US012666098B2

(12) United States Patent
Shanson et al.

(10) Patent No.: US 12,666,098 B2
(45) Date of Patent: Jun. 23, 2026

(54) METHODS AND SYSTEMS FOR GENERATING AND PROVIDING PROGRAM GUIDES AND CONTENT

(71) Applicant: Pluto Inc., West Hollywood, CA (US)

(72) Inventors: Spencer Shanson, Menlo Park, CA (US); Pavlo Kalmykov Vasilievich, Kharkov Oblast (UA); Jonathan Michael Jesperson, West Hollywood, CA (US); Adrian Chiu, West Hollywood, CA (US); Bryan Randall Fish, West Hollywood, CA (US); Jonathan Jovan Gwiazda, Carlsbad, CA (US); Sonia Priya Hashim, Saratoga, CA (US)

(73) Assignee: Pluto Inc., West Hollywood, CA (US)

( * ) Notice: Subject to any disclaimer, the term of this patent is extended or adjusted under 35 U.S.C. 154(b) by 0 days.

(21) Appl. No.: 19/051,027

(22) Filed: Feb. 11, 2025

(65) Prior Publication Data

US 2025/0211807 A1     Jun. 26, 2025

Related U.S. Application Data

(63) Continuation of application No. 18/516,669, filed on Nov. 21, 2023, now Pat. No. 12,244,880, which is a
(Continued)

(51) Int. Cl.
*H04N 21/25*          (2011.01)
*H04N 21/24*          (2011.01)
*H04N 21/2668*       (2011.01)
(52) U.S. Cl.
CPC ....... *H04N 21/251* (2013.01); *H04N 21/2407* (2013.01); *H04N 21/2668* (2013.01)

(58) Field of Classification Search
CPC ............. H04N 21/251; H04N 21/2407; H04N 21/2668
See application file for complete search history.

(56) References Cited

U.S. PATENT DOCUMENTS 5,411,493 A     5/1995  Rodriguez
6,378,129 B1    4/2002  Zetts
(Continued)

FOREIGN PATENT DOCUMENTS

EP          0594350 A1     10/1993
GB          2343051 A       4/2000
(Continued)

OTHER PUBLICATIONS

Extended European Search Report, regarding Application No. 25157794. 6, dated May 27, 2025, 8 pages.
(Continued)

*Primary Examiner* — Kyu Chae
(74) *Attorney, Agent, or Firm* — Knobbe, Martens, Olson & Bear LLP

(57)          ABSTRACT

Systems and methods are configured to manage streaming video content. A first time length specification for a content pod is accessed. If a determination is made that a response to a request for ancillary content of a duration corresponding to the first time length of the content pod includes ancillary content of insufficient duration to populate the first time length of the content pod, the content pod time length is reduced. Ancillary content items associated with the response to the request are streamed to a user device as part of a streaming channel comprising primary content having scheduled start times. A primary content item, having a scheduled start time, is streamed to the user device after the items of ancillary content, and earlier than the scheduled start time of the item of primary content.

20 Claims, 89 Drawing Sheets

Related U.S. Application Data continuation of application No. 18/062,720, filed on Dec. 7, 2022, now Pat. No. 11,849,165, which is a continuation of application No. 17/449,076, filed on Sep. 27, 2021, now Pat. No. 11,533,527, which is a continuation-in-part of application No. 17/150,897, filed on Jan. 15, 2021, now Pat. No. 11,425,437, which is a continuation of application No. 16/892,833, filed on Jun. 4, 2020, now Pat. No. 10,931,990, which is a continuation of application No. 16/405,443, filed on May 7, 2019, now Pat. No. 10,715,848.

(60) Provisional application No. 62/669,182, filed on May 9, 2018.

(56) References Cited

U.S. PATENT DOCUMENTS

| | | |
|---|---|---|
| 6,423,047 B1 | 7/2002 | Webster |
| 6,625,811 B1 | 9/2003 | Kaneko |
| 6,982,780 B2 | 1/2006 | Morley |
| 8,005,826 B1 | 8/2011 | Sahami |
| 8,418,195 B1 | 4/2013 | Page |
| 8,483,393 B2 | 7/2013 | Robert |
| 8,533,761 B1 | 9/2013 | Sahami |
| 8,572,649 B1 | 10/2013 | Gossweiler, III |
| 8,578,042 B2 | 11/2013 | Hu |
| 8,631,440 B2 | 1/2014 | Gossweiler, III |
| 8,745,023 B2 | 6/2014 | Libin |
| 8,826,443 B1 | 9/2014 | Raman |
| 9,112,623 B2 | 8/2015 | Blaxland |
| 9,130,918 B2 | 9/2015 | Picconi |
| 9,258,589 B2 | 2/2016 | Grouf et al. |
| 9,301,020 B2 | 3/2016 | Sun |
| 9,584,874 B1 | 2/2017 | Farias |
| 9,699,515 B2 | 7/2017 | Grouf et al. |
| 9,712,884 B2 | 7/2017 | Grouf et al. |
| 9,736,541 B1 | 8/2017 | Nijim |
| 9,998,787 B2 | 6/2018 | Grouf et al. |
| 10,063,612 B2 | 8/2018 | Brinkley |
| 10,104,445 B2 | 10/2018 | Patel |
| 10,140,493 B1 | 11/2018 | Raskin |
| 10,231,018 B2 | 3/2019 | Grouf et al. |
| 10,327,037 B2 | 6/2019 | Shanson et al. |
| 10,356,447 B2 | 7/2019 | Shanson |
| 10,356,480 B2 | 7/2019 | Hou et al. |
| 10,560,746 B2 | 2/2020 | Grouf et al. |
| 10,681,395 B1 | 6/2020 | Gang et al. |
| 10,681,431 B2 | 6/2020 | Levy |
| 10,715,848 B2 | 7/2020 | Hou |
| 10,820,066 B2 | 10/2020 | Caulfield |
| 10,902,474 B2 | 1/2021 | Lo |
| 10,931,990 B2 | 2/2021 | Hou |
| 10,939,168 B2 | 3/2021 | Grouf et al. |
| 11,533,527 B2 | 12/2022 | Shanson |
| 2002/0038457 A1 | 3/2002 | Numata |
| 2002/0121273 A1 | 9/2002 | Nyilas |
| 2003/0013424 A1 | 1/2003 | Adrain |
| 2003/0074664 A1 | 4/2003 | Kwoh |
| 2003/0088872 A1 | 5/2003 | Maissel et al. |
| 2003/0149988 A1 | 8/2003 | Ellis et al. |
| 2003/0212708 A1 | 11/2003 | Potrebic |
| 2003/0229900 A1 | 12/2003 | Reisman |
| 2004/0088737 A1 | 5/2004 | Donlan |
| 2004/0117831 A1 | 6/2004 | Ellis et al. |
| 2004/0123317 A1 | 6/2004 | Ozawa |
| 2004/0255336 A1 | 12/2004 | Logan et al. |
| 2006/0271959 A1 | 11/2006 | Jacoby |
| 2006/0294548 A1 | 12/2006 | Potrebic et al. |
| 2007/0107010 A1 | 5/2007 | Jolna |
| 2007/0204310 A1 | 8/2007 | Hua et al. |
| 2007/0294710 A1 | 12/2007 | Meesseman |
| 2007/0294734 A1 | 12/2007 | Arsenault |
| 2007/0299877 A1 | 12/2007 | Cohen et al. |
| 2008/0114880 A1 | 5/2008 | Jogand-Coulomb |
| 2008/0127257 A1 | 5/2008 | Kvache |
| 2008/0194276 A1 | 8/2008 | Lin |
| 2008/0235733 A1 | 9/2008 | Heie |
| 2008/0270462 A1 | 10/2008 | Thomsen |
| 2008/0271078 A1 | 10/2008 | Gossweiler |
| 2008/0271080 A1 | 10/2008 | Gossweiler |
| 2008/0306818 A1 | 12/2008 | Evans |
| 2009/0070819 A1 | 3/2009 | Gajda |
| 2009/0133054 A1 | 5/2009 | Boggie |
| 2009/0133090 A1 | 5/2009 | Busse |
| 2009/0199114 A1 | 8/2009 | Lewis |
| 2009/0204487 A1 | 8/2009 | Cansler |
| 2009/0241145 A1 | 9/2009 | Sharma |
| 2009/0259711 A1 | 10/2009 | Drieu et al. |
| 2009/0300675 A1 | 12/2009 | Shkedi |
| 2010/0021512 A1 | 1/2010 | Arron |
| 2010/0037253 A1 | 2/2010 | Sheehan |
| 2010/0138297 A1 | 6/2010 | Fitzgerald |
| 2010/0138298 A1 | 6/2010 | Fitzgerald |
| 2010/0169459 A1 | 7/2010 | Biderman |
| 2010/0180302 A1 | 7/2010 | Ellis et al. |
| 2010/0272419 A1 | 10/2010 | Wang |
| 2010/0299264 A1 | 11/2010 | Berger |
| 2010/0325657 A1 | 12/2010 | Sellers |
| 2011/0030012 A1 | 2/2011 | Diaz Perez |
| 2011/0072105 A1 | 3/2011 | Biderman |
| 2011/0126251 A1 | 5/2011 | LaFreniere |
| 2011/0126258 A1 | 5/2011 | Emerson |
| 2011/0149992 A1 | 6/2011 | Sharma et al. |
| 2011/0153423 A1 | 6/2011 | Elvekrog |
| 2011/0231660 A1 | 9/2011 | Kanungo |
| 2011/0261171 A1 | 10/2011 | Otsuka et al. |
| 2011/0264522 A1 | 10/2011 | Chan |
| 2012/0102524 A1 | 4/2012 | Goldschmidt Iki et al. |
| 2012/0110621 A1 | 5/2012 | Gossweiler, III |
| 2012/0116869 A1 | 5/2012 | Vasudevan |
| 2012/0144416 A1 | 6/2012 | Wetzer et al. |
| 2012/0158492 A1 | 6/2012 | Ye et al. |
| 2012/0174157 A1 | 7/2012 | Stinson, III |
| 2012/0192232 A1 | 7/2012 | Ellis |
| 2012/0272264 A1 | 10/2012 | Suzuki |
| 2013/0080579 A1 | 3/2013 | Gordon et al. |
| 2013/0080772 A1 | 3/2013 | McGowan |
| 2013/0152319 A1 | 6/2013 | Davis et al. |
| 2013/0170818 A1 | 7/2013 | Klappert |
| 2013/0175333 A1 | 7/2013 | Gilbert |
| 2013/0198642 A1 | 8/2013 | Carney |
| 2013/0198779 A1 | 8/2013 | Moon |
| 2013/0208188 A1 | 8/2013 | Nadarajah |
| 2013/0239136 A1 | 9/2013 | Babu |
| 2013/0276032 A1 | 10/2013 | Walter et al. |
| 2013/0298179 A1 | 11/2013 | Baum et al. |
| 2013/0305285 A1 | 11/2013 | Cook |
| 2013/0305287 A1 | 11/2013 | Wong |
| 2013/0311780 A1 | 11/2013 | Besehanic |
| 2013/0312028 A1 | 11/2013 | Dharmaji et al. |
| 2013/0312041 A1 | 11/2013 | Gresta |
| 2013/0332959 A1 | 12/2013 | Kothari |
| 2013/0347018 A1 | 12/2013 | Limp |
| 2014/0007170 A1 | 1/2014 | Klappert et al. |
| 2014/0033240 A1 | 1/2014 | Card, II |
| 2014/0090001 A1 | 3/2014 | Das |
| 2014/0115625 A1 | 4/2014 | McCoy |
| 2014/0150019 A1 | 5/2014 | Ma et al. |
| 2014/0157312 A1 | 6/2014 | Williams |
| 2014/0189743 A1 | 7/2014 | Kennedy |
| 2014/0201791 A1 | 7/2014 | Angiolillo et al. |
| 2014/0245351 A1 | 8/2014 | Ford |
| 2014/0282650 A1 | 9/2014 | Viles |
| 2014/0282667 A1 | 9/2014 | Major |
| 2014/0282677 A1 | 9/2014 | Mantell |
| 2014/0282736 A1 | 9/2014 | Elstermann |
| 2014/0298363 A1 | 10/2014 | Begeja et al. |
| 2014/0304756 A1 | 10/2014 | Fletcher |
| 2014/0348491 A1 | 11/2014 | Redmann |
| 2014/0351843 A1 | 11/2014 | Theriault |
| 2014/0366068 A1 | 12/2014 | Burkitt |
| 2014/0373041 A1 | 12/2014 | Yan |
| 2015/0020099 A1 | 1/2015 | Qin |

(56) References Cited

U.S. PATENT DOCUMENTS

| | | | |
|---|---|---|---|
| 2015/0113547 A1 | 4/2015 | Wolf | |
| 2015/0128163 A1 | 5/2015 | Cormican | |
| 2015/0143413 A1 | 5/2015 | Hall | |
| 2015/0186800 A1* | 7/2015 | Kaplow | G06N 5/04 |
| | | | 706/12 |
| 2015/0189347 A1 | 7/2015 | Oztaskent | |
| 2015/0237389 A1 | 8/2015 | Grouf | |
| 2015/0249869 A1 | 9/2015 | Dhruv et al. | |
| 2015/0264450 A1 | 9/2015 | Jung | |
| 2015/0302463 A1 | 10/2015 | Tinsman | |
| 2015/0310498 A1 | 10/2015 | Brandstetter | |
| 2015/0358661 A1 | 12/2015 | Navarro | |
| 2016/0073439 A1 | 3/2016 | Palin | |
| 2016/0112740 A1 | 4/2016 | Francisco | |
| 2016/0150294 A1 | 5/2016 | Phatak | |
| 2016/0198202 A1 | 7/2016 | Van Brandenburg et al. | |
| 2016/0241914 A1 | 8/2016 | Shenkler | |
| 2017/0085962 A1 | 3/2017 | Maughan | |
| 2017/0116530 A1 | 4/2017 | Modarresi | |
| 2017/0251238 A1 | 8/2017 | Feldman | |
| 2017/0264742 A1 | 9/2017 | Karimli | |
| 2018/0014077 A1 | 1/2018 | Hou et al. | |
| 2018/0060759 A1 | 3/2018 | Chu | |
| 2018/0103079 A1 | 4/2018 | Lewis | |
| 2018/0276256 A1 | 9/2018 | Sarkar | |
| 2018/0316968 A1* | 11/2018 | Card, II | H04N 21/2668 |
| 2019/0090027 A1 | 3/2019 | Lewis | |
| 2019/0098344 A1 | 3/2019 | Shanson | |
| 2019/0114662 A1* | 4/2019 | Bennion | G06Q 30/0255 |
| 2019/0228439 A1* | 7/2019 | Anthony | G06Q 30/0271 |
| 2020/0084486 A1 | 3/2020 | Cho | |
| 2020/0145702 A1 | 5/2020 | Feldman | |
| 2020/0228870 A1 | 7/2020 | Gordon | |
| 2020/0304851 A1 | 9/2020 | Hou | |
| 2021/0044869 A1 | 2/2021 | Grouf et al. | |
| 2022/0046302 A1 | 2/2022 | Shanson et al. | |
| 2023/0179421 A1 | 6/2023 | Rojas | |
| 2024/0098324 A1 | 3/2024 | Shanson et al. | |

FOREIGN PATENT DOCUMENTS

| | | |
|---|---|---|
| KR | 10-2009-0004398 A | 1/2009 |
| KR | 10-2014-0024359 A | 2/2014 |
| KR | 10-2015-0066915 A | 6/2015 |
| KR | 10-2016-0021132 A | 2/2016 |
| WO | WO 00/40021 A1 | 7/2000 |
| WO | WO 2004/077808 A2 | 9/2004 |
| WO | WO 2005/048589 A2 | 5/2005 |
| WO | WO 2007/123613 A1 | 11/2007 |
| WO | WO 2008/007274 A2 | 1/2008 |
| WO | WO 2011/106601 A2 | 9/2011 |
| WO | WO 2012/079054 | 6/2012 |
| WO | WO 2015/036518 A1 | 3/2015 |

OTHER PUBLICATIONS

Australian Examination Report regarding Application No. 2015218353, dated Nov. 2, 2018, 7 pages.

Australian Office Action regarding Application No. 2023201517, dated Apr. 11, 2024, 2 pages.

European Office Action dated Jul. 28, 2022, received in European Patent Application No. 19 798 921.3, in 7 pages.

European Search Report dated May 3, 2019 received for European Patent Application No. EP 19 15 8438, 10 pages.

Examination Report dated Apr. 16, 2019, received in Australian Patent Application No. 2015218353.

Examination Report dated Jul. 25, 2019, received in Australian Patent Application No. 2015218353.

Extended European Search Report dated Apr. 8, 2021, received in EP Patent Application No. 18858617.6, in 9 pages.

Extended European Search Report dated Aug. 4, 2017, Application No. 15749508.6.

Extended European Search Report dated Feb. 12, 2020, received in EP Patent Application No. 17824725.0.

Extended European Search Report dated Jan. 3, 2023, received in European Patent Application No. 22186793, in 10 pages.

Extended European Search Report dated Jun. 4, 2021, received in European Patent Application No. 19798921.3, in 10 pages.

Host. Oxford Dictionaries. Oxford University Press, n.d. Web. Sep. 3, 2016. <http://www.oxforddictionaries.com/us/definition/american_english/host>., 7 pages.

International Search And Written Opinion dated Jan. 4, 2023, received in International Patent Applicatoin No. PCT/US2022/076427, in 10 pages.

International Search Report and Written Opinion dated Apr. 1, 2019 received in International Patent Application No. PCT/UC2018/051966, in 18 pages.

International Search Report and Written Opinion, dated/mailed May 21, 2015, in International Application No. PCT/US2015/015902, 17 pp.

Li et al., "Video Multicast over the Internet", IEEE Network, vol. 13, Issue: 2, pp. 46-60, Mar./Apr. 1999.

Office Action dated Jun. 29, 2020 received in European Patent Application No. 19 158 438.2, in 4 pages.

Office Action dated Jun. 26, 2024, received in European Patent Application No. 22186793.0, in 8 pages.

PCT Search Report and Written Opinion dated Feb. 26, 2018 received in International Patent Application No. PCT/US2017/039960, in 18 pages.

* cited by examiner

102

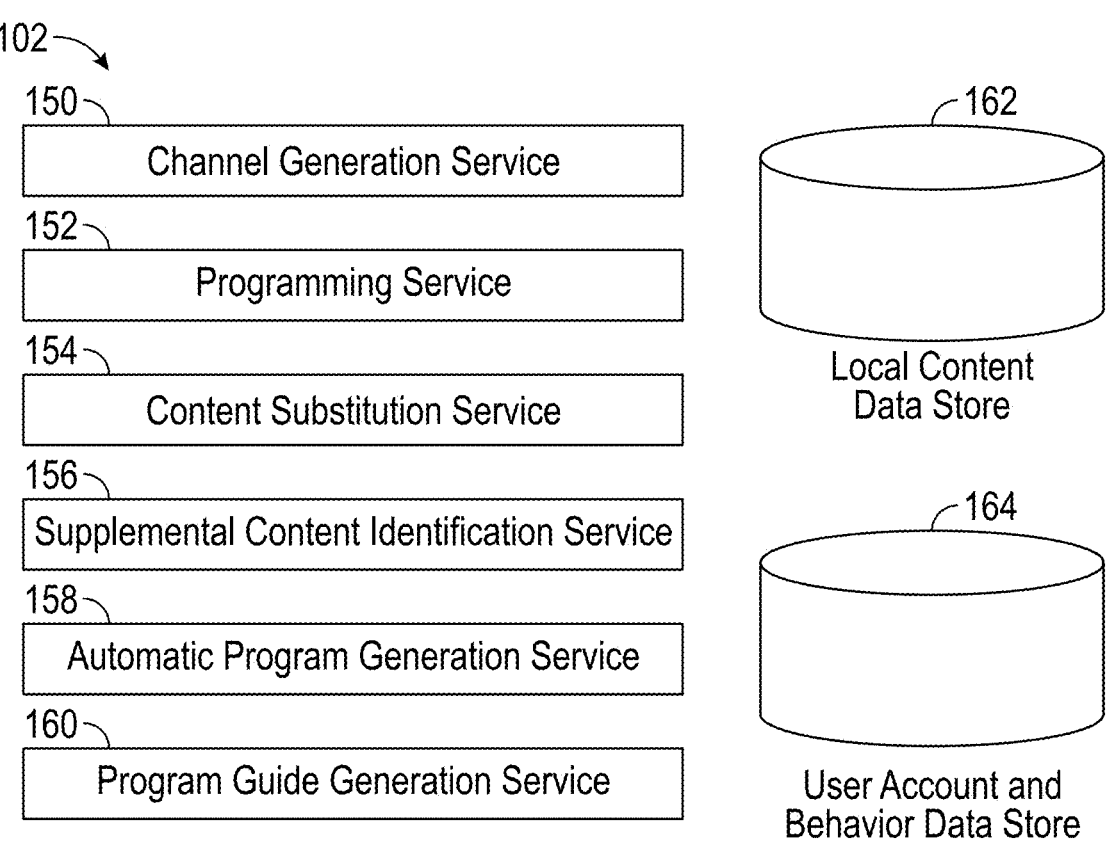

150
Channel Generation Service

152
Programming Service

154
Content Substitution Service

156
Supplemental Content Identification Service

158
Automatic Program Generation Service

160
Program Guide Generation Service

162
Local Content
Data Store

164
User Account and
Behavior Data Store

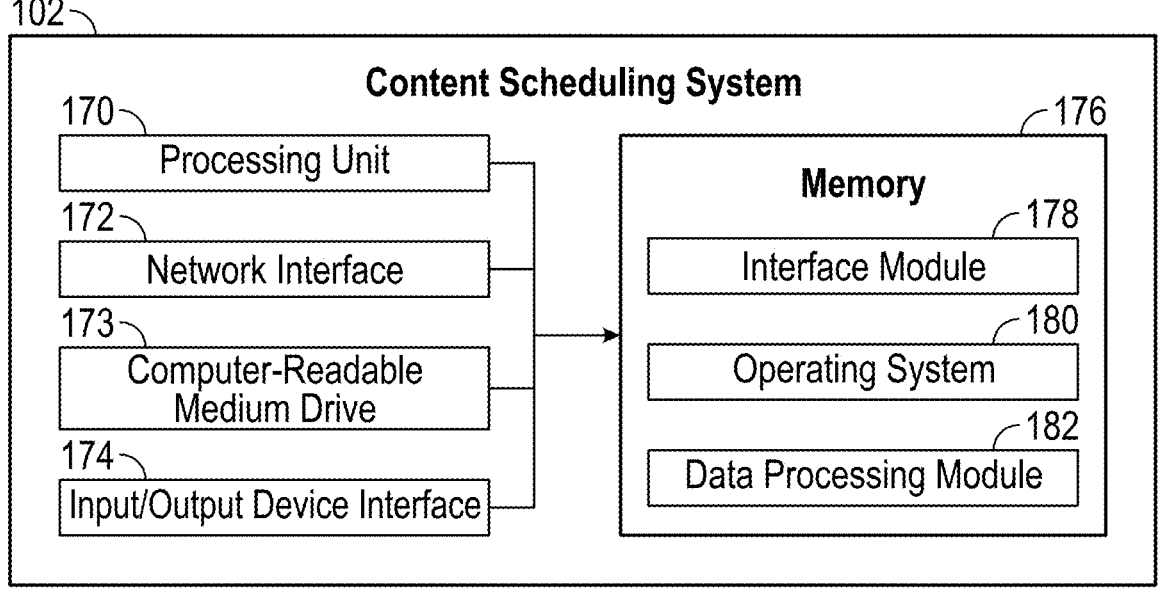

Content Scheduling System

170
Processing Unit

172
Network Interface

173
Computer-Readable
Medium Drive

174
Input/Output Device Interface

176
Memory

178
Interface Module

180
Operating System

182
Data Processing Module

FIG. 1C

PLUTO.TV ≡ 603 Cats 24/7   < ∨ All Channels    Feedback ⌗ | ◀⦁ | ⊠ Hi, Lisa Sign out ALL
a chat
24/7

Music
101 Top 40
102 Party Playlists
103 Underground Pulse
104 Hip Hop
105 Old Skool
106 EDM
107 Indie Music
108 Live
109 Top Dance Hits
111 1970's Music
112 1980's Music
113 1990's Music
114 2000's Music
115 Classic Rock
116 Alt Rock
117 Metal Rock
119 Covers
120 Country
131 Christian
134 Latin Pop

News & Info

Sports
509 Sport X
510 Fight Night
511 SK8
515 Snow Sports
516 Surfing

Entertainment
601 Top Viral Clips
602 Web Sci-Fi
603 Cats 24/7
604 Dogs 24/7
605 Web Comedy
606 Web Drama
607 X Toons
608 Web Talk
609 Classic Toons
611 Adult Swim

Comedy
301 Stand Up
302 COMEDY QA
304 Best of Youtube:
    Comedy 2013
307 Classic Stand Up
308 Sketch Comedy
309 NSFW Comedy
311 Fail Videos
314 Pranked
315 Female Comedians
317 NextGen Comedy
318 Comedy Grab Bag

TV
667 Daytime Soaps

Film
713 Movie Trailers
715 Comedy Film

Kids
401 Plutots: Songtime
404 Pluto Kids: Science
406 Plutots: Learn & Pay
408 Pluto Kids: How Things Work
409 Kids Shows
412 School Kids: History

Tech
552 Gadget
555 Nerd Culture
557 Gamer Lifestyle
558 Action Adventure Gaming
561 FPS ZONE
562 Minecraft
563 Car Reviews

Lifestyle
751 Healthy Cooking
755 World Travel

VIEW ALL CHANNELS ▢

| | | 2pm | | 3pm | | 4pm | |
|---|---|---|---|---|---|---|---|
| ◁ | | Splinter Cell... | H+: Part 1 | Video Game... | SYNC: Part1 | The Power In... | Star Talk with...| The cell: Part1 |
| ☆ | 602 | Web sci-fi | Cats Gone Viral! Sa... | Cats Gone Viral! Friday | | Cats Gone viral Thursday | |
| ★ | 603 | Cats 24/7 | Heroic Pups | Awesome Dog Tricks-Sunday | | Heroic Pups | |
| ☆ | 604 | Dogs 24/7 | The Onion S... | Leap Year: Pa... | The Onion SK... | Double Feature: Your Dad's Friends + Friend Pals| Dead Kevi| Amy Poehler's... |
| ☆ | 605 | Web comedy | | | | | |

FIG. 2B

Pluto Dashboard × pluto.tv:3000 #/channels

Pluto Dashboard   Channels   Clips   Episodes   Fragmented Episodes

Channels   ( Search channels... )

+ New Channel

Next

| No. | Title | Actions |
|-----|-------|---------|
| 0 | Welcome | ✐ ⊠ Delete |
| 101 | Top 40 | ✐ ⊠ Delete |
| 102 | Top Dance Hits | ✐ ⊠ Delete |
| 103 | Top Web Tracks | ✐ ⊠ Delete |
| 104 | Top Country Hits | ✐ ⊠ Delete |
| 105 | Party | ✐ ⊠ Delete |
| 106 | Underground Pulse | ✐ ⊠ Delete |
| 107 | Covers | ✐ ⊠ Delete |
| 108 | EDM | ✐ ⊠ Delete |
| 109 | Hip Hop | ✐ ⊠ Delete |
| 110 | Old Skool | ✐ ⊠ Delete |
| 111 | Indie Music | ✐ ⊠ Delete |
| 112 | Alt Rock | ✐ ⊠ Delete |
| 113 | Latin Pop | ✐ ⊠ Delete |
| 115 | Christian | ✐ ⊠ Delete |

FIG. 3B

Pluto Dashboard pluto.tv:3000 /#/channels/51c75f7bb6f26ba1cd000017

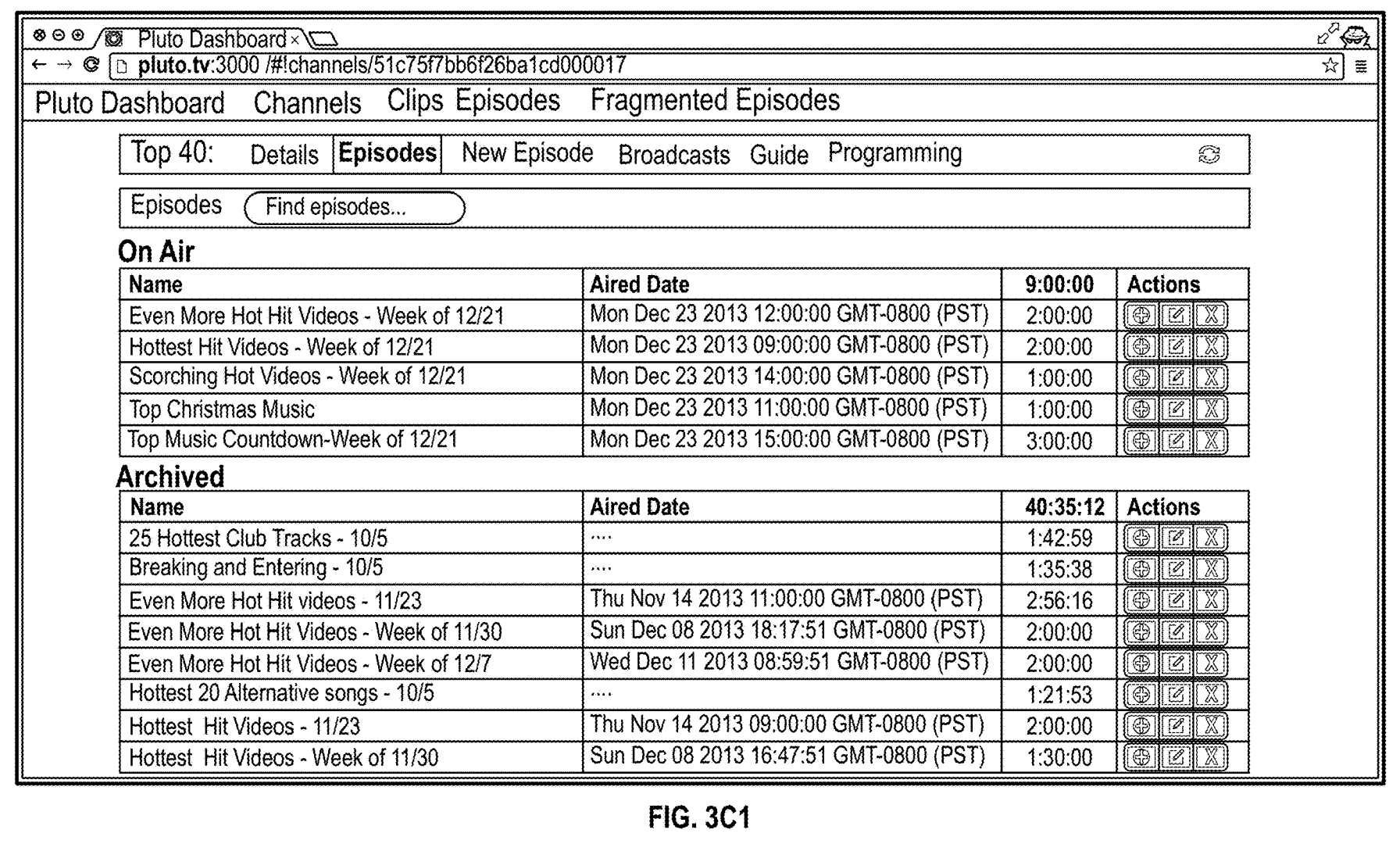

Pluto Dashboard   Channels   Clips   Episodes   Fragmented Episodes

Top 40:   Details   Episodes   New Episode   Broadcasts   Guide   Programming Episodes   ( Find episodes... )

On Air

| Name | Aired Date | 9:00:00 | Actions |
|---|---|---|---|
| Even More Hot Hit Videos - Week of 12/21 | Mon Dec 23 2013 12:00:00 GMT-0800 (PST) | 2:00:00 | ⊕ ✎ ✕ |
| Hottest Hit Videos - Week of 12/21 | Mon Dec 23 2013 09:00:00 GMT-0800 (PST) | 2:00:00 | ⊕ ✎ ✕ |
| Scorching Hot Videos - Week of 12/21 | Mon Dec 23 2013 14:00:00 GMT-0800 (PST) | 1:00:00 | ⊕ ✎ ✕ |
| Top Christmas Music | Mon Dec 23 2013 11:00:00 GMT-0800 (PST) | 1:00:00 | ⊕ ✎ ✕ |
| Top Music Countdown-Week of 12/21 | Mon Dec 23 2013 15:00:00 GMT-0800 (PST) | 3:00:00 | ⊕ ✎ ✕ |

Archived

| Name | Aired Date | 40:35:12 | Actions |
|---|---|---|---|
| 25 Hottest Club Tracks - 10/5 | ... | 1:42:59 | ⊕ ✎ ✕ |
| Breaking and Entering - 10/5 | ... | 1:35:38 | ⊕ ✎ ✕ |
| Even More Hot Hit videos - 11/23 | Thu Nov 14 2013 11:00:00 GMT-0800 (PST) | 2:56:16 | ⊕ ✎ ✕ |
| Even More Hot Hit Videos - Week of 11/30 | Sun Dec 08 2013 18:17:51 GMT-0800 (PST) | 2:00:00 | ⊕ ✎ ✕ |
| Even More Hot Hit Videos - Week of 12/7 | Wed Dec 11 2013 08:59:51 GMT-0800 (PST) | 2:00:00 | ⊕ ✎ ✕ |
| Hottest 20 Alternative songs - 10/5 | ... | 1:21:53 | ⊕ ✎ ✕ |
| Hottest Hit Videos - 11/23 | Thu Nov 14 2013 09:00:00 GMT-0800 (PST) | 2:00:00 | ⊕ ✎ ✕ |
| Hottest Hit Videos - Week of 11/30 | Sun Dec 08 2013 16:47:51 GMT-0800 (PST) | 1:30:00 | ⊕ ✎ ✕ |

FIG. 3C1

Pluto Dashboard × curation.pluto.tv/#!channels/521e345cc66c1204500010b

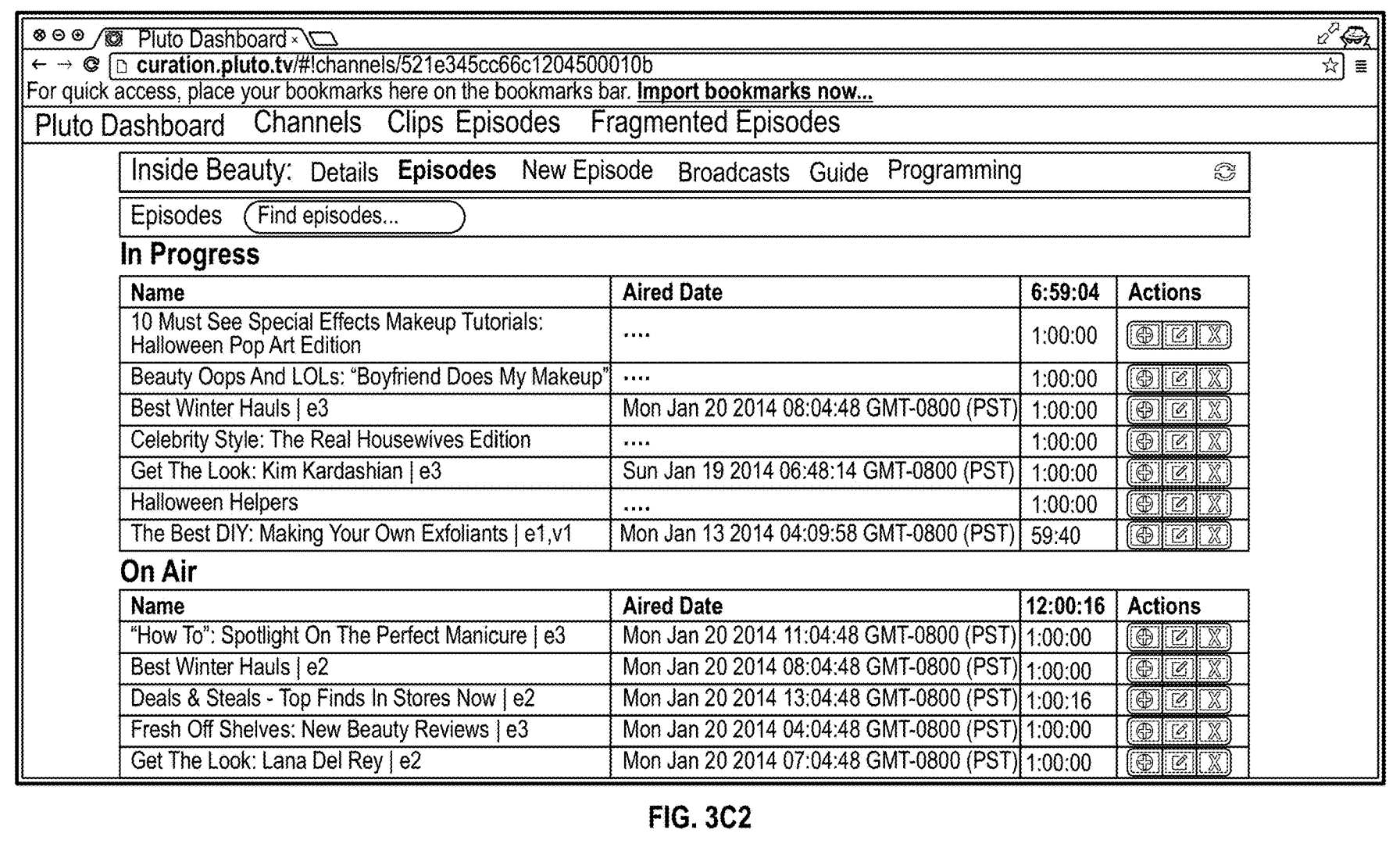

For quick access, place your bookmarks here on the bookmarks bar. Import bookmarks now...

Pluto Dashboard   Channels   Clips   Episodes   Fragmented Episodes

Inside Beauty:   Details   Episodes   New Episode   Broadcasts   Guide   Programming Episodes   (Find episodes....)

In Progress

| Name | Aired Date | 6:59:04 | Actions |
|---|---|---|---|
| 10 Must See Special Effects Makeup Tutorials: Halloween Pop Art Edition | ... | 1:00:00 | |
| Beauty Oops And LOLs: "Boyfriend Does My Makeup" | ... | 1:00:00 | |
| Best Winter Hauls \| e3 | Mon Jan 20 2014 08:04:48 GMT-0800 (PST) | 1:00:00 | |
| Celebrity Style: The Real Housewives Edition | ... | 1:00:00 | |
| Get The Look: Kim Kardashian \| e3 | Sun Jan 19 2014 06:48:14 GMT-0800 (PST) | 1:00:00 | |
| Halloween Helpers | ... | 1:00:00 | |
| The Best DIY: Making Your Own Exfoliants \| e1,v1 | Mon Jan 13 2014 04:09:58 GMT-0800 (PST) | 59:40 | |

On Air

| Name | Aired Date | 12:00:16 | Actions |
|---|---|---|---|
| "How To": Spotlight On The Perfect Manicure \| e3 | Mon Jan 20 2014 11:04:48 GMT-0800 (PST) | 1:00:00 | |
| Best Winter Hauls \| e2 | Mon Jan 20 2014 08:04:48 GMT-0800 (PST) | 1:00:00 | |
| Deals & Steals - Top Finds In Stores Now \| e2 | Mon Jan 20 2014 13:04:48 GMT-0800 (PST) | 1:00:16 | |
| Fresh Off Shelves: New Beauty Reviews \| e3 | Mon Jan 20 2014 04:04:48 GMT-0800 (PST) | 1:00:00 | |
| Get The Look: Lana Del Rey \| e2 | Mon Jan 20 2014 07:04:48 GMT-0800 (PST) | 1:00:00 | |

FIG. 3C2

Pluto Dashboard × curation.pluto.tv/#/channels/51c7577bb6f26ba1cd000017/episodes/52cf182dc2ea215b090019b4

For quick access, place your bookmarks here on the bookmarks bar. Import bookmarks now...

Pluto Dashboard   Channels   Clips   Episodes   Fragmented Episodes

Even More Hot Hit Videos - Week of 1/18: Channel Episodes Episode Details Clips New Episode Broadcasts Guide Progamming Clips    Find a Clip    |  ▦  ▤  |  Import ▽  |  ✕ Shuffle  |  Published Unpublished  |  On Air ▲ ▼  |  Save

| Name | Provider | Author | Link | 2:00:00 | Actions |
|---|---|---|---|---|---|
| PlutoTV 10 - Smoke | youtube | Pluto TV | https://www.youtube.com/watch?v=8E8QeuVebdM | 00:10 | |
| T-Pain feat. B.O.B - Up Down (Do This All Day) (Explicit) | youtube | TPainVEVO | https://www.youtube.com/watch?v=45Q4ZK3CN8k | 4:28 | |
| Janson Derulo "Marry Me" (Offical HD Music Video) | youtube | Jason Derulo | https://www.youtube.com/watch?v=zRCsZ5a3aCM | 3:46 | |
| Katy Perry - Unconditionally (Official) | youtube | KatyPerryVEVO | https://www.youtube.com/watch?v=XjwZAa2E;kA | 3:57 | |
| Lorde - Royals (US Version) | youtube | LordeVEVO | https://www.youtube.com/watch?v=niclKh6sBtc | 3:21 | |
| Ylvis - The Fox (What Does the Fox Say?) [Official Music Video HD] | youtube | tvnorge | https://www.youtube.com/watch?v=iofNR_WkoCE | 3:45 | |
| The Neighbourhood - Sweater Weather | youtube | TheNeighbourhoodVEVO | https://www.youtube.com/watch?v=GCdwKhTtNNw | 4:13 | |
| Zendaya - Replay | youtube | ZendayaVEVO | https://www.youtube.com/watch?v=cyLE4814XY0 | 4:01 | |
| PlutoTV: Watch What's Possible | youtube | PlutoTV | https://www.youtube.com/watch?v=OMN-GMvNCKc | 00:15 | |
| John Newman - Love Me Again | youtube | JhonNewmanVEVO | https://www.youtube.com/watch?v=CfihYWRWRTQ | 3:56 | |
| Future - Honest | youtube | FutureVEVO | https://www.youtube.com/watch?v=FAeAp9MzPtk | 3:37 | |
| Cassadee Pope - Wasting All These Tears | youtube | CassadeeVEVO | https://www.youtube.com/watch?v=EJZOeTnvq4k | 3:41 | |
| Hunter Hayes featuring Jason Marz - "Everbody's Got Somebody But Me" [Official Video] | youtube | hunterhayes | https://www.youtube.com/watch?v=yVdnvQsKyUs | 3:01 | |
| Sage The Gemini - Red Nose | youtube | SageTheGeminiVEVO | https://www.youtube.com/watch?v=-l-YY5p0uq8 | 3:48 | |
| Rich Homie Quan - Type of Way | youtube | RichHomieQuanVEVO | https://www.youtube.com/watch?v=-KKbdEr.JKlY | 4:34 | |

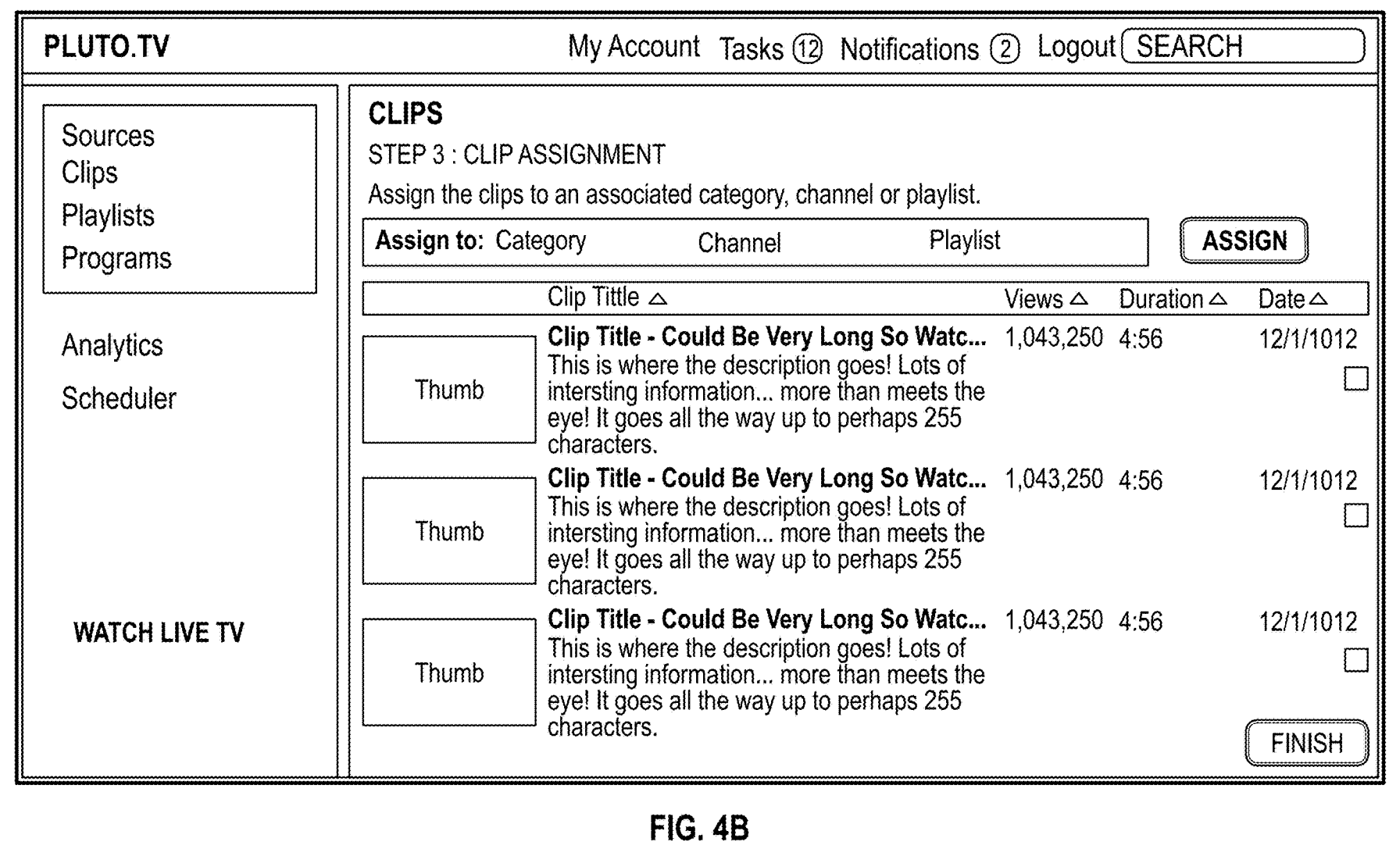

PLUTO.TV

My Account   Tasks ⑫   Notifications ②   Logout   SEARCH

Sources
Clips
Playlists
Programs

CLIPS

STEP 3 : CLIP ASSIGNMENT

Assign the clips to an associated category, channel or playlist.

Assign to: Category     Channel     Playlist     ASSIGN

| Clip Title △ | Views △ | Duration △ | Date △ | |
|---|---|---|---|---|
| Thumb | Clip Title - Could Be Very Long So Watc... This is where the description goes! Lots of intersting information... more than meets the eye! It goes all the way up to perhaps 255 characters. | 1,043,250 | 4:56 | 12/1/1012 ☐ |
| Thumb | Clip Title - Could Be Very Long So Watc... This is where the description goes! Lots of intersting information... more than meets the eye! It goes all the way up to perhaps 255 characters. | 1,043,250 | 4:56 | 12/1/1012 ☐ |
| Thumb | Clip Title - Could Be Very Long So Watc... This is where the description goes! Lots of intersting information... more than meets the eye! It goes all the way up to perhaps 255 characters. | 1,043,250 | 4:56 | 12/1/1012 ☐ |

FINISH

Analytics
Scheduler

WATCH LIVE TV

FIG. 4B

PLUTO.TV                    My Account   Tasks ⑫   Notifications ② Logout [SEARCH]

Sources
Clips
Playlists
Programs

Analytics
Scheduler

WATCH LIVE TV

CLIPS

STEP 2 : REMOVE BAD URLS

Below are URLs that were rejected because they are not able to be embedded on Pluto TV.

| Clip Tittle △ | | Views △ | Duration △ | Date △ |
|---|---|---|---|---|
| Thumb | Clip Title - Could Be Very Long So Watc... This is where the description goes! Lots of intersting information... more than meets the eye! It goes all the way up to perhaps 255 characters. | 1,043,250 | 4:56 | 12/1/1012 |
| Thumb | Clip Title - Could Be Very Long So Watc... This is where the description goes! Lots of intersting information... more than meets the eye! It goes all the way up to perhaps 255 characters. | 1,043,250 | 4:56 | 12/1/1012 |

[ REMOVE AND CONTINUE ]

FIG. 4C

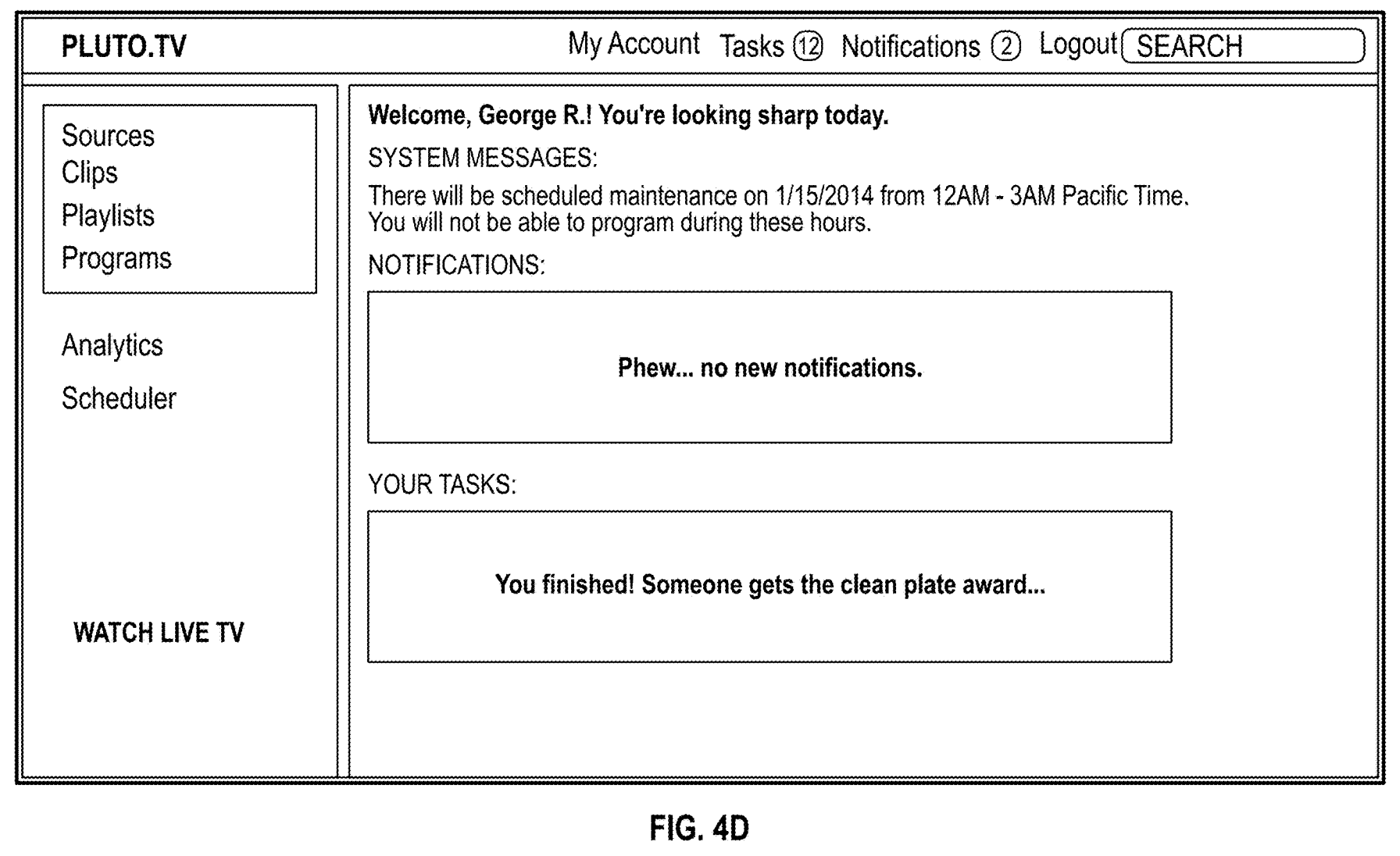

PLUTO.TV

My Account   Tasks ⑫   Notifications ②   Logout  [SEARCH]

Sources
Clips
Playlists
Programs

Analytics
Scheduler

WATCH LIVE TV

Welcome, George R.! You're looking sharp today.

SYSTEM MESSAGES:

There will be scheduled maintenance on 1/15/2014 from 12AM - 3AM Pacific Time.
You will not be able to program during these hours.

NOTIFICATIONS:

Phew... no new notifications.

YOUR TASKS:

You finished! Someone gets the clean plate award...

FIG. 4D

PLUTO.TV

My Account   Tasks ⑫   Notifications ②   Logout   SEARCH

Sources
Clips
Playlists
Programs

Analytics
Scheduler

WATCH LIVE TV

NOTIFICATIONS

| Channel Name | Show Name | Ep. # | Status | Date |
|---|---|---|---|---|
| Ammo | Big Time Explosions | 2 | Broken Link | 12/09/2013 |
| TOP 40 | This Week's Hits | | Broken Link | 12/06/2013 |

Mousing over the row in the table will show that you can click and it will take you to the playlist where you need to fix the broken link .

The "Date" is the date that the link was reported broken.

As of right now, I can't think of any other notifications to tell curators.

FIG. 4E

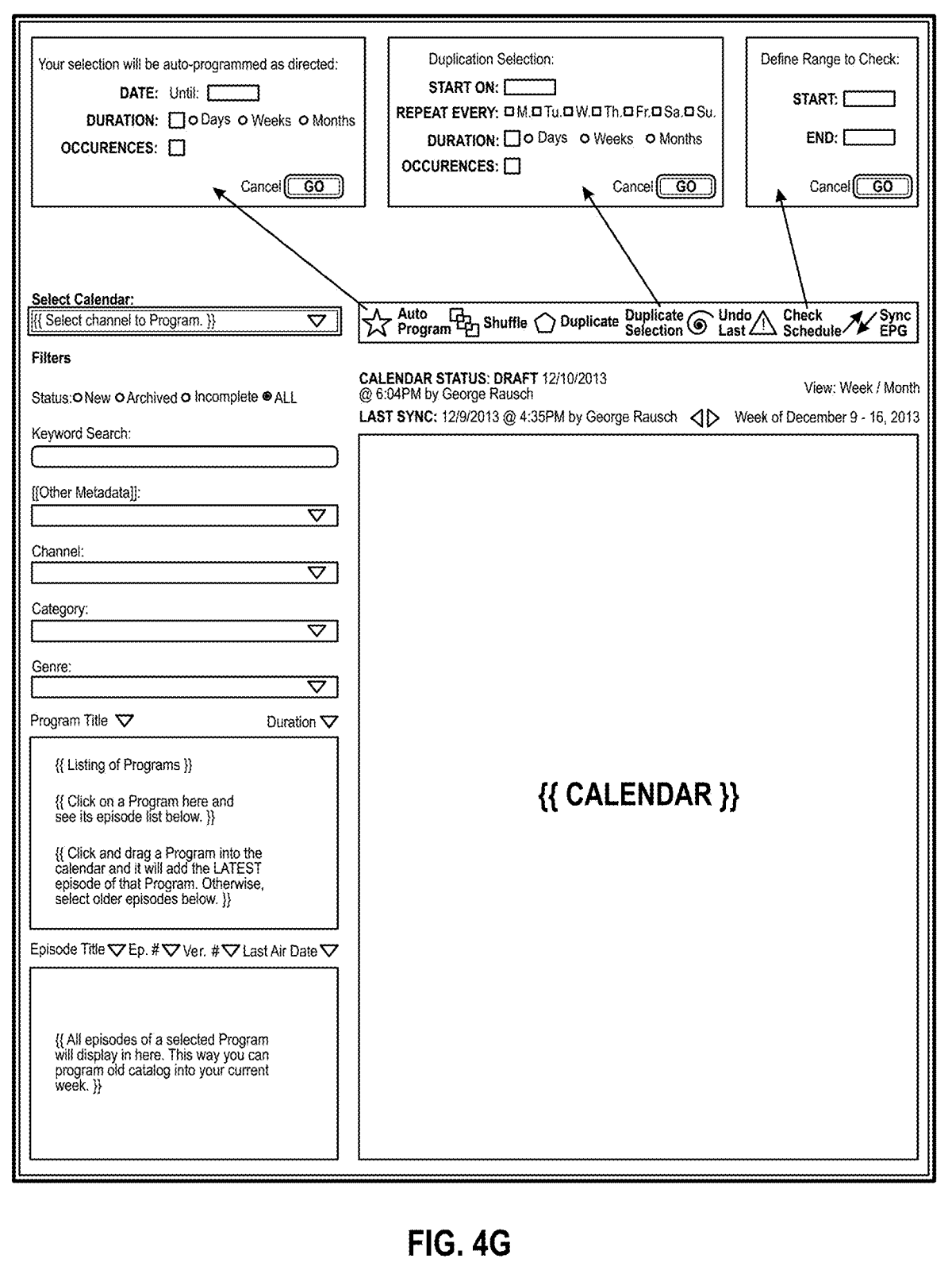

Your selection will be auto-programmed as directed:

DATE: Until: [_____]

DURATION: ☐ o Days  o Weeks  o Months

OCCURENCES: ☐

Cancel [ GO ]

Duplication Selection:

START ON: [_____]

REPEAT EVERY: ☐ M. ☐ Tu. ☐ W. ☐ Th. ☐ Fr. ☐ Sa. ☐ Su.

DURATION: ☐ o Days  o Weeks  o Months

OCCURENCES: ☐

Cancel [ GO ]

Define Range to Check:

START: [_____]

END: [_____]

Cancel [ GO ]

Select Calendar:

[{{ Select channel to Program. }}           ▽]

☆ Auto Program   ⊞ Shuffle   ⬠ Duplicate   Duplicate Selection ◉   Undo Last △   Check Schedule ⚠   Sync EPG

Filters

Status: o New  o Archived  o Incomplete  ⊙ ALL

Keyword Search:

[_____]

{{Other Metadata}}:

[_____ ▽]

Channel:

[_____ ▽]

Category:

[_____ ▽]

Genre:

[_____ ▽]

Program Title ▽                    Duration ▽

{{ Listing of Programs }}

{{ Click on a Program here and see its episode list below. }}

{{ Click and drag a Program into the calendar and it will add the LATEST episode of that Program. Otherwise, select older episodes below. }}

Episode Title ▽ Ep. # ▽ Ver. # ▽ Last Air Date ▽

{{ All episodes of a selected Program will display in here. This way you can program old catalog into your current week. }}

CALENDAR STATUS: DRAFT 12/10/2013
@ 6:04PM by George Rausch                                View: Week / Month
LAST SYNC: 12/9/2013 @ 4:35PM by George Rausch ◁▷ Week of December 9 - 16, 2013

{{ CALENDAR }}

FIG. 4G

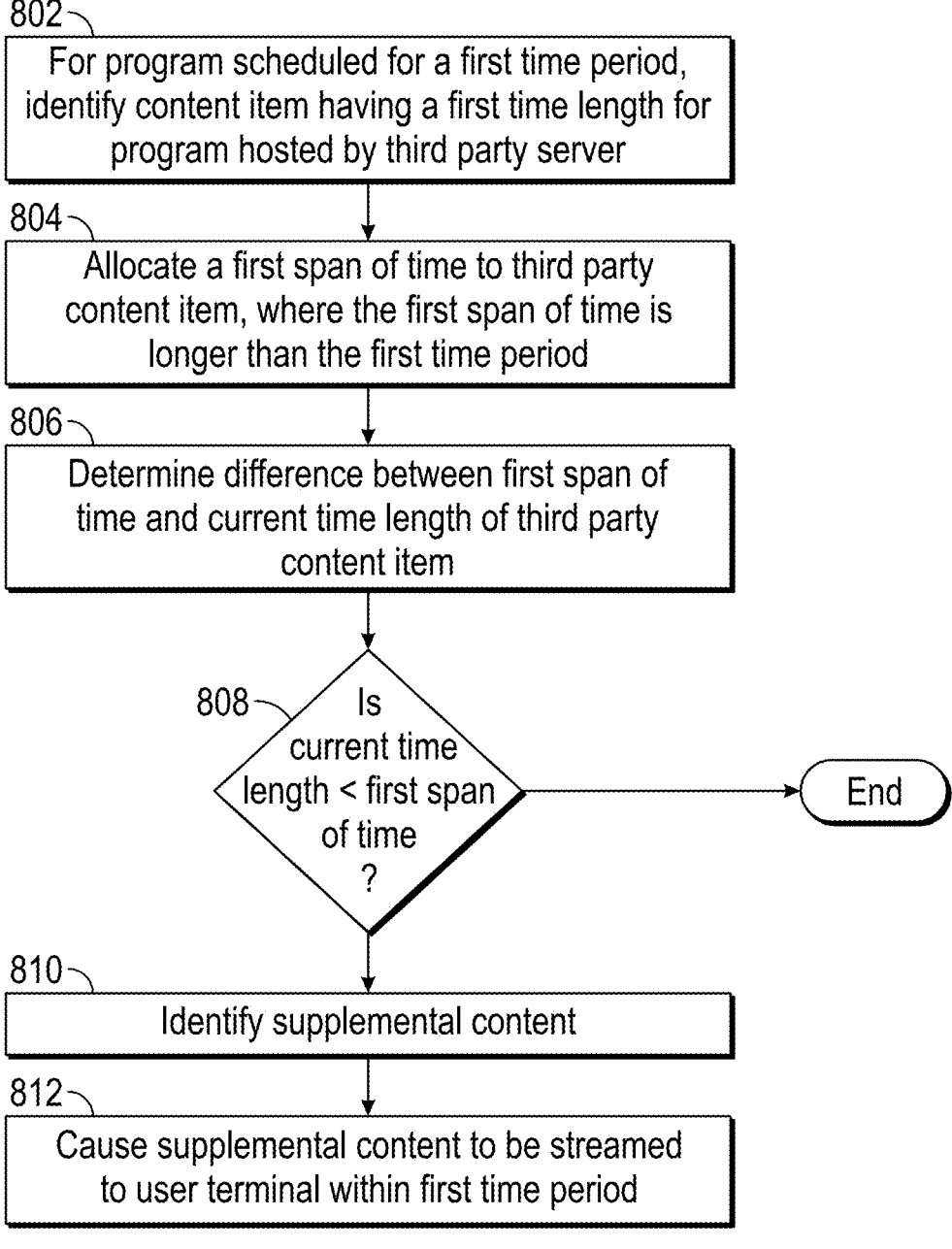

802
For program scheduled for a first time period, identify content item having a first time length for program hosted by third party server 804
Allocate a first span of time to third party content item, where the first span of time is longer than the first time period 806
Determine difference between first span of time and current time length of third party content item 808
Is current time length < first span of time ?

End

810
Identify supplemental content

812
Cause supplemental content to be streamed to user terminal within first time period

FIG. 8

902 — Access explicitly provided user preferences

904 — Access user behaviors

906 — Infer user preferences

908 — Dynamically generate custom program guide

910 — Provide dynamically generated customer program guide for display

1002 — Receive content criteria

1004 — Identify content satisfying criteria

1006 — Assemble program

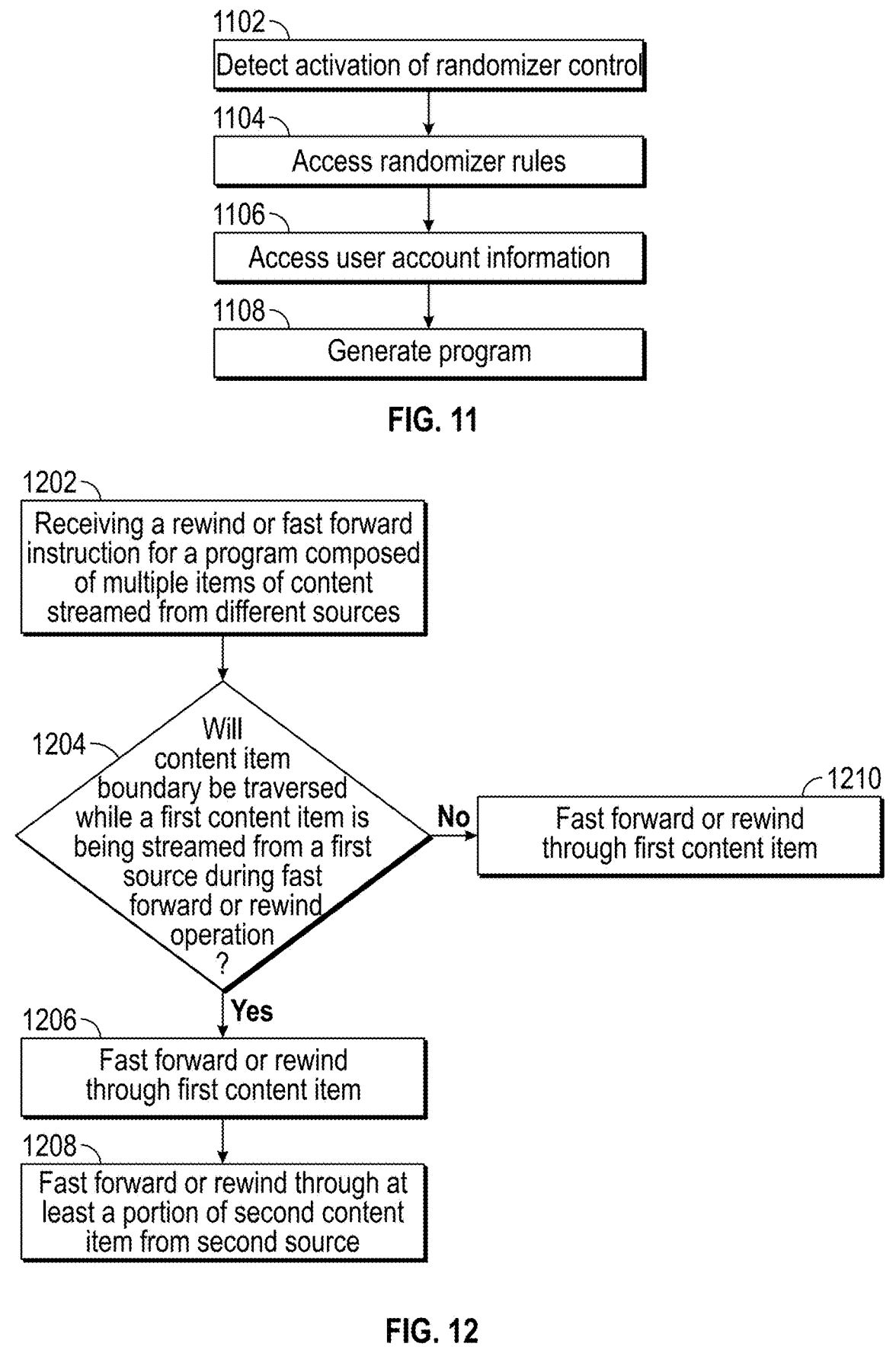

1102  
Detect activation of randomizer control

1104  
Access randomizer rules

1106  
Access user account information

1108  
Generate program

FIG. 11

1202  
Receiving a rewind or fast forward instruction for a program composed of multiple items of content streamed from different sources 1204  
Will content item boundary be traversed while a first content item is being streamed from a first source during fast forward or rewind operation ?

No → 1210  
Fast forward or rewind through first content item

Yes

1206  
Fast forward or rewind through first content item

1208  
Fast forward or rewind through at least a portion of second content item from second source

FIG. 12

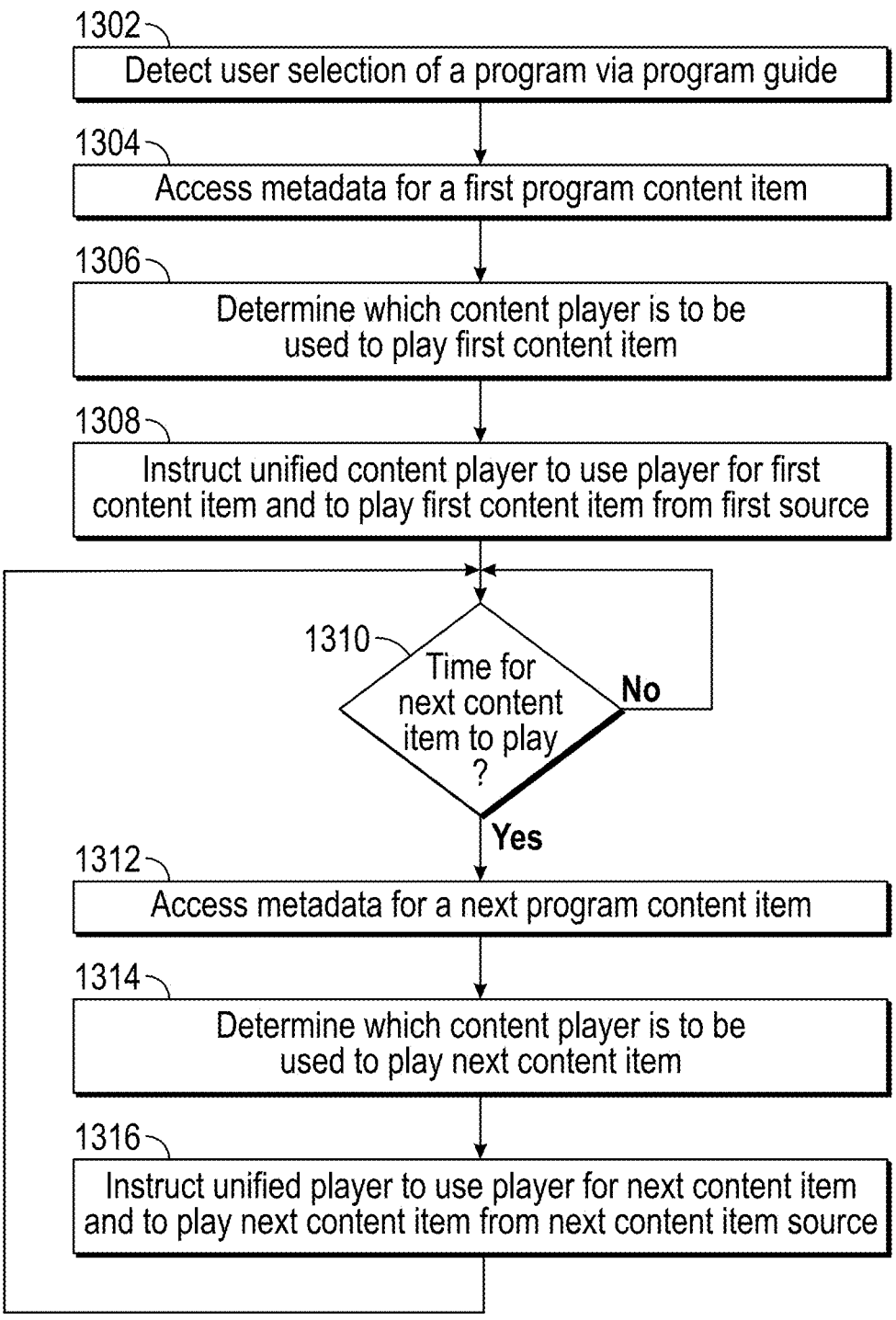

1302
Detect user selection of a program via program guide

1304
Access metadata for a first program content item

1306
Determine which content player is to be
used to play first content item

1308
Instruct unified content player to use player for first
content item and to play first content item from first source 1310
Time for
next content
item to play
?          No Yes 1312
Access metadata for a next program content item 1314
Determine which content player is to be
used to play next content item 1316
Instruct unified player to use player for next content item
and to play next content item from next content item source

FIG. 13

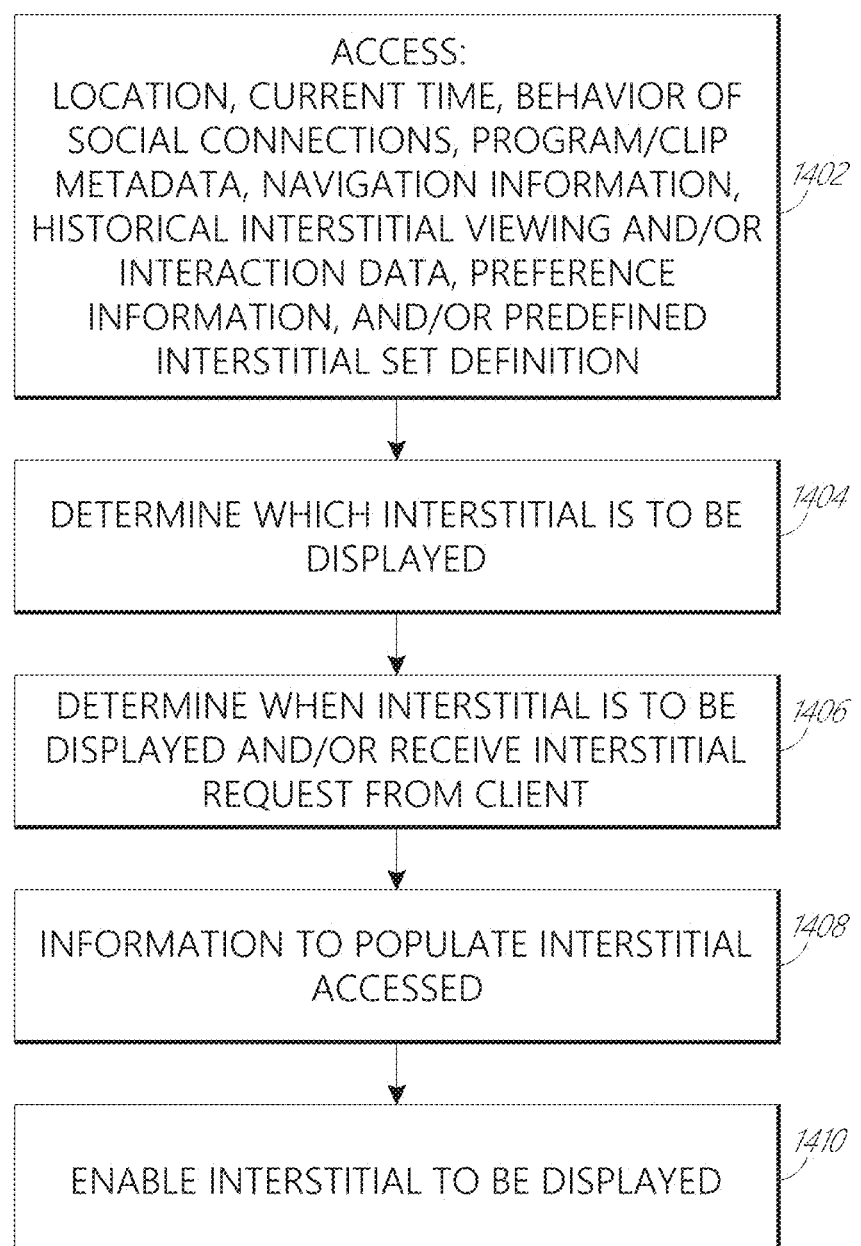

ACCESS:
LOCATION, CURRENT TIME, BEHAVIOR OF
SOCIAL CONNECTIONS, PROGRAM/CLIP
METADATA, NAVIGATION INFORMATION,
HISTORICAL INTERSTITIAL VIEWING AND/OR
INTERACTION DATA, PREFERENCE
INFORMATION, AND/OR PREDEFINED
INTERSTITIAL SET DEFINITION
*1402*

DETERMINE WHICH INTERSTITIAL IS TO BE
DISPLAYED
*1404*

DETERMINE WHEN INTERSTITIAL IS TO BE
DISPLAYED AND/OR RECEIVE INTERSTITIAL
REQUEST FROM CLIENT
*1406*

INFORMATION TO POPULATE INTERSTITIAL
ACCESSED
*1408*

ENABLE INTERSTITIAL TO BE DISPLAYED
*1410*

FIG. 14

ACCESS CONTENT NAME AND TIMING INFORMATION — 1602

QUERY DATABASE FOR CONTENT RELATED DATA — 1604

IS DATA RELATED TO POST INTERSTITIAL EVENT? — 1606

Yes → EXCLUDE — 1608

No

SELECT ITEM(S) OF CONTENT RELATED DATA — 1610

USE SELECTED ITEM(S) OF CONTENT RELATED DATA TO POPULATE INTERACTIVE INTERSTITIAL — 1612

POPULATED INTERACTIVE INTERSTITIAL DISPLAYED ON USER DEVICE — 1614

I = INTERSTITIAL

P = PROGRAM

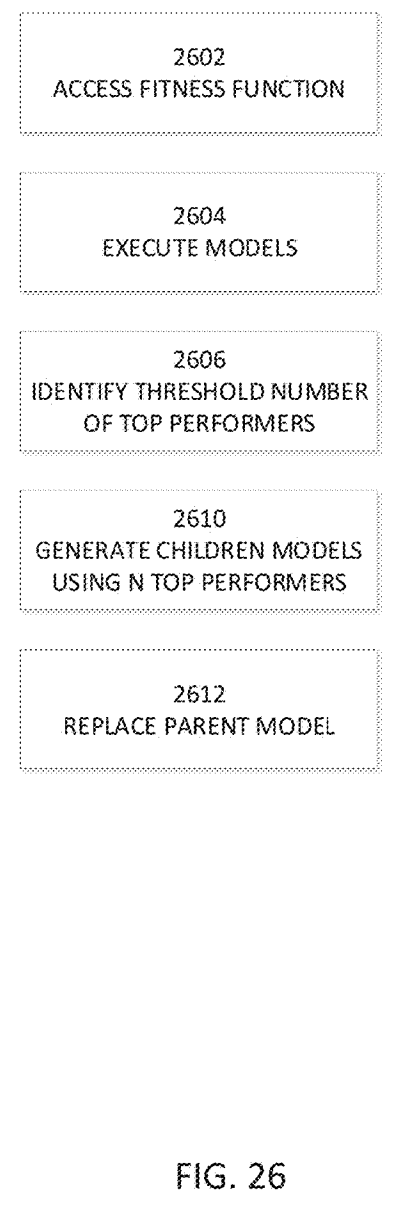

2602
ACCESS FITNESS FUNCTION

2604
EXECUTE MODELS

2606
IDENTIFY THRESHOLD NUMBER
OF TOP PERFORMERS

2610
GENERATE CHILDREN MODELS
USING N TOP PERFORMERS

2612
REPLACE PARENT MODEL

FIG. 26

2702
ACCESS USER PREFERENCES, HISTORICAL
VIEWING AND NAVIGATION HISTORY

2704
IDENTIFY USERS HAVING SPECIFIED
COMMON CHARACTERISTICS

2706
ASSIGN USER TO COHORT

3502
VIDEO SERVICES STITCHER
STREAMS CHANNEL TO USER
DEVICE

3504
UPCOMING
POD?

NO

YES

3506
ASSEMBLE AND GENERATE POD
REQUEST

3508
RECEIVE ANCILLARY CONTENT

3510
STREAM ANCILLARY CONTENT
TO USER DEVICE

METHODS AND SYSTEMS FOR GENERATING AND PROVIDING PROGRAM GUIDES AND CONTENT

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

COPYRIGHT RIGHTS

A portion of the disclosure of this patent document contains material that is subject to copyright protection. The copyright owner has no objection to the reproduction by any one of the patent document or the patent disclosure, as it appears in the patent and trademark office patent file or records, but otherwise reserves all copyright rights whatsoever.

BACKGROUND

Field of the Invention

The present invention is related to the identification, generation, organization, and distribution of content.

Description of the Related Art

Video sharing sites have become ever more popular. Users upload videos to a video sharing website. Other users can then navigate to and within the website to locate videos of interest. Users then watch the videos independent of other users, that is, users do not watch the videos on a schedule, but rather at whatever random time a given user accesses the video. Thus, using conventional techniques, it is difficult for users to locate videos of interest. Further, video viewing is an isolating experience, where users are viewing videos at different times, and often, because of the difficulty in locating content, friends infrequently view the same videos.

In addition, video streaming services (e.g., of movies, scripted episodic shows, unscripted shows, live sporting events, concerts, etc.) have become ever more popular. Certain video streaming services provide on-demand content, while others provide linear programmed streaming content, where video content is streamed to viewers in accordance with an electronic program guide schedule.

However, particularly in the instance of linear programmed streaming content, it is difficult to provide customized ancillary content experiences to users in a computer resource efficient manner. For example, using conventional approaches, it may not be possible or practical (from a computer resource utilization point of view or latency point of view) to ensure that a content viewer that is rapidly switching among channels of programmed streaming primary content (e.g., a movie, television episode, a program assembled from video clips, etc.) is consistently presented with the appropriate ancillary content as interstitials (e.g., video clips of a director of the primary content, a quiz regarding the primary content, or other content that may be of interest to the viewer) and is not inadvertently presented with a repeat of interstitial content that had just been viewed by the viewer.

Further, technical challenges are posed in synchronizing content being streamed according to a published streaming schedule. Yet further, maintaining content streaming according to a published streaming schedule for large numbers of target devices may conventionally require an inordinate amount of memory, processor, and network utilization.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the present disclosure relates to systems and methods configured to manage streaming video content. A first time length specification for a content pod is accessed. If a determination is made that a response to a request for ancillary content of a duration corresponding to the first time length of the content pod includes ancillary content of insufficient duration to populate the first time length of the content pod, the content pod time length is reduced. Ancillary content items associated with the response to the request are streamed to a user device as part of a streaming channel comprising primary content having scheduled start times. A primary content item, having a scheduled start time, is streamed to the user device after the items of ancillary content, and earlier than the scheduled start time of the item of primary content.

An aspect of this disclosure relates to systems and methods for receiving over a network from a first user terminal data that enables identification of the first user, accessing program information for a first digital program comprising video content, determining how many interstitials are to be presented during a playback of the first digital program, selecting a prediction model, executing the prediction model to generate predictions of user responses to one or more placements of interstitials with respect to the first digital program, based at least in part on the user response predictions determining positioning of interstitials with respect to the first digital program, and enabling the interstitials to be displayed on the first user terminal in accordance with the determined positioning.

An aspect of the present disclosure relates to a system, comprising: a network interface; at least one processing device; non-transitory memory storing programmatic code that when executed by the at least one processing device, cause the system to: access, using the network interface, data from a first user device that enables identification of the first user; determine a number of items of ancillary content that are to be presented during streaming of a first digital program; select a prediction model from a pool of prediction models; execute the prediction model, selected from the pool of prediction models, to generate predictions of user responses to a plurality of different placements of the number of items of ancillary content with respect to the first digital program; determine a positioning of the number of items of ancillary content with respect to the first digital program based at least in part on the generated predictions; using the determined positioning of the number of items of ancillary content in enabling at least a portion of the number of items of ancillary content to be streamed to and displayed by the first user device in accordance with the determined positioning; monitoring responses of the first user items to ancillary content displayed by the first user device; and based at least in part on the monitored responses of the first user to the displayed items of ancillary content, enhancing the prediction model.

An aspect of the present disclosure relates to a system, comprising: a network interface; at least one processing device; non-transitory memory storing programmatic code that when executed by the at least one processing device, cause the system to: access, using the network interface, data from a first user device that enables identification of the first user; use the identification of the first user to access associated user data; determine a first number of items of ancillary content that are to be presented during streaming of a first digital program; select, using at least the accessed user data, a prediction model from a pool of prediction models, the pool of prediction models comprising prediction models configured to generate predictions of user responses to different positioning of ancillary content with respect to digital programs; execute the prediction model, selected from the pool of prediction models, to generate predictions of user responses to a plurality of different placements of the first number of items of ancillary content with respect to the first digital program; determine a positioning of the first number of items of ancillary content with respect to the first digital program based at least in part on the generated predictions; based at least in part on the determined positioning of the first number of items of ancillary content, enable at least a portion of the first number of items of ancillary content to be streamed to and displayed by the first user device in accordance with the determined positioning; monitor, via information received using the network interface from the first user device, responses of the first user items to ancillary content displayed by the first user device; based at least in part on the monitored responses of the first user to the displayed items of ancillary content, enhancing the prediction model; and use the enhanced prediction module to enable a second number of items of ancillary content to be streamed to and displayed by the first user device in accordance with a second determined positioning.

An aspect of the present disclosure relates to a computer-implemented method comprising: receiving, at a computer system comprising one or more processing device over a network from a first user device, data that enables identification of the first user; accessing data associated with the first user using the identification of the first user; accessing by the computer system program information for a first digital program comprising video content; determining how many interstitials are to be presented during a playback of the first digital program; accessing a prediction model; executing the prediction model to generate, using the data associated with the first user, predictions of user responses to one or more placements of interstitials with respect to the first digital program; based at least in part on the user response predictions determining positioning of interstitials with respect to the first digital program; and enabling the interstitials to be displayed on the first user device in accordance with the determined positioning.

An aspect of the present disclosure relates to a non-transitory computer-readable media including computer-executable instructions that, when executed by computer system, cause the computer system to at least: access data from a first user device that enables identification of the first user; determine a number of items of ancillary content that are to be presented during streaming of a first digital program; access a prediction model; execute the prediction model to generate predictions of user responses to a plurality of different placements of the number of items of ancillary content with respect to the first digital program; determine a positioning of the number of items of ancillary content with respect to the first digital program based at least in part on the generated predictions; using the determined positioning of the number of items of ancillary content in enabling at least a portion of the number of items of ancillary content to be displayed by the first user device in accordance with the determined positioning; monitoring responses of the first user items to ancillary content displayed by the first user device; and based at least in part on the monitored responses of the first user to the displayed items of ancillary content, modifying the prediction model.

An aspect of the present disclosure relates to a system configured to dynamically control streaming of content for channels of linear, scheduled content, the system comprising: a network interface; at least one processing device; non-transitory memory storing programmatic code that when executed by the at least one processing device, cause the system to: access a specification of a first time length of a first ancillary content pod, wherein ancillary content used to populate the first ancillary content pod is configured to be displayed between items of primary content, the items of primary content comprising video content, wherein the items of primary content are associated with corresponding scheduled start play times; transmit a first request for ancillary content of a duration corresponding to the first time length of the first ancillary content pod; determine whether the response to the first request for ancillary content of a duration corresponding to the first time length of the first ancillary content pod includes ancillary content of sufficient duration to populate the first time length of the first ancillary content pod; at least partly in response to determining that the response to the first request for ancillary content of a duration corresponding to the first time length of the first ancillary content pod is insufficient to populate the first time length of the first ancillary content pod: reduce the first time length of the first ancillary content pod by a first time period; cause items of ancillary content associated with the response to the first request for ancillary content to be streamed to a first user device as part of a streaming channel comprising primary content having scheduled start times; cause an item of primary content, associated with a corresponding scheduled start time, to be streamed immediately after the items of ancillary content associated with the response to the first request for ancillary content are streamed to the first user device, and earlier than the corresponding scheduled start time of the item of primary content; determine respective extension time lengths for one or more ancillary content pods scheduled to be played after the first ancillary content pod; extend the respective time lengths of the one or more ancillary content pods scheduled to be played after the first ancillary content pod by respective extension time lengths to thereby synchronize playing by the first user device of a second item of primary content to a corresponding scheduled start time associated with the second item of primary content; cause the one or more ancillary content pods extended by respective extension time lengths to be populated with ancillary content; and cause the ancillary content used to populate the one or more ancillary content pods extended by respective extension time lengths, to be streamed to the first user device.

An aspect of the present disclosure relates to a computer implemented method, the method comprising: accessing a specification of a first time length of a first ancillary content pod, wherein ancillary content used to populate the first ancillary content pod is configured to be displayed between items of primary content, the items of primary content comprising video content, wherein the items of primary content are associated with corresponding scheduled start play times; transmitting a first request for ancillary content of a duration corresponding to the first time length of the first ancillary content pod; determining whether the response to the first request for ancillary content of a duration corresponding to the first time length of the first ancillary content pod includes ancillary content of sufficient duration to populate the first time length of the first ancillary content pod; at least partly in response to determining that the response to the first request for ancillary content of a duration corresponding to the first time length of the first ancillary content pod is insufficient to populate the first time length of the first ancillary content pod: reducing the first time length of the first ancillary content pod by a first time period; enabling items of ancillary content associated with the response to the first request for ancillary content to be streamed to a first user device as part of a streaming channel comprising primary content having scheduled start times; enabling an item of primary content, associated with a corresponding scheduled start time, to be streamed after the items of ancillary content associated with the response to the first request for ancillary content are streamed to the first user device, and earlier than the corresponding scheduled start time of the item of primary content; determining respective extension time lengths for one or more ancillary content pods scheduled to be played after the first ancillary content pod; extending the respective time lengths of the one or more ancillary content pods scheduled to be played after the first ancillary content pod by respective extension time lengths to thereby synchronize playing by the first user device of a second item of primary content to a corresponding scheduled start time associated with the second item of primary content; enabling the one or more ancillary content pods extended by respective extension time lengths to be populated with ancillary content; and enabling the ancillary content used to populate the one or more ancillary content pods extended by respective extension time lengths, to be streamed to the first user device.

An aspect of the present disclosure relates to a non-transitory memory that stores programmatic code that when executed by the at least one processing device, cause the at least one processing device to perform operations comprising: access a specification of a first time length of a first ancillary content pod, wherein ancillary content used to populate the first ancillary content pod is configured to be displayed between items of primary content, the items of primary content comprising video content, wherein the items of primary content are associated with corresponding scheduled start play times; provide a first request for ancillary content of a duration corresponding to the first time length of the first ancillary content pod; determine whether the response to the first request for ancillary content of a duration corresponding to the first time length of the first ancillary content pod includes ancillary content of sufficient duration to populate the first time length of the first ancillary content pod; at least partly in response to determining that the response to the first request for ancillary content of a duration corresponding to the first time length of the first ancillary content pod is insufficient to populate the first time length of the first ancillary content pod: adjust the first time length of the first ancillary content pod by a first time period; enable items of ancillary content associated with the response to the first request for ancillary content to be streamed to a first user device as part of a streaming channel comprising primary content having scheduled start times; enable an item of primary content, associated with a corresponding scheduled start time, to be streamed after the items of ancillary content associated with the response to the first request for ancillary content are streamed to the first user device, and earlier than the corresponding scheduled start time of the item of primary content; determine respective extension time lengths for one or more ancillary content pods scheduled to be played after the first ancillary content pod; adjust the respective time lengths of the one or more ancillary content pods scheduled to be played after the first ancillary content pod by respective extension time lengths to thereby synchronize playing by the first user device of a second item of primary content to a corresponding scheduled start time associated with the second item of primary content; and enable the one or more ancillary content pods extended by respective extension time lengths to be populated with ancillary content; and enable the ancillary content used to populate the one or more ancillary content pods extended by respective extension time lengths, to be streamed to the first user device.

An aspect of the present disclosure relates to a system configured to dynamically control streaming of content for channels of linear, scheduled content, the system comprising: a network interface; at least one processing device; non-transitory memory storing programmatic code that when executed by the at least one processing device, cause the system to: access a specification of a first time length of a first ancillary content pod, wherein ancillary content used to populate the first ancillary content pod is configured to be displayed between items of primary content, the items of primary content comprising video content, wherein the items of primary content are associated with corresponding scheduled start play times; transmit a first request for ancillary content of a duration corresponding to the first time length of the first ancillary content pod; determine whether the response to the first request for ancillary content of a duration corresponding to the first time length of the first ancillary content pod includes ancillary content corresponding to the first time length of the first ancillary content pod; at least partly in response to determining that the response to the first request for ancillary content of a duration corresponding to the first time length of the first ancillary content pod is longer than the first time length of the first ancillary content pod: extend the first time length of the first ancillary content pod by a first time period; cause items of ancillary content associated with the response to the first request for ancillary content to be streamed to a first user device as part of a streaming channel comprising primary content having scheduled start times; cause an item of primary content, associated with a corresponding scheduled start time, to be streamed immediately after the items of ancillary content associated with the response to the first request for ancillary content are streamed to the first user device, and later than the corresponding scheduled start time of the item of primary content; determine respective reduction time lengths for one or more ancillary content pods scheduled to be played after the first ancillary content pod; reduce the respective time lengths of the one or more ancillary content pods scheduled to be played after the first ancillary content pod by respective reduction time lengths to thereby synchronize playing by the first user device of a second item of primary content to a corresponding scheduled start time associated with the second item of primary content; cause the one or more ancillary content pods reduced by respective reduction time lengths to be populated with ancillary content; and cause the ancillary content used to populate the one or more ancillary content pods reduced by respective reduction time lengths, to be streamed to the first user device.

While reference may be made to a program guide, the program guide need not be displayed to a user for the user to view or listen to programs or channels. For example, the user may access a program or channel via voice command, a gesture, remote control, or otherwise.

BRIEF DESCRIPTION OF THE DRAWINGS

FIG. 1A-1C illustrates an example system environment and certain components thereof.

FIGS. 2A-2L illustrate example program guide user interfaces.

FIGS. 3A-3E illustrate example backend guide user interfaces.

FIGS. 4A-4G illustrate example backend guide user interfaces.

FIGS. 7-16 illustrate example processes.

FIG. 26 illustrates an example process for generating models.

DETAILED DESCRIPTION

Figure 1A:
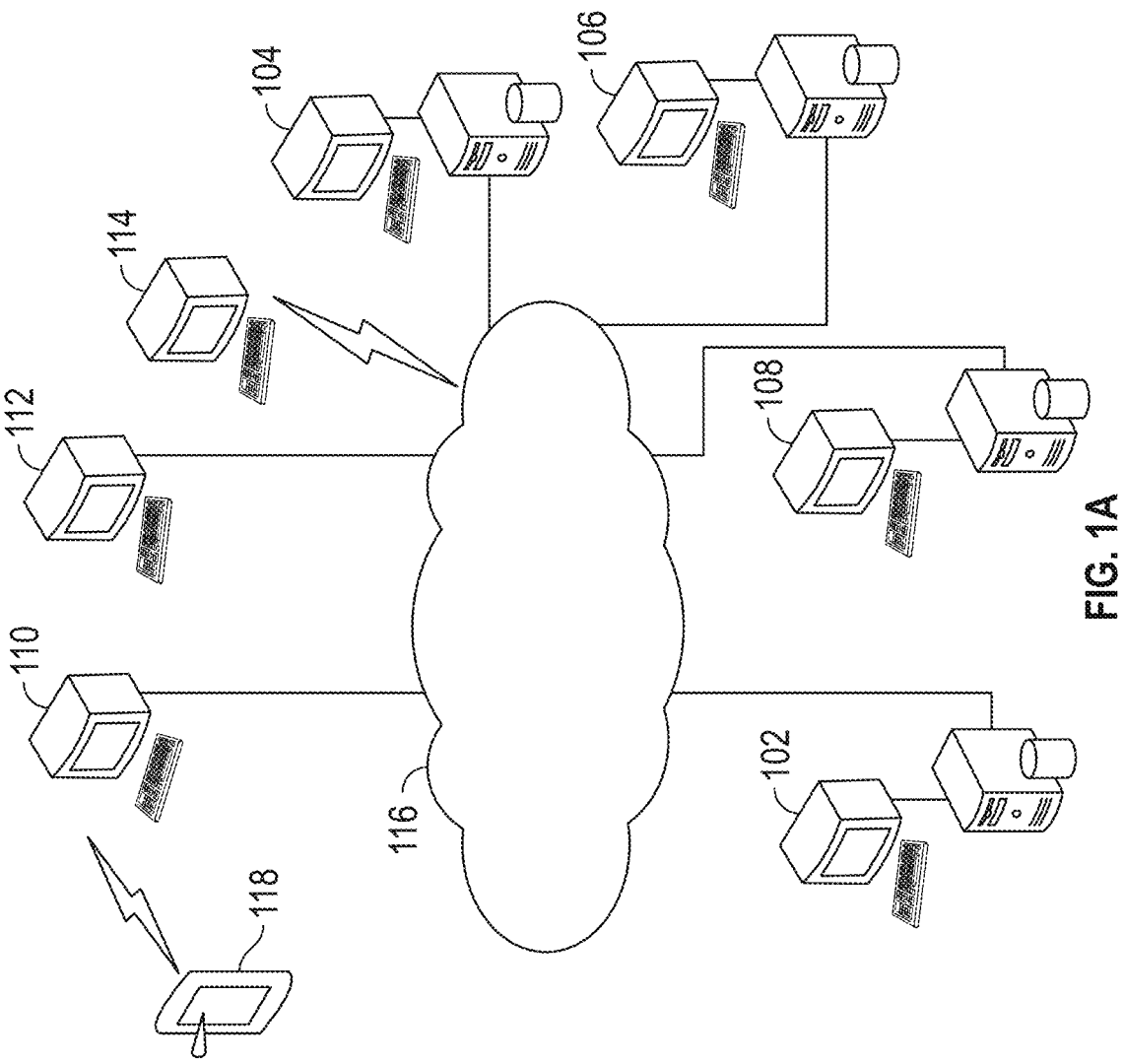

Certain embodiments described herein overcome some or all of the noted deficiencies of conventional video sharing sites. Certain embodiments logically assemble user and/or professional content (e.g., streamed content) from one or more sites into channels, and provide a content site where specific videos are provided for display to viewers at specific times, according to a program schedule. Optionally, the content for a given channel, or a program within a channel, is streamed from multiple third party content sites to the user terminals, without passing through the content site system that organizes the third party content into channels and programs.

Systems and methods are further described configured to enable ancillary content pods content, ancillary content placement, and ancillary content placement duration to be adjusted on a user-by-user basis and/or a user cohort-by-user cohort basis.

As described herein, an electronic program guide may be generated for one or more channels of linear programmed streaming content, which may include scheduled start times and end times for respective items of primary content. By way of example, an item of primary content may be in the form of a movie, an episode of a periodic series (e.g., a "television" series), a live event (e.g., a sporting event, awards show, or the like), a one-off show or special, a curated set of clips from one or more sources, and/or the like.

It may be desirable to display interstitial content (which may also be referred herein to as ancillary content) between items of primary content or during a given item of primary content (where the display of the primary content is paused while the interstitial content is displayed).

As described elsewhere herein, an interstitial may be in the form of text, video, and/or audio content. The interstitial may be used to aid in tying or bridging programs into a channel. The interstitial may provide information regarding an upcoming clip or program. An interstitial may be in the form of a paid advertisement for a product or service or may be in the form of an in-house advertisement. An interstitial may optionally be selected based at least in part on characteristics of a viewer (e.g., user preferences, user profile information, etc.) and/or on characteristics or specifications of an interstitial provider. Rules may be defined to select an interstitial.

An interstitial may include static content (e.g., static text) and/or dynamic content (e.g., dynamically selected text). By way of illustration, static text may include the phrase "Coming up next" followed by dynamic text including the title or subject matter of the upcoming content ("the week's funniest cat videos"), optionally obtained from metadata associated with the upcoming content.

By way of further example, the interstitial content may be selected that corresponds to the user's interests. The interstitial content may be in the form of a director of the primary content discussing the primary content, a quiz regarding the primary content, quizzes, jokes, news, trivia, information regarding programs or channels, user submitted content (e.g., video, still image, text, etc.), sponsored content, an advertisement, and/or other non-primary content.

Optionally, an automated process of selecting and/or generating interstitials may be utilized. An automated process is described for adaptively adjusting an ancillary content pod length, optionally in real time, and selecting content to populate the adjusted ancillary content pod.

Further, as described herein, systems and methods are configured to calculate ancillary loads in a channel of linear content streaming content, dynamically adjust ancillary content pod durations, track drift on a viewer-by-viewer or cohort-by-cohort basis, the drift resulting from the adaptive placement and playing of ancillary content relative to a channel content timing schedule, adjust a content schedule (where the content schedule is optionally displayed to a viewer) to reflect drift, resynchronize "drifted" content to the original published content schedule, use drift to adjust a starting position of a viewer's stream, select backfill content to resynchronize the viewer back to the published schedule, and present the original published schedule, to which the viewer is now synchronized, to the viewer. Optionally, the drift value may be stored for a given viewer and/or the drift value may be stored per channel as part of the viewer's session, to enable the collected drift associated with a first channel to be utilized in the event the viewer switched to a second channel and then resumed watching the first channel.

As will be described, technical challenges may be encountered in synchronizing content being streamed according to a streaming content schedule. Yet further, maintaining content streaming according to a streaming content schedule for large numbers of target devices may conventionally require an inordinate amount of high-speed memory. Systems and methods described herein overcome these and other technical challenges.

FIG. 1A illustrates an example content scheduling system 102 in an example environment. FIGS. 1B-1C illustrate example components of the content scheduling system 102. The content scheduling system 102 may host a program guide (described in greater detail herein), program scheduling information, channel definitions, channel categories, user account information, video player schema information for video players or other content players from different websites, interstitial templates, interstitial set definitions, interstitial content, etc. The content scheduling system 102 may include one or more of the following service modules, discussed in greater detail herein: a channel generation module 150, a programming module 152, a content substitution module 154, a supplemental content identification module 156, an automatic program generation module 158, a program guide generation module 160 and/or other modules. It is understood that the functions of the modules may be performed by fewer or more modules.

The example content scheduling system 102 includes a processing unit 170, a network interface 172, a non-transitory computer-readable medium drive 173, and an input/output device interface 174, all of which may communicate with one another by way of a communication bus. The network interface 172 may provide the content scheduling system 102 with connectivity to one or more networks (e.g., network 116) or computing systems. The processing unit 170 may thus receive information and instructions from other computing devices, systems, or services, such a user terminals and third party content hosting services, via a network. The processing unit 170 may also communicate to and from memory 176 and further provide output information via the input/output device interface 174. The input/output device interface 174 may also accept input from various input devices, such as a keyboard, mouse, digital pen, touch screen, etc.

The memory 176 may contain computer program instructions that the processing unit 170 may execute in order to implement one or more embodiments of the present disclosure. The memory 176 generally includes RAM, ROM and/or other persistent or non-transitory computer-readable storage media. The memory 176 may store an operating system 180 that provides computer program instructions for use by the processing unit 170 in the general administration and operation of the content scheduling system 102. The memory 176 may further include other information for implementing aspects of the present disclosure.

Optionally, the memory 176 includes an interface module 178. The interface module 178 can be configured to facilitate generating one or more interfaces through which a third party user, utilizing a compatible computing device, may send to, or receive from, the content scheduling system 102 content, content metadata, preferences, content recommendations, instruction data, interstitials, interstitials templates and/or interstitial content, or otherwise communicate with the content scheduling system 102. Specifically, the interface module 174 may be configured to facilitate processing functions described herein, including generating and providing program guides, scheduling programming, generating recommendations, providing program guide navigational tools, providing DVR functionality, dynamically generating programs, enabling a user to generate a program, providing user interfaces, etc. The user interfaces described herein can be implemented as a graphical user interface (GUI), web-based user interface, computer program, smartphone or tablet program or application, touchscreen, command line interface, gesture, voice, or text interface, etc., or any combination thereof. A user may cause a program to be played by a content player by selecting a program from a program guide. A program may also be displayed without a user having to select a program or channel and without the display of a program guide. Further, the program guide need not be displayed to a user for the user to view or listen to programs or channels. For example, the user may access a program or channel via voice command (e.g., recognized by a voice command system), a body/hand gesture or a wand gesture (e.g., recognized by a camera-equipped gesture recognition system, or a wand motion tracking system), a remote control, or otherwise.

In addition, the memory 176 may include a data processing module 182 that may be executed by the processing unit 170. Optionally, the data processing module 182 implements aspects of the present disclosure. For example, the data processing module 182 can be configured to process user queries, instructions, data and content from the data stores 162, 164, etc.

The content scheduling system 102 may communicate with a variety of third party content hosting systems 104, 106, 108 (wherein the third party systems are not operated by the same entity that operates the content scheduling system 102), from which content may be streamed and/or interstitial and/or data for interstitials accessed. Optionally, a content programmer (sometimes referred to as a curator) defines a program and/or a channel. For example, the content programmer may define a channel to be "cats". The content programmer may define a program for the "cats" channel to be "cats playing with dogs", with a time length of 30 minutes, to be provided to users at a specified day/time (or at recurring days/times). The content programmer may search for, identify, and select program-appropriate content (e.g., video content, music content, still image content, social streams, text messages, etc.) from one or more content sites, such as third party video, music, image, social media, blogs (e.g., microblogs), and/or other hosting sites that may host video clips, music media, still images, graphics, social media, blog/microblog messages (e.g., text and/or audio-video messages), etc., from one or many users. The content programmer may define an order for the selected clips and/or other form of content to be presented when the program is viewed or listened to by users. For example, the content scheduling system 102 may record clip sequencing information specified by a programmer or the system to indicate the order that selected clips will be played back as part of a program. The system 102 may associate metadata with a given clip in a program, such as a starting point/time and a stop point/time for each clip. Other metadata that may be associated with a clip, program segment, or a program may include the names or other identifiers of writers, actors, directors, producers, artists, performers, other people that appear in the program or clip, etc., associated with the clip or program, optionally in association with their respective titles/job functions/character names. Other examples of metadata may include album names and album sales associated with a performer appearing in the program or clip.

Optionally, the system 102 may associate one or more content categories (e.g., using metadata) with a given clip or program. Example categories may include genre, animals, arts and culture, family, food and drink, health, house and garden, how-to, military, money, nature, people and lifestyle, politics, pop culture, relationships, science, technology, transportation, travel, and/or sports. A given category may be associated with one or more sub-categories. Optionally, two or more categories may include a given sub-category. Corresponding metadata may be stored in association with the given clip or program.

For example, the genre category may be associated with sub-categories (e.g., using sub-category metadata) that correspond to different types of film/movie/television/other content genres (e.g., drama, horror, comedy, science fiction, action adventure, romantic comedy, fantasy, foreign language, movie, television series, webisode, etc.). Also by example, the animal category may be associated with sub-categories that correspond to different types of species or classes of animals (e.g., cats, dogs, birds, fish, lizards, ocean life, wildlife, etc.).

By way of further example, the arts and culture category may be associated with sub-categories that correspond to different types of arts and culture (e.g., architecture, design and typography, digital, experimental, fan, mixed media, painting, political, street, user experience design, user interface design, etc.). By way of yet further example, the family category may be associated with sub-categories that correspond to different types and classes of family members (e.g., babies, children, parents, parenting, relatives, teenagers, grandparents, mother, father, grandmother, grandfather, etc.). By way of still further example, the food and drink category may be associated with sub-categories that correspond to different types of food or food related matters (e.g., cooking, dessert, entrée, appetizer, soup, salad, meat, restaurant, seafood, soda, spirit, vegetables, etc.). By way of yet further example, the health category may be associated with sub-categories that correspond to different types of health related matters (e.g., health conditions, dental health, diet/nutrition, fitness, grooming, men's health, women's health, mental health, sexual health, sexuality, addiction, etc.).

By way of further example, the house and garden category may be associated with sub-categories that correspond to different types of house and garden related matters (e.g., furnishing, improvement, lawn and garden, remodeling, decorating, etc.). By way of still further example, the how-to category may be associated with sub-categories that correspond to different types of how-to related matters (e.g., beauty, crafting, do-it-yourself, fashion, etc.). By way of yet further example, the military category may be associated with sub-categories that correspond to different types of military related matters (e.g., combat, explosion, military training, weapons, tanks, ships, aviation, etc.).

By way of further example, the money category may be associated with sub-categories that correspond to different types of money-related matters (e.g., budgeting, investments, retirements, taxes, etc.). By way of yet further example, the nature category may be associated with sub-categories that correspond to different types of nature-related matters (e.g., insects, landscapes, natural disasters, weather, surf, etc.). By way of yet further example, the people and lifestyle category may be associated with sub-categories that correspond to different types of related matters (e.g., amateur stunts, body modification, career, celebrities, crazy stunts, crime, entertaining, explosions, fashion, fights, holidays, performance art, politics, recreational, weapons, self-help, shopping, special events, tricks and juggling, etc.).

By way of further example, the politics category may be associated with sub-categories that correspond to different types of politics-related matters (e.g., United States politics, African politics, Central American politics, city politics, European politics, Middle East politics, world politics, commentary and debate, etc.). By way of yet further example, the pop culture category may be associated with sub-categories that correspond to different types of pop culture related matters (animation, anime, books, cartoons, dance, fail and pranks, games, girls, boys, illusion, magic, movies, music, puzzles, sketch comedy, stand-up comedy, television, theater, video games, virtual reality, etc.). By way of still further example, the relationship category may be associated with sub-categories that correspond to different types of relationship-related matters (e.g., dating, family, friends, marriage, etc.).

By way of further example, the science category may be associated with sub-categories that correspond to different types of science-related categories (e.g., environmental, experimentation, lectures and facts, etc.). By way of yet further example, the technology category may be associated with sub-categories that correspond to different types of technology-related categories (e.g., computers, electronics, Internet, mobile apps, slow motion, software, etc.). By way of still further example, the transportation category may be associated with sub-categories that correspond to different types of transportation-related matters (e.g., bicycle, boats, cars, motorcycle, planes, hover boards, autonomous vehicles, subways, taxis, trains, trucks, walking, etc.).

By way of further example, the travel category may be associated with sub-categories that correspond to different types of travel-related categories (e.g., accommodations, destinations, camping, tips, etc.). By way of still further example, the sports category may be associated with sub-categories that correspond to different types of sports-related categories (e.g., abs and glutes, auto racing, BMX and extreme biking, baseball, basketball, boating and sailing, body building, boxing, car culture, cardio and aerobics, cycling, dance workouts, extreme combat and mixed martial arts, extreme motorsports, extreme snow and ice sports, extreme sports compilations, fishing, football, general martial arts, general strength and flexibility, golf, horse racing, hunting, ice hockey, martial arts, boxing, wrestling, miscellaneous sports, motorcycles and motocross, motorsports, mountain biking, mountaineering and climbing, Olympics and other games, other sports, other water sports, outdoor and mountain sports, Pilates and fitness ball, self-defense, skateboarding, skiing, snow and ice sports, snowboarding, soccer, sports comedies, sports documentaries, sports dramas, sports stories, step aerobics workouts, stunts and general mayhem, surfing and board sports, tai chi and qigong, tennis, triumph of the underdogs, water sports, women in sports, etc.).

By way of further example, a given program or clip may be associated with some or all of the following metadata: name, short description, category (e.g., one or more of the categories discussed herein), sub-category/genre (e.g., one or more of the sub-categories or genres discussed herein), tags, region filter (e.g., that restricts the showing of the program/clip to one or more regions/countries), breakpoints (e.g., specified in SMTPE time format: hour, minute, second, frame HH:MM:SS:FF), available date (the first date that the content should first be made available, optionally specified in GMT date format MM/DD/YYYY), film color (e.g., color, black and white), copyright notice (e.g., copyright owner, year of publication), file name of closed captioning language, actor(s) and/or guest(s), producer, content rating and reasons for rating (e.g., G, All, PG, PG-13, R, X, violence, crude language, nudity, adult situations, etc.), subtitle languages, etc.

An electronic form may be provided via which some or all of the content metadata may be entered. Some or all of the content metadata may be provided via a file (e.g., a spreadsheet file, a word processor file, or the like). Some or all of the content metadata may be accessed from a third party database.

Some or all of the metadata may be used to search for and/or to select content for presentation (e.g., to a particular user or for a particular geographical or national region, or for all users). For example, if a region filter specifies that a given clip is only to be shown in the United States, the clip may be excluded from programs provided to or assembled for users in other regions, while the clip may be included in a program provided to or assembled for users in the United States. By way of further example, if a first available date for a given clip is some time in the future, the clip may be excluded from programs provided to users until that date is reached. If a given user has specified a certain rating filter (e.g., specifying that no content having a rating more mature than PG-13 is to be excluded), clips that are associated with a rating that do not satisfy the rating filter may be excluded from programs provided to the user. Optionally, if a given clip is excluded from a program, a substitute clip having the same or similar length and subject matter may be identified and inserted into the program.

Optionally, content may be received from one or more sources in one or more formats. Optionally, received content may be analyzed to determine if the content satisfies one or more quality criteria. For example, the content may be inspected to determine if it is formatted via one or more specified formats using one or more specified codecs (e.g., Apple PrRes 422, MPEG-4, H.264 (20 Mbps minimum for HD, 30 Mbps minimum for HD), MPEG-2 (20 Mbps minimum for HD, 30 Mbps minimum for HD) for video, LPCM, 5.1 channel for audio, channel 1 and 2 for mono, etc.) and one or more specified frame rates (720×488, 720×480 for NTSC SD, 720×576 for PAL SD; 1920×1080 or 1280×720 for HD). The received content may be stored in memory by the system 102 for later access.

Thus, the system 102 may cause the clips in a given program to be sequenced so as to provide a user with a seamless viewing experience. Optionally, the programmer may indicate where advertisements may be inserted between clips. For example, the programmer may specify that an advertisement may be inserted between the 4th and 5th clip and the 9th and 10th clip. Then, during playback, one or more advertisements may be selected and inserted at the designated points between clips.

Optionally, a mediation layer is provided to dynamically determine the placement and/or selection of interstitials/ overlays (e.g., advertising, quizzes, jokes, news, trivia, information regarding programs or channels, user submitted content (e.g., video, still image, text, etc.), sponsored content, etc.) on programs comprised of short videos or other content. The mediation layer may include defined rules (e.g., programmer defined rules) that specify when an advertisement (or interstitial) is to be displayed (e.g., within a specified time block within a program, based on how much of a particular program a user has viewed, based on the subject matter of a given item of content (e.g., as determined from associated metadata), based on what is occurring or being displayed in the content, between specified clips, etc.). Optionally, a client displaying a program (e.g., an application or a browser) may execute code that determines when and/or where an advertisement or interstitial is to be displayed. Optionally, in addition or instead, a remote server (e.g., the server that assembles/stiches content together to form a program) may execute code that determines when and/or where an interstitial/overlay is to be displayed. For example, the server may identify predefined locations for such interstitial/overlay.

Optionally, a single clip or other streaming content being viewed by a viewer may be automatically paused during playback at a designated point or time (or randomly), and an advertisement or interstitial (e.g., optionally from a source different than the clip, such as from an advertisement server or other interstitial server) may be selected (e.g., by the advertisement server or the interstitial server), and provided for display to the user (e.g., streamed and/or played to the user). When the advertisement has completed playing or other interstitial has been displayed for a designated period of time or until a specified event occurs (e.g., user input for an interactive interstitial), the playing of the clip may be resumed. Thus, an advertisement or interstitial may optionally be played as a mid-roll advertisement with respect to a given clip.

A programming module may keep a running tally of the sum of the lengths (in time) of the video clips and/or other content selected by the content programmer for a program, and display the running tally to the content programmer. The programming module may provide a visual and/or audible alert to the user when the running tally is equal to the defined time length of the program, and may provide a different notification when the running tally is greater than the defined time length of the program. If the total length of the selected clips and/or other content exceeds the defined program length, the programming module may optionally trim the last clip in the program or a portion of each clip and/or other content in the program to bring the total length of the program to be about equal to the defined length of the program. The content scheduling system records the locators for the selected clips (or other content, such as image content, social streams, blog (e.g., microblogs), text messages, etc.), or a locator for a playlist of the selected clips or other content, the ordering of the clips and/or other content, and day(s)/time(s) the video program is to be presented to users, and then causes the program (with the clips in the defined order) to be presented accordingly at the scheduled days/times and causes a program guide to include a listing for the program at the specified days/times for the specified duration.

Optionally, the system 102 may automatically perform at least a portion of the content selections for a channel or program, optionally using for example, a channel generation module or an automatic program generation module. For example, the system 102 may search for and locate video content using search terms (e.g., specified by a content programmer) corresponding to various categories/subjects. By way of illustration, if the system is seeking to define a channel of videos and/or other content regarding cats, the system may issue a search for videos of cats. The system may issue the search request using the search engine of one or more third party content hosting sites (e.g., by submitting the search request and search terms using an application programming interface associated with the content hosting sites). The content hosting sites may use tags (e.g., assigned by the user that posted the video, assigned by other users, assigned by an operator of the video hosting sites, etc.) associated with the video content to identify videos corresponding to the search request. By way of further example, if the system is instructed to include microblog entries as part of the cat channel, the system 102 may search for microblog entries (e.g., TWITTER® tweets) that include cat related text or hashtags (e.g., "#funnycat").

The system 102 may use further criteria in selecting among videos and/or other content for the cat channel or for a specific program. For example the system may issue a search query for "cats", and optionally filter the results based on one or more criteria. Optionally, the system may search for cat videos and/or other content of a specific length or range of lengths (e.g., 5 minutes, between 4 minutes and 6 minutes, etc.). Other criteria may be used as well in determining which videos and/or other content to select and include in a given program for a given channel. For example, the system may access the number of views on the third party video hosting site and/or the user ratings provided by users of the third party video hosting site in determining which videos to select.

By way of illustration, the system may be programmed to select only those videos which have more than a threshold number of positive indications (e.g., more than 500 positive indications (e.g., "thumbs up" votes)), and/or greater than a specified percentage of positive posting indications (e.g., 75% of users, that provide an indication as to whether or not they like the video, indicate that they like the video) or a specified ratio of positive indications vs. negative indications (e.g., a ratio of at least 3/1 of positive indications vs. negative indications). In addition or instead, the system may access and/or analyze other types of indications. For example, the indications (e.g., social presence, social rating, number of followers, number of posted videos, aggregated number of views for all videos posted by author for videos posted on one or more sites, audience size and/or type, other author activities, etc.) may relate to the author/source of an item of content generally. For example, a threshold may be set with respect to an author's number of followers, social rating, influence rating, number of friends (on a social networking site), etc. Such indications may be accessed from the third party video hosting site on which the content is hosted and/or from other sites and sources (e.g., social networking sites, influence scoring sites, microblog sites, etc.).

By way of further illustration, in this example, the system may select videos for the cat channel that have a tag and/or title of "cat", have at least 600 views and/or have at least a 75% approval rating. The system 102 may in addition or instead select the top 50 (or other number) most viewed cat videos or the top 50 (or other number) rated videos for the channel. The system 102 or other content programmer may in addition or instead select videos of cats from the top 50 ranked (or other number) authors based on the number of followers they have and/or their influence score. The system 102 may assemble a channel and a program based on the identified videos from one or more third party sites.

By way of further example, the system may access the number of followers a blogger (e.g., a microblogger) has and/or the number of times a given blog post has been reposted by others in determining which blog posts to select for a program. Other example factors that may be taken into account in selecting content may include the number of replies that were received in response to a content posting, the number of likes a posting received, the number of different social networking sites a posting was reposted too, an engagement or influence rating of a posting user (which may be based at least in part on engagement measurements, such as the ratio of reactions generated by content posted by the user over the number of content postings, and/or where the rating may be generated by the system 102 and/or accessed from one or more influence rating services, such as KLOUT®, KRED®, PEERINDEX®, etc.), etc.

The system 102 may use the supplemental content identification module or other tool to periodically review the video hosting websites to ensure that the selected videos for a given program are still available to be streamed to the user display. If the system 102 determines that certain videos that had already been included in scheduled program are no longer available, the system may find alternative videos of similar length (e.g., based on a length tag or other length indication) and subject matter (e.g., because the alternative video had been previously manually designated as an alternate video from the specific program, based on a subject tag or other indication) to substitute in place of the missing videos, as discussed in greater detail herein. Similarly, the system 102 may periodically review other content hosting websites to ensure that the selected content items (e.g., microblog postings, social networking page postings, etc.) for a given program are still available to be provided to the user terminal. If the system 102 determines that certain other content items that have already been included in scheduled program are no longer available, the system may find alternative content of similar length (e.g., based on a length tag or other length indication), type, and/or subject matter to substitute in place of the missing content.

The system 102 may also communicate with a variety of user terminals over a network 116 (e.g., via the Internet). The system may provide user terminals 110, 112, 114 with access to the program guide (e.g., as a web app via a web browser and/or via a dedicated application, such as a phone app hosted on a user terminal) and enable the user terminals to access programs streamed directly from the content hosting systems 104, 106, 108, and/or via the system 102, according to the timing of the program guide schedule. The system 102 may also provide simulated digital video recorder (DVR) functionality as described elsewhere herein. The system 102 may also host administrator user interfaces and associated programs. A mobile device 118 may have an application installed thereon that enables the mobile device to act as a remote control and enables the user to navigate the program guide on a user terminal via inputs on the mobile device 118.

The system 102 may include data stores 162, 164 that store content to be streamed to users (e.g., backup/alternate content as discussed herein, standard channel content, promotional/advertisement content, etc.), location information for content to be streamed to users (e.g., URLs to video content on third party hosting sites 104, 106, 108, URLs to music content, image content, social content, microblogs, etc., or any combination thereof on local or third party content hosting sites), program schedules, user account information (e.g., user channel and content preferences (e.g., genre, program, subject matter, content and/or channel likes and/or dislikes provided by the user via one or more interfaces), user specifications of channels to be blocked, user reminder instructions, user bookmarks, user viewing history (e.g., which channels and programs the user has watched, how often the user watches a given channel or program, how long a user watches a given program or channel, etc.), rules, and/or other information. For example, the data store 164 may store a user's responses to interstitials of different types, such as advertisements, games, program information, and/or the like. The stored user responses may indicate whether the user navigated away from an interstitial (e.g., changed channels or otherwise accessed a different program), fast forwarded through the interstitial, skipped the interstitial, replayed the interstitial, interacted with the interstitial (e.g., clicked on a link in the interstitial, responded to a question posed by the interstitial, played a game provided by the interstitial, and/or the like).

By way of example, user account information (e.g., user channel and content preferences explicitly provided by the user, user channel and content preferences as determined from the user's content viewing history, etc.), user behaviors (e.g., how long a user watches content per day or week, how many times in a specified time period the user changes channels, how often per specified time period the user tries a new channel or show (a channel or show the user has not previously viewed), etc.), promoted content (e.g., content sponsored by an advertiser or other third party), and/or data from third parties may be used in generating content recommendations for the user and/or in organizing how a program guide is presented to the user. Optionally, the program guide generation module 160 may be utilized to generate and/or personalize program guides. For example, some or all of the foregoing data may optionally be used in determining: the ordering of channels in the electronic program guide (e.g., which channels are presented first, second, third, etc.); which, if any channels are to be excluded from the program guide (e.g., channels that the system determines are of low interest to the user); which channels are to be highlighted (e.g., via color, animation, pop-up interfaces or otherwise, etc.), what types of information are to be included in the program guide, etc. Thus, a program guide may be automatically generated and customized for a given user.

Optionally, an artificial intelligence engine may be provided which learns the user's preferences and interests (e.g., based on the user account information and viewing and/or navigation behavior) and recommends other content (e.g., other programs and channels) via text, graphics, and/or a computer generated voice track synchronized with the lips and facial movements of a computer generated host (which may appear as a human or which may appear as a cartoon figure, animal, or otherwise). The computer generated host may be configured to act as channel or program host.

The content hosting systems 104, 106, 108 may enable users to upload or otherwise post media content (e.g., recorded and/or live streaming content), such as videos, social media content, or other content, and to provide media titles and/or other tags (e.g. descriptive, subject matter tags). The videos or other content may be associated with metadata, such as length of the videos or other content and/or length of advertisement streamed as a pre-roll or post-roll video advertisement). The users and/or the hosting systems may assign a categorization tag to the media content (e.g., humor, cats, licensed television shows, science, film and entertainment, gaming, etc.), and may record and post viewer rating information, and track and post the number of views. Some or all of this information may be accessed and used by the system 102 (e.g., using an application programming interface (API)), as similarly discussed herein.

Figure 2A:
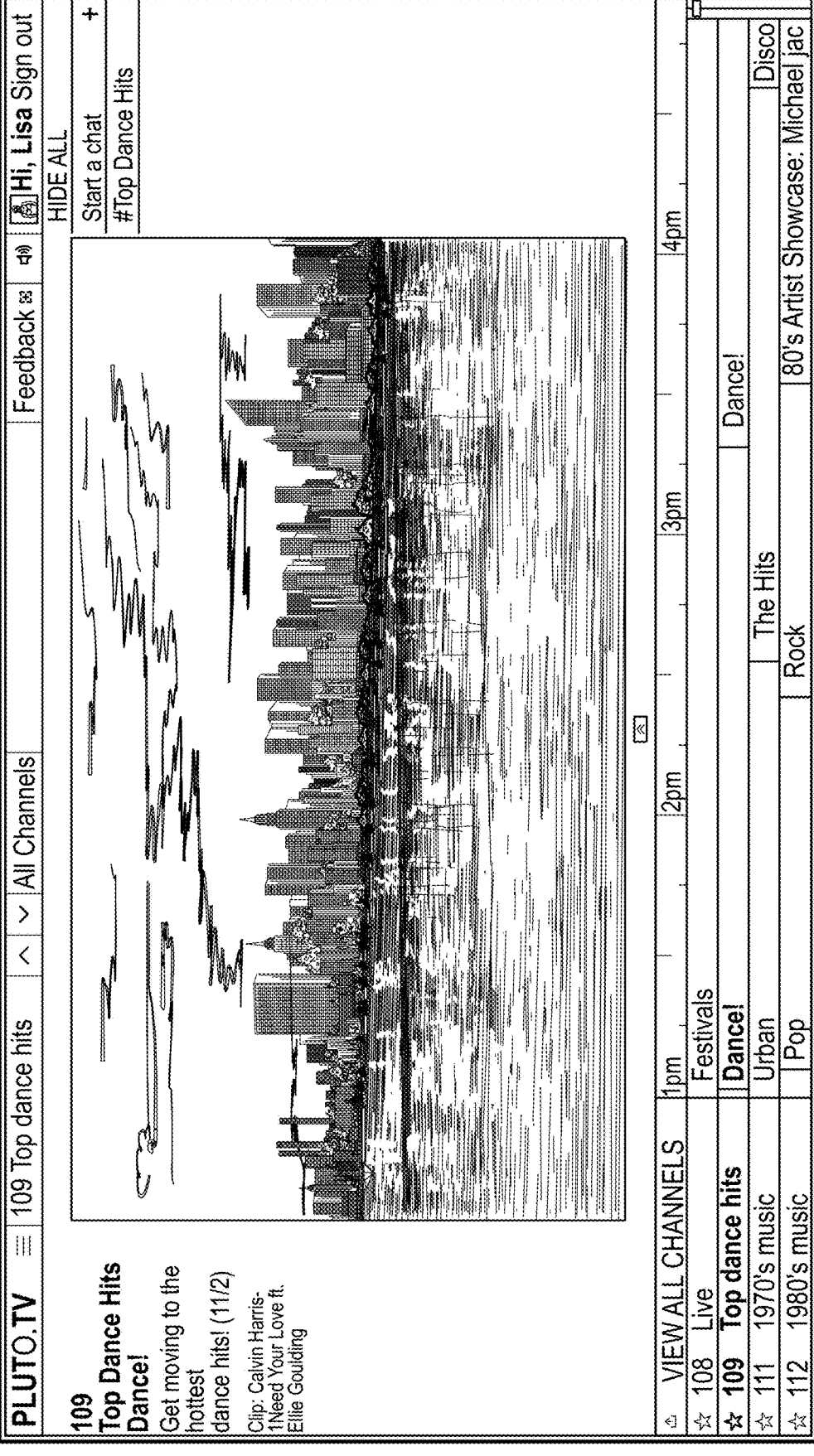

FIG. 2A illustrates an example interactive program guide for a plurality of channels and time periods and a viewing area to view a currently playing program for a user-selected channel. It is understood that the program guide can have fewer or additional features, and may have a different appearance and controls. The program guide may be accessed, displayed, and interacted with using a browser (e.g., as a web app coded using a browser-supported programming language, such as JavaScript), using a dedicated application (e.g., a mobile device app (e.g., a phone app or a tablet app), a game console app, a personal computer app, a smart television app, a streaming device app, etc.), or otherwise. Optionally, program guide functionality may be provided by a system that the user may connect to the user's playback device. For example, the system may be in the form of a dongle or stick that the user can plug into a playback device port (e.g., an HDMI port) or wirelessly connect to the playback device. In this example, the program guide is in the form of a grid, although other arrangements and formats may be used.

In this example, on the left side of the program guide (the vertical axis), channel numbers are provided (although other channel naming conventions may be used, such as titles, letters, colors, etc.). On the horizontal axis, time periods are listed. Program titles are provided, with an indication (e.g., a graphical indication and/or numerical start/stop times) as to when a given program starts and ends. Thus, the programs listed by the program guide are scheduled/planned events, typically with a specified duration, within a channel timeline. The user can scroll over the channels on the left side and the user interface will present additional information regarding the channels and/or regarding programs and episodes of recurring programs. The user can scroll forward and backward thorough the program timeline by mousing over the timeline header or otherwise. The viewing area (and program) may be displayed at the same time as the program guide, or the viewing area may be closed to provide a larger area for the display of the program guide. Similarly, the program guide may be closed or overlaid to provide a larger area for the display of the viewing area (e.g., by activating a "full screen" control provided by the user interface).

Within the program guide, there are individual links by channel that are accessed by the user's browser when the channel is changed. For example, the link for the channel "Top 40" may be in the form of http://pluto.tv/#!channels/Top%2040&_=_. A given channel may have associated content "playlists," which are a series of clips organized into scheduled programs/episodes and which may be accessed by the user browser. Thus, a playlist may optionally be in the form of a list of clips (e.g., compiled by human content programmers or automatically by the system), which share a similar theme, message or subject, and that are organized into a program with a specified duration.

The viewing area displays the currently playing program for a user selected channel. Optionally, information regarding the program is displayed in conjunction with the program. Some of the information may be pulled from the metadata of the currently playing clip and some of the information may be pulled from the channel name and the program name. For example, the viewing area user interface may display the corresponding channel number, the channel name, the program name, the name of the currently playing clip, and/or other information. It is understood that a user does not have to select a specific program to view the program. The user can select a channel, and the programs for that channel will continuously play on the user's terminal according to the schedule until the user navigates to another channel, pauses a program, closes the program guide application, etc. The program guide may emphasize the currently playing channel and/or program in the program listing (e.g., using color, bolding, animation, or otherwise).

Optionally, an "all channels" control is provided. The user can activate the "all channels," control, and in response the user interface will list all the current active channels (although the user may need to scroll through the channel listing to view all the active channels). The user can also select a categories control, and in response, the user interface will display channel groupings, where channels are grouped according to theme/category (e.g., 100-200 children; 300-400 sports; 500-600 on-demand, 700-800 pay-per-view, 900-1000 user generated channels, etc.), and the names and/or channel numbers for each channel are provided. An example channel categories user interface is illustrated in FIG. 2B. The various categories may optionally be visually indicated using separate, spaced apart, color coded rectangles for each category, with a category name as a header, and with a listing of channels for each category.

The user can also activate a control which, when detected, causes the user interface to display additional or fewer channels in the grid or to display only channels the user had previously indicated as being favorite or preferred channels of the user.

Optionally, as noted above, in addition to displaying scheduled programs, the same program guide user interface may optionally also list on-demand programs (e.g., free on-demand content, pay-per-view movies, music, television shows, or other content that are part of a subscription package, etc.), where a user can click on an on-demand program listing at any time and have the program streamed to the user. The on-demand content listings may optionally be grouped so that they are listed as adjacent channels (e.g., channels 500-600 may be dedicated to on-demand channels). The grouped on-demand content listings may be displayed above or below the scheduled programing channels, or between an upper set and a lower set of scheduled programing channels.

If there is a fee associated with viewing an item of on-demand content (e.g., the content is pay-per-view content, or is rentable for a specific period of time), optionally associated fee information is accessed from a data store and provided for display within or in association with the on-demand listing. If the user clicks on an item of fee-based content, the user may be prompted to enter payment information or to agree that previously provided payment information may be used to charge the fee. The user may then be charged the fee and may view the fee-based content. Optionally, the grouping of on-demand channels may be displayed as a single entry, and an expand control may be provided which, if activated by the user, causes each on-demand channel entry to be displayed. Thus, optionally, the same program guide may display listings for, and access to both on-demand and linear, scheduled, channels.

Optionally, a randomizer control (e.g., a button or menu entry) is provided, which when activated by a user, causes the system to generate in substantially real-time a program and/or channel of non-scheduled content and/or content not specifically selected by the user (e.g., where the program or channel is not simply a playlist defined by the user). However, optionally, the content is not truly randomly selected, but may be selected based on one or more criteria. Optionally, some or all of the content is randomly selected and/or handpicked by an operator. For example, the system may access user account information (e.g., a user's content preferences, viewing behavior, and/or viewing history) to be used in selecting, in substantially real-time, one or more items of content to be displayed to the user as a program or channel. For example, if the user's account information indicates that the user likes baseball and skateboarding bloopers but is not interested in football bloopers, the randomizer may select from one or more sources baseball and skateboarding blooper video content, and generate a program for the user from selected baseball and skateboarding blooper video content, while excluding football blooper video content from the program.

Optionally, an intelligent channel scan mode is provided that determines a priority order for channels to jump to, in response to a user activating a scan control based at least in part on processed set(s) of data. By way of illustration, a scan control may be provided, which when activated, causes a player to cycle through channels, presenting content from each channel cycled through for a period of time (e.g., 1 second, 3 second, 5 seconds, or other period of time, or to the end of the current content item (e.g., video clip) or the end of the current program, which is optionally settable by the user) before jumping to the next channel. If the user likes content being provided by a channel, the user can activate the scan control again or a play control to stop scanning and to enable the content of the current channel to be presented. The scan mode may be configured to scan though each available channel or to scan through only a subset of available channels.

The ordering of the scan may be based on the ordering of the channels in the program guide, or the ordering of the scan may be dynamically determined. For example, the scan sequence may be based on the content the user is currently viewing, the user viewing history, user preferences, other user account information (e.g., genre, program, subject matter, content and/or channel likes and/or dislikes, user specifications of channels to be blocked, user reminder instructions, user bookmarks, etc.), etc.

For example, depending on the configuration of the scan mode, if the user is currently viewing a sports channel when activating the scan control, the scan mode may only scan through other sports channels. By way of further example, depending on the configuration of the scan mode, if the user is currently viewing a sports channel when activating the scan control, the scan mode may first scan through other sports channels, and then scan through non-sports channels.

Optionally, a user interface is provided via which the user may specify one or more specific scan sequences, which may be associated with respective scan controls. The user interface may include a field via which the user can enter a scan sequence name, which may then be presented in association with the respective scan controls. Thus, for example, a user may define a sports channel scan sequence, a comedy channel scan sequence, a music channel scan sequence, a reality show scan sequence, etc. A menu of respective scan controls may be presented via which the user can select the desired scan sequence. In response to the user selection, the content player will then scan through the selected channel sequence.

Optionally, a recommendation control is provided, which when activated by the user, causes the system to generate and/or display program and/or channel recommendations. The recommendations may be based at least in part on one or more of the following: user account information (e.g., genre, program, subject matter, content and/or channel likes and/or dislikes, user specifications of channels to be blocked, user reminder instructions, user bookmarks, etc.,), user viewing history, user navigation behavior, etc.

Figure 2C:
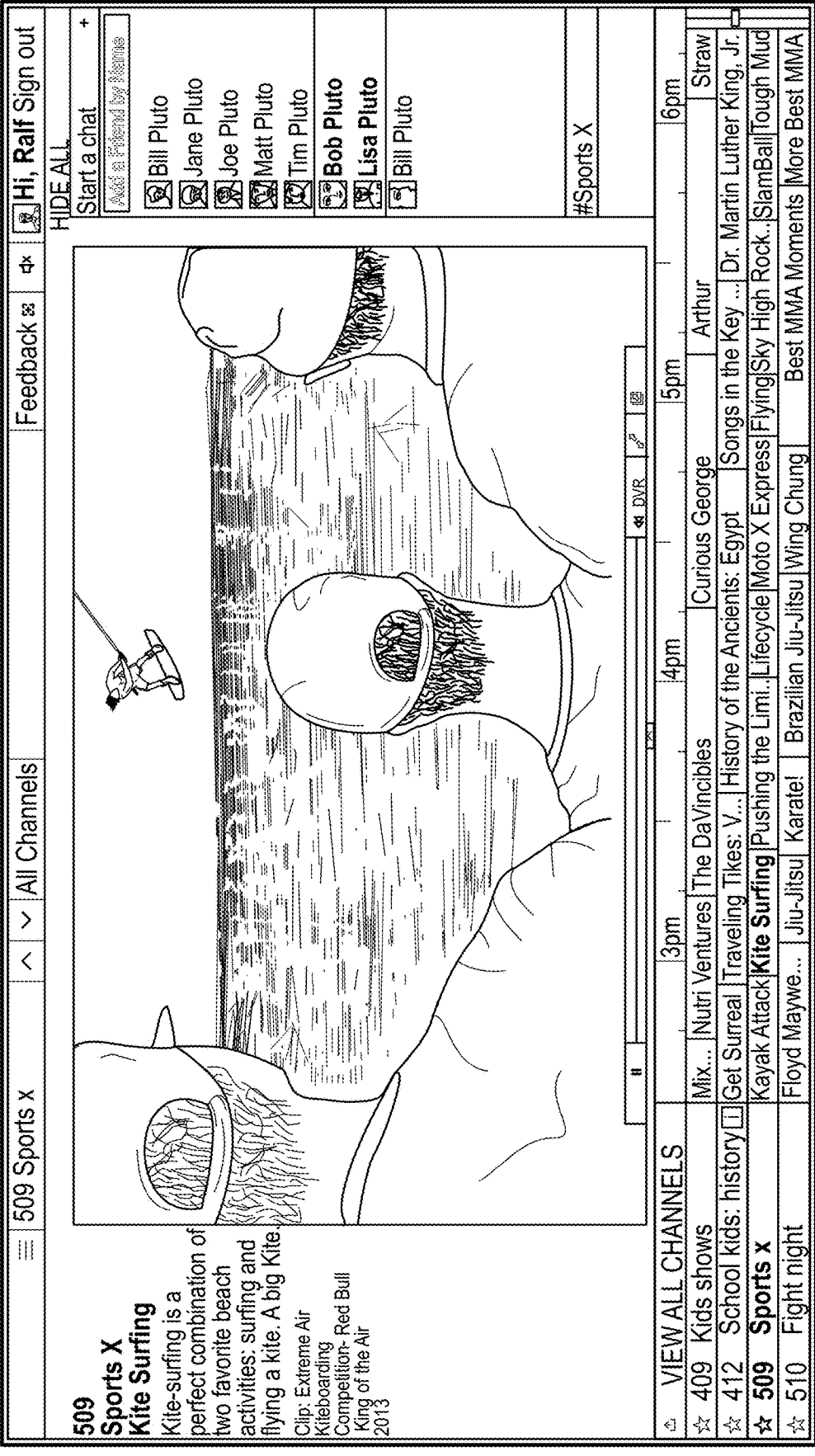
Figure 2D:
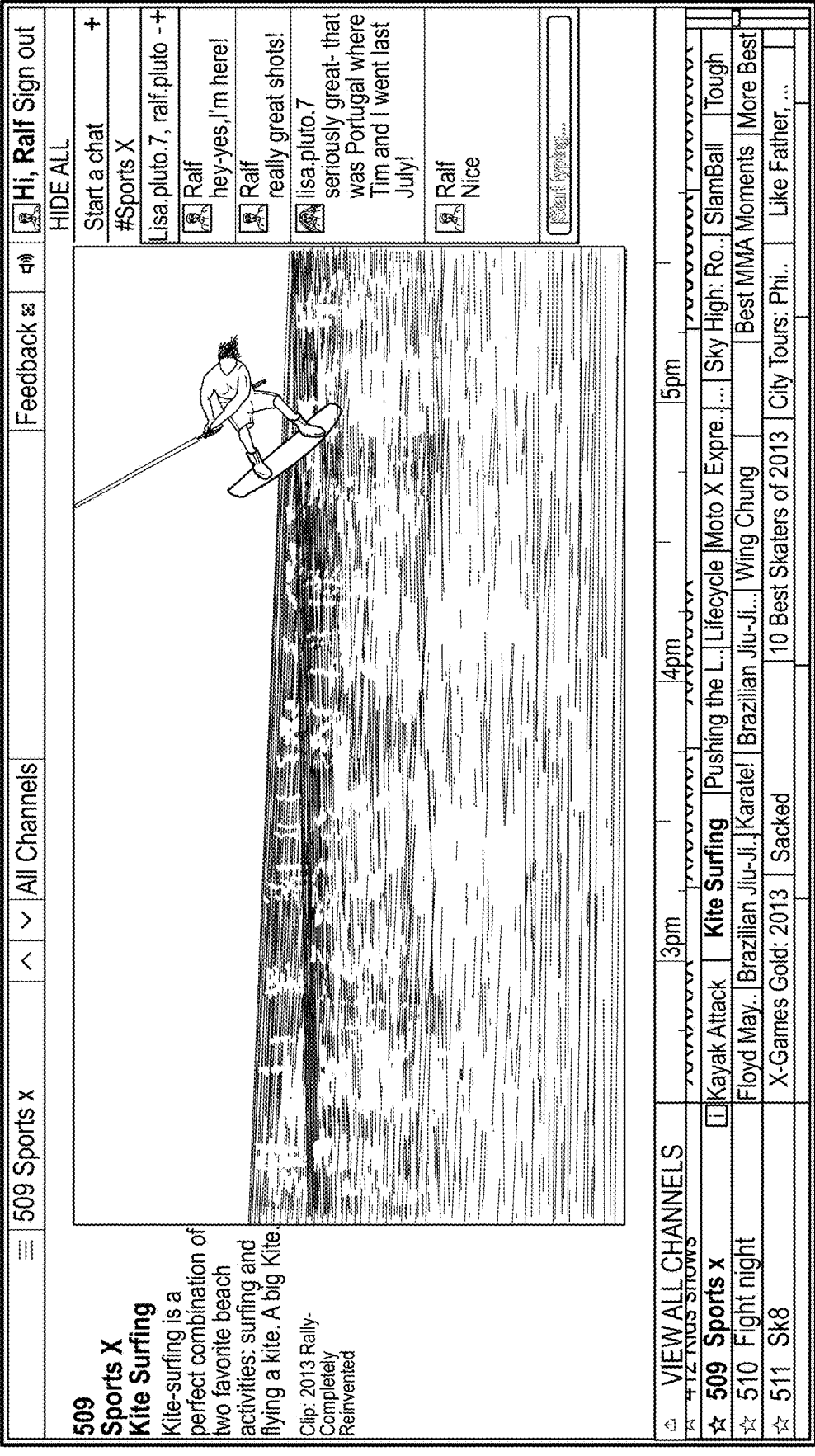

As further illustrated in FIG. 2A, a chat control is optionally provided which enables a user to initiate a chat (e.g., a text chat) with others. Optionally, a chat user interface is provided (e.g., in response to the user activating the chat control) displaying names and/or images of the certain of the user's friends, as illustrated in FIG. 2C. The names or images of the user's friends may be accessed from a social networking site or may be provided directly by the user (e.g., via an "add a friend" interface). The chat user interface may indicate which of the user's friends are online, and which of the user's friends are currently viewing the same program as the user. FIG. 2D illustrates a chat session which may take place while the various chatters are viewing a program (e.g., a scheduled program on a channel, so that the chat session is synchronized with the episode). Optionally, the user interface may access video and audio content from a webcam and a microphone to enable users to chat via a video and/or audio conference. The webcam may also be positioned and used to enable a user's friends watch the user watching a given program.

Figure 2E:
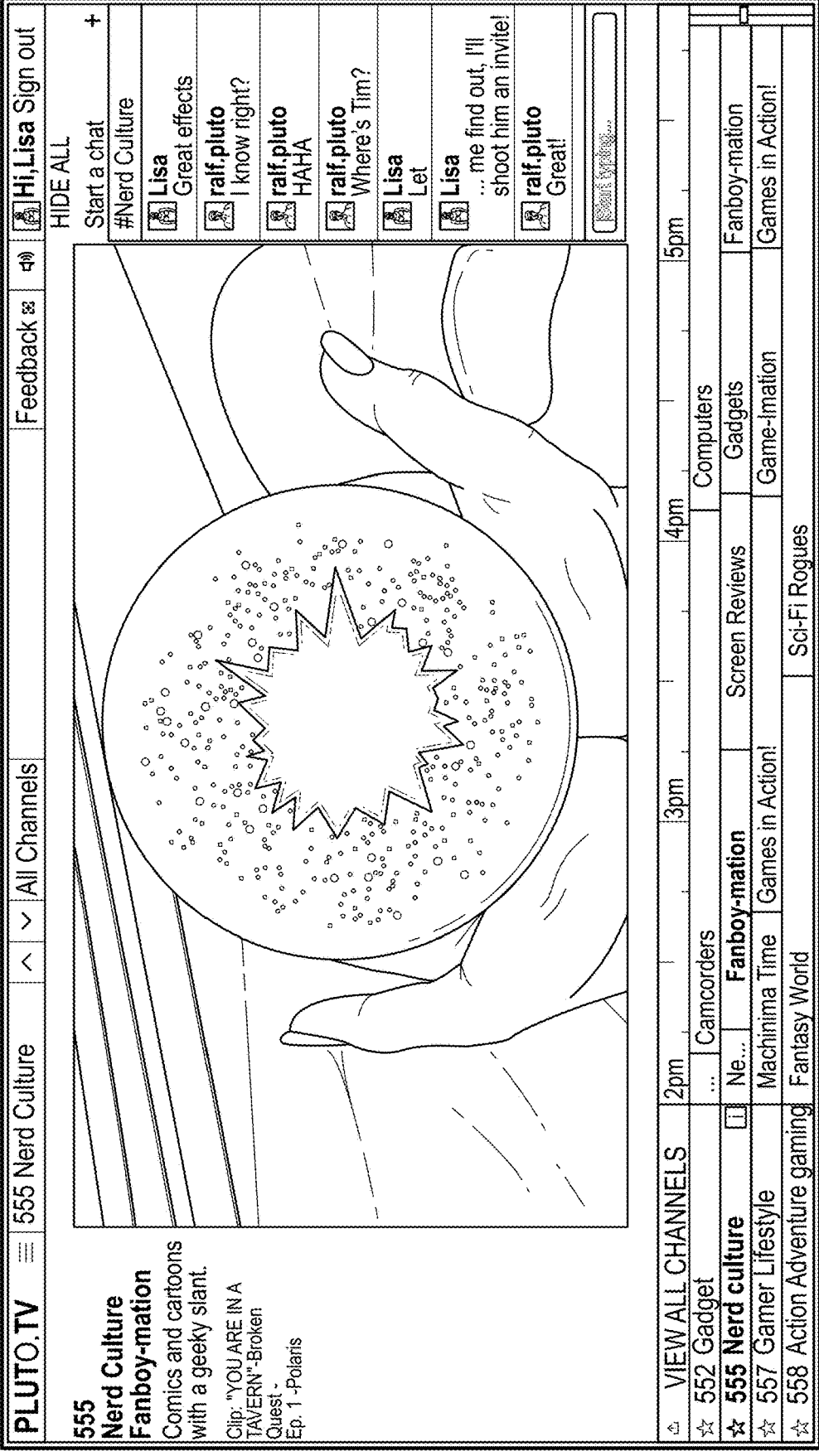

The user can invite others to watch a current or future program via the chat user interface or optionally via a direct invitation user interface. For example, the user can activate an invitation control, and an invitation will be sent to a friend (or other user) specified by the user. The invitation may identify the program title, channel, and/or the program date/time. Optionally, the invitation may include preexisting invitation template text and dynamic text identifying the program and channel the user is watching, such as "I am watching 'Cats having dinner' on Channel 302. Please watch along with me" or "I will be watching 'Cats having dinner' on Channel 302 on Friday, December 26. Please watch along with me" (the underlined text indicates the dynamic text). The dynamic text may be determined by detecting what program the user is watching and determining which channel it is on. The dynamic text may then be inserted into the invitation. The invitation may be sent in real time. Optionally, the chat user interface may also provide access to a public chat room, as illustrated in FIG. 2E.

Controls to a real or simulated digital video or other content recorder (DVR) may be provided for display on a user terminal in association with a video or other content player. Optionally, the DVR may be a module hosted by the system 102 or hosted by the user's terminal and implemented in part using software in communication with the software providing the program guide. An example DVR set of controls is illustrated in FIGS. 2C and 2J. As will be described, optionally the DVR may be used to "record" a program, view a recorded program (e.g., from a library specific to a user or from a shared library), pause and rewind a live program, share a program currently being watched, and/or share bookmarks. In this example, a pause/play control, a rewind control, a fast forward control, and a scrubber control are provided. For example, the user may instruct, via a record control provided by the program guide user interface, that a show be recorded for later playback. A DVR user interface may also provide a listing/library of recorded programs (which may be virtually recorded programs), from which the user may select for playback. The DVR function may enable the user to rewind or fast forward through a recorded or currently playing program using corresponding rewind and fast forward controls.

Optionally, an actual DVR is not used. Rather, the interface simulates the functionality of a DVR. Thus, for example, although the DVR control set enables the user to pause, rewind and fast forward through a program, a copy of the program is not stored on the user terminal or on the content scheduling system. Instead, the DVR control set is controlling playback of media being streamed from the third party content sources. Thus, for example, if a user provides a "record" instruction while watching the program, no actual content is recorded in response. Instead, a bookmark may be stored (e.g., on the user terminal or on the content scheduling system) indicating at what point in the program the user activated the record program. When the user later accesses the "recorded" program, the system access the stored bookmark, determines at what time point the user activated the bookmark, and causes playback of the corresponding clip (and hence program that included the clip), accessed from the third party content site, to begin at the bookmarked location. Thus, advantageously, storage space on the user terminal or content scheduling is not wastefully occupied storing the content from the third party content site.

Optionally, the user may associate several bookmarks with a program, where each bookmark is associated with a different time/point in the program. The program guide may include a listing control, which when activated by the user, causes a listing of the bookmarks/recordings to be generated and displayed to the user. The listing may display some or all of the following: a frame from the program corresponding to the location of the bookmark, the name of the program, the program channel, and the date/time the user created the bookmark. The user can then select a given bookmark or "recording" for playback, and the corresponding program will then be played back at the bookmarked point.

A user's bookmarks and library may be associated with the user's account and optionally may not be accessible to other users. Optionally, the user can select to share some or all of the user's bookmarks or library of programs with one or more other users. For example, the user may share bookmarks for a particular program, a set or sets of programs, a channel or set of channels. The recipient(s) of the bookmarks (or library) may be notified that the user is sharing the bookmarks (or library) with the recipient and may view a similar generated bookmark listing. Optionally, a bookmark (or access to a bookmark via a link or otherwise) may be included in an invitation from the user (such as the invitations discussed elsewhere herein) to one or more other users to watch the program (e.g., beginning at the bookmarked location). Thus, the system enables the user to engage in the viewing of the program starting at a bookmarked location with other remote users with whom the user shared the bookmark with. Optionally, the library and/or bookmarks may be shared across a variety of different platform types (e.g., tablet computers, smart phones, desktop computers, networked televisions, etc.) or only one or more user and/or system selected platform types.

In addition, the DVR (the virtual or non-virtual DVR) may be used to navigate through a program being viewed by the user in accordance with its scheduled display. That is, the DVR enables the user to rewind, pause, and fast forward through a "live" program. Optionally, the DVR prevents that user from fast forwarding through a program past it current "live" point. Optionally instead, the DVR may enable the user to fast forward through a program past it current "live" point. Of course, if the program is an actual live program (e.g., a live sporting event), the user is prevented from fast forwarding through the program past the current actual live point in the program.

Because a given program may be composed of multiple clips being streamed from different sources, which are then logical and visually stitched together (to provide a seamless viewing experience to a viewer), rewinding or fast forwarding through a given program may cause clip boundaries to be traversed. Because certain clips may be from different sources, the system determines if the rewind (or fast forward) instruction will cause a clip boundary to be traversed, and if so, will determine which other clip should be streamed to the user video player based on the amount of rewinding or fast forwarding. The system will then cause the appropriate clip from the appropriate source to be streamed to the user video player from the appropriate point in the clip. It is understood, that a user may rewind or fast forward through a program using dedicated rewind and fast forward controls, a scrubber, or otherwise. An example DVR user interface is discussed below with respect to FIGS. 2J and 2K.

Optionally a library add control (e.g., a button) may be provided on third party pages (e.g., website pages) or via a browser plug in that enables a user to add a video on the third party page to the user's individual library (e.g., the user's DVR library for access via the DVR or otherwise). For example, when the user activates the library add control, code associated with the library add control detects the activation and transmits corresponding video locator infor- mation (or locator information for other content, such as image content, social streams, microblogs, text messages, etc.), to the user's library (which may be hosted on the user's terminal and/or the system). For example, the locator infor- mation may comprises a URL and/or an internal code of the third party that points to the video (or other content) spe- cifically separately from the page as a whole, so that when the video is later accessed by the user, only the video, and not the surrounding page, is displayed in the user's video player. Thus, for example, if the user comes across a video on a news channel website, but does not have time to view the video, the user can "save" the video to the user's library for later playback by activating the library add control. Optionally, the video may be added to a specific private or public playlist or channel, such as a user defined channel of videos that the user has saved but not yet viewed.

Figure 2F:
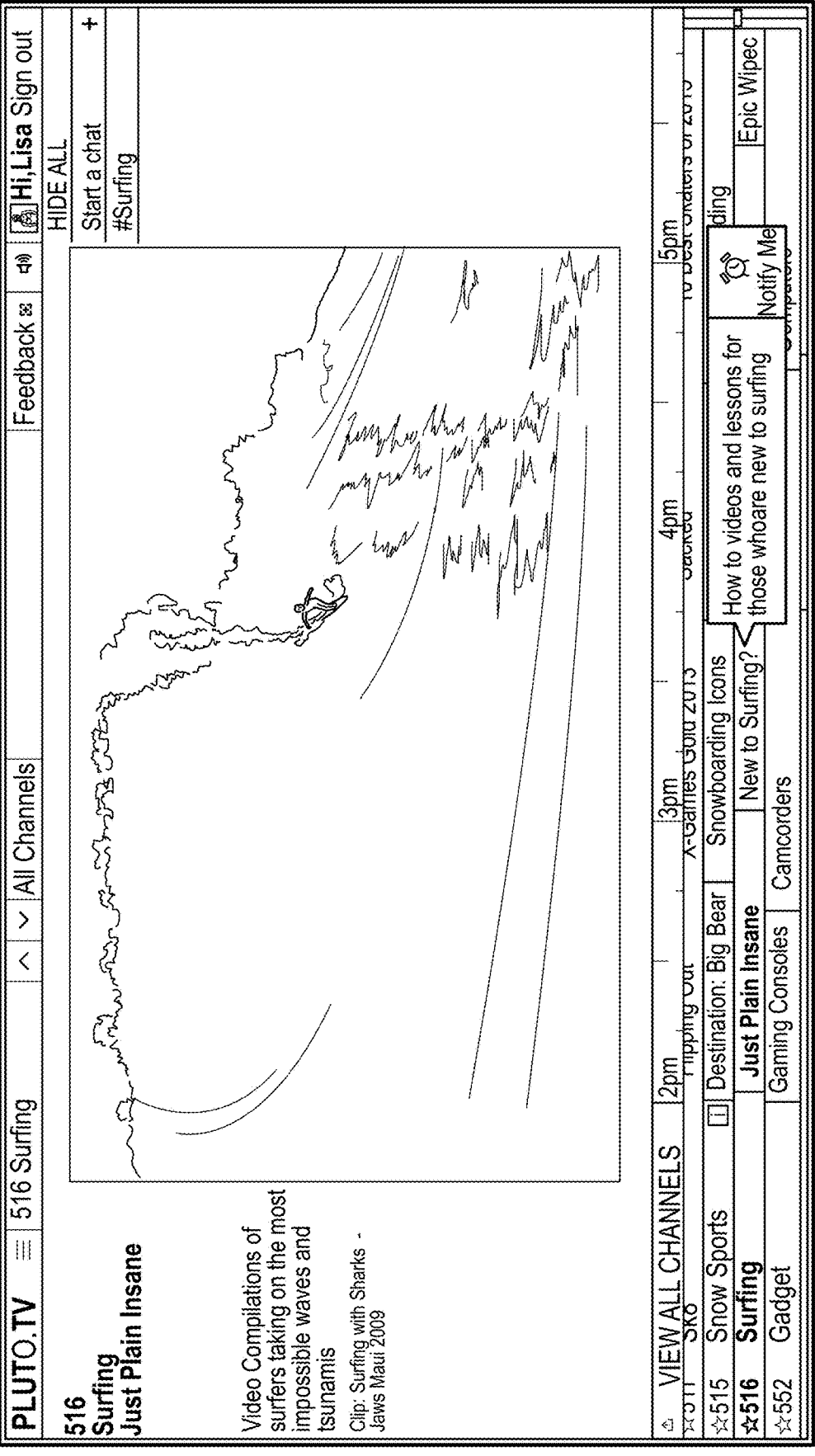
Figure 2G:
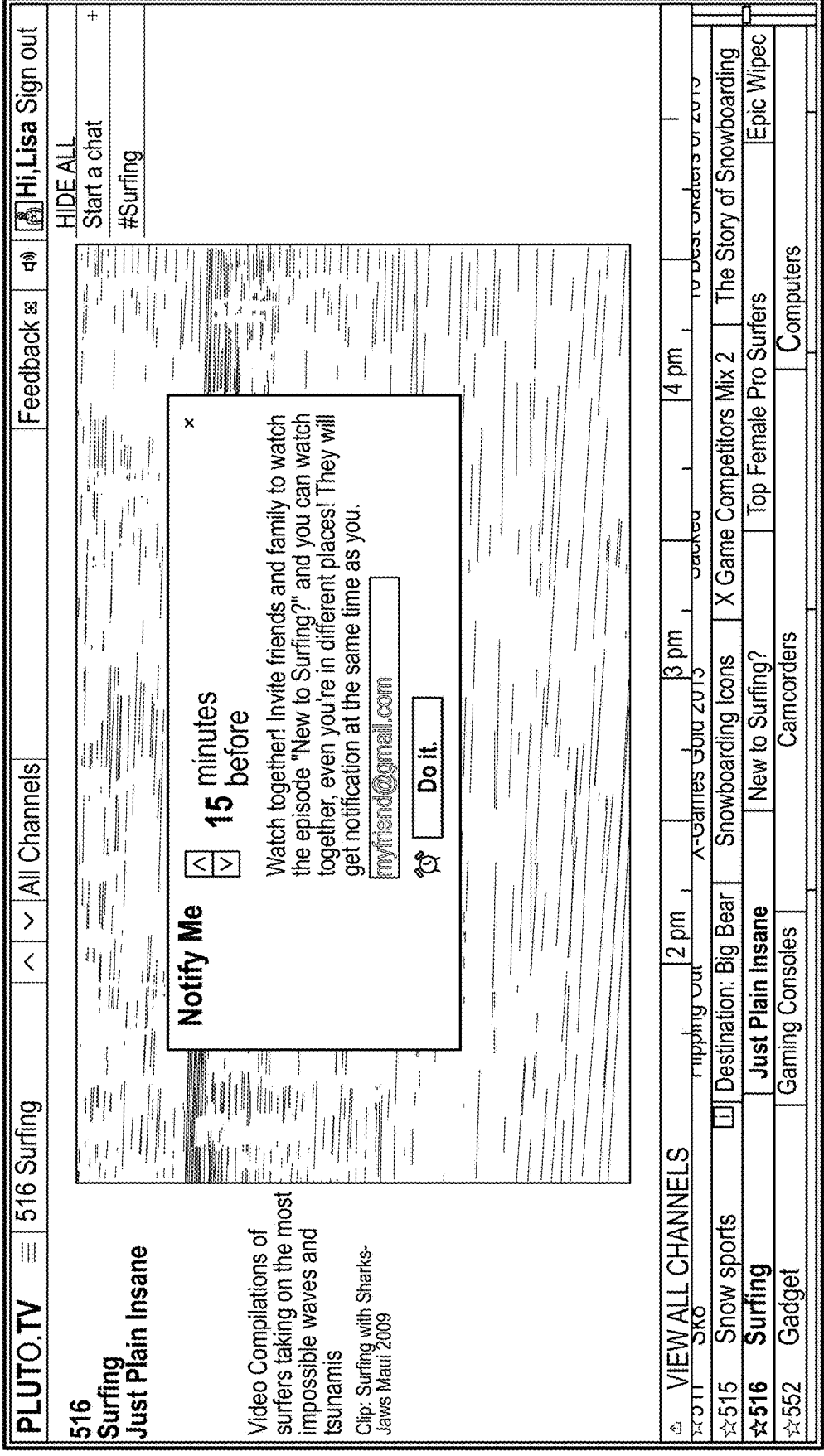

If the user clicks on a program listed in the program guide that has not yet begun, a reminder control is presented (e.g., in a pop-up window or otherwise), an example of which is illustrated in FIG. 2F (the "notify me" control). If the user activates the reminder control, the reminder user interface illustrated in FIG. 2G is presented. The user can provide an instruction that a reminder be transmitted to the user preset amount of time or a user-specified amount before the begin- ning of the program. Optionally, the user can specify, via a user account specification, via a control in the pop-up window, via a menu selection, or otherwise, how the reminder is to be provided.

For example, the user can specify that the reminder is to be provided via an audible alert or visual on the user's terminal, via an SMS/MMS message transmitted to a user mobile device, via an email, via an automated phone call, via an entry on the user's calendar (which will cause the calendar to provide an audible and/or visual reminder), and/or otherwise. By way of illustration, the user can specify that the reminder is to be provided at the program start time, 1 minute before the program start time, 15 minutes before the program start time, 1 hour before the program start time, or other amount of time before the program start time. The system or app will store the reminder instructions and provide reminders to the user accordingly. As illustrated in FIG. 2G, the reminder user interface may also include an interface via which the user can invite another person to watch the upcoming program at the same time. In the example illustrated in FIG. 2G, a field is provided via which the user can indicate (e.g., by entering an email address or SMS address of the invitee) to whom the invitation is to be provided. The invitee will then be provided with a reminder at about the same time the user is provided the reminder (e.g., via email, SMS, or otherwise).

Figure 2H:
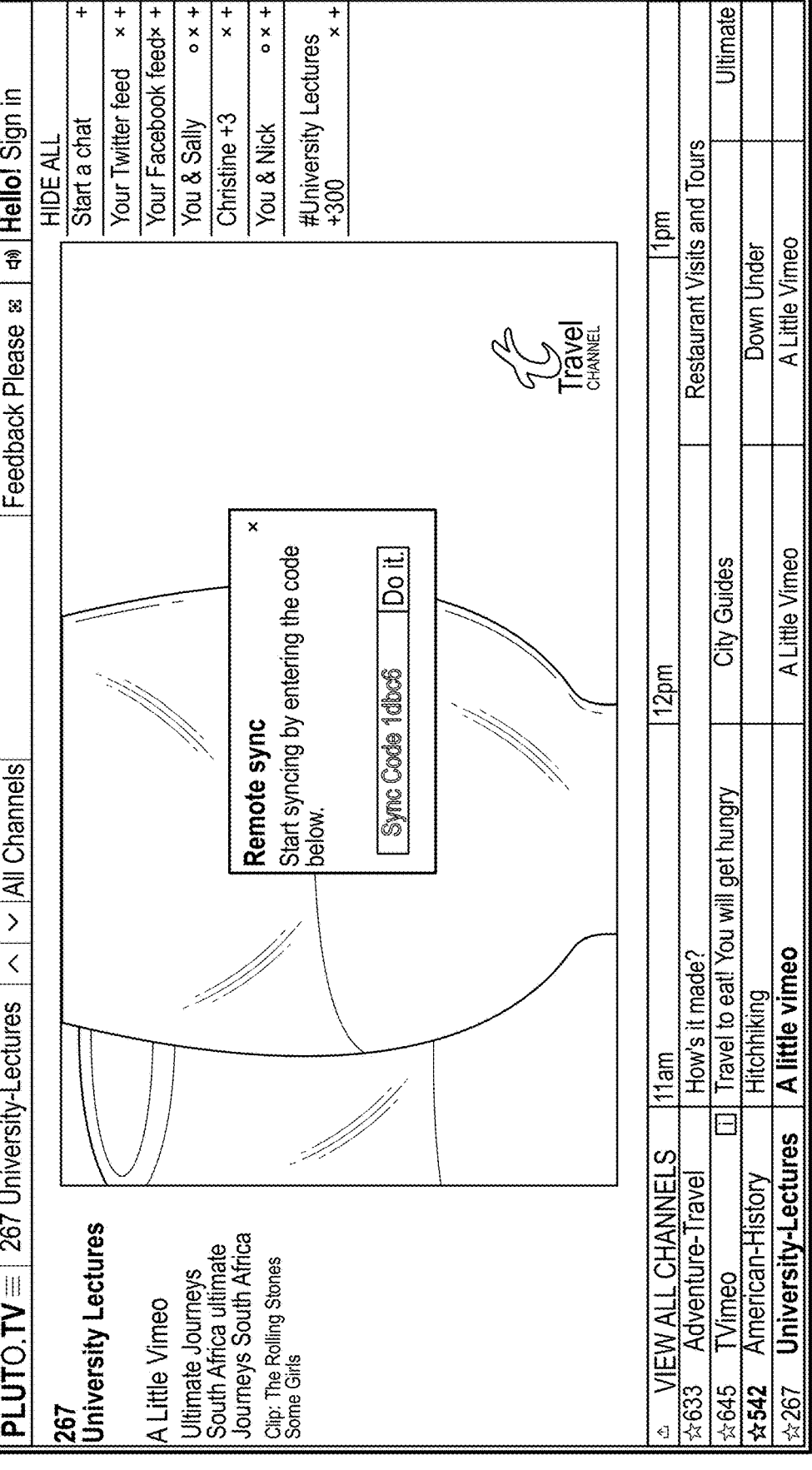
Figure 2I:
Figure 2J:
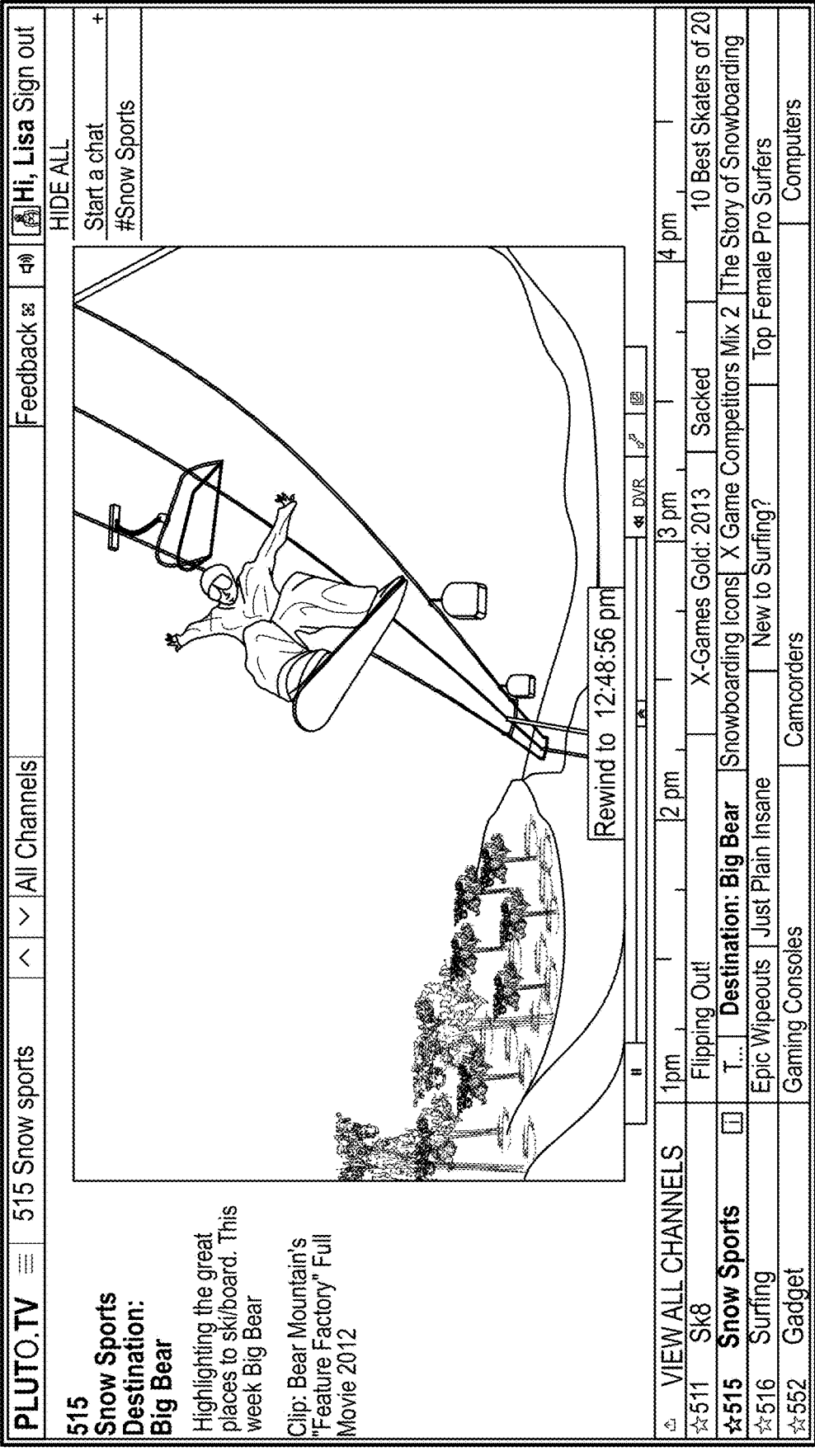

Optionally, the program guide user interface can be navi- gated using a remote control. For example, the remote control may be in the form of a mobile device, such as a mobile phone with a touch screen or a touch tablet, which has a remote control application (or other application includ- ing a remote control module, such as a program guide application including a remote control module) downloaded to and installed thereon. The remote control may be con- figured to directly communicate with the user interface application hosted on the user's terminal via a local wireless communication protocol, such as Bluetooth, or via a local area wireless network, such as a Wi-Fi network, or other- wise. Optionally, in order to enable the remote control to be synchronized with the program guide presented in a browser on the user terminal, the user selects a sync control presented via the remote control application (e.g., the phone app). The application then prompts the user to enter in the remote sync code generated by the web app executed by the user browser, as illustrated in FIG. 2H. Once the user enters the code into a field presented by the application, the application becomes a remote control for the web app. For example, the appli- cation may present a version of the program guide formatted for the remote control application host (e.g., a smart phone or tablet display), as illustrated in FIG. 2I. When the user selects a given channel or program on the program guide provided via the remote control, that same channel or program will be selected in the web app on the user terminal. Thus, the user inputs on the remote control may be func- tionally mirrored on the user terminal. Similarly and option- ally, when the user selects a given channel or program via the web app, that same channel or program will be selected on the remote control.

Figure 2K:
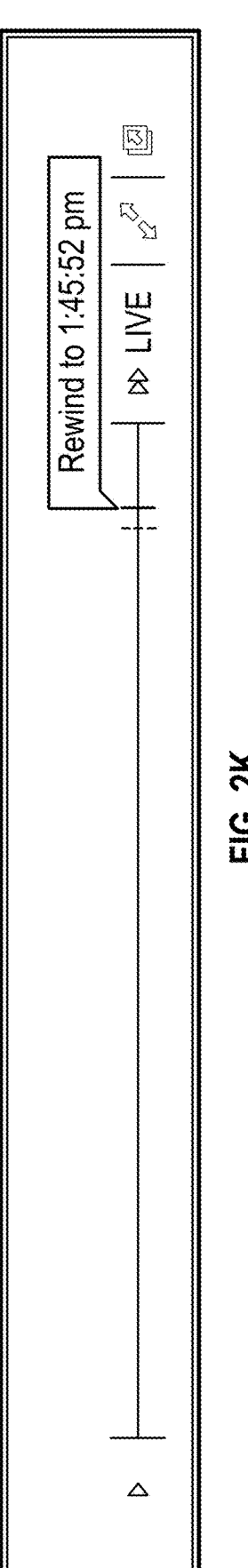

FIGS. 2J and 2K further illustrate the example DVR user interface, where the user has dragged the cursor in the scrubber back to rewind the current program, and the current rewind position of the scrubber cursor is displayed (e.g., in terms of the time of day that portion was originally played). A live control is provided, which when activated, causes the DVR to return a "live" program to the current "live" position (the current point in the program that is being played in accordance with the program guide schedule).

Figure 2L:
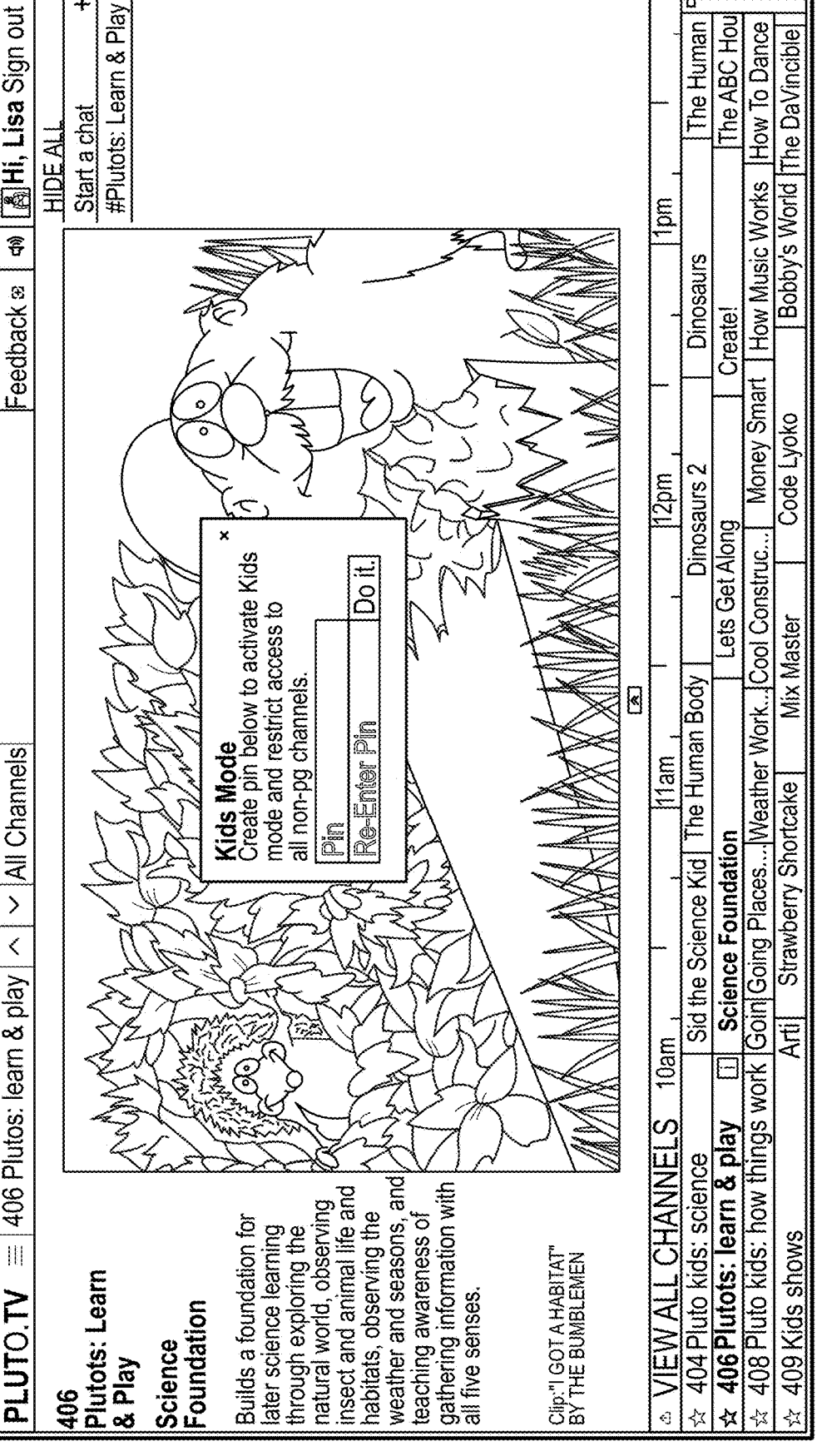

Optionally, a parental control is provided via which the user can prevent channels and/or programs having an unac- ceptable rating (e.g., a rating above G or PG, or other than a PG rating) from being presented unless an override input is entered (e.g., a PIN code). An administrating user (e.g., a parent) may specify an override code via a user interface accessible via the program guide (see, e.g., the example illustrated in FIG. 2L). The system will record the override code specified by the user. If someone attempts to access, via the user's account, a program that exceeds the permitted rating, such access is detected by the application or system, and in response the user interface provides a visual and/or an audible notification that the program rating exceeds the parental control threshold and prompts the user to enter the override code. If the user enters the correct override code, as verified by the system or application, then the program will be displayed via the user interface. If the user fails to enter the correct override code, then the program will not be displayed.

Figure 3A:
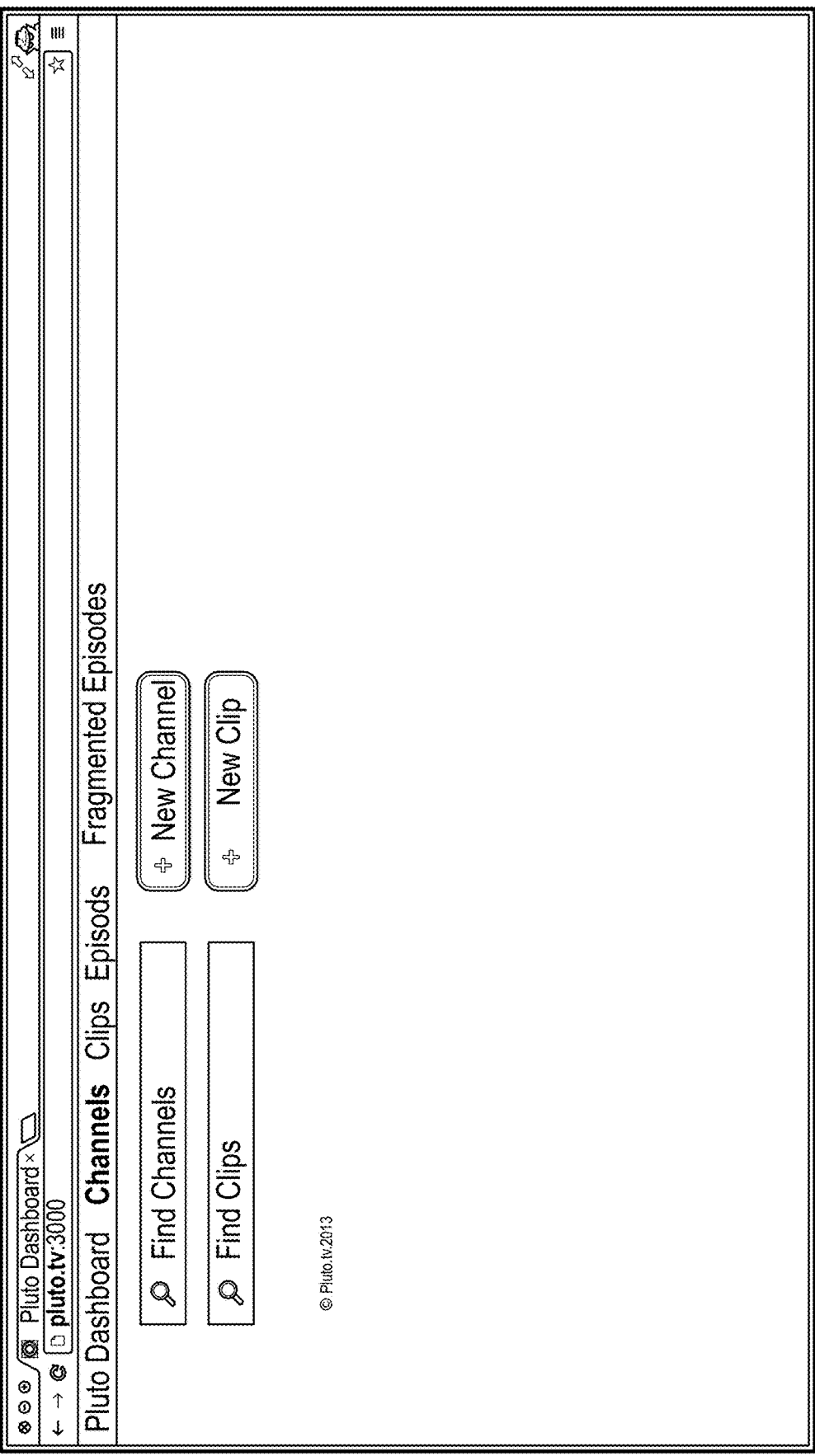

Example backend user interfaces will now be discussed that enable a content programmer to program channels and programs. FIG. 3A illustrates an example user interface including a search field via which the user can enter search queries to search for channels or clips. The search queries may be routed to one or more content hosting sites and/or a content repository or index maintained by the content scheduling system. The search results may then be presented to the user. The search results may be aggregated if they included results from more than one source. The operator can add new channels to a channel lineup by activating a "new channel" control, and can add a new video clip or other content to a program by activating a "new clip" control.

Optionally, the index of content may be made available to third parties (e.g., over a network) via an application programming interface (API). The third parties may access and use the index to identify and locate content from one or more sources that meet one or more filter conditions specified by the third party (where a filter condition may relate to content metadata). For example, the content index may include content locators (e.g., URLs for Internet content), unique content identifiers, and/or metadata extracted and optionally normalized (e.g., into an interoperable standard data format) from one or more content sources (e.g., video, music, image, social media, microblogs, and/or other hosting sites or data stores). By way of further example, the content metadata may include length information. By way of yet further example, the content metadata may identify notable individuals associated with an item of content (e.g., names of writers, actors, directors, producers, artists, performers, etc., in association with their respective titles/job functions/character names), content title, content subject matter/topic, content classification (e.g., video, music, blog, etc.), instruments played (e.g., for music content), other metadata discussed herein, etc. Metadata may have been obtained via the content source, via an analysis of the content (e.g., by processing the content to identify actors, music, subject matter, etc.), and/or from other databases (e.g., other databases that store and provide access to content metadata).

Thus, for example, a third party may specify via an interface a length, subject matter, and category, for desired content, and a search engine will locate and return, via the API, search results identifying corresponding content and/or some or all of the associated metadata. The third parties may utilize the metadata and identified content to construct their own electronic program guides, their own programs, and/or channels, or may use the identified content and metadata for other purposes.

FIG. 3B illustrates an example of a user interface enabling a programmer to edit content programming. For example, the user interface enables a programmer to add channels to a channel lineup (e.g., by activating a "new channel" control) or delete channels from a channel lineup by activating a delete control associated with a given channel. The modifications are stored and reflected within the channel lineup and program schedule by the system. The changes reflected in the channel lineup are presented by the system to the programmer.

FIG. 3C1 illustrates an example user interface presenting lists of programs for a selected channel ("Top 40" in this example) generated by the system. The system categorizes, organizes, and presents the programs as groups based at least in part on the program status, such as "On Air", meaning the program is scheduled to be aired, "In Progress," meaning the program is still being edited and is not yet complete, "Completed", meaning the program is ready (per programmer guidelines) and is ready to be scheduled into the program tool, and "Archived" meaning the programs have been aired or assembled but not aired, but are not currently scheduled to be aired. The aired/airing dates and times, and program lengths for each program may be provided for display as well. Corresponding delete controls are provided for deleting a given program. An "add" control is provided to enable the programmer to duplicate an existing program and then manipulate/edit into a new program. When the system detects that the user has activated the "add" control, the system makes a copy of the corresponding program (or the data used to assemble the clips into the program). The user may then activate an "edit" control provided by the user interface via which the user can edit the program details including the name, description and/or published state. FIG. 3C2 a user interface similar to that of FIG. 3C1. In this example, the system organizes the list so that programs that are in progress are grouped together and programs that are on air are grouped together. In this example, the program title, aired date/time, and duration may be listed. Add, edit, and delete controls are provided and may be used as similarly discussed above with respect to FIG. 3C.

FIG. 3D illustrates an example user interface presenting a list of clips, including the name of the clip, the source or provider of the clip, author (content creator that uploaded clip), a locator (e.g., a URL or other link) for the clip, and the clip run time. Certain information, such as the name of the clips and the clip length may be obtained from metadata associated with the clips. Controls are provided for deleting a given clip and for obtaining additional information regarding the clip. The programmer may instruct the system to filter or sort the clip list. For example, the user can instruct the system to filter the list to only display published or unpublished clips. A shuffle control is provided which, when activated, instructs the system to reorganize order of clip playback (e.g., randomly or otherwise). The "in progress" indication denotes that the corresponding program is not yet complete, and enables the curator/programmer to organize incomplete programs that are in progress. A field is provided for receiving search queries for searching for additional clips. The search queries may be routed to one or more content hosting sites and/or a content repository or index maintained by the content scheduling system. The search results identifying the matching clips may then be presented to the user. The search results may be aggregated if they included results from more than one source.

Referring again to the example illustrated in FIG. 3D, an import control is provided. The import control enables the programmer to import a clip or to import a list of clips (or links/locator thereto, such as a URL or other locator) into the program at once. A user may enter one or more clip locators (e.g., a URL) into a corresponding field, and the system will import the corresponding clip(s).

Figure 3E:
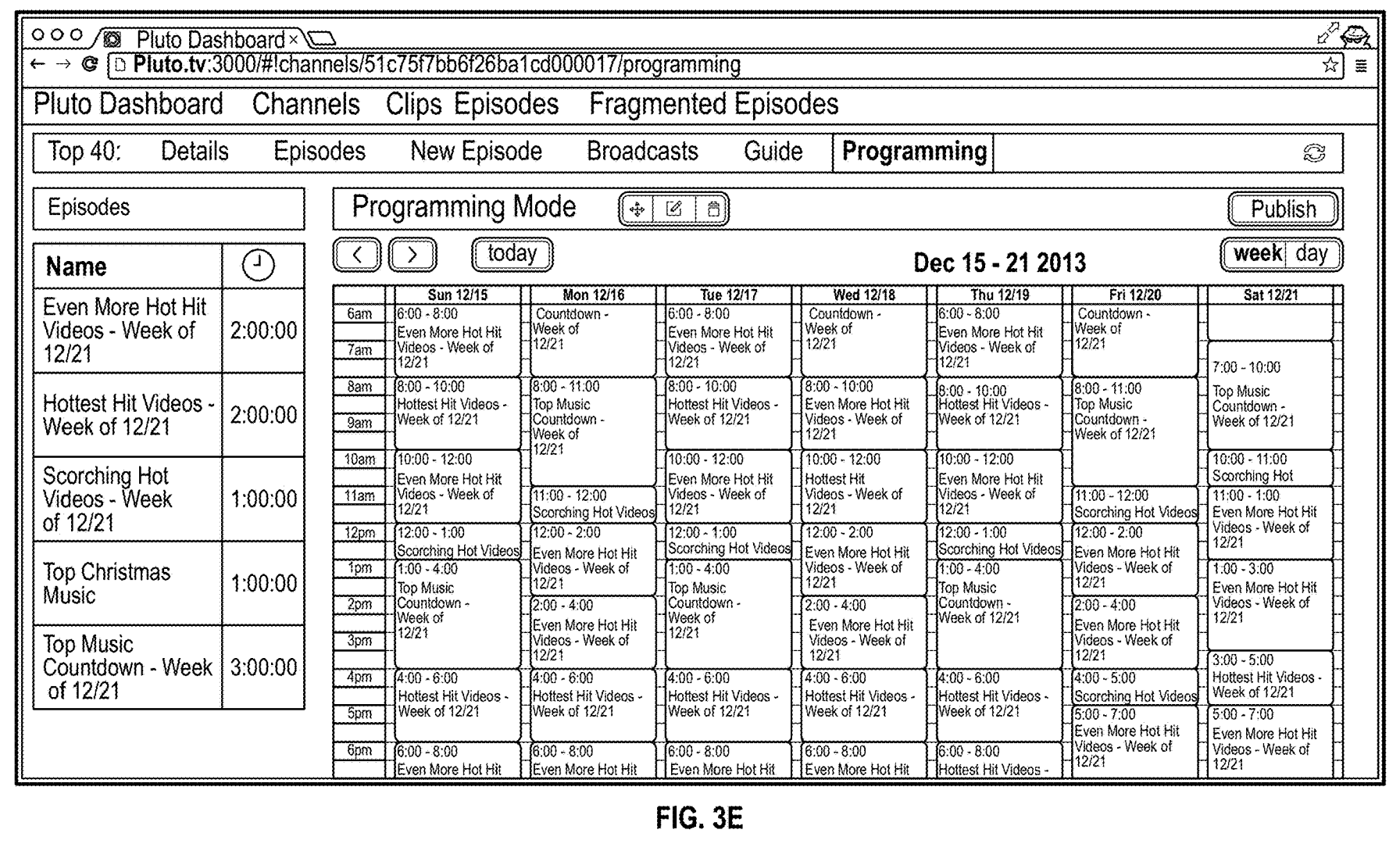

FIG. 3E illustrates an example program scheduler user interface for a channel. The programmer can instruct the program scheduler user interface to display the schedule for a selected week or day, and in response, the program scheduler user interface will display the schedule accordingly. In this example, the schedule for a week is arranged and displayed in a grid format, where time of day is listed on the Y axis, and the day is listed on the X axis. The programs scheduled for each time period of each day are displayed in the grid, wherein a given program entry includes the time period the program will be displayed, the name of the program, and the week the program will be displayed. In this example, the schedule has not yet been published to be accessed and viewed by the general user public. The programmer can activate the "publish" control and the corresponding program guide will be published and made accessible to the general user public by the system. The names of unique programs/episodes included in the grid are listed in a table on the left, including the program length. Thus, the user interface enables the programmer to quickly determine how many unique programs are scheduled for the displayed week or day without having to manually identify and count the unique programs. The user interface optionally enables the programmer to manually drag and drop completed programs from the left navigation into the schedule (e.g., the weekly schedule), providing an optional mechanism to override an automatic program schedule.

Figure 4A:
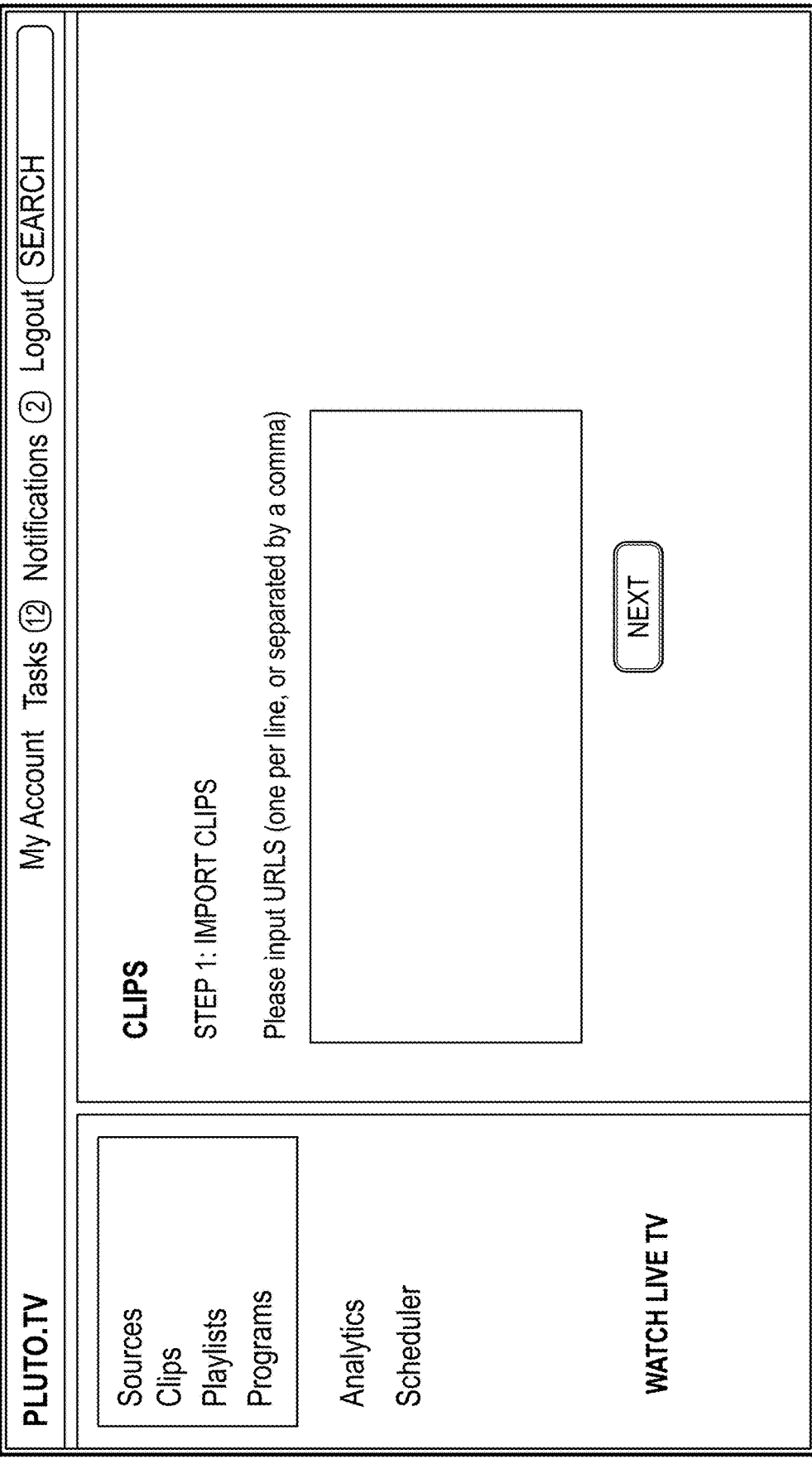

Example content programmer user interfaces will now be discussed. FIG. 4A illustrates an example user interface via which the programmer can enter locators for one or more clips (or locators for other content, optionally including real-time generated content, such as a streaming microblog) to be imported. It is understood that the term real-time includes substantially real-time (e.g., in less than 0.5 seconds, in less than 1 second, in less than 2 seconds, etc.) unless the context indicates otherwise. FIG. 4B illustrates a report generated by the system indicating which locators entered via the user interface of FIG. 4A are not usable (e.g., are not embeddable by the system in the program guide). The list of "bad" clip locators may include, for each corresponding clip, some or all of the following: a thumbnail for the clip, the clip title, a clip description, the number of clip views, the clip duration, and the date the clip was posted, in addition to some or all of the metadata associated to the original clip. A control is provided via which the operator can remove the "bad" locators/clips (or bad locators for other content). FIG. 4C illustrates an example clip assignment user interface via which the programmer can assign a given clip to an associated category, channel, program, or playlist. The system will then store the assignment.

FIG. 4D illustrates an example task/notification interface. The interface may provide system messages (e.g., system up/down times, maintenance schedules, etc.), other notifications, and a listing of uncompleted tasks assigned to the programmer, as tracked by the system. FIG. 4E illustrates an example notification user interface. The notification may identify a corresponding channel, program name, episode number, status/issue (e.g., broken link), and the status date. If, for example, there is a broken link identified, the programmer can click on the corresponding entry, and the system will be present the corresponding playlist, via which the user can fix/replace the broken link.

Figure 4F:
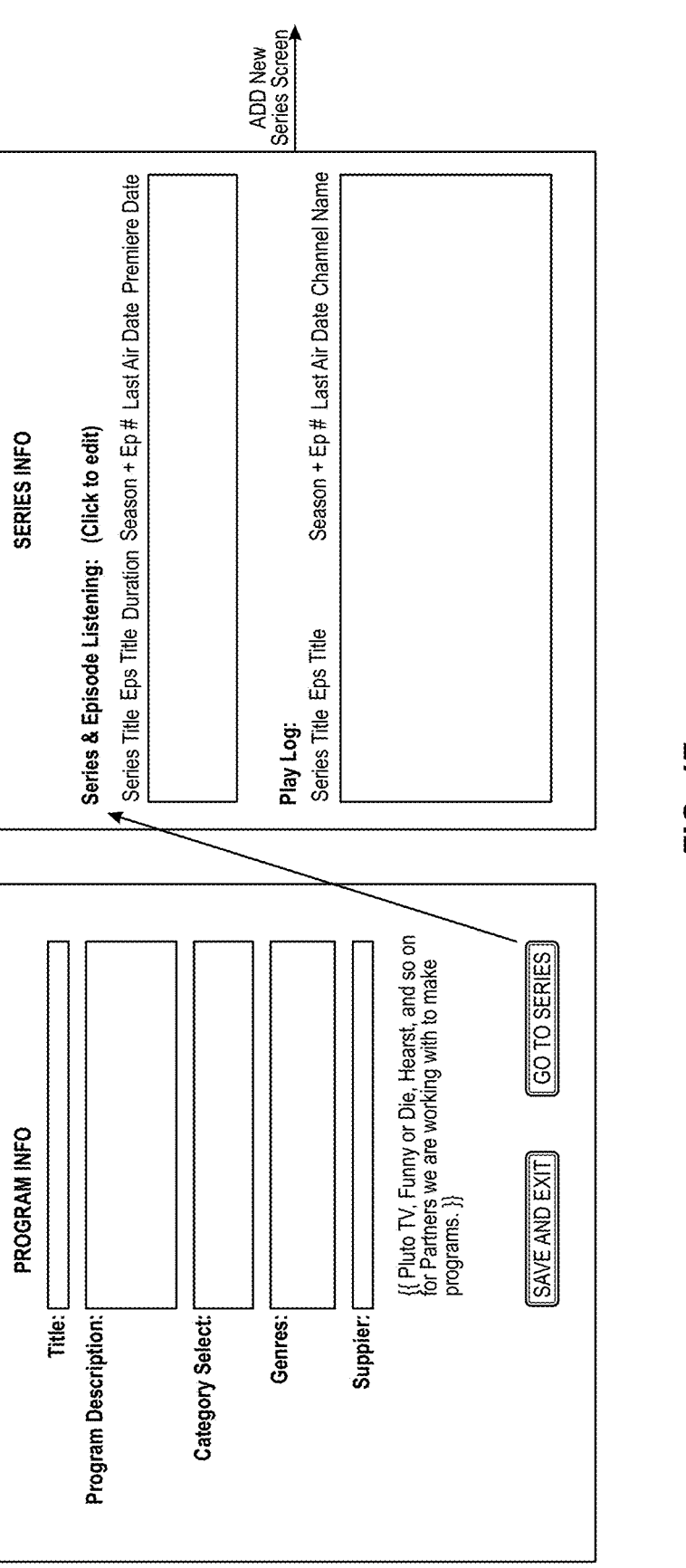

FIG. 4F illustrates example user interfaces via which a programmer can define a program and can create a new episode within a program series, and can view the last air dates for episodes. The program information user interface enables the programmer to enter, edit, and/or view such information as "title," "program description," "category," "genres", and/or "supplier." The programmer can instruct the system to save the information by activating a save control. The programmer can also navigate to a series information user interface. The series information user interface enables the programmer to enter, edit, and/or view such information as "series title," "episodes title", "duration", season number and episode number, last air/broadcast date of the episode, and premier date (the date the episode was first aired/broadcast). The programmer can select a given episode (e.g., by clicking on an episode entry), and the system will open up the program information user interface.

FIG. 4G illustrates an example user interface of a scheduling tool that enables a programmer to program a channel. A "select channel" interface enables the programmer to select (e.g., via a menu or in search results) a channel to be programmed. Once the channel is selected various other fields may be populated by the system with the relevant programming information (retrieved from memory) for the selected channel. Fields are provided via which the programmer can enter search terms, select/enter metadata, select/enter a category, and/or select/enter a genre. The system will identify corresponding programs (optionally including the program title and duration) from which the programmer can select to add to the selected channel.

For example, the programmer can drag a given program identifier to a calendar user interface (which lists days and time for specifying broadcast dates and times) and drop the program identifier at a desired month, week, day, and time for the selected channel. The example calendar user interface includes navigation controls enabling the user to navigate to a desired month, week, and/or year. If the identified program is a series with multiple episodes, optionally dragging and dropping the program name will cause the latest/newest episode to be added to the calendar at the specified date/time. Optionally, multiple or all of the episodes for the selected program are listed (optionally, including the episode title, number, version, and last air date) in an episode user interface, and the programmer can drag and drop whichever episode the programmer wishes to add to the calendar. The system may track, update and display calendar status information, such as the date/time the calendar was last modified, who last modified the calendar, last sync (with a live calendar for consumer viewing) date/time and by who, the calendar status (e.g., draft, finalized, etc.), etc. The system may synchronize the updated calendar with the live calendar in response to detection a sync command from an authorized programmer.

It is understood that the programs which may be added by a content programmer to a channel or schedule are not limited to prerecorded programs. The programming tool can be used to select and add an upcoming live program (e.g., a concert, sporting event, awards show, interview, etc.) to a schedule for a channel. For example, the live program may be streamed from a third party content site. The programming tool may inspect and check the programming to ensure that the programmer did not schedule the live event to be played at a date/time that is prior to the occurrence of the live event. If the programming tool determines that the programmer has attempted to schedule a live event to be played before the occurrence of the live event (e.g., as determined by comparing scheduling day/time metadata accessed from the third party content site with that of the programming calendar), the programming tool may notify the programmer of the error and optionally prevent the programmer from scheduling the live program at such a premature date/time. Thus, optionally, a given channel may include prerecorded and live streamed programs/clips (or other content, such as image content, social streams, blogs, text messages, etc.). Adding a live streamed event to a channel may optionally be performed seamlessly, in a manner similar to that of recorded, non-live, content.

An auto-program user interface corresponds to an auto-program function. The programmer can define certain criteria for the auto-programming of programs by entering or selecting, via respective fields, an ending date, a duration (e.g., in days, weeks, or months), and the number of occurrences. The auto-program function takes a selection (single or multiple programming blocks) and receives the date, duration, or number of occurrences in which to automatically program the selection into the future. Optionally, in order to use the auto-program function, the programming pattern (e.g., day(s) of the week, refresh cycle (daily, weekly, bi-monthly, monthly)) needs to be pre-defined at the program level. The auto-program function will automatically program the program/episodes in accordance with the programmer's definition, thereby reducing the effort and time needed to perform a repetitive programming process.

A duplicate selection user interface corresponds to a duplicate selection function. The programmer can define certain criteria for the programming of programs by entering or selecting, via respective fields, a start date, a repeat definition (e.g., repeat every Monday, Tuesday, Wednesday, Thursday, Friday, Saturday, and/or Sunday), duration (e.g., in days, weeks, or months), and the number of occurrences. The duplicate selection function takes a selection (single or multiple programming blocks) and receives the definition in which to automatically program the selection into the future. The duplicate selection may be used where the programming pattern is not pre-defined at the program level. The duplicate selection function will automatically program the program/episodes in accordance with the programmer's definition, thereby reducing the effort and time needed to perform a repetitive programming process.

A check schedule user interface corresponds to a check schedule function. The check schedule function is configured to detect errors (e.g. unused space (e.g., a time range in the schedule where no content is designated to be played), scheduling of a live event to be played at a time prior to the occurrence of the live event, removed or invalidated clips (or other content), insufficient available advertising and promotional space (in terms of time), incomplete metadata (e.g., missing thumbnails, titles, descriptions, length information, etc.), etc.) and to report the errors to the programmer before the programmer synchronizes their programming calendar to a live calendar for consumer viewing. The check schedule function report may include a list of programming errors that need to be fixed and programming errors that may be ignored auto-program function. The programmer can define start and end dates for the schedule check via the check schedule user interface.

Optionally, consumers may also be provided with access to some or all features of the channel scheduling tool to enable users to program their own channels and to share their channels with other users. Optionally, one or more channels may be crowd sourced by multiple users. Thus, the broader population may be provided with curating tools to let independent users generate channels.

For example, the curating tools may enable an independent user to create a linear, scheduled experience out of on-demand content. For example, a library of different content may be provided via which the user can assemble a program or channel. By way of illustration, on-demand content may be categorized as to themes or subject matter (e.g., retro-comedy, reality clips, etc.). The independent user may select one or more categories of content from the library, and select one or more items of content from the categories of content to create a program or a set of programs. Optionally, the independent user may include content from other sources as well. The independent user may define a channel using the programs (e.g., where the programs are scheduled to be shown at specified times or according to a specified schedule), and the channel may be made available to users at large (e.g., via an electronic program guide provided to other users that includes a listing for the user generated channel or program) or only to users identified by the independent user that created the channel or that have a specified social networking relationship with the independent user.

Figure 5A:
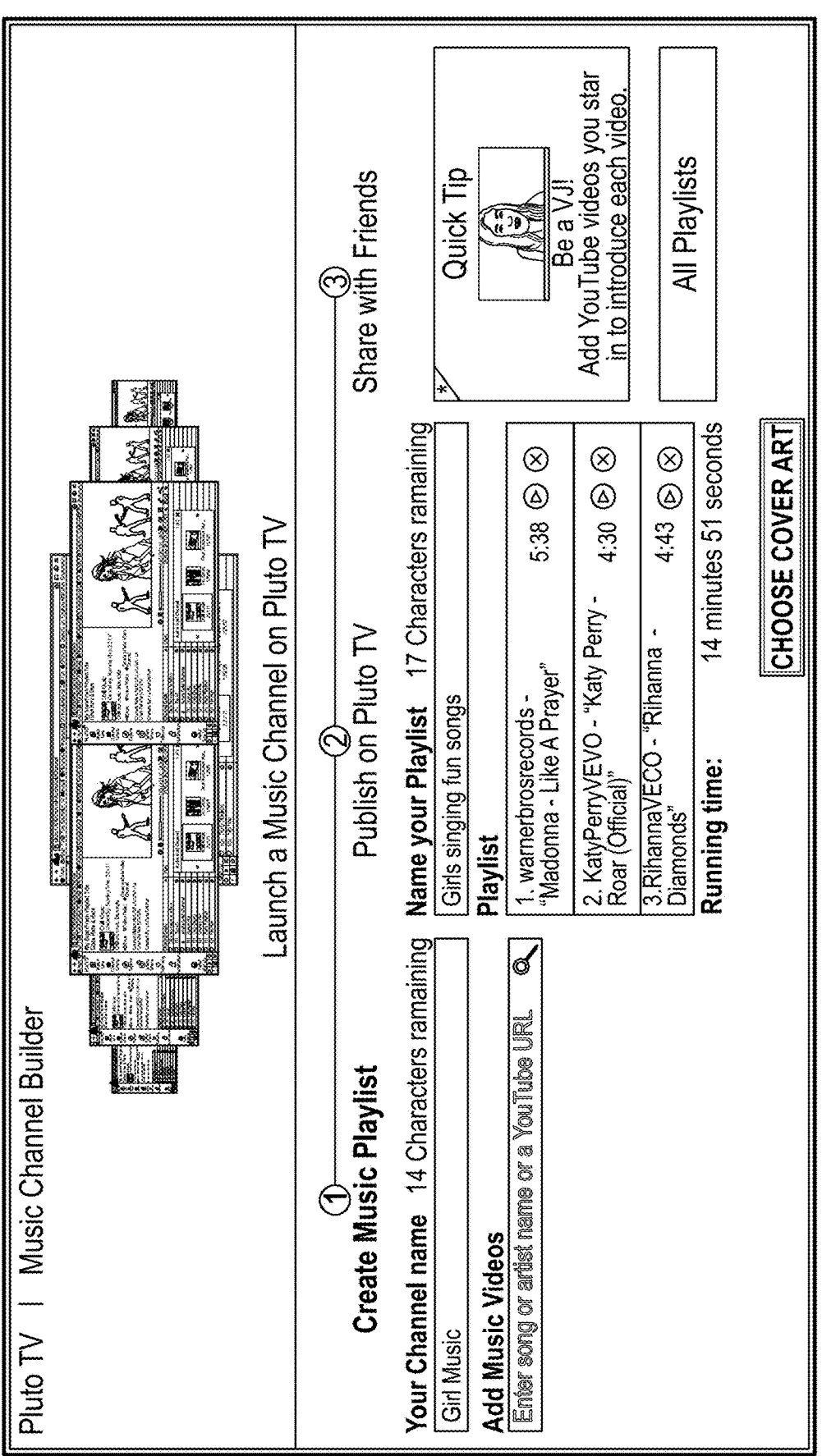
FIG. 5A illustrates an example program generation user interface.

FIG. 5A illustrates an example program generation user interface which guides a user (e.g., an independent user who is not a professional content programmer) through a program generation process. The illustrated example user interface has specific fields and controls for the assemblage of a music video program for a music channel to further ease the program generation process for a music video program. Other program-type specific user interfaces may be provided as well (e.g., a "Top 10 list" program definition user interface, a cooking program definition user interface, etc.).

In the example illustrated in FIG. 5A, a channel name field is provided via which the user may enter a name for the user's channel. A playlist name field (where a playlist may correspond to a program) is provided via which the user may enter a name for the current music video playlist being defined. An "add music videos" interface is provided via which the user can specific or select a music video to add to the playlist. For example, the user may enter a song, artist, or album name, and a system search engine will locate and present a listing of matching music videos with associated play controls enabling the user to view play the music videos. The user may then select one or more of the matching music videos to add to the playlist. Optionally, the "add music videos" interface may be configured to receive a locator (e.g., a URL) for a music video to be added to the playlist, A playlist field displays the music videos currently included in the playlist, including the name of the music video/song, the associated record label, the play time, and the play ordering (1, 2, 3, etc.). A play control may be provided with respective playlist entries, which when activated will cause the corresponding music video to be played. A delete control may be provided in association with a given playlist entry which the user can activate in order to delete the playlist entry from the playlist. The current playlist running time may be calculated and displayed. The playlist running time may be recalculated and displayed when additions or deletions are made to the playlist. A control may be provided enabling the user to select cover art for a given playlist entry and/or for the channel as a whole. The user playlist definitions are received and stored by the system.

Optionally, a user interface may be provided that enables the user to insert user generated content (e.g., video clips) between non-user generated content (e.g., between video content from this party video hosting sites). For example, the user generated content (e.g., where the user records a video of the user acting as a program or channel host) may be used to introduce the next item of non-user generated content. By way of illustration, if the user is defining a "top 10 list" program that discusses 10 items of video content, the user interface may first prompt the user to record (e.g., using a video recorder included in the user terminal) an overall program introduction. The user interface may then prompt the user to record an introduction to the video rated number 10. The user interface may then prompt the user to record an introduction to the video rated number 9, then 8, then 7, and so on. Thus, the user interface provides a template guiding the user through the program and channel creation process. The process may assemble a channel using a plurality of user-generated programs.

Figure 5B:
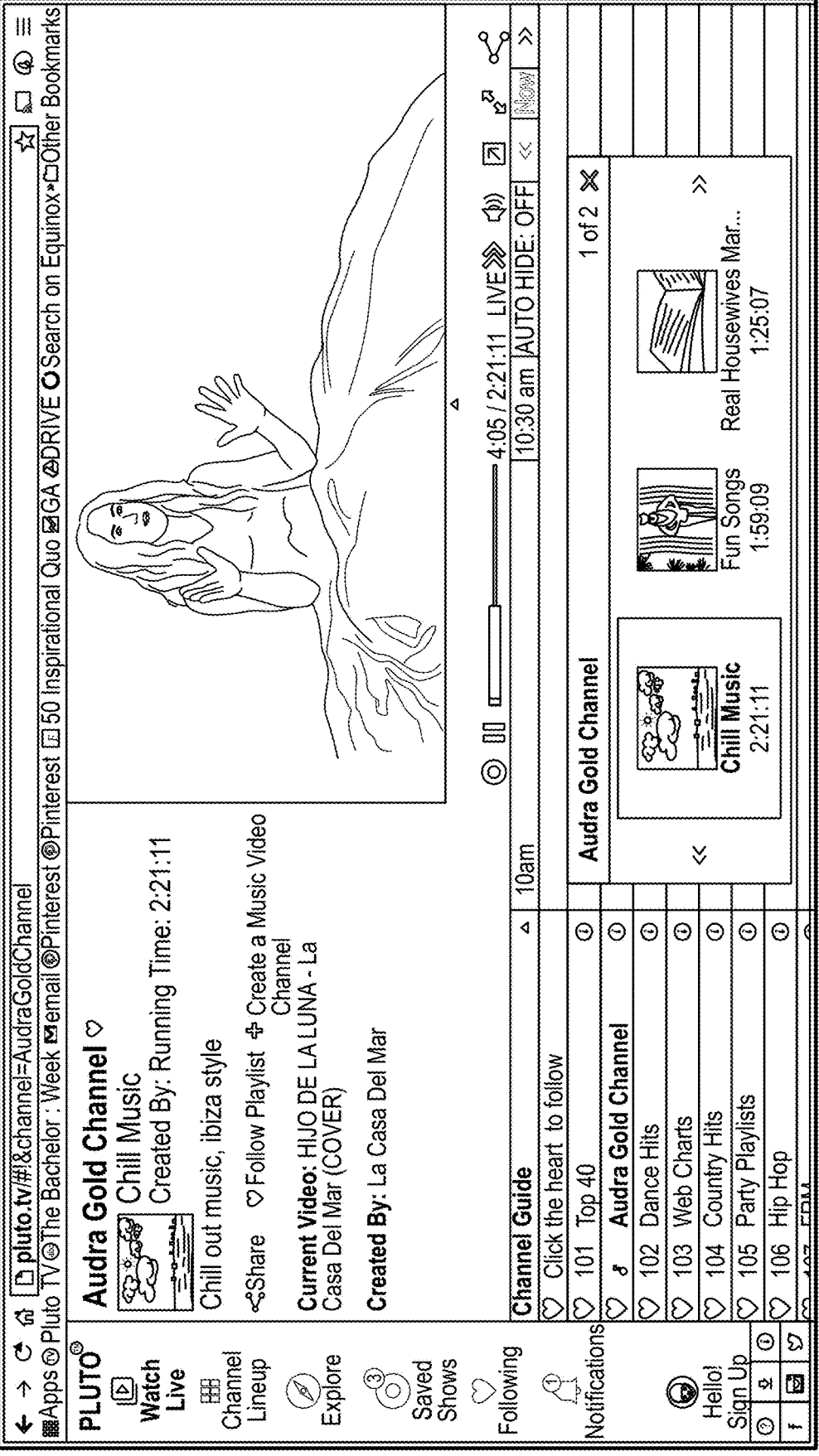
FIG. 5B illustrates an example program guide user interface including a user-generated program.

FIG. 5B illustrates an example program guide user interface including a listing for a user-generated program created using the user interface illustrated in FIG. 5A. The user generated playlist is included in the channel guide ("Audra Gold Channel"), and some or all of the album covers may be displayed at a given time, where the album cover of the currently playing music video is emphasized (e.g., via a frame, color, size, or otherwise). Controls may be provided enabling the viewer to skip a music video or to otherwise navigate through the playlist. Optionally, the playlist may be played on-demand, rather than at specifically scheduled times.

As noted above, the program lineup for a given channel may be manually selected by an operator or automatically selected by a channel generation module 150. For example, an operator may specify a theme for a channel. The operator may assign one or more tags to a channel, where the tags correspond to the channel theme. By way of illustration, if the theme of the channel is to be cats, the operator may assign the tags "cat", "feline", and "kitten" to the channel. The operator may specify further tags for a specific desired program/episode at a specific time. A given program may be made up of multiple clips (e.g., short videos and/or other content such as image content, social streams, microblogs, text messages, etc.) from one or more sources (e.g., the video hosting sites discussed above, social network streams, microblogs, etc.). The operator may also specify time lengths for programs, and the day and/or time the corresponding program is to be shown. Optionally, the operator may specify a desired time length, with minimum or acceptable maximum time for the program and/or for clips (and/or other content) included in program. The operator may also specify (e.g., by providing a URL) one or more sources for video content.

For example, the operator may want a program about cat tricks for a 6:00 PM presentation. The operator may specify program tags "cat tricks", "tricks", "swimming cat", "climbing", etc. The operator may further specify that the program is 30 minutes long, and each clip to be included in the program is to be preferably 2 minutes, but no shorter than 1 minute long and no longer than 3 minutes long, and the program is to be displayed at 6:00 PM. The module may then search the specified video or other content sources for videos or other content with tags corresponding to one or more of the tags specified by the user, that are preferably 2 minutes long, and no shorter than 1 minute and no longer than 3 minutes, where the total length of the videos are 30 minutes. The operator may optionally specify thresholds for numbers of views and viewer ratings the clips (or other content) are to have, as similarly discussed elsewhere herein. The operator can similarly specify multiple programs for a given day or days, and the channel generation module will locate corresponding clips.

The channel generation module 150 will then schedule the found clips (or other content) to be routed to users that have elected to view the corresponding programs or channels via the program guide user interface. Optionally, the resulting program assembled by the channel generation module 150 may be presented by the system to an operator (e.g., a content programmer) to ensure that the program, and the assembled clips (or other content) for the program, are suitable. The operator may change the ordering of the clips (and/or other content), and may delete clips and add clips or other content (e.g., accessed from a system database of clips or other content and/or by manually navigating to one or more video sources or other content sources to identify and select clips or other content).

As similarly discussed above, the content described herein may be in the form of video content, music content, still image content, social streams, text messages, etc., or any combination thereof. Thus, for example, a programmer (or an end-user programming their own channel), may compose a program (e.g., an episode) or channel to include a mixture of video clips, streaming microblogs, and social networking streams. By way of illustration, a programmer may compose a channel program to include a 3 minute video clip of a pet doing tricks, followed by a 30 second stream of a social network associated with the channel (which may include substantially real-time user posts related to the video clip), followed by a 15 second stream of a microblog of a first specified person (which may include substantially real-time posts from the first person related to the video clip), followed by a 2 minute clip of a pet doing tricks, followed by another 30 second stream of the social network associated with the channel, followed by a 15 second stream of a microblog of a second specified person, followed by a 2 minutes of a live dog show, and so on. Thus, a program and/or channel may integrate different types of content/media (including live and recorded content) from different types of sources.

As similarly discussed above, programs and/or channels may be automatically generated, and programs and/or channels. Further, socially driven real-time programming of channels may be provided. By way of illustration, viewer input may be taken into account in generating a program or channel, in real-time. For example, a poll may be provided to users (e.g., via the program guide, a pop-up prompt, a text message, or otherwise) during a clip, program, advertisement, or content transition, asking viewers what they would like to see next. When the poll is for an existing channel, the poll may include choices related to the subject matter of the channel or program. By way of illustration, if the channel is for dog tricks, the poll may ask if they want to see a clip of a video a dog performing a retrieving trick, a jumping trick, or a catching trick. Based at least in part on the votes, corresponding content may be selected (optionally in real time), and the selected content may then be displayed next and/or at a later time.

Optionally, content (e.g., a video clip, image, etc.) for a channel or program, and/or the theme of a channel or program, may be selected or generated based, at least in part, on input from social network sources. For example, trending subjects may be identified on one or more social network sites, such as microblog sites, image posting sites, etc. The trends may be identified via metadata (e.g., keywords, key phrases, hashtags, subject descriptions etc.) associated with social network data, or from an analysis of the content itself. For example, the speed of posts (e.g., the number of posts per minute) and acceleration of posts (e.g., the rate of increase or decrease of posts over a period of time, such as the last hour) regarding a particular subject may be determined and used in selecting an item of content for a program, may be used to select a title or a channel.

Rules may be defined which specify which social network data, in terms of content, source and/or time period, is to be used in determining which content to select. For example, a rule may specify that video clips from one or more specified sources having metadata corresponding to the top 10 Twitter hashtags over the last 24 hours are to be selected for a program. By way of further example, a rule may be defined specifying that the 20 most popular video clips (in terms of views over the last 7 days), from a specified video hosting website, having the phrase "cat trick" in the title, are to be identified, and that the top 5 of those 20 video clips having the most views over the previous 24 hours are to be selected to form a program.

Optionally, an automated process of selecting and/or generating transitions/interstitials (e.g., quizzes, jokes, news, trivia, information regarding programs or channels, user submitted content (e.g., video, still image, text, etc.), sponsored content, advertising, etc.) between clips or programs may be utilized. For example, an interstitial may be in the form of text, video, and/or audio content that may be presented during (e.g., as a partial overlay) and/or after a given item of primary content is being displayed (where primary content may be a programmed clip, such as a clip of a cat trick for a cat trick program). The interstitial may be used to aid in tying or bridging clips into a program, or tying or bridging programs into a channel. The interstitial may provide information regarding an upcoming clip or program. The interstitial may optionally be selected based at least in part on characteristics of a viewer (e.g., user preferences, user profile information, etc.). Rules may be defined to select an interstitial.

An interstitial may include static content (e.g., static text) and/or dynamic content (e.g., dynamically selected text). By way of illustration, static text may include the phrase "Coming up next" followed by dynamic text including the title or subject matter of the upcoming content ("the week's funniest cat videos"), optionally obtained from metadata associated with the upcoming content.

An interstitial may be composed using a variety of specified media files and/or text. For example, a "you are watching" interstitial to be presented immediately before a commercial during an episode/program may include some or all of the following: a specified text tagline (e.g., "You are watching"), a channel logo specified via a logo locator (e.g., "channels/news-247/news247.ai"), a channel number (e.g., channel 101), an episode/program name (e.g., "Headline News"), a start time for the episode/program (e.g., "8 PM/7 PM CT"), a channel video specified via a video locator (e.g., "channels/[channel.slug]/video.mp4"), a channel-related image specified by an image locator (e.g., "channels/[channel.slug]/hero.jpg"), a channel-related music file specified by a music locator (e.g., "channels/[channel.slug]/music.mp4"), a channel-related audio voice over file specified by a voice over audio file locator (e.g., "channels/[channel.slug]/voiceover.mp3"), a system operator specific audio voice over file specified by a system operator voice over audio file locator (e.g., "global/onlyonplutotv.mp3"), a timeline identifier, an ad break index, a sequence index, etc. A user interface may be provided that includes fields to receive some or all of the following: tagline text, a channel logo locator, a channel number, an episode/program name, a start time for the episode/program, a channel video locator, a channel-related image locator, a channel-related music file locator, a channel-related audio voice over file locator, a system operator specific audio voice over file locator, a timeline identifier, an ad break index, a sequence index, etc. Some or all of the fields may be automatically populated from information accessed from one or more of the data stores discussed herein. The defined interstitial may then be assembled and transmitted to a user for presentation.

By way of further example, a "welcome back" interstitial to be presented immediately after a commercial during an episode/program may include some or all of the following: a current channel number, a channel logo specified via a logo locator, an episode/program name, a next episode/program name, a next episode/program start time, a channel video specified via a video locator, a channel-related image specified by an image locator, a channel-related music file specified by a music locator, a channel-related welcome back audio file specified by a corresponding audio file locator, a system operator specific audio voice over file locator, etc. A user interface may be provided that includes fields to receive some or all of the foregoing. Some or all of the fields may be automatically populated from information accessed from one or more of the data stores discussed herein. The defined interstitial may then be assembled and transmitted to a user for presentation.

By way of further example, a "title" interstitial to be presented immediately before an episode/program may include some or all of the following: a channel logo specified via a logo locator, an episode/program name, a video container file name, an audio file name for an audio file that describes and/or states the name of the episode/program, a channel related music file name, etc. As similarly discussed above, a user interface may be provided that includes fields to receive some or all of the foregoing. Some or all of the fields may be automatically populated from information accessed from one or more of the data stores discussed herein. The defined interstitial may then be assembled and transmitted to a user for presentation.

Optionally, fields may be provided via which a user can specify channel specific themes (e.g., background color(s), font color(s), font type(s), font size(s), etc.) for interstitials. The received field entries may be used by the system is composing a given interstitial for a channel.

By way of further example, the interstitial content may be selected that corresponds to the user's interests. By way of illustration, if it is determined that the next program is not of interest to the viewer (e.g., by comparing preference information for the viewer that indicates the viewer's subject matter interests with metadata of the next program that indicates the subject matter of the next program), but a program that will be displayed in two hours is of high interest to the viewer, the system may select a interstitial that discusses the program that will be displayed in two hours rather than the next program.

Optionally, as discussed above, the system may be configured to generate, using artificial intelligence, a computer generated channel or program host. For example, the host characteristics may be selected based at least in part on user account information, user preference information (e.g., expressly provided and/or inferred user preferences), and/or metadata associated with program host. The computer generated host may be used to deliver interstitial content, examples of which are discussed above Interstitials may be interactive and may provide the user with enhanced user interfaces and interactivity. Further, interstitials may be dynamically generated based on current conditions/information, reducing the need to pre-generate and store extremely large number numbers of potentially needed interstitials, thereby reducing non-volatile memory utilization. An interstitial may be displayed between clips, during a break in a program, immediately before and/or after a commercial (e.g., to retain a viewer's during a commercial), or otherwise. The type of interstitial and/or interstitial content may be randomly (which includes pseudo-randomly) selected for a given interstitial slot (e.g., in response to a randomizer control being set). Different types of interstitials (or different specific interstitials) may be associated with different weights for different interstitial slots so that certain types of interstitials will be selected more often for presentation for a given slot by a pseudo-random selection process. For example, certain types of interstitials may be more heavily weighted for an interstitial slot immediately prior to the beginning of a program, while other types of interstitials may be weighted more heavily for an interstitial slot immediately prior to presentation of an advertisement. A user interface may be provided that enables an operator or other user to assign weights to interstitials or interstitial-types for specific interstitial slots or slot types. Factors that may be evaluated by the system in the automated selection of interstitials for a given interstitial slot may include some or all of the following: current channel, current episode/program, randomizer control setting (on/off), current time (within a 24 hour clock), time position within a current episode/program, number of advertisements scheduled for a current episode/program, interstitial type/identifier, a container type, a current ad pod present (that specified the type and/or order an interstitial plays within an ad pod).

Examples of interactive interstitial types may include games (e.g., crossword puzzles, chess, checkers, 20 questions, etc.), trivia questions (e.g., trivia questions regarding programs, actors, directors, writers, politicians, sport statistics, album sales, album names, car brands, etc.), social media interactions, ticketing, voting, etc. Other examples of interstitials (which may or may not be interactive) include weather interstitials (e.g., where the system accesses geolocation information of the user, accesses corresponding weather information from a weather information database, and displays the weather information, such as temperature, rain, wind, weather maps, via the interstitial), health information interstitials (e.g., providing health-related information from wearables or scales), promotional interstitials (providing information regarding upcoming programs or regarding products or services), social media feed interstitials (e.g., displaying posts and/or post feedback from user specified social networking services, such as microblogs, photograph posting services, video posting services, etc.), an informational dashboard regarding the user's day (e.g., incoming email, calendared events, social network feeds, etc.), find friends interstitials, advertisements, and news feeds interstitials.

It is understood that, as similarly discussed elsewhere herein, although the present description refers to interstitials, the same or similar interfaces or data may be presented to the user via an overlay (e.g. via a widget). For example, the "interstitial" may partially overlay the display of a program or a program clip. Optionally, when used as an overlay, the "interstitial" may be translucent or semi-transparent to enable the underlying program or program clip to be viewed to at least some degree.

Interstitials may be provided to keep a user engaged and interested in viewing content. Further sets of related interstitials may be presented, where a first interstitial is presented before one or more items of other content (e.g., advertisements or video clips), and a second, related interstitial is presented after (e.g., immediately after) those one or more items of other content.

An interactive interstitial may provide the user with an opportunity to provide input (e.g., commands or data) in response to content presented via the interstitial. For example, if the interactive interstitial is a quiz, the user input may be a response to the quiz. By way of further example, if the interactive interstitial requests the user to post information, a "like" or other approval indicator, a video frame, a video clip, or other posting, to the user's social online presence (e.g., a social networking site, a microblog, an image posting site, etc.), the user may respond by posting to the user's social online presence. By way of yet further example, if the interactive interstitial is a game, the user input may be a game play input.

By way of still further example, an interstitial, presented just before an advertisement break (sometimes referred to as an advertisement pod, including one or more advertisements), may include a first portion of a joke (in the form of text and/or audibly, optionally including an image of a person or animation telling the first portion of the joke). The second portion of the joke (e.g., a punchline) may be presented as another interstitial after the advertisement break.

Thus, by using related interstitials before and after other content, a user may be more likely to view the content between the related interstitials.

Optionally, a paired device (e.g., a user mobile device, phone, laptop, desktop, etc.) may be used to prompt the user to interact with the interactive interstitial presented on another device (e.g., a television or monitor coupled to an internal or external streaming Internet media player and hosting a client application or coupled to a set top box) and to receive a user input (e.g., a touch, text, or voice input). The user input may then be transmitted from the paired device to the remote system. For example, the paired device may host an application (such as that discussed elsewhere herein) configured to paired with a user account (e.g., by logging into the user account via the application) and to display such prompts and/or to receive such user input.

By way of illustration a video stream (e.g., of a program composed of clips) may have interstitial/overlay notification triggers embedded therein. When the video stream is playing, the trigger may be detected by the remote system (e.g., the server that stitches clips (e.g., from different sources) together to form a program) or by the client hosted on the streaming Internet media player (via the server that provides streaming content to the client) or host a client application or set top box. The streaming Internet media player may be coupled to a television to display streaming content from the media player. When the trigger is detected, a message is transmitted to a detected online paired device application, which causes the user prompt to be displayed to provide a user input related to the interstitial/overlay.

Examples of interstitial selection will now be described. Optionally, an interstitial (to be displayed in an interstitial slot or opportunity) may be selected based in whole or in part on the content of a currently viewed program/program segment (e.g., as determined based on some or all of associated metadata). For example, if the interstitial is a quiz, the quiz may comprise a question regarding the program being watched, regarding an event that occurred in the program segment immediately before the interactive interstitial and after the previous interstitial, or regarding a particular frame of the program (which may be displayed by the interstitial).

By way of further example, the quiz may relate to an actor or other person appearing in the program, a director of the program, music accompanying the program, etc. By way of illustration, the quiz may ask the user to identify other programs a given actor has appeared in. By way of further illustration, the quiz may ask the user to identify the first episode in a serial program that a given actor appeared in. By way of illustration, the quiz may ask the user to identify in which episode a plot event occurred (e.g., when two characters started dating, when a character lost a job, etc.). By way of further illustration, the quiz may ask the user to identify the first episode in a serial program that a given actor appeared in. Other illustrative examples may relate to an actors personal life (e.g., who are they dating, who they are married to, where do they live, how many children they have, what type of pet they have, etc.).

Optionally, the interstitial may be selected based on the content of a currently viewed program but may not be directly related to the content of the currently viewed program. For example, if a user is viewing a program of a performer known as a fashion setter, the interstitial may be a trivia quiz related to fashion generally. By way of illustration, the quiz may request the user to identify a current fashion trend, or which designer began a specified fashion trend. By way of further illustration, if the program is a reality program, the quiz may ask the user questions relating to another reality program or a reality celebrity that is not in the program currently being viewed.

Optionally, the system may have a predefined set of interstitials that are available to be displayed between program segments or between programs. The interstitial set may be defined for a specific program or channel, or the interstitial set may be defined for a set of channels or programs. The interstitial set definition may be stored in memory in association with corresponding program or channel identifiers. The interstitial set definition may be customized for a particular user. Optionally, the interstitial set is not associated with a specific program or channel or set of programs or channels.

Optionally, when an interstitial will be needed to fill an interstitial slot between program segments or between programs or for other interstitial placement opportunities, the corresponding interstitial set definition may be accessed from memory. For example, the corresponding interstitial set definition may be accessed by the system automatically issuing a query to an interstitial data store that stores interstitials and/or interstitial set definitions. The query may include an indication of the program, program segment, and/or program channel the interstitial is needed for. The data store may search for and identify the corresponding interstitial set definition.

The actual interstitial used for a given interstitial opportunity may be dynamically selected from the accessed interstitial set definition based on one or more parameters. For example, the interstitial may be selected using historical user activity information, such as how the user responded to an immediately preceding interstitial. By way of illustration, if the previous interstitial was an interactive interstitial of a first type, but the user declined to interact with interstitial of the first type, the system may select an interstitial of a second type from the set of interstitials and not use the interstitial of the first type. If, instead, the user interacted with the interstitial of the first type, the system may select the same or another interstitial of the first type for display to the user.

By way of further example, if the user responded to an interactive interstitial trivia quiz, the next selected interstitial to be displayed to the user may include the response received from the user, and indication as to whether the user response was correct (e.g., as determined by the system), and/or the correct answer to the quiz. By way of still further example, if the user provided an input to interactive interstitial game, the next selected interstitial to be displayed to the user may include the result of the user's game input (e.g., a game score, a player ranking, a movement of an electronic game piece, etc.). By way of still further example, if the user responded to an interactive interstitial requesting the user to post content on the user's social presence (e.g., social network webpage, photograph feed, microblog, video feed, etc.), then the next selected interstitial to be displayed to the user may display reactions of others to the user's posting provided via the corresponding social presence.

Program/program segment metadata may be used to populate an interstitial. By way of illustration, a given item of content (e.g., a program or program segment) may be associated with metadata. The metadata may include information regarding or related to the content (e.g., actors, celebrities, cast, production crew, fictional characters, biographies, plot summaries, other metadata discussed herein, etc.). The system may access the metadata and use the metadata to generate a question for the user to be presented via an interstitial at a next or later interstitial opportunity. A third party database may also be used to populate an interstitial.

Optionally, with respect to the trivia quiz interactive interstitial, the quiz may be composed using an artificial intelligence engine that accesses a content information database (e.g., that provides information on movies, television, actors, celebrities, cast, production crew, fictional characters, biographies, plot summaries, trivia and reviews video games etc.). Optionally, the artificial intelligence engine may take into account the current elapsed play time of the content being watched to avoid providing a trivia question that will disclose or "spoil" an upcoming event in the content being watched. Optionally, the artificial intelligence engine may take into account the current elapsed play time of the content being watched to avoid providing a question that cannot be answered until the user has viewed a later portion of the content. For example, a given trivia question may have an associated timestamp that associates the trivia with a given point in the content. The artificial intelligence engine may exclude a question associated with such trivia from the trivia quiz interactive interstitial until the given content point has been played.

The selection of the interstitial may also be selected based in whole or in part on the user's navigation of content being consumed. For example, the system may optionally detect a user's navigation mode. By way of illustration, the system may detect whether the user is viewing a program at normal speed, if the user is fast forwarding through a program, or if the user is rewinding through the program. The user may be performing navigation using rewind, play, fast forward, and/or scrubber bar controls. Optionally, the system may dynamically select different interstitial content to be displayed depending on the detected navigation mode. For example, the system may select an interactive interstitial if it detects the user is viewing at normal speed, the system may select a static interstitial (e.g., comprising a still image and/or text) if the system detects the user is rewinding, and the system may select an animated interstitial if the system detects the user is fast forwarding.

By way of further example, the interstitial may also be selected based in whole or in part on user preferences and/or interests stored in a system data store, as similarly discussed elsewhere herein. The user preference may specify the type of interstitial the user likes (or are favorites) or does not like. The user specification may be provided via a user interface provided via a webpage, an app, or otherwise. The user interface may enable the user to indicate whether the user likes or does not like a given interstitial or interstitial type via a "like" and/or a "do not like" control. Optionally, the user interface may enable the user to specify on a scale how much the user likes a given interstitial or interstitial type. For example, the user interface many enable the user to rate a given interstitial or interstitial type on a scale (e.g., a scale of 1 to 5, a scale of 1 to 10, or a grade A to F).

By way of illustration, if the user indicated that the user does not like trivia quizzes, then the system may inhibit the presentation of trivia quiz interstitials. By way of further illustration, if the user indicated that the user enjoys using social networks, then the system may present social interstitials to the users. In addition to using user preferences in determining which interstitials to present to a user, the system may use such preferences in determining a frequency with which to present a given interstitial or interstitial type. For example, if the user rated a given interstitial or interstitial type on a scale, the more favorably the user rated the given interstitial or interstitial type, the more often the given interstitial or interstitial type will be presented.

Optionally, an interstitial selection user interface may be provided via a webpage, a dedicated interstitial application, a video content playback application, a linked companion device (e.g., a mobile phone, a tablet computer, or a television/media player remote control (e.g., having a touch or non-touch display and user input controls) hosting an application configured to display the video content disclosed herein) and/or an interstitial enabling a user to select and/or rate interstitials. The interstitial selection user interface may present interstitials offered by one or more sources. The interstitial user interface may include a filter control enabling a user to specify that the user interface is to display interstitials in specified categories (e.g., interactive, games, trivia, utilities, etc.) and/or from specified sources.

Examples of user input in response to an interactive interstitial will now be described. User input in response to presentation of an interactive interstitial may be provided by the user and received by the system via a variety of techniques. For example, the interstitial may include controls that may be activated by the user via touch, cursor, hand motions, or otherwise. The user device may communicate the user inputs over a network to a remote system which may then process the user inputs in a manner corresponding to the interstitial. By way of further example, the user input may be provided via an out-of-band or sideband channel, such as via a text or MMS message, or via a remote procedure call (RPC) message provided via the user's phone, tablet, laptop, desktop, or other text or multimedia messaging system.

By way of illustration, if the user is responding to a trivia quiz presented by a trivia quiz interstitial, the user may provide a response via an SMS text message addressed to an address specifically associated with the trivia quiz interstitial or via an application (e.g., installed on a mobile user device, such as a phone). The text message may be sent by the same user device being used to view the interstitial, or the text message may be sent via a different user device. For example, the interstitial may be provided over the Internet via a wired and/or local area network connection and viewed on a laptop or tablet computer, and the text message may be transmitted over a cellular network (e.g., a 3G, 4G, LTE, or other cellular network) using a separate phone device. As similarly discussed elsewhere herein, optionally a paired companion device (e.g., a user mobile device, phone, laptop, desktop, etc.) may be used to prompt the user to interact with the interactive interstitial presented on another device (e.g., a television or monitor coupled to an internal or external streaming Internet media player and host a client application or set top box) and to receive a user input (e.g., a touch, text, or voice input). The user input may then be transmitted from the paired device to the remote system. Optionally, the application on the paired companion device may store locally and/or on a remote system a record of all interactive interstitials displayed to the user. Such interactive interstitials may be accessed and displayed via the paired companion device or another user device at a later date, and the user may then engage and respond to the displayed interactive prompts.

For example, the paired device may host an application (such as that discussed elsewhere herein) configured to paired with a user account (e.g., by logging into the user account via the application) and to display such prompts and/or to receive such user input.

By way of illustration a video stream (e.g., of a program composed of clips) may have interstitial/overlay notification triggers embedded therein. When the video stream is playing, the trigger may be detected by the remote system (e.g., the server that stitches clips (e.g., from different sources) together to form a program) or by the client hosted on the streaming Internet media player (via the server that provides streaming content to the client) or host a client application or set top box. When the trigger is detected, a message is transmitted to a detected online paired device application, which causes the user prompt to be displayed to provide a user input related to the interstitial/overlay With respect to the quiz example, the system may receive the text message, parse the user's response, compare the user's response against a correct answer associated with the question posed by the trivia quiz interstitial, and determine if the user answered the quiz correctly. As similarly discussed elsewhere herein, the system may cause a subsequent (or the same) interstitial to present an indication to the user as to whether the user correctly answered the trivia quiz. The system may keep a record of each trivia quiz the user answered correctly and/or incorrectly, and provide the user with a corresponding score and/or ranking which may be displayed to the user via interstitials. Such record may also be accessed and recalled in a linked companion application and/or may be summarized via a scoreboard for later viewing on a user device. The optional use of an out-of-band or sideband channel to provide interactivity enables more asynchronous communication between a user via a user device and the remote system, and further reduces the loading on the network used to stream video content to a user device.

By way of yet further illustration, if a social presence interstitial prompts the user to post a hash tagged phrase (e.g., #ILovePluto.tv) to a given microblog (or a phrase with other labels or metadata tags used on make it easier for users to find messages directed to specific topic), the system can then conduct a search of the user's microblog account to determine if the user posted the hash tagged phrase. The system can also monitor any such posting to identify reactions by other users to the posting (e.g., likes, re-transmission or reposting of the user's posting, comments, etc.). The system may cause a subsequent (or the same) interstitial to present an indication to the user that the user has posted the hash tagged phrase and/or the reaction of others to the hash tagged phrase (e.g., the number of likes, sharings, retransmissions, reposting, comments, and/or the comment content/text). Optionally, the user may identify via a user interface one or more social network and/or content sharing accounts via a link to the user's social network page or feed, and/or via a user identifier and passwords for such accounts, which may be stored in memory and later used to monitor the user's posting.

Optionally, an API may be provided to enable third parties the ability to code applications, games, etc., to be presented via an interstitial. The API may enable a variety of parameters to be passed (e.g., which controls are to be displayed, the interstitial content, where the interstitial is to be accessed from, the translucency of the interstitial, the source of the interstitial, branding information, themes, etc.). The API may enable a third party to define visual assets, visual design and styling, font selection, display templates, preferred interaction methods, time limit to respond, interstitial targeting metadata such as demographics, category, genre, ideal age, gender, location, etc. Optionally, the system may rank interactive interstitials based at least in part on the number of users inputs received as a result of an interstitial. For example, if an interstitial prompts a user to post a hash tagged phrase or a phrase with other labels or metadata tags used on make it easier for users to find messages directed to specific topic, the system may count the number of times the hash tagged phrase was posted, and use that count in determining the popularity or success of the interstitial. Optionally, the system may issue queries to determine the number of times a hash phrase was tagged, and display the number of times the hash phrase was tagged to the user in a subsequent interstitial to indicate the popularity of the user's posted phrase. The ranking or popularity indication (number of actions taken, number score, grade score, etc.) may be presented to users via the interstitial, via another interstitial, via an interstitial library user interface, or otherwise.

Optionally, an interstitial may be personalized for a user in terms of its appearance (e.g., color, skin, etc.) and the content provided via the interstitial as described elsewhere herein.

Example processes will now be discussed with reference to the figures.

FIG. 14 illustrates an example process for selecting, populating, and displaying an interstitial. The process may be performed by the system, by the client, or partially by the system and partly by the client. At block 1402, some or all of the following data may be accessed:

user device location;
    current time;
    behavior of social connections;
    program/clip metadata;
    navigation information;
    historical interstitial viewing and/or interaction data;
    preference information; and/or
    predefined interstitial set definitions.

The location of the user device may optionally be determined using its IP address, GPS information, or otherwise. The location information may be used to identify which interstitials are permitted to be provided to the user at the user's current location. For example, certain interstitial content may only be licensed for use in certain countries, but not others. By way of further example, the location information may be used to find interstitials that are relevant to the user. By way of illustration, if the user location is in a desert region, interstitials related to sailing may be determined to be of less interest to the user, while interstitials related to sunblock may be of more interest to the user.

The behavior of social connections may be determined by accessing the user's social graph that describes the user's relationships with one or more other users. By way of example, optionally the social graph may be generated by the content scheduling system or the social graph may be accessed from a third party social networking site which the user authorized the content scheduling system to access. The actions of those users may then be determined. For example, the navigation and viewing history, expressed preferences, inferred preferences, historical interstitial interactions and/or other information regarding the other users may be accessed.

Examples of program/clip metadata, navigation information, historical interstitial interaction data, preference information, and predefined interstitial set definitions that may be used with the process will now be discussed in greater detail.

As discussed elsewhere herein, the program/clip metadata may include timestamps and information regarding people or items in a clip or program or associated with those involved in creating the clip or program. For example, the metadata may include the names or other identifiers of cast members, writers, directors, producers, artists, performers, other people that appear in the program or clip, etc., optionally in association with their respective titles/job functions/ character names (e.g., cast member, lead male, lead female, director, producer, principal photographer), and when cast members appear in the program or program segment. Other examples of metadata may include album names and album sales associated with a performer appearing in the program or clip. Still other examples of metadata may include genre, category, sub-category, etc. Yet other examples are described elsewhere herein. Optionally, certain metadata, such as the name of the program or clip, and timestamp information may be used to access from a database (e.g., over a network from a third party database) certain information, such the length of program or clip, a rating of a program or clip, ratings of a program or clip, reviews of a program or clip, names or other identifiers of cast members, writers, directors, producers, artists, performers, other people that appear in the program or clip, etc., optionally in association with their respective titles/job functions/character names.

As similarly discussed elsewhere herein, the navigation information may include information on whether the user is viewing a program at normal speed, if the user is fast forwarding through a program, or if the user is rewinding through the program. The navigation information may include a history of content user has previously viewed, including content viewed by time of year, time of week, and/or time of day. The user may be performing navigation using rewind, play, fast forward, and/or scrubber bar controls. The navigation information may be transmitted by the user client (e.g., a web browser executing a video player or dedicated application) to the remote system over a network. Optionally, the user client may transmit the play time update to the remote system which may utilize this information to determine user navigation and/or to determine when an interstitial is to be displayed.

The historical interstitial viewing and interaction data may include some or all of the following information: which interstitials were presented to the user, when the interstitials were presented, which interstitials were presented on the current user device, which interstitials were presented on other user devices, on which channels the interstitials were presented, on what programs the interstitials were presented, the historical physical location of the user device (e.g., as determined from an IP address, GPS information, or otherwise) when a given interstitial was viewed, on how the user responded to one or more previous interstitials (e.g., an immediately preceding interstitial, interstitials presented earlier in the program, interstitials presented on other programs on the same channel, interstitials presented on other programs on other channels, etc.), and/or how the user responded to interstitials of different types (e.g., trivia question type interstitials (e.g., trivia questions regarding programs, actors, directors, writers, politicians, sport statistics, album sales, album names, car brands, etc.), social media type interstitials, ticketing type interstitials, voting type interstitials, etc.).

The preference information may include expressly provided preference information provided by the user via a preference user interface and/or inferred preference information based at least in part on user interactions with interstitials, programs, channels, viewing history, user navigation, and viewing behavior, etc. For example, a user interface may be provided via which the user can specify that the user is interested in certain subjects (e.g., certain sport types, certain sport teams, weather, certain news topics, actors, show types, etc.). Preference information may be inferred based on the user's content viewing history (which channels and programs the user has watched, and how much time the user has spent watching a given channel or program), and/or user behaviors (e.g., how long a user watches content per day or week, how many times in a specified time period the user changes channels, how often per specified time period the user tries a new channel or show (a channel or show the user has not previously viewed), etc.).

A given predefined interstitial set definition may define a set of interstitials that are to be used for a specific program, channel, subject matter, or content source. The interstitial set definition may be stored in memory in association with corresponding program, channel, subject matter, or content source identifiers. Optionally, the interstitial set is not associated with a specific program or channel or set of programs or channels.

At block 1404, the process determines which interstitial is to be displayed for an interstitial opportunity between programs, clips, or as an overlay. The determination may be based in whole or in part on the information accessed at block 1402. For example, if the user is viewing a music video, and is not fast forwarding or rewinding, the interstitial may be a music trivia interstitial.

At block 1406, the process determines when the interstitial is to be displayed. For example, there may be metadata associated with the program that indicates when an interstitial is to be displayed, and the user client or server may detect such metadata and issue a request to a remote system from the interstitial.

At block 1408, data needed to populate the interstitial is accessed. For example, the data may be accessed from a system database or the data may be accessed from a remote third party data store. By way of illustration, if the interstitial is a trivia quiz regarding a program the user is watching, the accessed data may include names or other identifiers of cast members, writers, directors, producers, artists, performers, other people that appear in the program or clip, etc., optionally in association with their respective titles/job functions/character names. The data may optionally include the various time periods and/or scenes a given cast member appears in a program. Other data may include information on other programs (e.g., names of movies, television shows, shared videos, musical performances, etc.) they have been involved in (e.g., appeared in, wrote, directed, produced, etc.), personal information (e.g., age, year born, marital status, name of significant other/spouse, number of children, income, other business interests, etc.), photographs, etc.

At block 1410, the process enables the interstitial to be displayed, populated with some or all of the accessed data. For example, if the interstitial is a trivia quiz regarding a program the user is watching, the interstitial may present a question regarding an actor in the program (e.g., "Name three other movies John Doe appeared in"). The questions may be automatically generated using language processing, may be generated by a curator, may be submitted by viewers, may be accessed from third party databases, may be selected via collaborative user voting on potential questions, via social submission (e.g., by tagging a question), via a moderated or non-moderated AMA ("ask me anything"), and/or otherwise.

Figure 15:
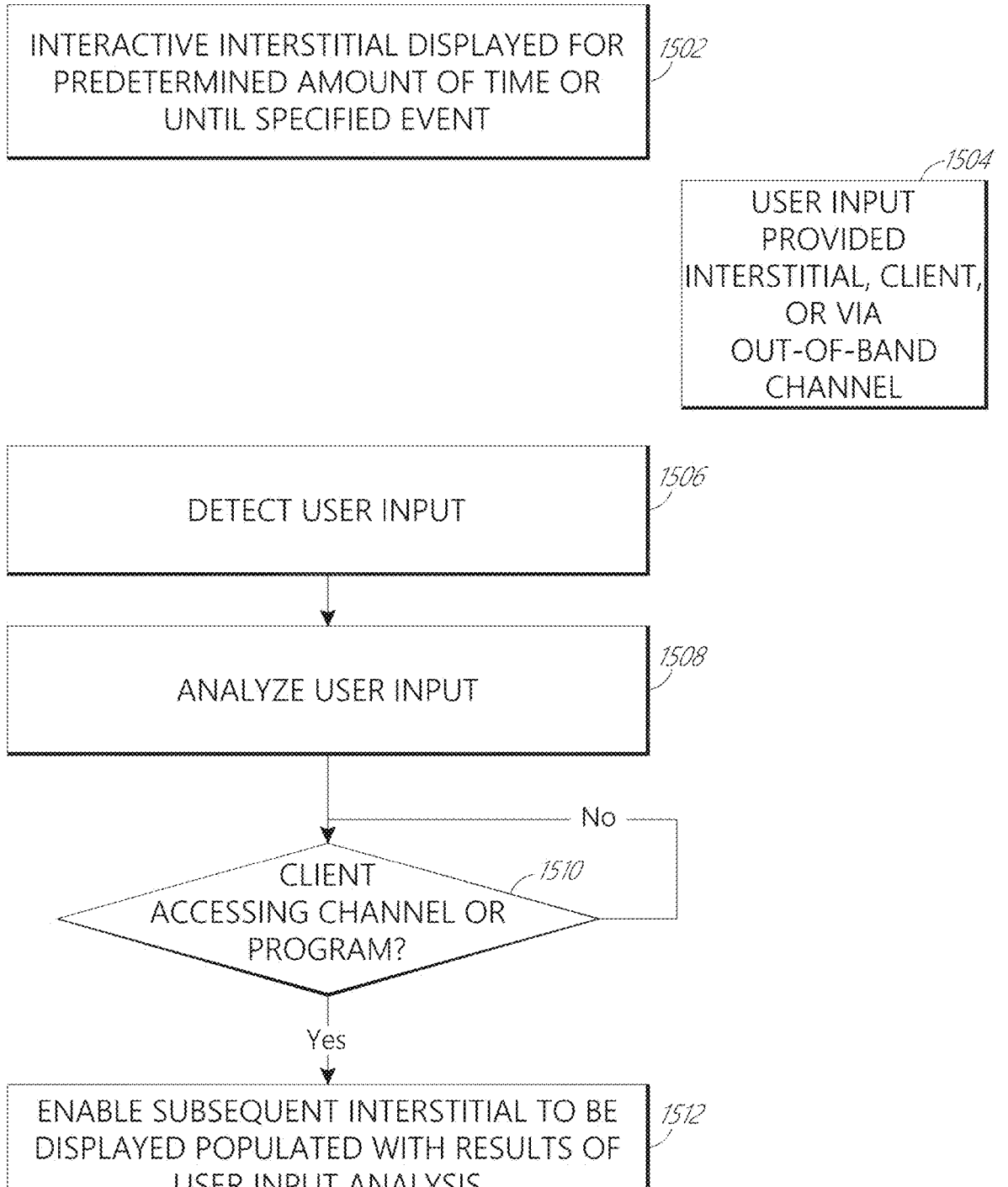

FIG. 15 illustrates an example interstitial interaction process that may be performed after a program segment or an entire program (or the interstitial may be displayed as a partial overlay with the program is playing). At block 1502, an interactive interstitial is displayed, prompting the user to take an action. After a period of time or in response to an event, the interactive interstitial is no longer displayed, and the program (or a subsequent program) is played. For example, the interactive interstitial may be displayed by the client for a predetermined amount of time. The predetermined amount of time may have been specified via data included in the interstitial, by the remote system, or by the client. Optionally, the interstitial may be displayed until an event occurs, such as a detection of a user activation of an interstitial "close" control or a program "play" control, a terminate or play command from the remote system is received, or detection of a user action responding to the interstitial user action prompt.

At block 1504, the user takes an action responding to the interstitial user action prompt. For example, the user may activate a control and/or provide data (e.g., textual data (e.g., a hash tagged phrase), image data, emoji's, etc.) via the user client, or via an out-of-band or side-band channel. At block 1506, the process detects and optionally receives the user input. For example, the user input can be provided via a text message directed to a phone number associated with the remote system which may then receive the text message. By way of further example, the user input can comprise an image, text, and/or graphic post to one or more social presence services (e.g., a microblog, a social network, a video or image sharing service, etc.). The system may detect the user input by monitoring the user's social presence to determine whether and what the user has posted content. The system may log into the user's social presence account to monitor the user's postings and other actions that have timestamps after a timestamp associated with when the interstitial was displayed to the user. At block 1508, the system may analyze the user's postings to determine if the postings corresponding to a response to the interactive interstitial. For example, if the interactive interstitial prompted the user to post a hash tagged phrase, the system may compare the user's postings with the phrase and determine whether there is a match.

If there is a match the system determines or infers that the user posted the phrase is response to the interactive interstitial. Otherwise, the system determines or infers that the user did not respond to the interactive interstitial.

Assuming the system determines or infers that the user took an action in response to the interactive interstitial, at block 1510, the process determines whether feedback on the user's action is be provided to the user (e.g., via another interstitial, which may or may not be an interactive interstitial). For example, the system may determine whether the user is still viewing content via client, such as the same clip, program, or channel that the viewer had been watching when the interactive interstitial was presented to the user. The system may also determine whether there is a current interstitial presentation opportunity. If the system determines that the user is still viewing and/or there is a current interstitial presentation opportunity, at block 1512 an interstitial is presented via the user client, populated with the feedback. For example, if the user action was a response to a quiz, the feedback may indicate whether the user provided a correct answer and, if not, the correct answer. By way of further example, if the user action was to post content on a social network, the feedback may be an acknowledgment, and optionally a presentation of the number of likes, shares, re-transmissions, and/or comments.

Figure 16:
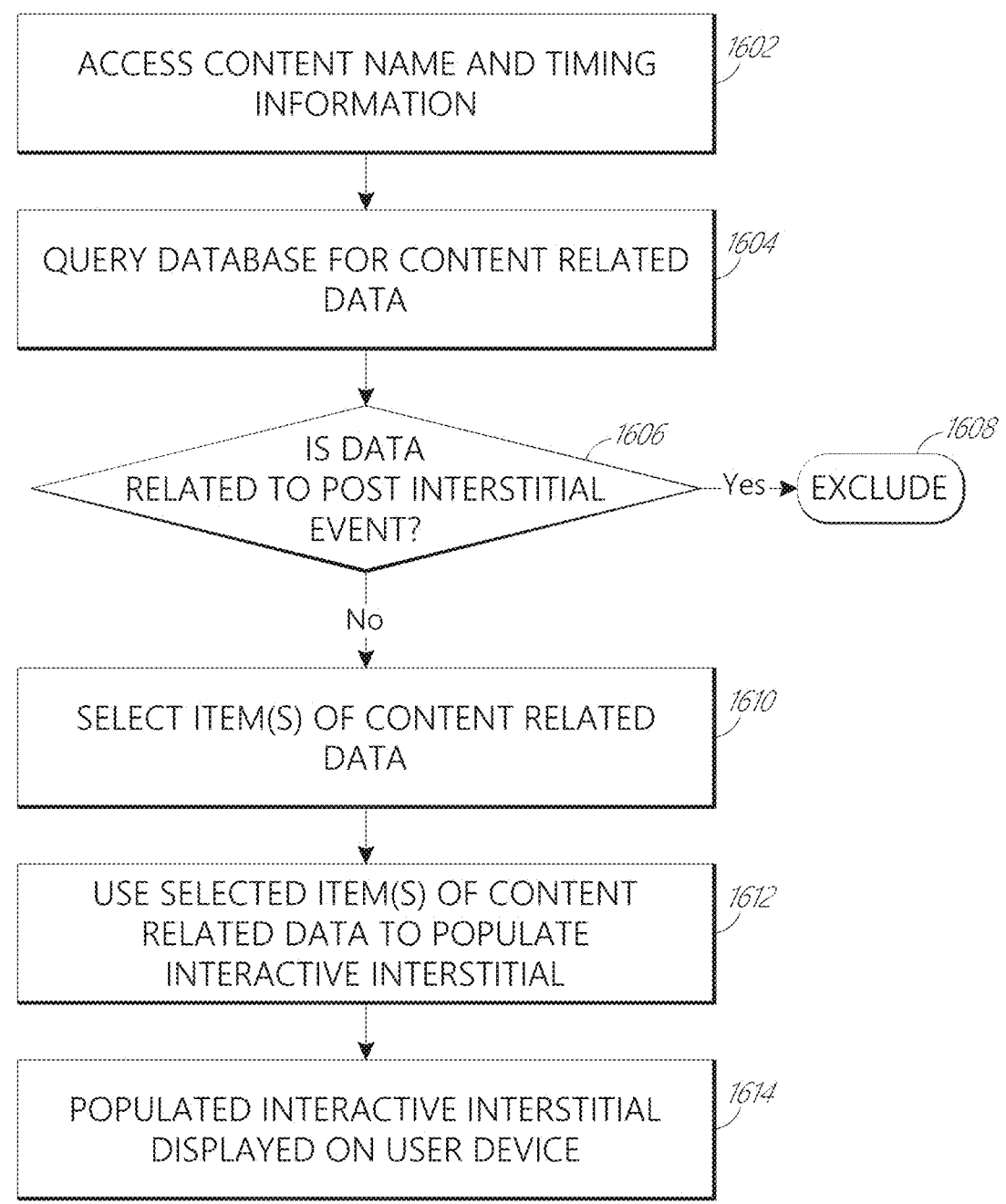

FIG. 16 illustrates an example process for selecting content for an interactive interstitial (e.g., a trivia quiz interstitial). At block 1602, the process accesses the name of the content (or other content identifier) being played (e.g., the program or program segment) and the current play position (the current elapsed play time). At block 1604, the process accesses a database and issues a query for related content (e.g., to generate a quiz to populate an interstitial) using the content name (or other identifier) and optionally the play position. As similarly discussed above, the content related data may include may include the names or other identifiers of writers, directors, producers, artists, performers, other people that appear in the program or at the program segment currently being played, optionally in association with their respective titles/job functions/character names.

At block 1606, a determination is made as to whether the data relates to an event or character appearance that has not yet occurred, but will occur after the display of the interactive interstitial. If a determination is made that the data relates to an event or character appearance that has not yet occurred, but will occur after the display of the interactive interstitial, at block 1608, the data is excluded from being used for the quiz question (e.g., to avoid prematurely revealing a plot event, and so to avoid spoiling the movie for the user).

At block 1610, appropriate data items are selected for the interactive interstitial quiz question. At block 1612, the selected data are re-written as questions for populating the interactive interstitial. At block 1614, the populated interactive interstitial is provided for display on the user device.

Figure 17A:
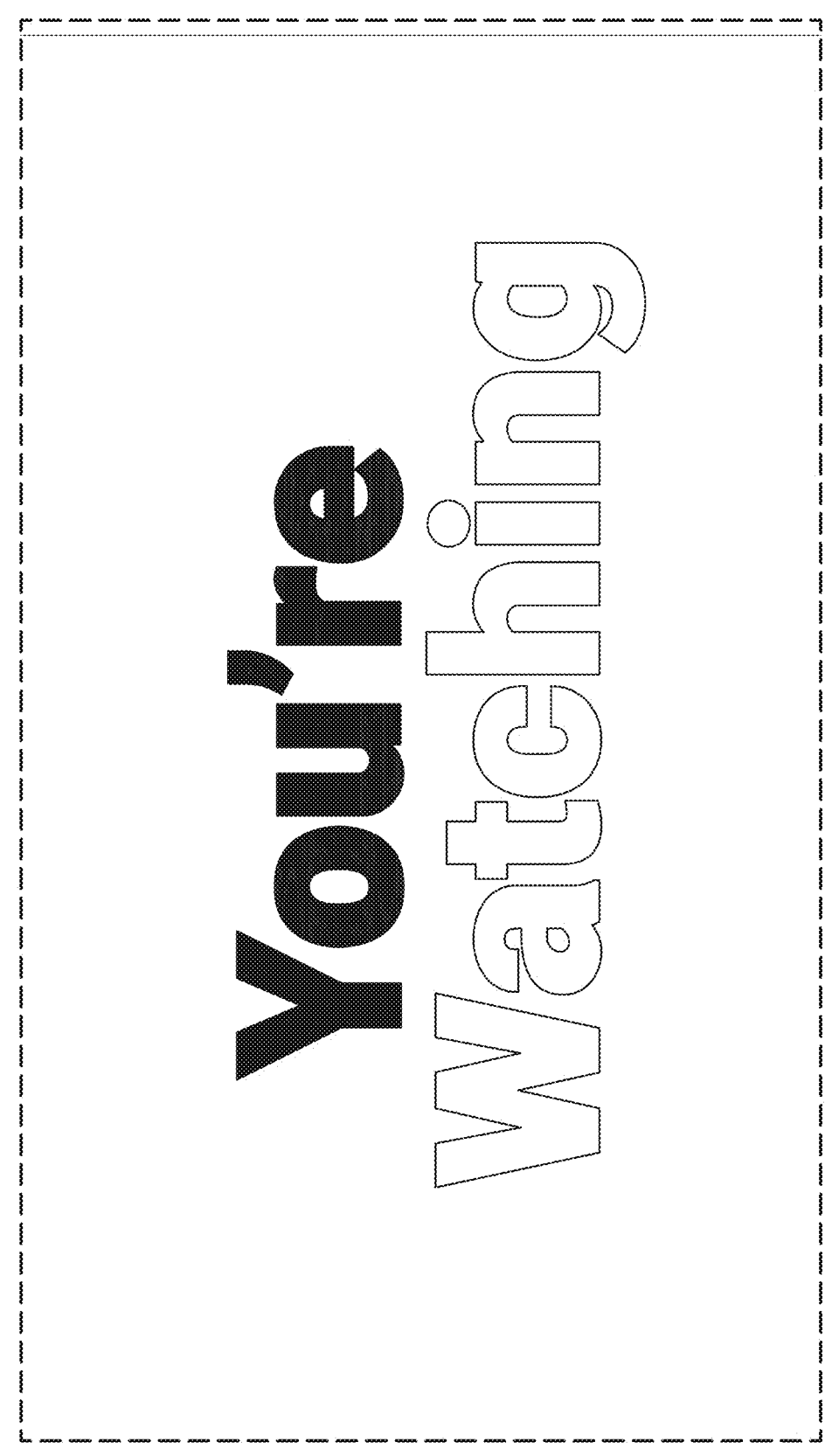
FIGS. 17A-17U illustrate example interstitials.
Figure 17B:
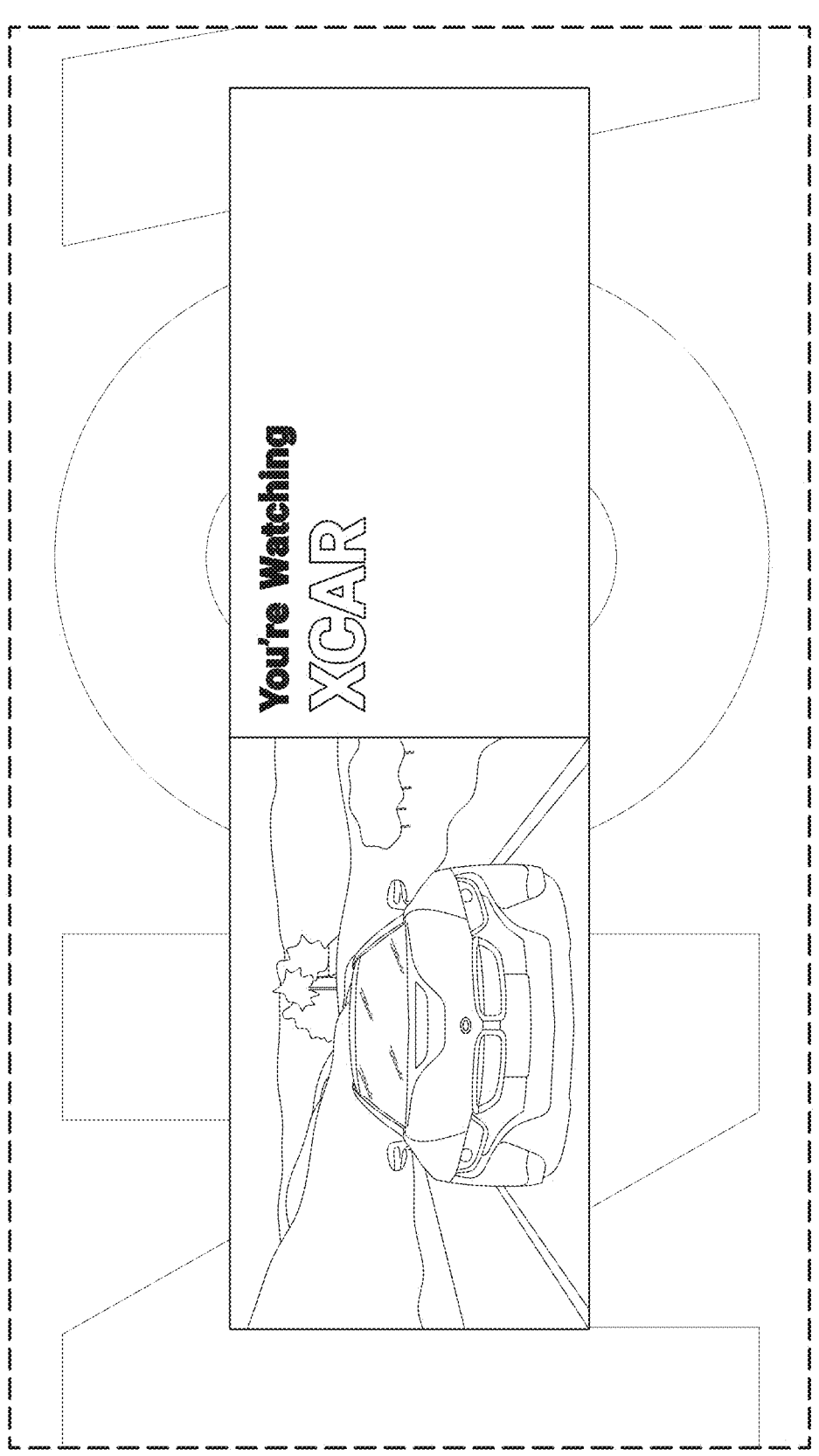
Figure 17C:
Figure 17D:
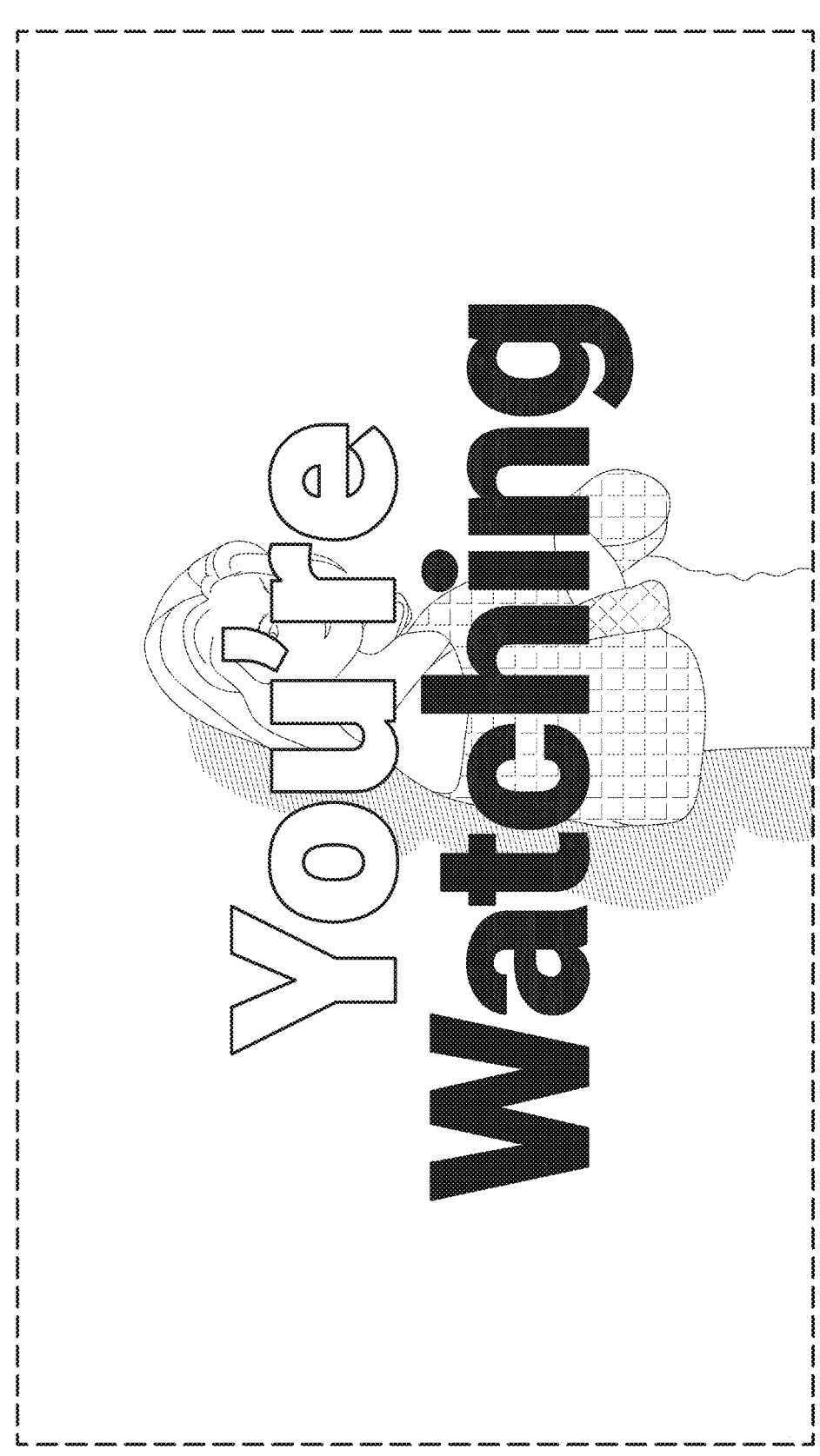
Figure 17E:
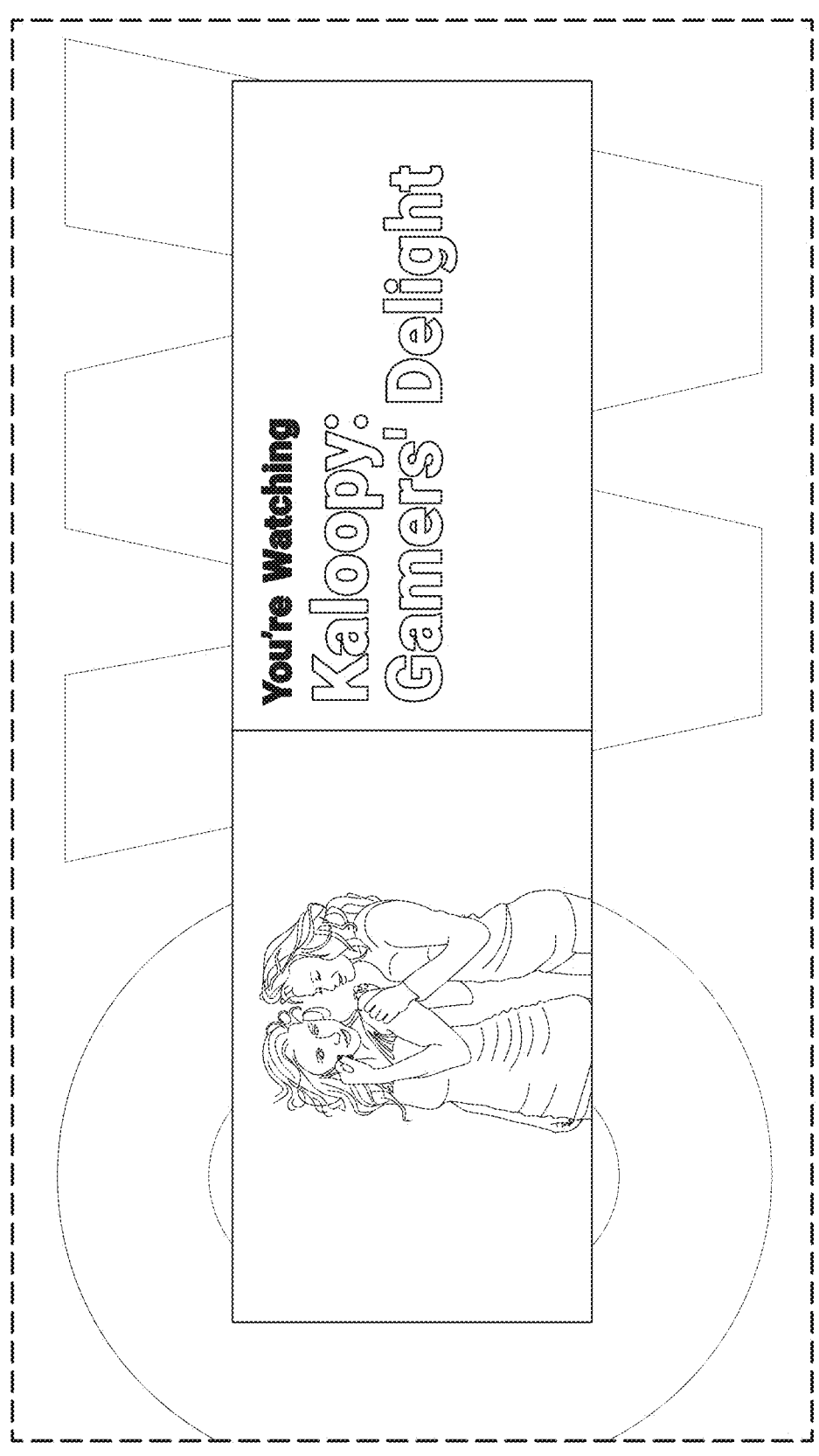
Figure 17F:
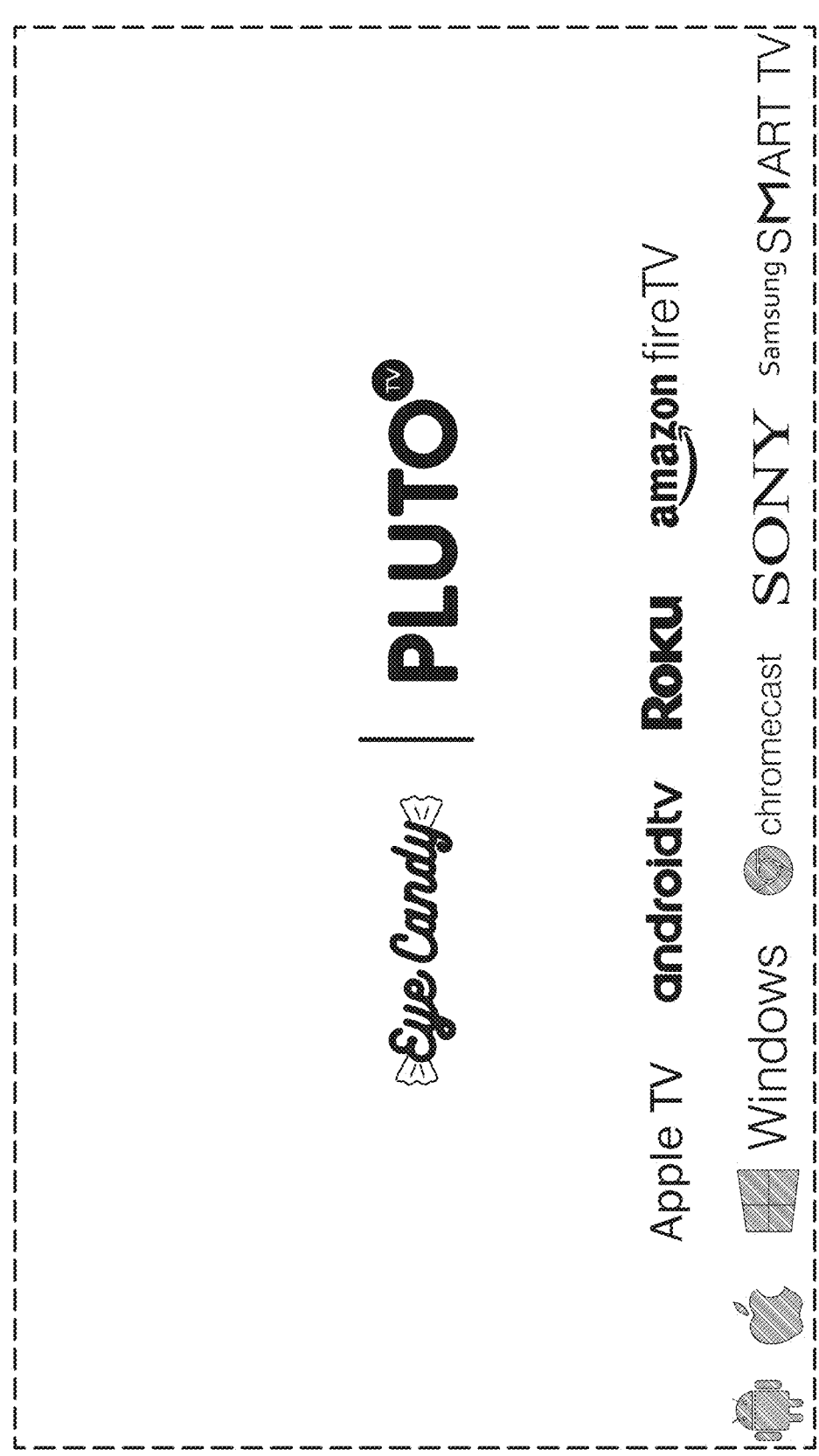
Figure 17G:
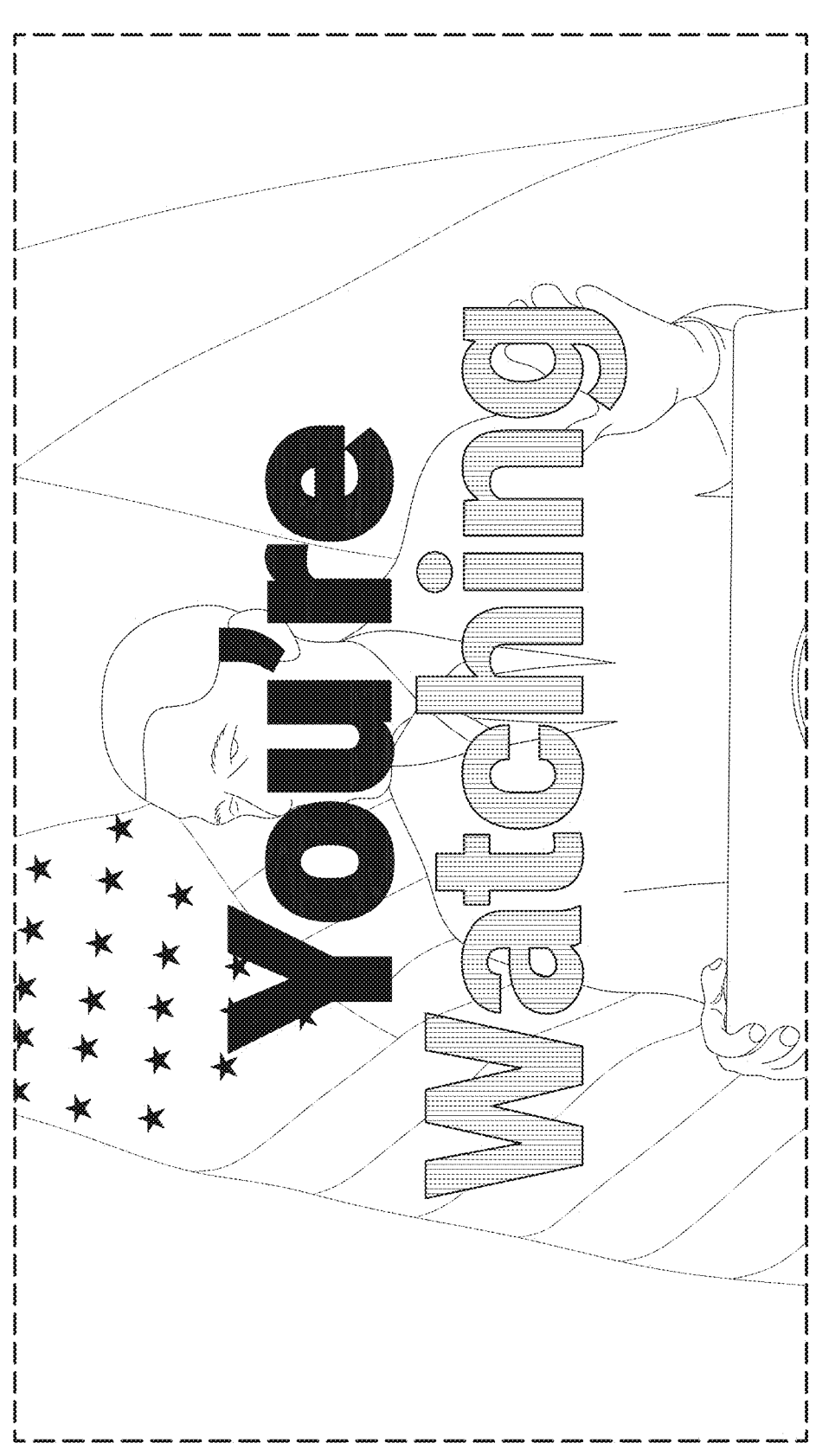
Figure 17H:
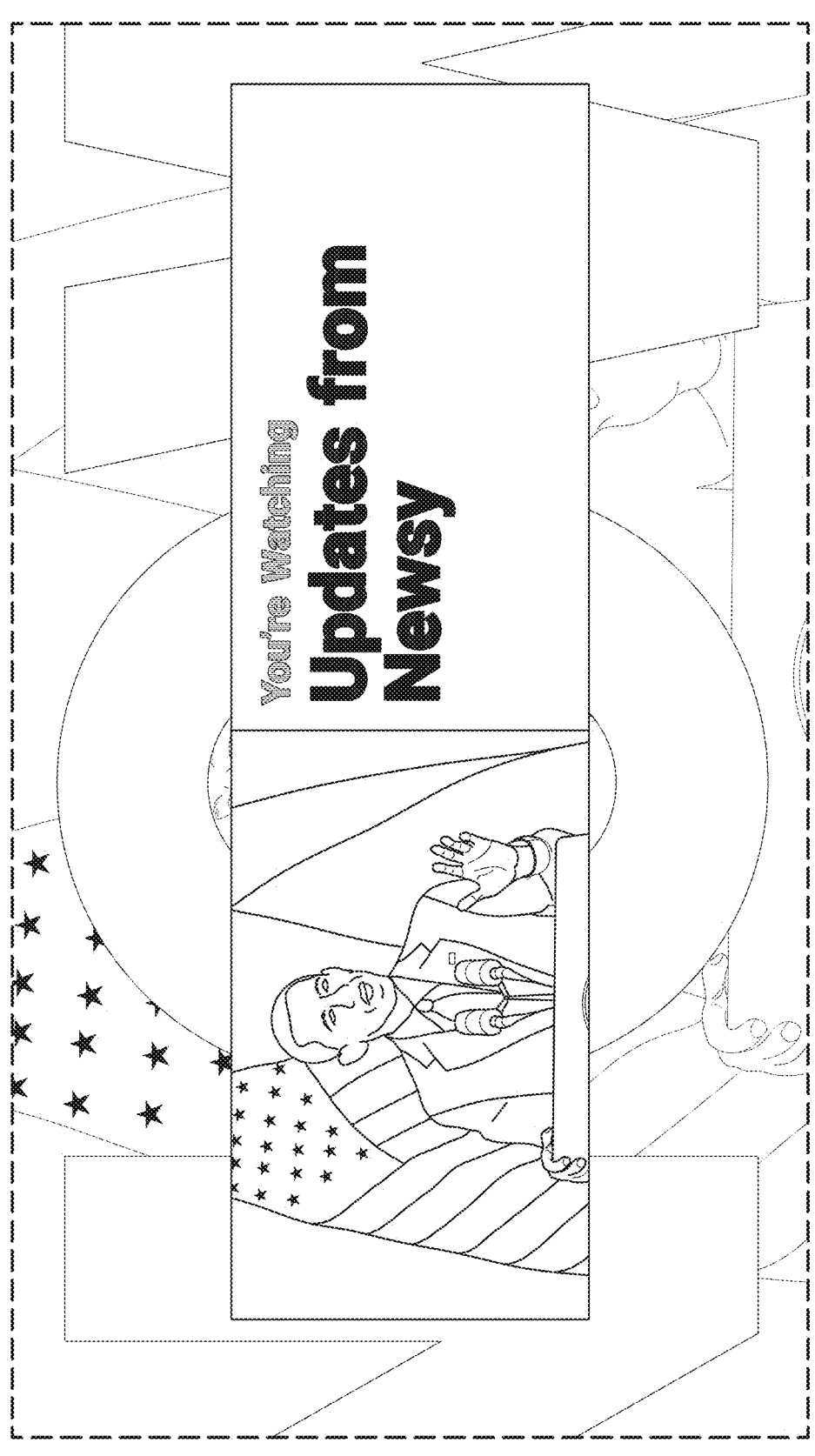
Figure 17I:
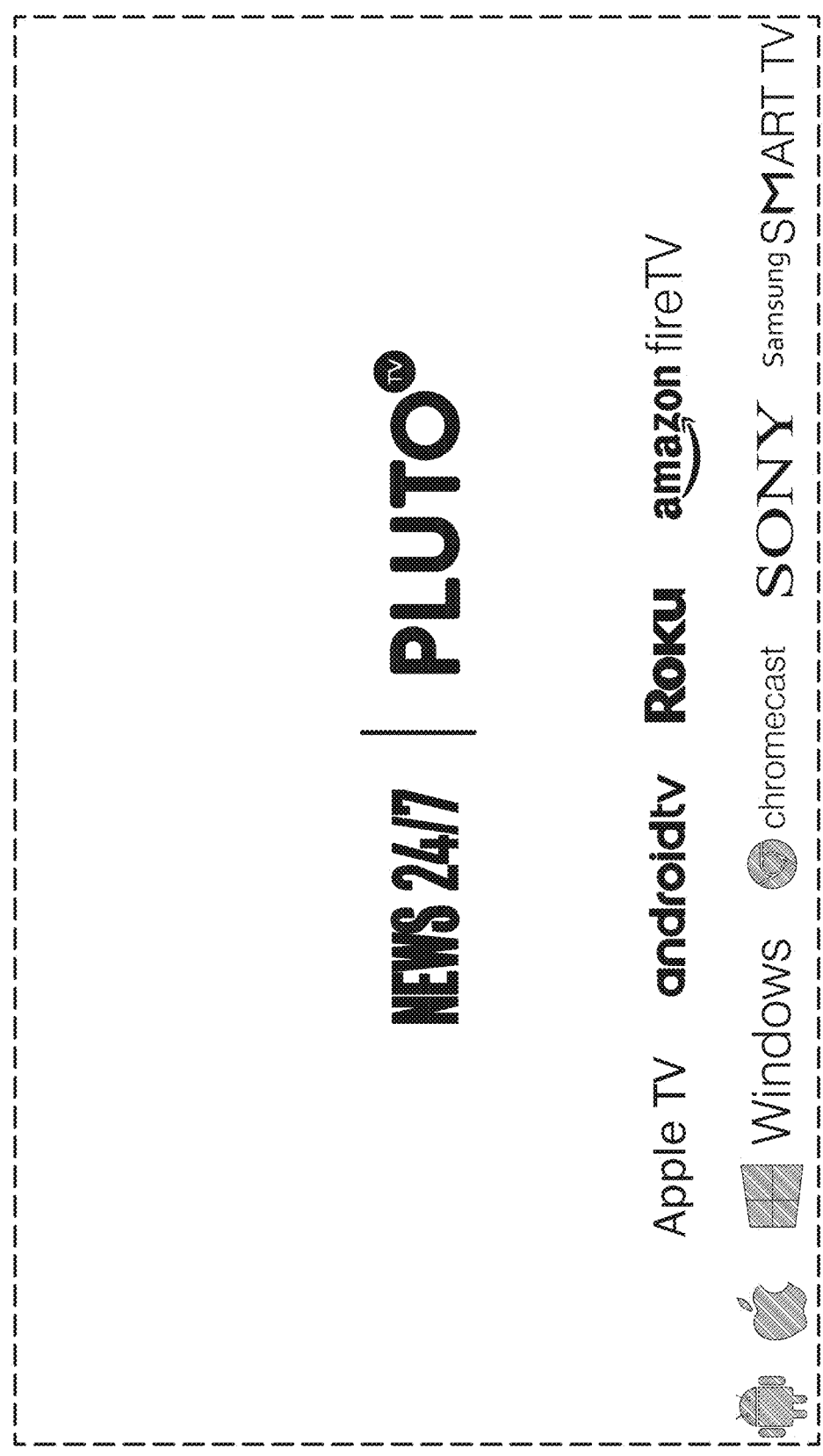
Figure 17J:
Figure 17K:
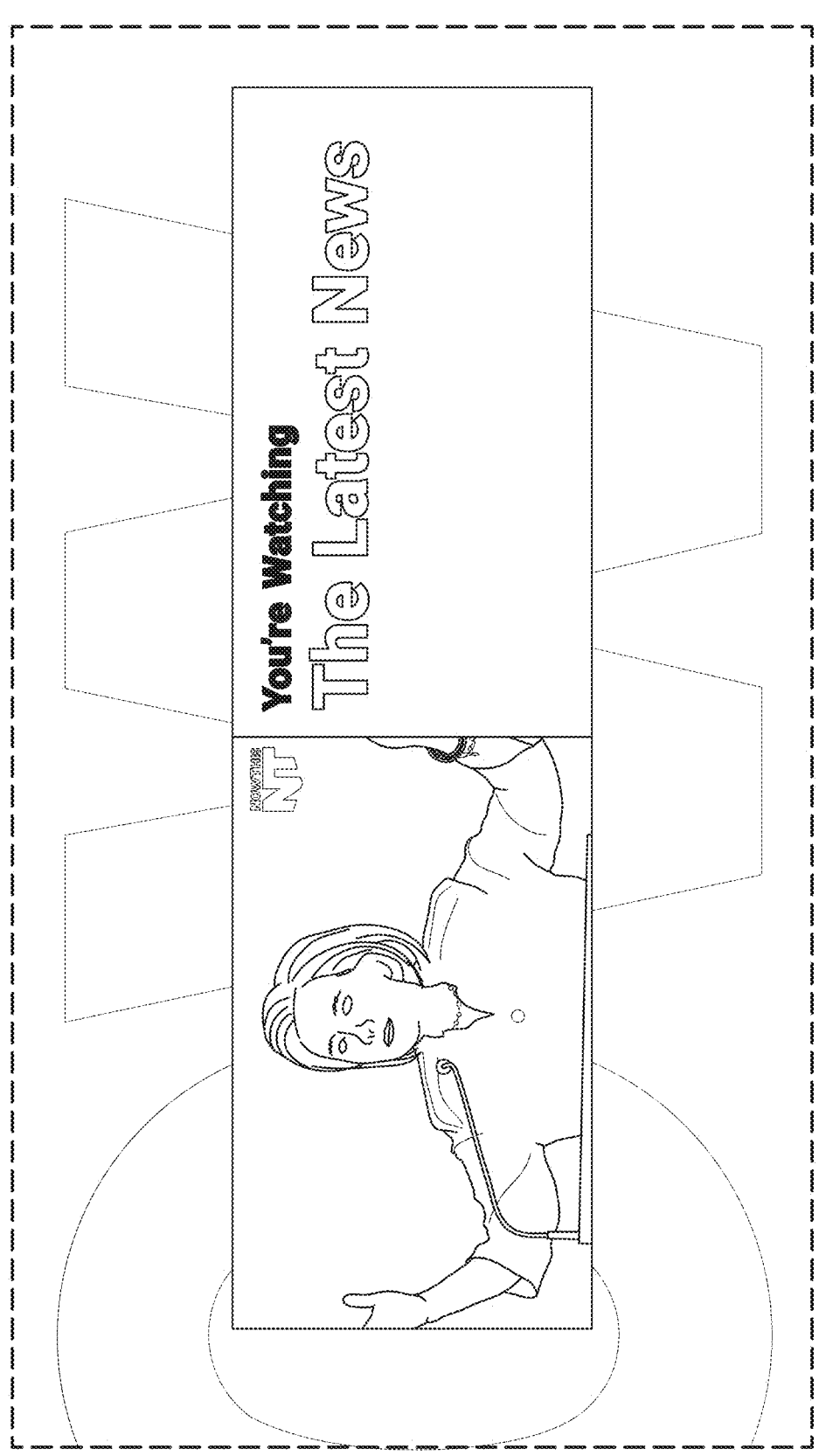
Figure 17L:
Figure 17M:
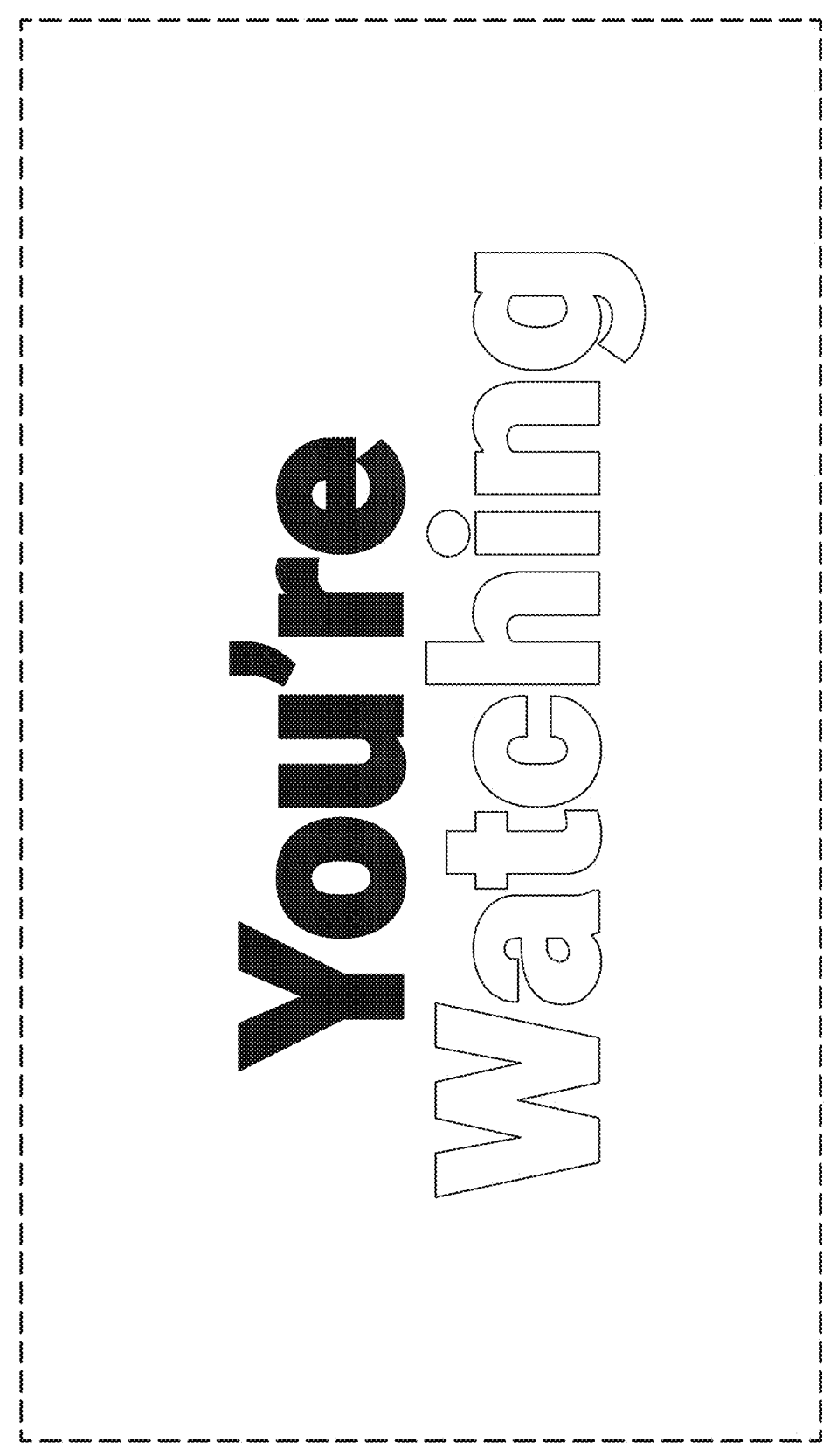
Figure 17N:
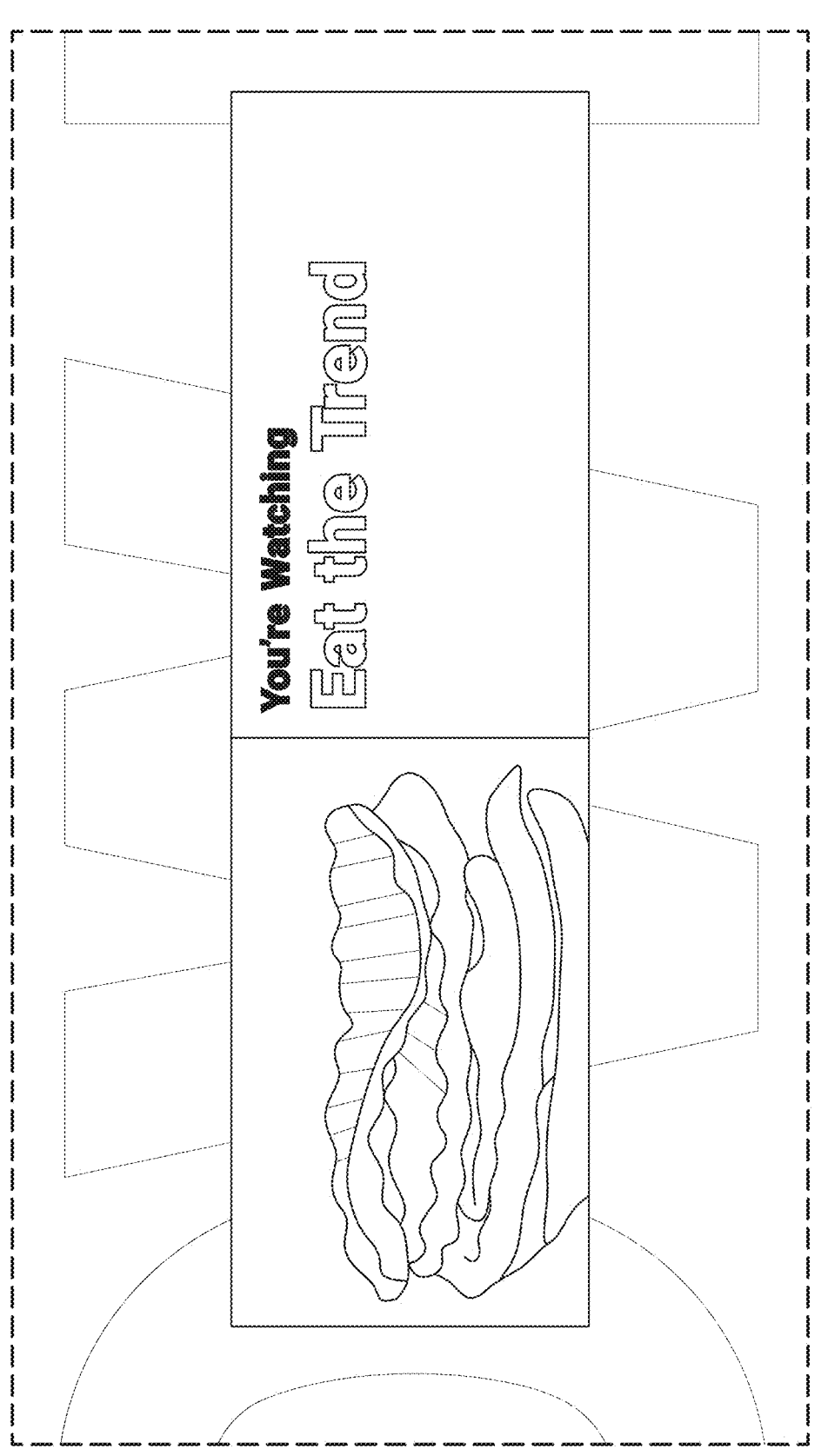
Figure 170:
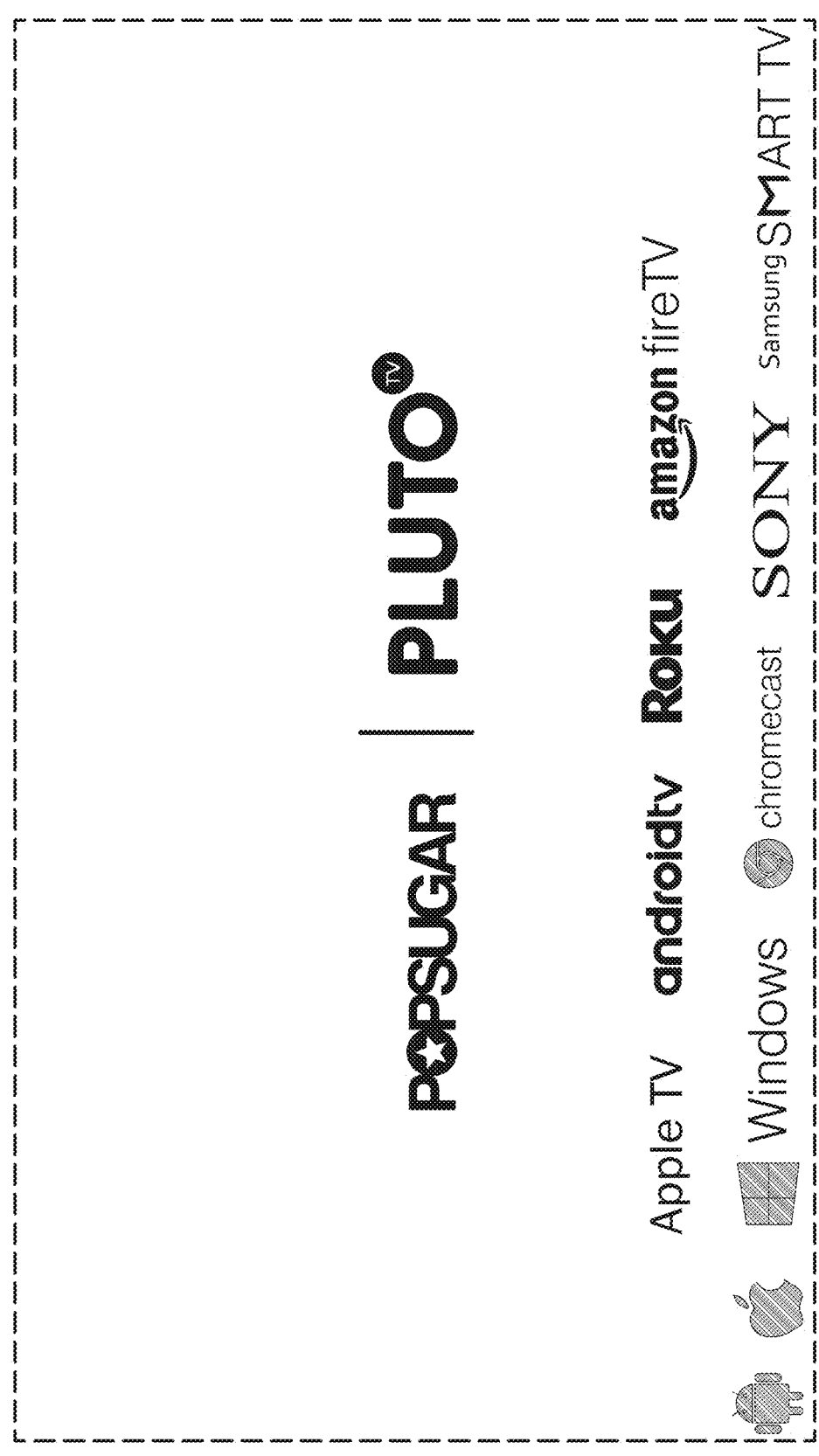
Figure 17P:
Figure 17Q:
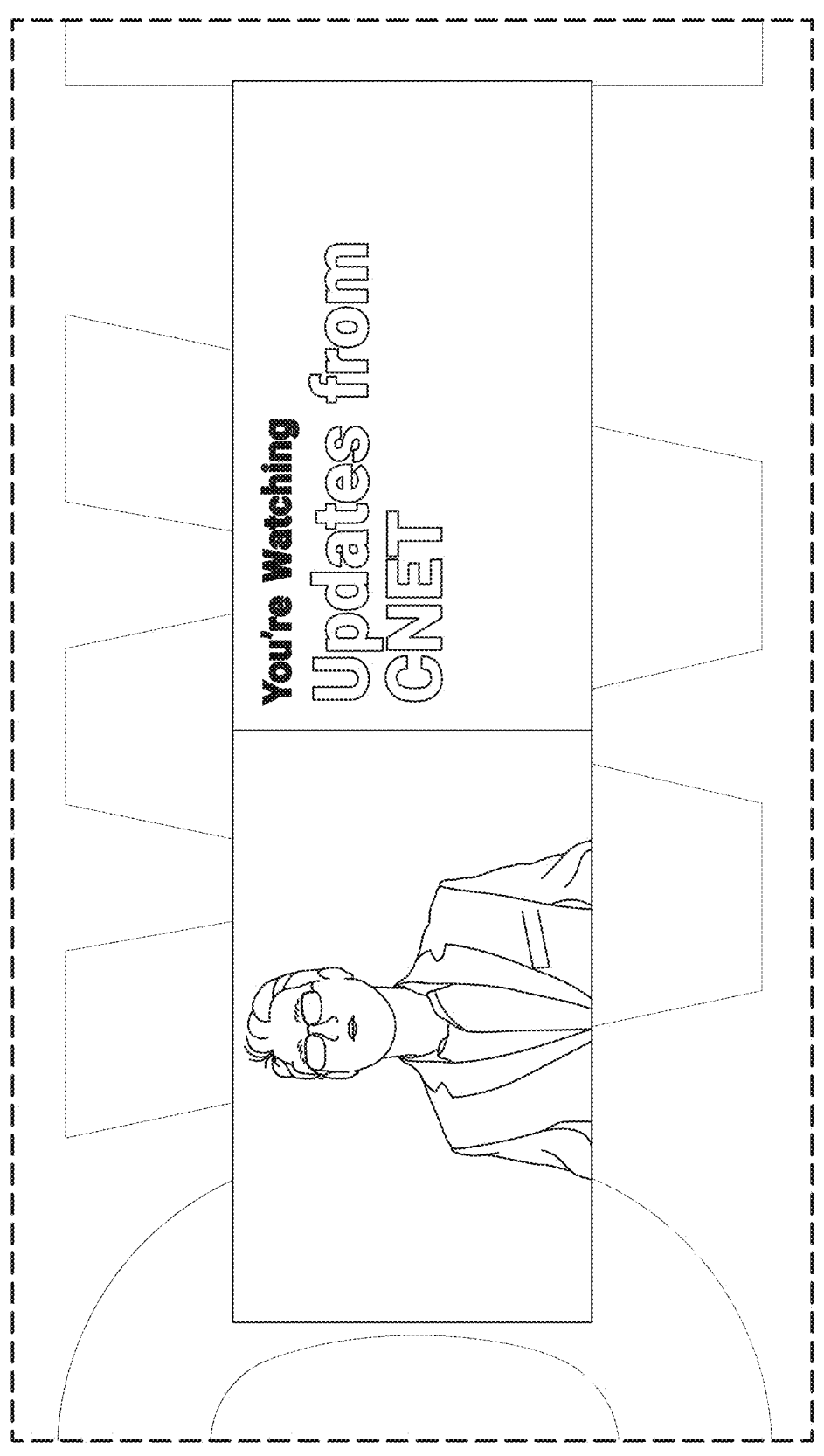
Figure 17R:
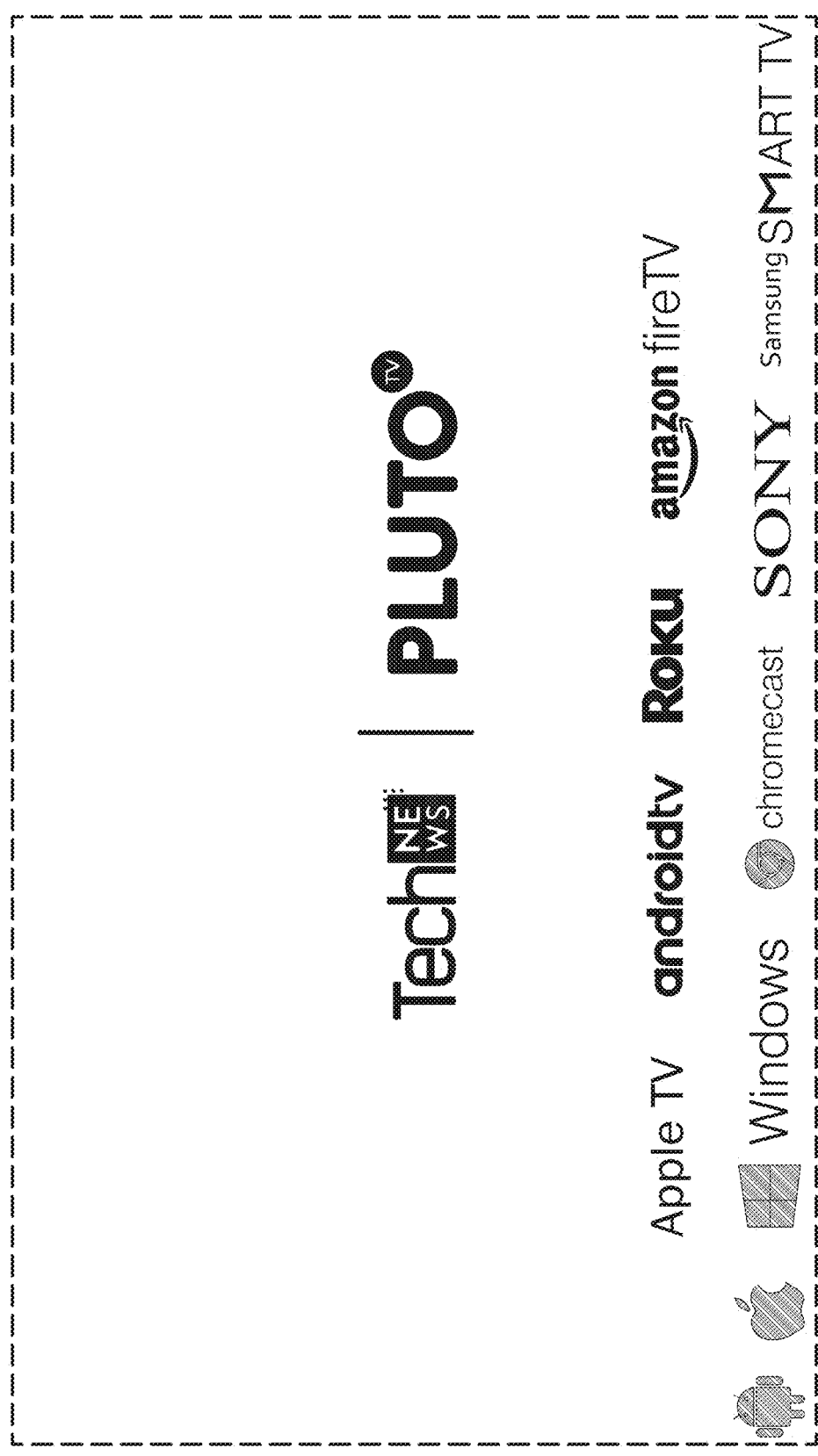
Figure 17S:
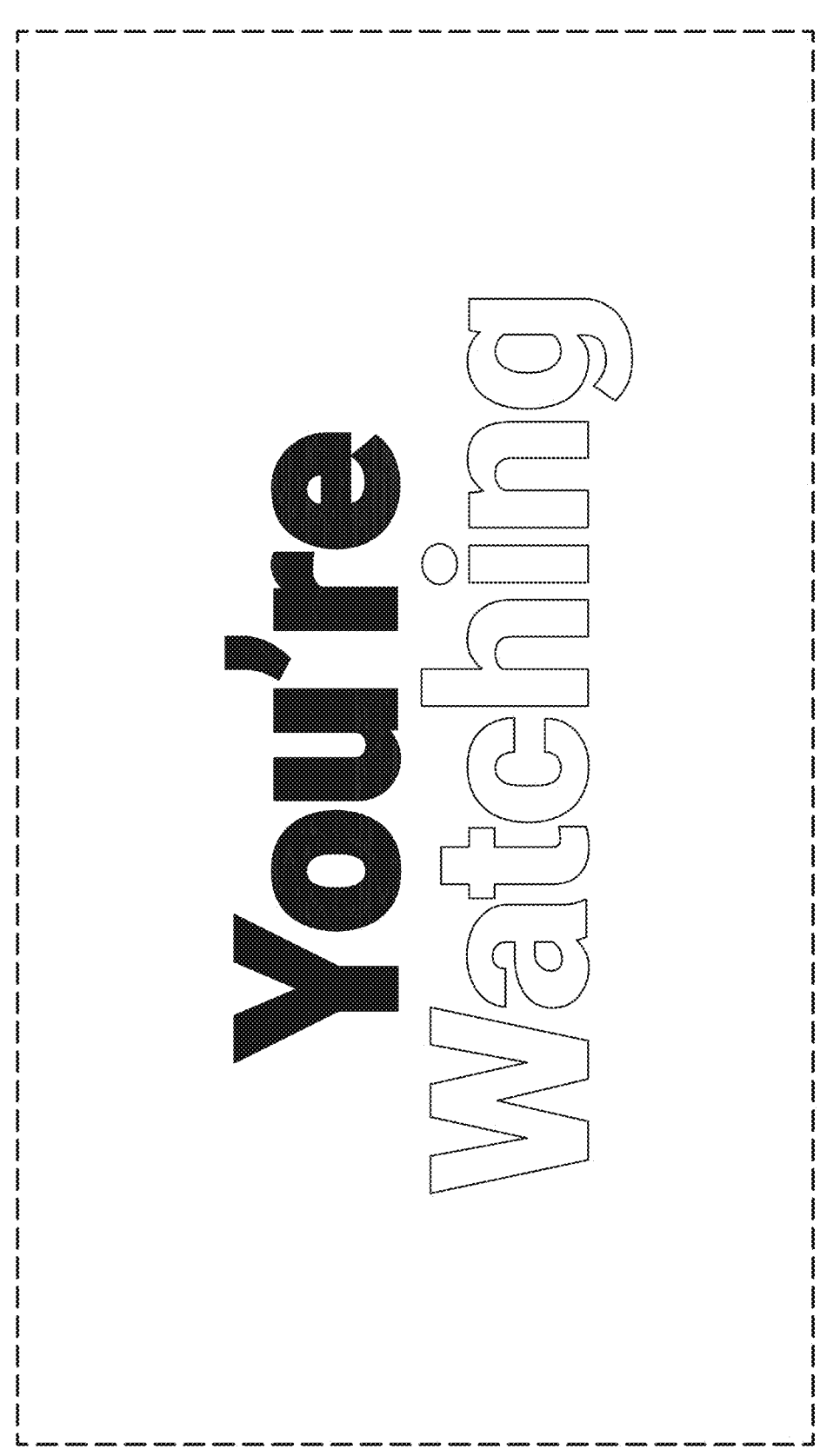
Figure 17T:
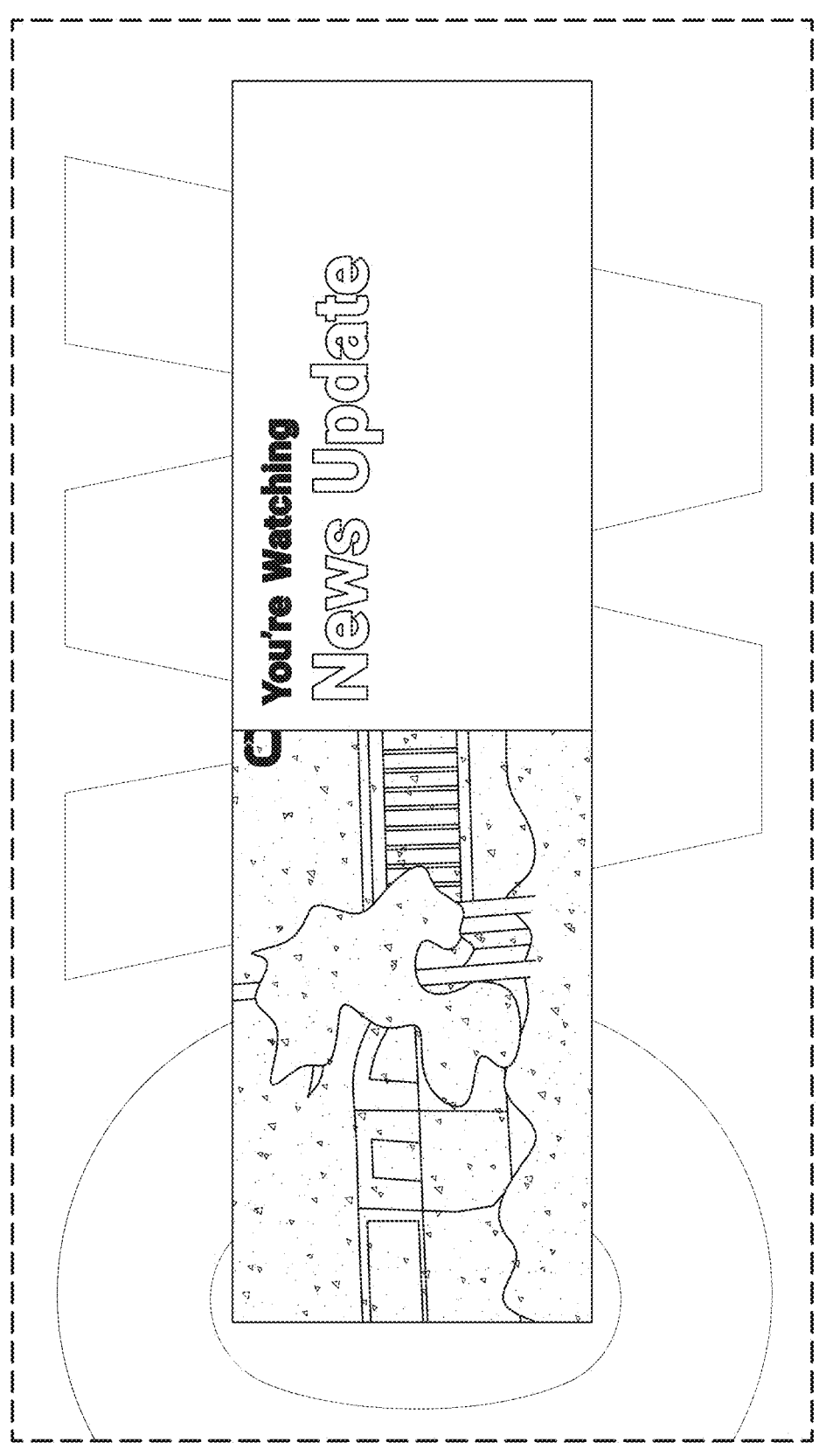
Figure 17U:
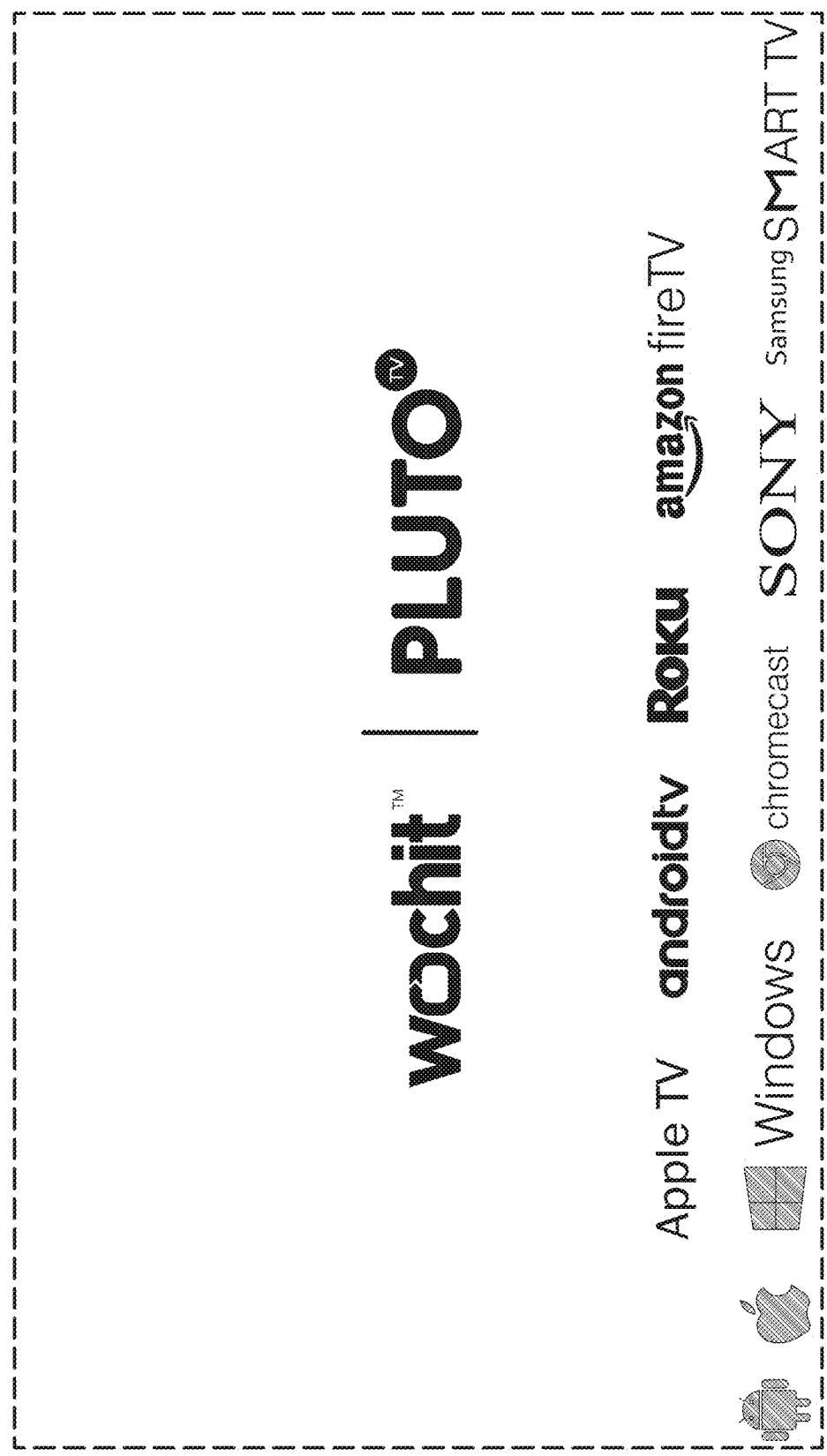

FIGS. 17A-17U illustrate example interstitial user interfaces. A given interstitial may optionally include one or more video and/or audio components as described elsewhere herein. For example, an interstitial may include a video in the foreground corresponding to the subject of a program/episode, scrolling/animated text in the background, and a music track (e.g., specific to the episode or channel).

Figure 18A:
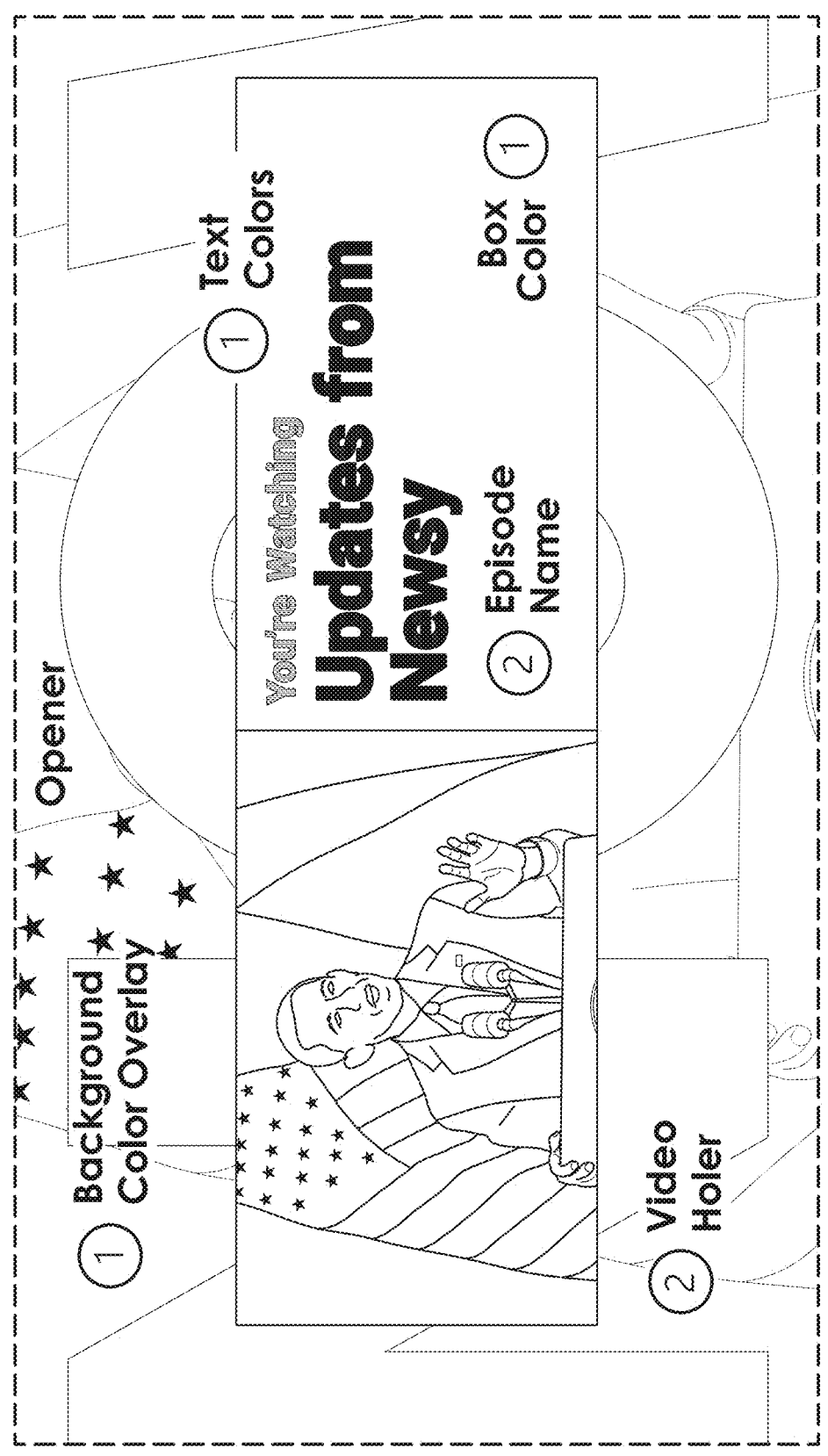
FIGS. 18A-18C illustrates example interstitial formats including dynamic data elements.

FIG. 18A illustrates an example interstitial format including dynamic data elements for an interstitial to be displayed as opener for a program/episode (e.g., immediately prior to the beginning of a program/episode). The elements may be selected in whole or in part based on respective program/episode/clip metadata. The interstitial elements may include some or all of the following:

Theme Colors: optionally includes overlays, text, and/or flat graphics. Optionally, the theme colors may change based on themes established in the channel's brand guidelines. Refer to the differences between the above and below image to understand the changes that happen in color themes.

Episode Name: the episode name changes based on the series metadata, where the episode name may reflect the current episode playing or an episode that is about to play.

Video Holders: video holder changes based on the series metadata so that the video relates to the episode title.

Figure 18B:
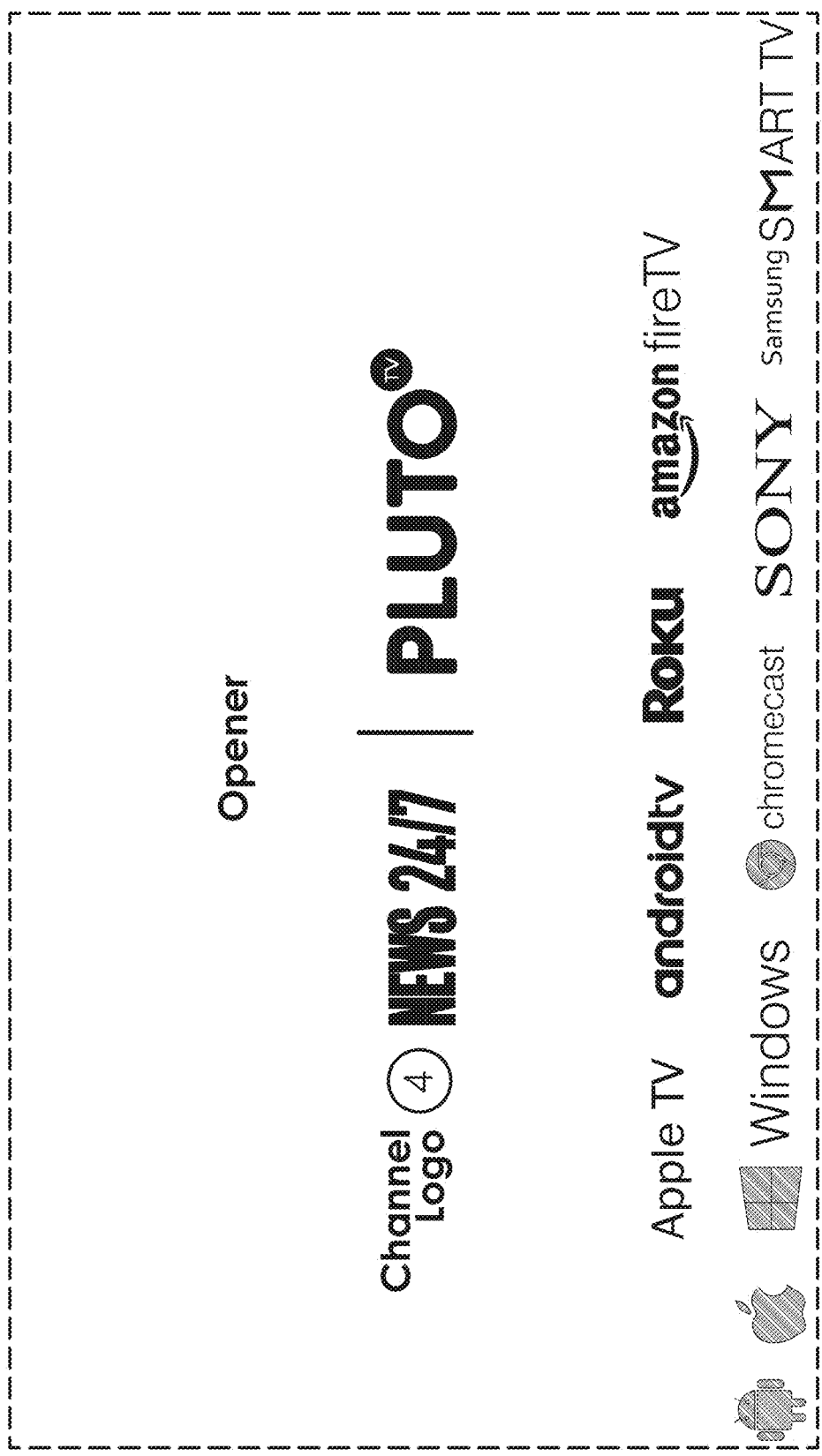

FIG. 18B illustrates another example interstitial that includes a channel logo for the current channel being viewed by/displayed to a user.

Figure 18C:
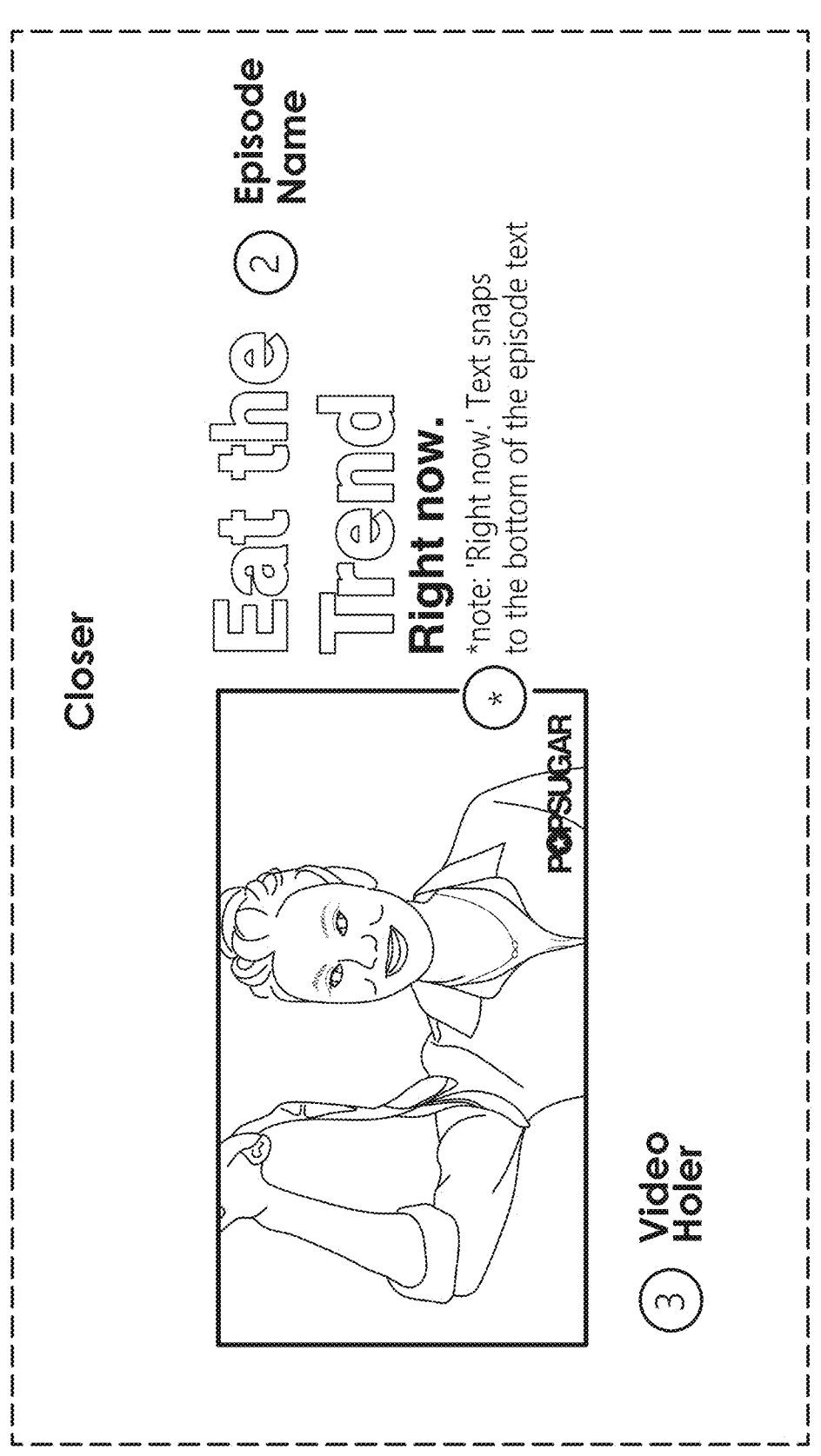

FIG. 18C illustrates another example interstitial (e.g., that may be displayed at the end of a program/episode). The interstitial elements may include some or all of the following:

Episode Name: the episode name changes based on the series metadata, where the episode name may reflect the current episode playing or an episode that is about to play.

Video Holders: video holder changes based on the series metadata so that the video relates to the episode title.

Figure 19:
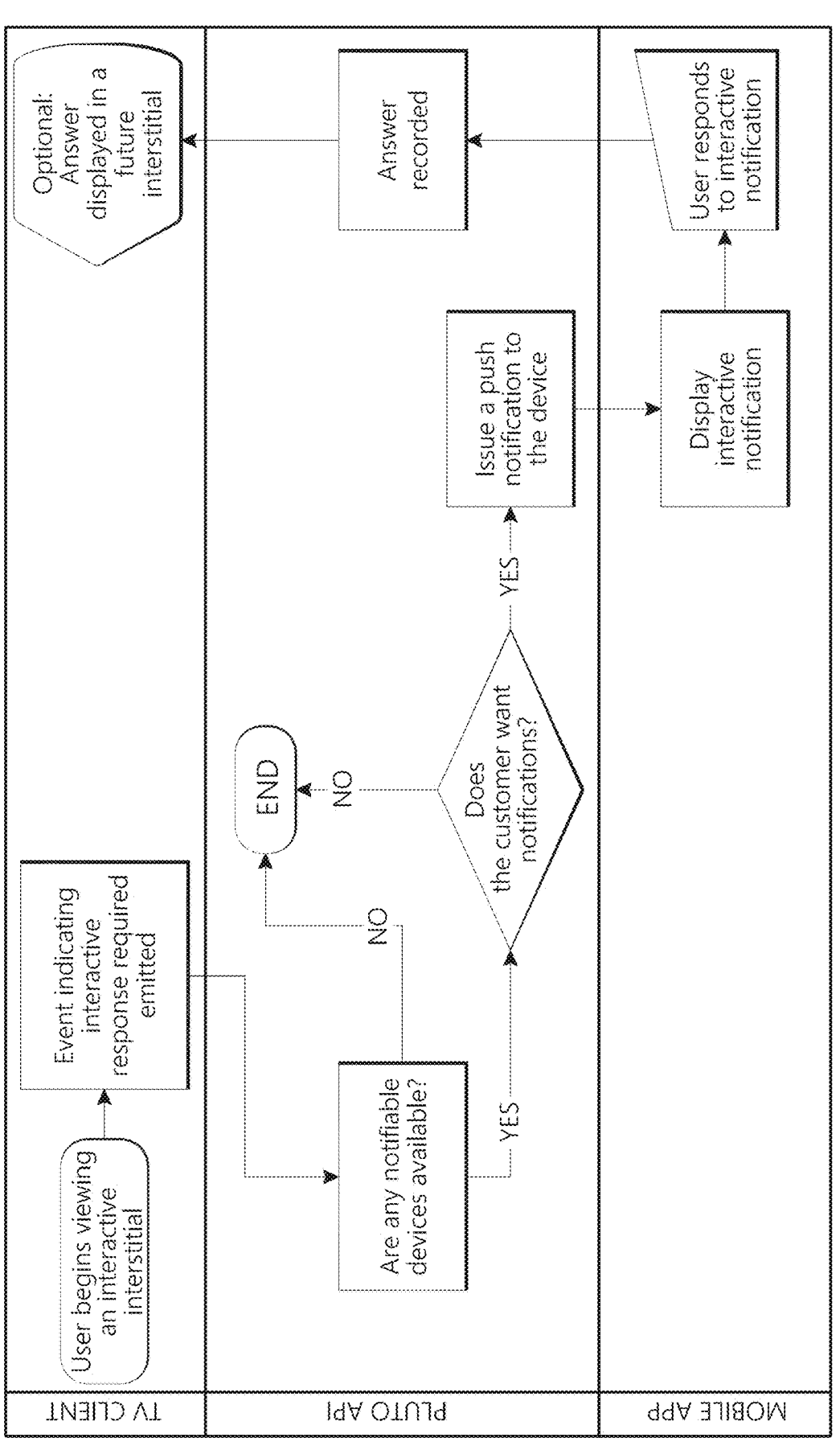
FIGS. 19-21B illustrate example interstitial-related processes.

FIG. 19 illustrates an example process for enabling a user to interact with an interactive interstitial, presented on a first user device (e.g., a television/monitor), via a linked companion device (e.g., a mobile phone, a tablet computer, a laptop, a television/media player remote (e.g., including a touch or non-touch display, a soft keys displayed via the display and/or hard keys, where the remote may be a dedicated remote or included in a mobile phone, tablet computer, or other device), a television/monitor coupled to an internal or external streaming media player hosting a client application, or other companion device). In this example, the interstitial is presented via a television or monitor coupled to an internal or external streaming media player hosting a client application as discussed elsewhere herein. The process detects (e.g., via the streaming media player client in this example, or via a backend server) an event indicating an interactive response is needed from the user (e.g., via a flag or other indicator embedded in the streamed content). If the detection of an event indicating an interactive response is needed is performed by the streaming media player client, the streaming media player client may transmit a notification to a remote backend server via an API. The server may detect whether any user companion devices are available to receive a notification regarding the desired user interaction. For example, an online presence of a user mobile device may be detected via a query to and response from a client application installed on a user companion device. If a determination is made that such a companion device is not available to receive the notification, the process may end.

If a determination is made that such a companion device is available to receive the notification, a determination is made as to whether the user wants to receive such notifications. For example, the user may have indicated via the companion device, via the companion device client application, via the streaming media player client application, via a user account Website user interface, or otherwise, that the user does or does not want to receive such notifications. If a determination is made that the user does not want to receive such notifications, then the process may end without providing the user with such a notification. The notification may specify what type of response(s)/interaction(s) the user may provide and may include controls and/or fields configured to receive such response(s)/interaction(s) (or the user may be instructed to provide response(s)/interaction(s) via another communication channel, such as an SMS/MMS interface).

If a determination is made that the user does want to receive such notifications, then a notification may be pushed to the companion device (e.g., to the client application hosted on the companion device). The companion device client application may then display the notification. At least partly in response to detecting that the user has provided a response/interaction (e.g., via a control or field presented by the companion device client application), the response/interaction may be transmitted by the companion device client application via the companion device to the server via an API. The server may receive and store the user response/interaction. Optionally, the response/interaction may be inspected and a determination may be made as to whether the response/interaction is correct (e.g., if the response/interaction is a response to a quiz or puzzle), and the determination may be stored in association with the response/interaction. Optionally, a second interstitial is composed based at least in part on the user response/interaction. For example, the user response/interaction may be displayed via the television client application in a later interstitial presented on the television/monitor, optionally with an indication as to whether the response/interaction is correct, and/or optionally with feedback from others regarding the response/interaction (e.g., the number of likes or re-postings by other users on one or more social media platforms/sites). Although the foregoing description discloses providing notifications and enabling a user to provide an interstitial response/interaction via a companion device (e.g., a mobile phone, a tablet computer, a laptop, a television remote, etc.), optionally, such a response may be provided via the device that displayed the interactive interstitial (e.g., the television/ monitor coupled to a media player in the above example) rather than a companion device.

Optionally, a user may be tracked as the user changes channels. Such channel changing information may be utilized in determining when related interstitials are to be presented. Thus, for example, if a user is viewing a first channel, a first of a pair of interstitials may be presented just prior to another content event (e.g., prior to an advertisement break that includes one or more advertisements or just prior to the end of a program). By way of illustration, the first interstitial may include a first portion of a joke. If the user navigates to a program on second channel prior to the end of the content event (e.g., prior to the end of the advertisement break or just prior to the end of a program), the system may detect such channel change. The system may then cause the second of the pair of interstitials (e.g., a joke punchline) to be presented on the second channel (e.g., after a content event is completed on the second channel or immediately upon changing channels). Optionally, the system may access a first threshold time period value and will inhibit the presentation of the second of the pair of interstitials until a sufficient amount of time has elapsed such that the first threshold time period value is reached. Optionally, the system may access a first threshold quantity of interstitials value (e.g., one or more) and will inhibit the presentation of the second of the pair of interstitials until at least the first threshold quantity of interstitials has been presented to the user on the second channel. Optionally, the system may inhibit presentation of the second of the pair of interstitials until the end of an ad pod or program on the second channel.

By way of further example, the system may optionally track a user's content viewing across devices. By way of illustration, if the user is viewing a program on a first device (e.g., a phone), and if a first of a pair of interstitials is presented on the first device prior to a first content event, and it is then detected that the user is viewing the program (or another program or channel) on a second device (e.g., a laptop), the second of the pair of interstitials may be presented on the second device (e.g., after a content event is completed on the second device or immediately upon accessing a program on the second device).

By way of illustration, when a user views content on a given device, the user may be identified via login information, a token, or cookie information transmitted from the device to the system. For example, the system may utilize the login information, token, or cookie information to locate and access a user record that identifies the user. In addition, the system may determine which device the user is utilizing to access content by accessing device make and model information from the device.

The system may detect when a user has interrupted a viewing session on the given device.

For example, the system may periodically transmit a ping message to the user device. If the application being used to view the content does not transmit a receipt acknowledgement within a threshold period of time, the system may determine that the user has closed the application vie which the user was viewing content.

By way of further example, the application (e.g., a dedicated application or a browser) may have been configured to periodically transmit a "heartbeat" message to the system to indicate it is still active. If the application fails to transmit a threshold number of consecutive heartbeat messages within a first period of time, the system may infer that the application is inactive and that the user is no longer viewing content via the application.

By way of still further example, if a user activates a logout control on the application, the application may transmit a logout/session termination message to the system.

The system may maintain a user record of the last interstitial displayed to the user and an indication as to whether there is a related interstitial that has not yet been presented to the user.

When the user accesses content from the system using a second device, the user may be identified via login information, a token, or cookie information received from the second device. In addition, the system may detect that the user is utilizing a different device via device make and model information. The system may access the user record from memory and determine that the related interstitial has not yet been presented to the user. The system may then cause the related interstitial to be presented to the user at an appropriate time, such as immediately after a content event (e.g., an advertisement break) or immediately upon selecting a channel or program.

Figure 20A:
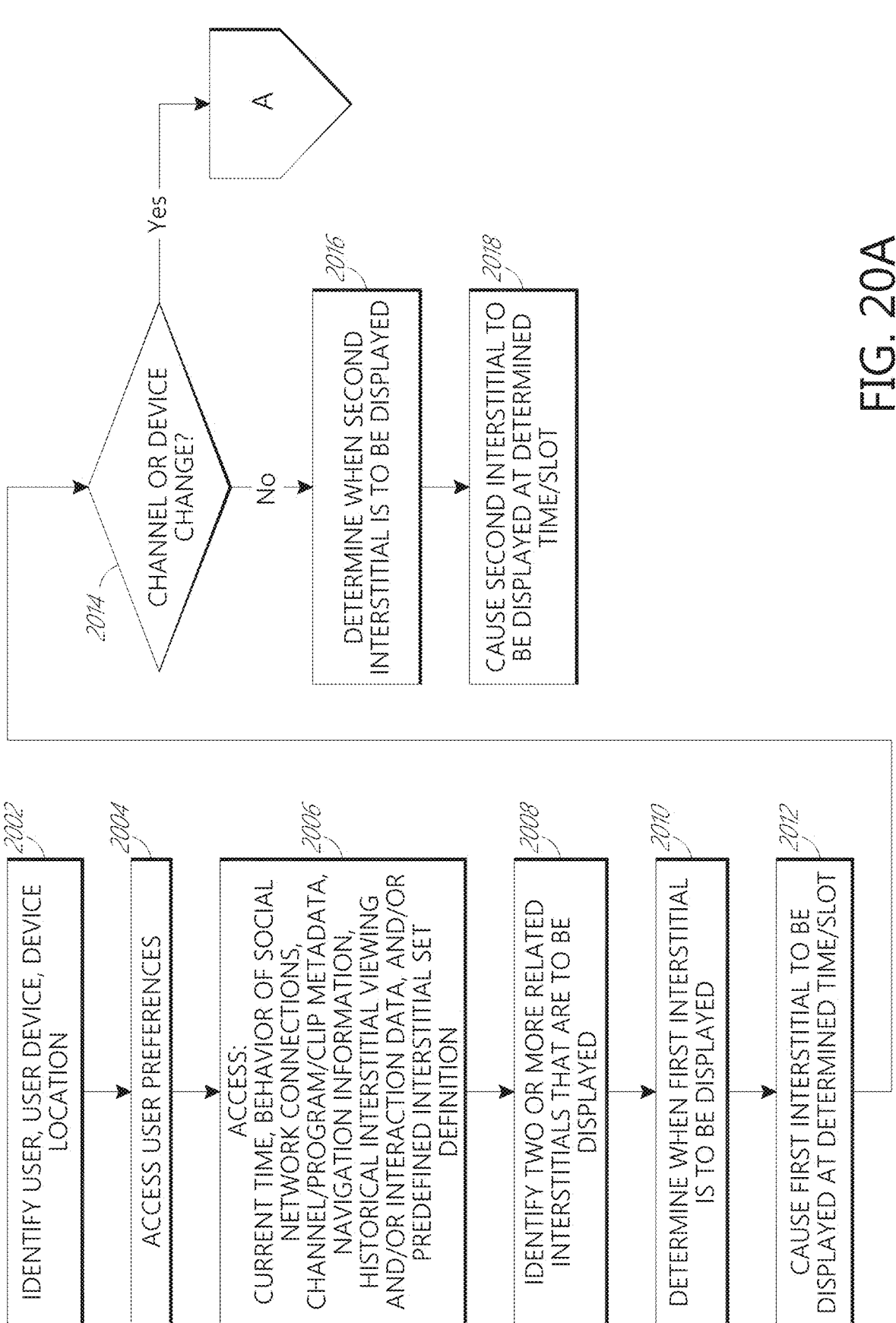
Figure 20B:
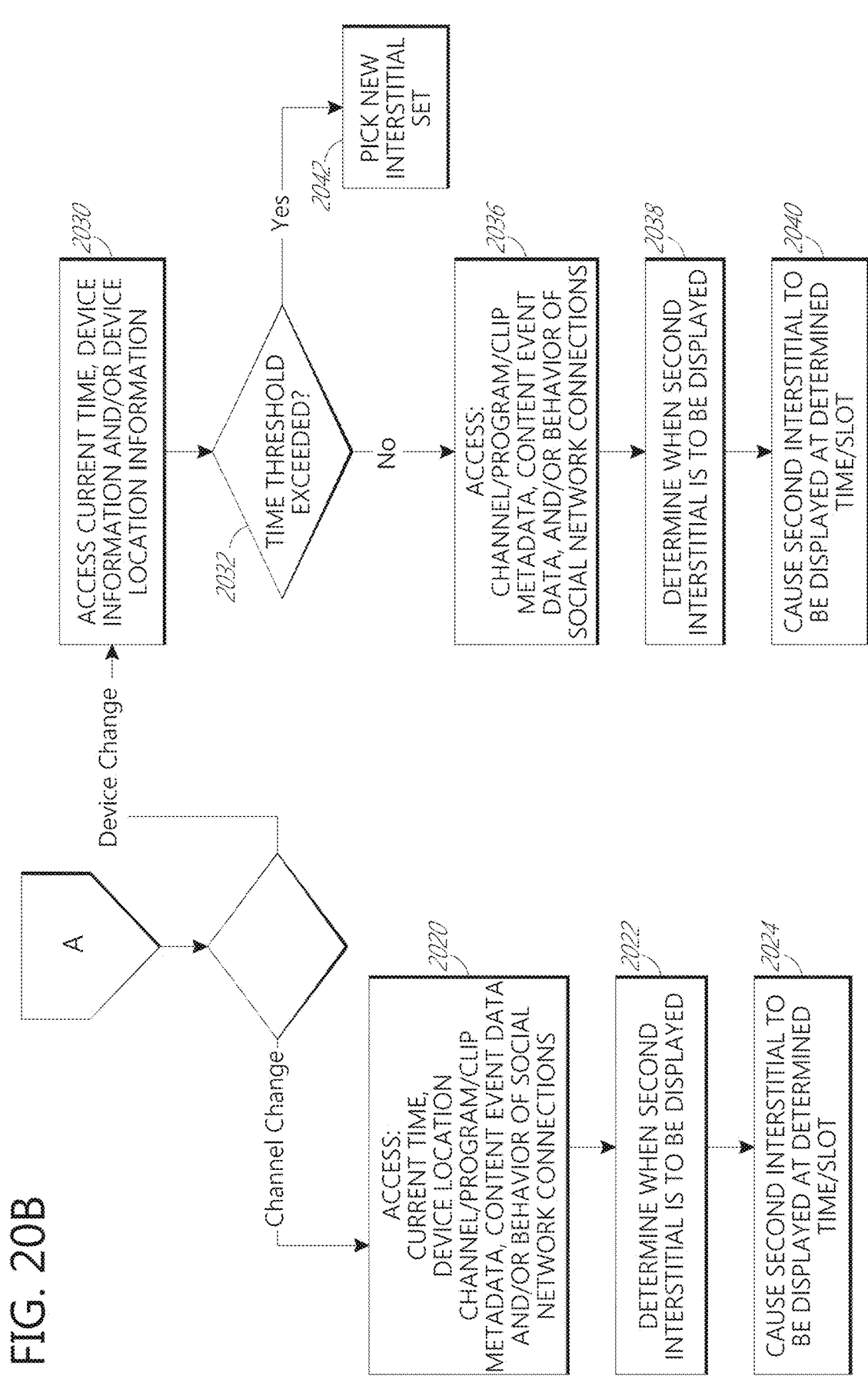

FIGS. 20A-20B illustrate an example process that tracks a user and selectively displays related interstitials on different channels and/or devices. The process enables related interstitials to "follow" the user as the user navigates to different channels or otherwise, or as the user changes devices used to view content.

At block 2002, the user, the current user device being used to access content, and user device location are identified. As similarly discussed above, the user may be identified via login information, cookie data, a token, or otherwise. The user device and optionally browser may be identified via a user agent value received from the user device. For example, the user agent value may optionally be in the following format: Browser/[version]([system and browser information]) [platform]([platform details]) [extensions]. The device may also be identified via information obtained during a device registration process. Other tools, such as Google Analytics, may be used to identify the device and browser (if a browser is being used). The device location information may be obtained via the device IP address, via software that logs and reports the device location using GPS or WiFi positioning data, via radio signals transmitted to and from the device, or otherwise.

The location information may be used to identify which interstitials are permitted to be provided to the user at the user's current location and/or to identify interstitials that are relevant to the user.

At block 2004, express user preferences (e.g., provided by the user via a preference user interface) and/or inferred user preferences, such as the example preferences discussed elsewhere herein, are accessed from memory. For example, the user preference may specify the type of interstitial the user likes (or are favorites) or does not like. Optionally, an indication of the degree of like or dislike may be accessed (e.g., a score or grade the reflects like or dislike). User preferences may indicate genre, program, subject matter, content and/or channel likes and/or dislikes, user specifications of channels to be blocked, user reminder instructions, user bookmarks, user navigation history, etc.

At block 2006, At block 1402, some or all of the following data may be accessed:

user device location;
  current time;
  behavior of social connections;

channel metadata
program metadata
clip metadata;
navigation information;
historical interstitial interaction data;
preference information; and/or
predefined interstitial set definitions.

The behavior of social connections may be determined by accessing the user's social graph. For example, the navigation and viewing history, expressed preferences, inferred preferences, historical interstitial interactions and/or other information regarding other users that the user is socially connected with may be accessed.

Non-limiting examples of optional program metadata, clip metadata, navigation information, historical interstitial interaction data, preference information, and predefined interstitial set definitions that may be used with the process will now be discussed in greater detail.

The channel metadata may include information regarding the channel the user is currently viewing (e.g., the channel name, the channel types, subject matter information, etc.). The program/clip metadata may include timestamps and information regarding people or items in a clip or program or associated with those involved in creating the clip or program. For example, the metadata may include the names or other identifiers of cast members, writers, directors, producers, artists, performers, other people that appear in the program or clip, etc., optionally in association with their respective titles/job functions/character names (e.g., cast member, lead male, lead female, director, producer, principal photographer), and when cast members appear in the program or program segment. Other examples of metadata may include album names and album sales associated with a performer appearing in the program or clip. Still other examples of metadata may include genre, category, subcategory, etc. Yet other examples are described elsewhere herein.

Optionally, certain metadata, such as the name of the program or clip, and timestamp information may be used to access from a database (e.g., over a network from a third party database) certain information, such the length of program or clip, a rating of a program or clip, ratings of a program or clip, reviews of a program or clip, names or other identifiers of cast members, writers, directors, producers, artists, performers, other people that appear in the program or clip, etc., optionally in association with their respective titles/job functions/character names.

As similarly discussed elsewhere herein, the navigation information may include information on whether the user is viewing a program at normal speed, if the user is fast forwarding through a program, or if the user is rewinding through the program. The navigation information may include a history of content user has previously viewed, including content viewed by time of year, time of week, and/or time of day. The user may be performing navigation using rewind, play, fast forward, and/or scrubber bar controls. The navigation information may be transmitted by the user client (e.g., a web browser executing a video player or dedicated application) to the remote system over a network. Optionally, the user client may transmit the play time update to the remote system which may utilize this information to determine user navigation and/or to determine when an interstitial is to be displayed.

The historical interstitial interaction data may include information as which interstitials were presented to the user, when the interstitials were presented, on which channels the interstitials were presented, on what programs the interstitials were presented, on which user device the interstitials were presented, the physical location of the user device (e.g., as determined from an IP address, GPS information, or otherwise) when a given interstitial was viewed, on how the user responded to one or more previous interstitials (e.g., an immediately preceding interstitial, interstitials presented earlier in the program, interstitials presented on other programs on the same channel, interstitials presented on other programs on other channels, etc.), whether a user navigated away after viewing a first of a related pair of interstitials, and/or how the user responded to interstitials of different types (e.g., trivia question type interstitials (e.g., trivia questions regarding programs, actors, directors, writers, politicians, sport statistics, album sales, album names, car brands, etc.), social media type interstitials, ticketing type interstitials, voting type interstitials, etc.).

A given predefined interstitial set definition may identify related interstitials that are to be presented in a certain order and/or may define a set of interstitials that are to be used for a specific program, channel, subject matter, or content source. The interstitial set definition may optionally be stored in memory in association with corresponding program, channel, subject matter, or content source identifiers.

At block 2008, a set of two or more related interstitials may be selected, optionally based on some or all of the information obtained at blocks 2002, 2004, and 2006. For example, the two or more related interstitials may be selected based on the user device, user device location, user preferences, channel metadata, program metadata, clip metadata, navigation information, historical interstitial interaction data, and/or predefined interstitial definitions. By way of illustration, a first interstitial may be a trivia quiz including two questions, a second related interstitial may be an answer to a first quiz question, and a third related interstitial may be an answer to a second quiz question. By way of further example, if a first of an interstitial pair had previously been displayed to the user, but the second of the interstitial pair has not yet been displayed to the user, the selection of the interstitial pair may be inhibited to avoid re-displaying the first interstitial before the second interstitial has been displayed.

At block 2010, a determination is made as to when (in terms of time or available slot) a first of the selected set of two or more related interstitials are to be displayed. For example, the determination may be based on some or all of the information obtained at blocks 2002, 2004, and 2006 and/or on an identification of a next content event, such as an advertisement break (sometimes referred to as an advertisement pod). By way of illustration, a determination may be made that the first interstitial is to be displayed immediately prior to an identified content event (e.g., advertisement break, station identification, etc.). At block 2012, the first interstitial is caused to be rendered on the user device at the determined time or slot in the channel presentation.

At block 2014, a determination may be made whether the user has navigated to a different channel on the same user device, or has changed devices used to access the content.

If the user has not navigated to a new channel and is not using a different device, at block 2016 a determination is made or accessed as to when (in terms of time or slot) the second interstitial is to be displayed. At block 2018, the second interstitial is caused to be displayed on the user device at the determined time/slot.

If a determination is made that the user has changed channels (e.g., via navigation data/instructions received from the user device) during the current session (e.g., prior to the user logging out or closing the application used to view the channel content), then at block 2020, current time, current device location information, current channel metadata, program metadata, clip metadata, behavior of social network connections and/or content event timing information may be accessed. Some or all of the information accessed at block 2022 may be utilized to determine when the second interstitial is to be displayed. For example, optionally the process may access a threshold period of time value from memory, wherein the second interstitial is not to be displayed before the threshold period of time (the threshold period of time beginning after playing of the first interstitial) has elapsed. The process may then inhibit the display of the second interstitial on the current channel until the threshold period of time has elapsed and optionally based on additional criteria. For example, the process may inhibit the display of the second interstitial on the current channel until the first occurrence of an end of an ad pod and/or program after the threshold period of time has elapsed. The foregoing technique avoids the second interstitial being displayed immediately after the first interstitial upon a channel change. At block 2024, the second interstitial is caused to be displayed on the user device at the determined time/slot on the current channel.

If a determination is made that the user has changed devices (e.g., based as a user login on a different device), then at block 2030, the current time, an identification of the current user device being used to access content, and the current user device location are accessed. At block 2032, optionally a determination is made as to the time duration since the first interstitial was presented to the user. If the determined time duration exceeds a first threshold, then at block 2042 a new interstitial or interstitial set is selected, as similarly described above. Optionally, the second interstitial is not presented to the user (or is not presented to the user unless the first interstitial is presented again), as given the time duration, the user may no longer recall the first interstitial.

If the first threshold is not exceeded, at block 2036, current channel metadata, program metadata, clip metadata, behavior of social network connections and/or content event timing information may be accessed as similarly discussed above. At block 2038, some or all of the information accessed at blocks 2030, 2034, 2036 may be utilized to determine when the second interstitial is to be displayed on the current user device. At block 2040, the second interstitial is caused to be displayed on the current user device at the determined time/slot on the current channel.

As discussed elsewhere herein, optionally, programs and other content may be scheduled to be shown a predetermined times on specified channels. A program guide may be generated and provided to users that include listings channels and for channel programs at specified days/times for a specified duration. Thus, optionally, programs may be scheduled around fixed time slots. This causes a set of users (e.g., all end users, all end users in a specified geographical area, etc.) to be able to view the same program content at the same time (optionally with relatively minor variations introduced by buffering and player differences), and view advertisement breaks at the same time. However, optionally, different users may be presented with different advertisements during a given advertisement break. For example, different advertisements may be selected for different users based on user preferences, user navigation history, and/or other user-specific information such as that discussed elsewhere herein. Different advertisements may optionally be served to different users using different ad servers. A given advertisement may optionally be dynamically selected in real time for a given ad slot (e.g., within +/–100 ms of the beginning of an ad slot).

A given ad pod (which may be composed of one or more ad slots) may be assigned a predetermined time duration. However, different advertisements may have different lengths, as similarly discussed elsewhere herein. Further, there may not be sufficient advertisements available for a given ad pod. One option would be to use placeholder video to fill or help fill an ad pod. However, such use of placeholder videos may provide an inadequate user experience. Further, a given advertisement may not be exactly the same length as the slot in which it is shown. For example, a 30 second slot may be filled by a 30.5 second advertisement. Such variations can cause programs to no longer match the program guide schedule. Further, such variations can cause different users to have programs begin and end at different times.

In order to address such technical difficulties in synchronizing content playback across multiple users and user devices (where users may view the same primary content but different interstitial content (e.g., different ads), a given ad pod duration may be adjusted on a user-by-user basis so that the starting time of a program (or program segment) subsequent to the ad pod may be individually adjusted accordingly on a user-by-user basis.

For example, if, for a given user, only 60 seconds of advertisements are used to fill a 90 second ad pod, 30 seconds of the ad pod will be unfilled. In order to compensate, the next scheduled content item (e.g., program or program segment) may be adjusted so as to be displayed on the user device 30 seconds earlier than the originally scheduled time, and the next ad pod's duration may be extended by 30 seconds beyond its original scheduled length. Such timing adjustments may be periodically made on a user-by-user basis so as to resynchronize the viewing experience of the users back to the original content schedule (e.g., by the beginning of each hour or half hour) by inserting just enough content (e.g., ads, filler videos, and/or other interstitial content).

Thus, different users may be presented with different interstitial content of different duration. Certain users may be presented with different numbers of interstitial content as needed to fill in gaps in ad pods and synchronize user viewing experiences with a program guide.

Figure 21A:
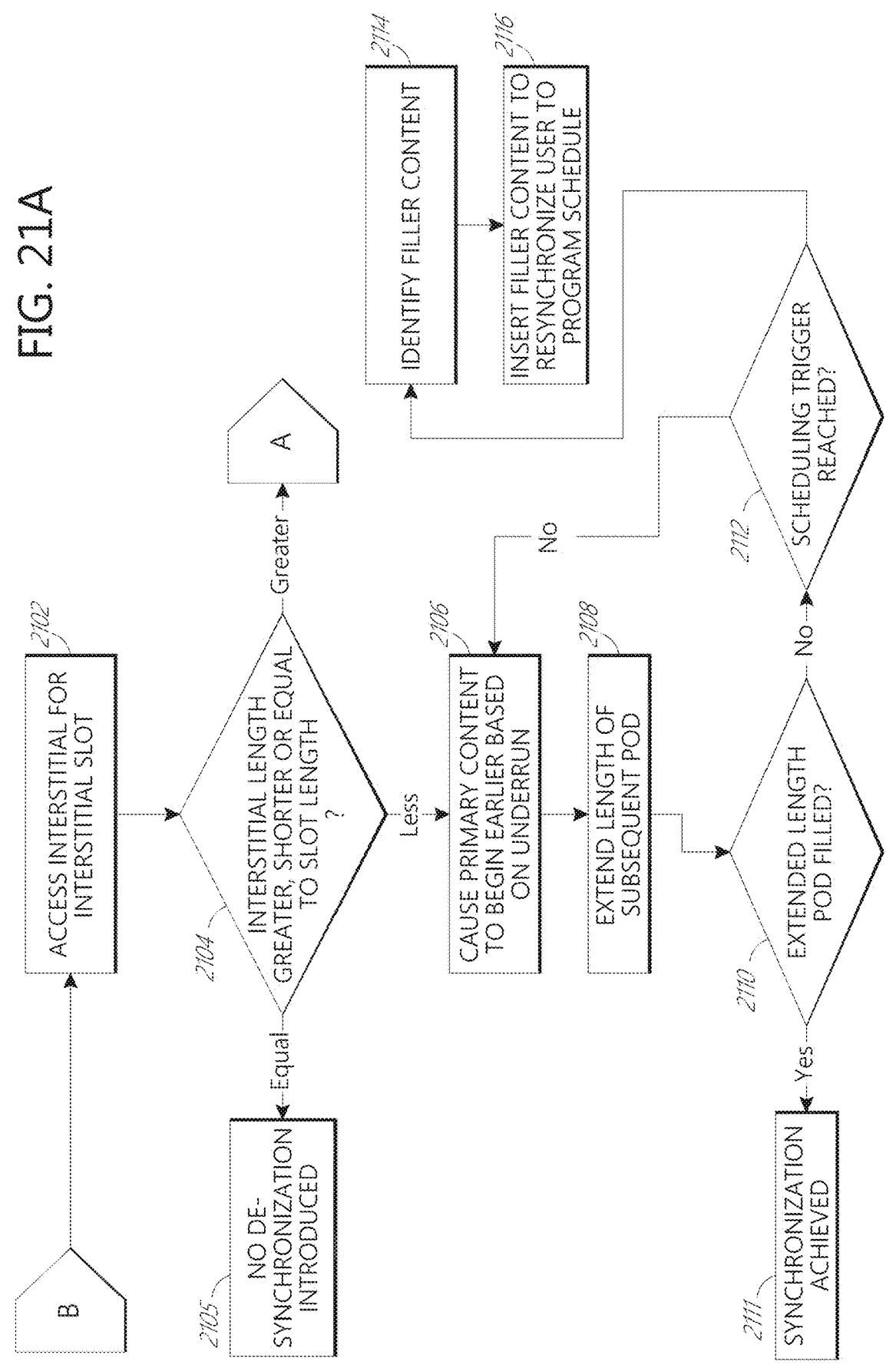
Figure 21B:
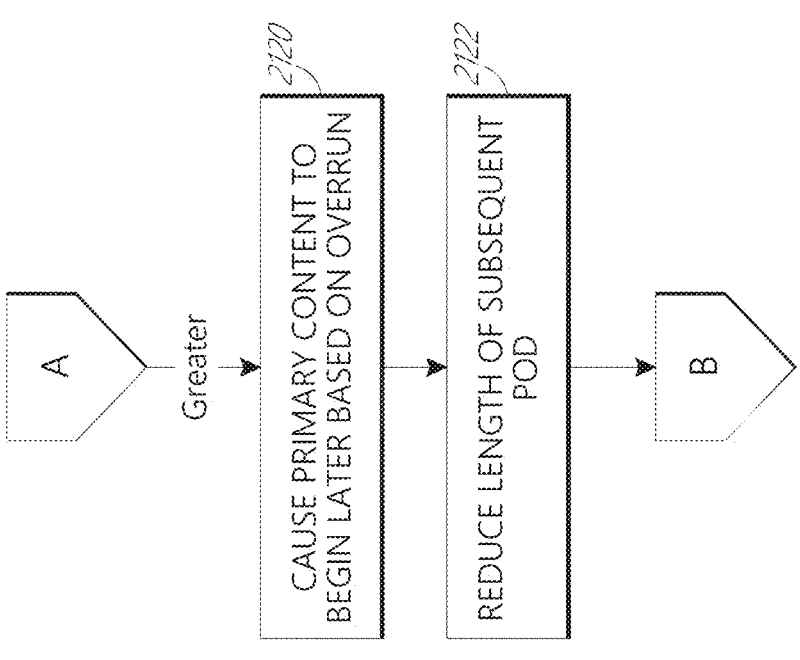

FIGS. 21A, 21B illustrate an example process for individually synchronizing a user's viewing experience with a program schedule. The process may be performed in parallel for multiple users viewing a given program on a given channel. The synchronization process may be used to ensure that the multiple users will eventually be viewing the same content at the same time.

At block 2102, a predetermined interstitial slot is identified. An interstitial is selected for the interstitial slot, as similarly discussed elsewhere herein. At block 2014, the length of the selected interstitial (e.g., as determined from metadata associated metadata) is compared with the length of the interstitial slot. The difference in length (if any) of the selected interstitial and the interstitial slot length as determined. If the length of the interstitial is determined to be the same as the length of the interstitial slot, then a determination is made at block 2105 that playing of the selected interstitial in the interstitial slot did not introduce a desynchronization of the user's viewing experience with respect to the program schedule.

If a determination is made that the selected interstitial is shorter than the interstitial slot, then at block 2106, the next item of scheduled content (e.g., primary content such as a program or a portion of the program) is caused to be played earlier than its scheduled time. For example, the next item of scheduled content may be caused to be played earlier than its scheduled time by an amount equal to the difference in length of selected interstitial and the interstitial slot length as determined at block 2104.

At block 2108, a subsequent ad pod (e.g., the next ad pod) time length may be extended. The pod time length extension may be based on the difference in length of selected interstitial and the interstitial slot length as determined at block 2104. For example, the pod time length extension may be set equal to the difference in length of selected interstitial and the interstitial slot length as determined at block 2104. At block 2110, content (e.g., ad content) is selected for the extended pod and a determination is made as to whether the length of the selected content is less than the extended pod length. If the length of the selected content is equal to the extended pod length, then at block 2111, a determination is made that the user's viewing experience is now synchronized with the original program schedule.

If the length of the selected content is shorter than the extended pod length, then at block 2112, a determination is made whether a scheduling trigger has been reached. For example, a scheduling trigger may be set for a certain time before the next program or before a certain time event (e.g., an hour marker (e.g., 1 PM, 2 PM, etc.) or half-hour marker (e.g., 1:30 PM, 2:30 PM, etc.). The scheduling trigger may be used to ensure that users' viewing experiences are synchronized by a certain point in time. If the scheduling trigger has not been reached, than the process may return to block 2106. If the scheduling trigger has been reached, then at block 2114, a sufficient length of filler content is identified to fill any underrun with respect to the user's viewing experience relative to the program schedule. For example, optionally the filler content may be less desirable than the content previously used to identify slots. By way of illustrative example, the filler content may be viewer submitted content, station identification content, sponsored content, and/or other content. At block 2116, the selected filler content is caused to be played to the user to resynchronize the user viewing experience to the program schedule (and to that of other users).

If a determination is made at block 2104 that the selected interstitial is longer than the interstitial slot, then at block 2120, the next item of scheduled content (e.g., primary content such as a program or a portion of the program) is caused to be played later than its scheduled time. For example, the next item of scheduled content may be caused to be played later than its scheduled time by an amount equal to the difference in length of selected interstitial and the interstitial slot length as determined at block 2104. At block 2122, the next ad pod may be reduced in length by an amount based on (e.g., equal to) the difference in length of selected interstitial and the interstitial slot length as determined at block 2104. The process may then proceed back to block 2102.

Another challenge presented by creating channels and programs for clips from different video sources (e.g., video websites) and/or for other content, is that the different video sources may provide custom video players for videos hosted by a given source. For example, each source's video player may have a different appearing video player, with common controls placed in different positions, and with some video players having different control sets than other video players. Conventionally, such inconsistent player user interfaces and functionality does not pose much of a problem for users, as users typically are accessing videos at a single source during a given viewing session.

However, when users are viewing, via a single site, multiple videos as part of a channel, they expect to have a unified viewing experience, and it would be confusing and disconcerting to be presented with a different player for each program/video. To address this problem, certain embodiments provide a meta-player that integrates other video players into single experience and provides a common video player interface. For example, while the user is watching a channel, the meta-player may cause a given program to be presented in a video presentation area. When the next program comes on, it too is presented in the same video presentation area, even though the native players may present the videos in differently positioned presentation areas. Further, the meta-player places a common set of video player controls at the same locations and with the same appearance, even though the native players may have different control placements and different control appearances.

By way of example, the common controls may be defined to include some or all of the following: rewind, fast forward, play, pause, record, navigate to the next clip (or other content), like, share (which enables a user to instruct that a notification regarding the program, optionally including a link to the program, be sent to a designated recipient), etc. Optionally, if a given source player includes a control that is not included in the common control set, that non-common control is excluded from presentation to the user via the meta-player. Optionally instead, if a given source player includes a control that is not included in the common control set, that non-common control is presented to the user via the meta-player in an area reserved for the display of non-common controls.

In certain embodiments, the system determines what player is needed to play a given video clip (e.g., based on the source of the clip/the URL to the clip), and then uses a program (e.g., implemented using an interpreted client side script, such as JavaScript) to call the appropriate player, wrapped in the meta-player interface.

The video player may be configured to display programs from two or more channels at a time in respective windows. For example, the windows may be configured as picture-in-a-picture windows, as side by side windows, or as windows that the user may drag and drop to desired locations.

Thus, certain embodiments optionally provide seamless switching of video sources and players in a manner transparent to the user to thereby provide the user with a unified experience when viewing content from different sources (e.g., within a program or a channel).

Figure 6:
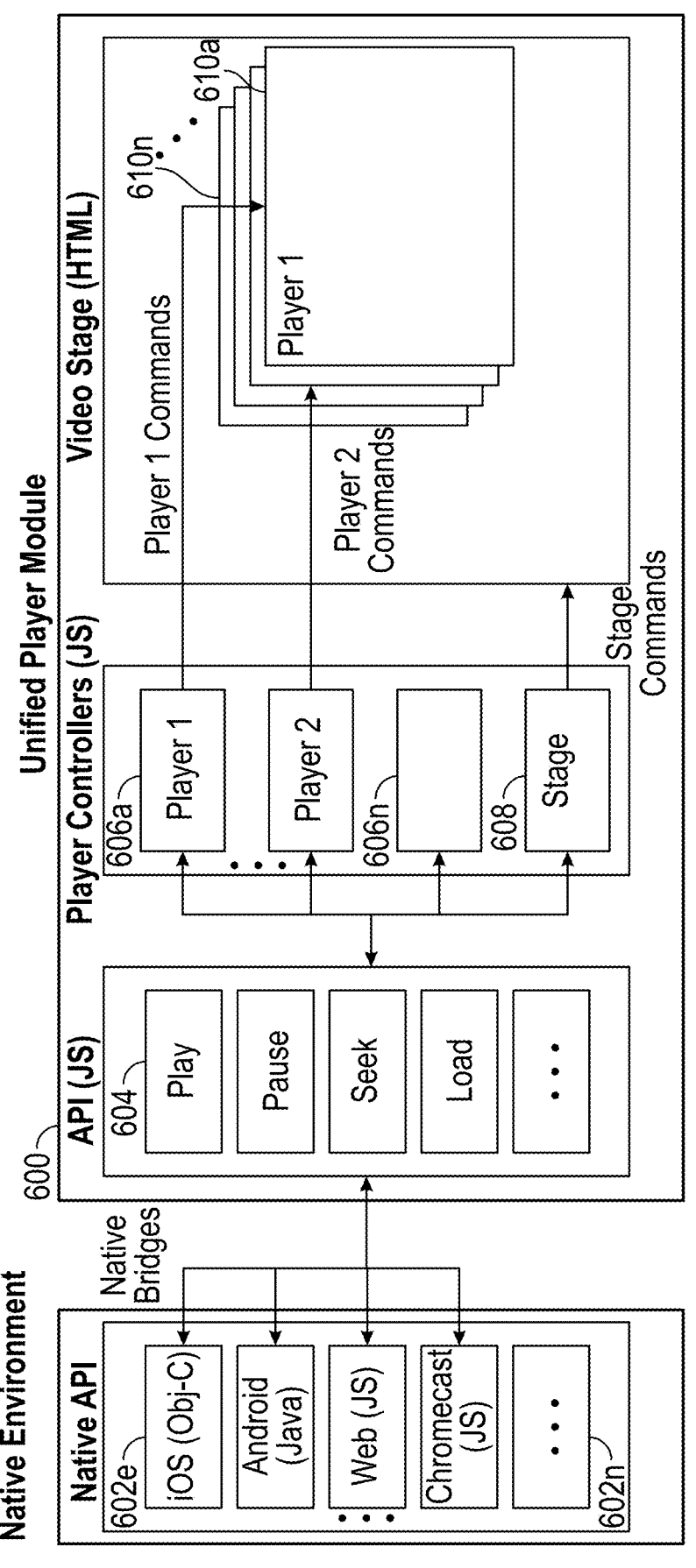
FIG. 6 illustrates an example unified content player architecture.

FIG. 6 illustrates an example architecture utilizing a unified player 600 that provides a common wrapper for a plurality of third party content players 610a-610n. In this example, various native bridge APIs 602a-602n are provided for various native environments (e.g., IOS®, ANDROID®, Web, CHROMECAST®, etc., which may be hosted on mobile devices, such as tablets, phones, laptops, etc., and/or on non-mobile devices, such as networked televisions, desktop computers, game consoles, etc., and which may utilize different programming languages) to communicate with a unified player module (e.g., an HTML or HTML hybrid content player application). The unified player 600 may include APIs 604 (optionally implemented in JavaScript) for common player functions, such as, by way of example some or all of the following: play, pause, forward, fast forward, rewind, fast rewind, seek, load, etc. The player function APIs 604 may in turn communicate with player control APIs 606a-606n (optionally implemented in JavaScript) for various content players 610a-610n (e.g., video players).

The content players 610a-610n may include chromeless content players that provide outside developers access to the standard player controls, and enable the outside developers to provide their own customized skin and/or additional features. Different content players may be configured to play different types of formats of content (e.g., MPEG, MKV, AVI, FLV, etc.). Optionally, the original video host's advertisements, analytics, watermark, etc. are preserved with the content stream.

A given player controller API routes commands received from a user via the native environment to the currently active content player. A stage module 608 ensures the appropriate content player is being used for the content (e.g., video clip) currently being played. By way of illustration, a given program may include four video clips, each of which utilizes a different content player. When the program is played, the stage module 610a-610n causes a first content player to play a first item of content, a second content player to play a second item of content, etc. However, to the user, it appears as if the same content player, with the same controls in the same positions, is being used to play each of the four video clips.

FIG. 13 illustrates an example process utilizing a unified content player, which may be executed using a content scheduling system or other computing system. While the following description may refer a first and a second item of content and a first content player and a second content player, there may be more than two items of content and two content players. At block 1302, an electronic program guide is presented to a user, and the user selects a program to play (or the user is watching a program playing as a result of a previous selection of a channel of which the program is a part). The user program (or channel) selection is detected. The program in this example is composed of multiple content items (e.g., video clips) from different sources, where at least one content item is to be streamed from a first source and is to be played back using a first content player (e.g., a first video player), at least one content item is to be streamed from a second source and is to be played back using a second content player (e.g., a second video player).

At block 1304, metadata associated with the first content item is accessed. Optionally, the metadata may be accessed from a local data store (e.g., local content data store of content scheduling system 102). Optionally, the metadata is accessed from the first content item source. The metadata associated with the first content item may include some or all of the following data: an identification of what content player is to be used to play the first content item, an identifier identifying the first source, and/or a content item identifier (e.g., a unique alphanumeric or other code) identifying the first content item.

At block 1306, the process determines, at least in part, from the metadata which content player is to be used to play the first content item. At block 1308, the process instructs a unified content player on a user terminal to access the first content player and to utilize the first content player to play the first content item from the first content source. For example, the instructions may include the first content player identifier, the first source identifier, and/or the first content item identifier. Optionally, the instructions include a URL corresponding to the first content item. The first content player may be presented via a user browser and may be generated using code (e.g., JavaScript) from the content scheduling system, the first content source, and/or other source. The first content player may be configured so that the appearance conforms to a standardized uniform content player appearance (e.g., with the controls in a certain location and with a certain appearance, which may be different than that of the first content player in its native form).

At block 1310, a determination is made whether it is time for the next content item (the second content item in this example) to be played by the unified player. For example, the determination may be based on a timer or a trigger (e.g., metadata associated with the program) that indicates that it is (or is about to be) time for the second content item to be played. If it is time for the second content item to be played, at block 1312 metadata associated with the second content item is accessed (although the metadata may be accessed earlier, such as at the beginning of the program). Optionally, the metadata may be accessed from a local data store (e.g., local content data store of content scheduling system 102). Optionally, the metadata is accessed from the second content item source. The metadata associated with the second content item may include some or all of the following data: an identification of what content player is to be used to play the second content item, an identifier identifying the second source, and/or a content item identifier (e.g., a unique alphanumeric or other code) identifying the second content item.

At block 1314, the process determines, at least in part, from the metadata which content player is to be used to play the second content item. At block 1316, the process instructs a unified content player on a user terminal to access the second content player and to utilize the second content player to play the second content item from the second content source. For example, the instructions may include the second content player identifier, the second source identifier, and/or the second content item identifier. Optionally, the instructions include a URL corresponding to the second content item. The second content player may be presented via a user browser and may be generated using code (e.g., JavaScript) from the content scheduling system, the second content source, and/or other source. The second content player may be configured so that the appearance conforms to a standardized uniform content player appearance (e.g., with the controls in a certain location and with a certain appearance, which may be different than that of the second content player in its native form), so that the second content player and the first content player appear the same to the user, and the switching of content players is transparent to the user (e.g., the user is unaware that different content players are being used to play content from different sources). The process may then repeat for the next content item, and so on.

It is understood that other activities may be performed by the unified content player during playback of a content item. For example, the unified content player may report (e.g., to the content scheduling system or other system) the current playback position of the content item being played, buffering delays, and/or other information.

Another challenge posed by the process of composing a program using one or more clips from third party content hosting sources over which the system operator has no control, is that a given clip may be deleted at any time (e.g., by the third party hosting site, by the posting user, or otherwise). For example, a content hosting source may delete a video clip because of an alleged copyright violation, because of viewer complaints regarding the video clip, or for other reasons. Thus, when a clip is scheduled to be displayed to users as part of a program, the clip may be no longer be available, and an error condition may occur or there may be a dead space within the corresponding program (or if the program is composed of a single clip, the whole program may be "dead").

In order to address this problem, optionally certain embodiments identify backup content (e.g., video content or other content) to be substituted for removed or other unavailable video content that had been included in a program. In an example embodiment, before a given program is scheduled to air, the system may determine whether or not the clip is still available. For example, the system may issue a query to the hosting site via an API regarding the availability of the clip, and the hosting system will then provide a response received by the system, the response indicating whether or not the clip is still available (or may provide no response, which may indicate that the clip is no longer available). By way of illustration, the system may be scheduled to perform the availability check 30 minutes before the program airs, 12 hours before the program airs, one day before the program airs, or other time period before the program airs.

If the system determines that the clip is not available, the system may identify a substitute clip from a pool of clips or from one or more other sources (optionally including a pool of clips stored and maintained by the content scheduling system). By way of example, a pool of substitute clips (or other content) may have already been manually or automatically identified for the specific program (e.g., a dedicated program pool). The system may then select the substitute clip (or other content) from the program pool based at least in part on the similarly to the length (in time) of the no longer available clip. For example, if the currently unavailable clip is 2 minutes in length, the system may identify a clip from the pool that is 2 minutes or less in length. By way of further example, the system may identify a clip between 1 minute and 45 seconds and 2 minutes and 15 seconds long.

Thus, optionally, the system may select substitute content that is longer than the time period of the unavailable content, and may truncate the excess content corresponding to the time that exceeds that of the unavailable content. Optionally, if the system selects substitute content that is longer than that of the unavailable content, the system may delete other content from the program to compensate (e.g., the system may delete previously included promotional/advertising content for other programs). Optionally instead, the system may select substitute content that is no longer than the time period of the unavailable content.

Optionally, rather than using a dedicated program pool of substitute backup clips, the system may search for and select substitute clips from a broader pool (e.g., a pool specific to a given channel) or from third party content hosting sites. For example, the substitute clip may be selected by the system based on its similarity (e.g., as determined by comparing tags) to the currently unavailable clip and on the clip length. By way of illustration, if the currently unavailable clip has a tag of "cat tricks" and is 5 minutes in length, the system may identify a substitute clip that also has the tag "cat tricks" or a functional synonym for "cat tricks" (e.g., "cat stunts"), and that is about 5 minutes in length.

Optionally, rather than using a substitute clip to replace a video clip, live content (or other content type) may be specified, such as a microblog or social network stream.

Optionally, the currently unavailable clip may be substituted using two or more clips (or other content, which may include live content and/or recorded content) that combined have about the same length as the currently unavailable clip. A packing algorithm may be used to select multiple clips (or other content) to replace a given currently unavailable clip.

The system may select a combination of substitute content, where each item of content of the combination is shorter than the unavailable content, but the combined length of the combination is longer than the time period of the unavailable content. The system may truncate the excess content from one of the items of the combination of substitute content (e.g., the last item of content) corresponding to the time that exceeds that of the unavailable content. Optionally instead, the system may select a combination of content having a length that is no longer than the time period of the unavailable content. Optionally, if the length is shorter than the time period of the unavailable content, fill-in content may be selected and used to fill-in the time period.

Yet another challenge posed by composing a program using one or more clips (or other content) from sources over which the system operator has no control, is that a given clip may actually vary in length. For example, a given clip may include a lead-in video (or post-roll) commercial when initially identified and selected for a given program, and so the clip (including the commercial) will have a first length. The lead-in clip may be dynamically selected by an advertisement server at the time the clip is requested. Thus, different advertisements of different lengths may be selected based on when the clip is requested and/or based on the location of the requester. Therefore, the given clip may include a different video commercial of a different length than the video commercial that was streamed as a lead-in commercial when the clip was originally selected, (or the clip, when originally selected, may not have included any lead-in video commercial), and hence the total length of the clip (including the lead-in advertisement) may change.

In order to address this problem and to ensure that the lengths of clips are synchronized with the scheduled program end time, certain embodiments schedule a longer time for a given clip/item of content (or for the program in which the given clip is to be included) than the actual length of the clip when initially selected for the program. The selected scheduled length may be configured to accommodate the maximum anticipated potential increase in clip length. For example, typically lead-in advertisements are 1 minute or less, and so the system may schedule an additional minute for the clip, or may schedule an additional 2 minutes to even better ensure that the total clip time (including the lead-in, post-roll, or other advertisement) will not exceed the scheduled time for the clip.

Then, when the clip is about to be (e.g., within 1 second, within 15 seconds, within 30 seconds) or is played as part of the program, the system may examine the clip (e.g., the clip metadata that indicates the advertisement length and/or the clip length) to determine the current total clip length (including the advertisement from the advertisement server) of the about-to-be played clip. For example, the system may use an API to access the clip length without the advertisement from the content hosting system. If the total clip length is shorter than the amount of time scheduled for the clip (or for multiple clips in a given program), the system may select other content to fill out the time. The fill-in content may be selected based on its length and optionally based on its relevancy to the program. If the system determines that the clip is shorter than the allocated time, the system may identify fill-in content, which may be in the form of one or more video clips or still/static images.

Optionally, the system may select fill-in content that is longer than the time period that needs to be filled in, and will truncate the excess content corresponding to the time that exceeds the period that needs to be filled in. Optionally, if the system selects fill-in content that is longer than the time period that needs to be filled in, the system may delete other content from the program to compensate (e.g., the system may delete previously included promotional/advertising content for other programs). The fill-in content may correspond to the subject matter of the program, may be promotional content for other programs, or may be advertisement content for one or more products or services. Optionally, the fill-in content may be retrieved from a pool of clips maintained by the system or from one or more other sources. By way of example, a pool of fill-in clips may have been manually or automatically identified for the specific program (e.g., a dedicated program pool). The system may then select the fill-in clip from the program pool based at least in part on the similarity to the length (in time) of the clip underrun.

Optionally, certain channels may be provided to, and accessed by users for free. Optionally, certain channels may be paid subscription channels, where the system will prevent access to the channels by users that the system determines has not subscribed to those channels. Optionally, bundled subscription packages may be provided where programs and/or channels are bundled by subject (e.g., any available shows regarding a specified sports team), theme (e.g., travel, music, etc.), event (a live concert, a sporting event, etc.), etc., and users may subscribe to one or more bundles. Optionally, certain programs/channels may be on a pay per view basis, where the system informs the user that the user needs to pay a fee to access a given program, or to access a channel for a specified period of time.

Optionally, the system may access (e.g., via an API) programming information from other broadcasters (e.g., cable and/or over-the-air broadcasters that also provide content to computers, mobile devices, etc. or that otherwise provide access to their content), and may add the programming information (e.g., name of program, air date/time, etc.) to the programming guide discussed above. Thus, the program guide may provide an integrated program guide including information for multiple broadcasters (e.g., online video content sources, over-the-air broadcasters, cable broadcasters, etc.). Optionally, the program guide enables the user to select and view channels and content from such broadcasters. Optionally, a user interface is provided via which the user can provide log-in information for the user's account(s) with the other broadcaster(s) that require or ask for such log-in information order to access their content. The system may then utilize such log-in information from the user (e.g., user ID, password, etc.), to verify that the user is authorized to access such broadcaster content and/or the system forwards the login information to the broadcaster for verification and authorization.

Optionally, one or more channels may be embedded on and streamed to one or more third party sites (e.g., websites). For example, a blog about hip-hop music may embed a hip-hop music channel for viewing by its audience. Optionally, the channel may be presented with links to the site hosted by the system. Optionally, a company may utilize the system to generate a channel or program for a company brand. For example, if the company manufacturers or sells sports footwear, the system may be utilized to generate programs and/or channels of content related to or depicting footwear with the company brand. The content for the program of channel may be hand-selected by the company or the content may be automatically identified and/or assembled into a program or channel as similarly discussed elsewhere herein. The company channel may be accessed via a company website, a website hosted by the system, and/or a third party content hosting website. Optionally, a given channel or program may be syndicated across a plurality of platforms and distribution points (e.g., to other linear platforms, to cable or satellite set-top boxes, etc.). For example, an interface (e.g., provided via a software developer kit) may be provided enabling a publisher to create a channel (e.g., as discussed elsewhere herein) and specify how and to where the channel is to be broadcast (e.g., over the air, over the internet, via cable, etc.).

Optionally, content may utilize IP and/or wireless multicast streaming (e.g., to reduce network bandwidth usage), where a given stream may be accessed by multiple destinations, rather than only using one-to-one unicast streaming. For example, in multicast streaming, a multicast transmission may transmit IP packets to a group of destination terminals on a network. A destination node (e.g., a user terminal) may send to the system a join message when joining a multicast streaming transmission and may send a leave messages when leaving a multicast streaming transmission. For example, when a user is viewing a first channel and then switches to second channel, a leave message may be transmitted by the destination node for leaving the first channel, and a join message may be transmitted by the destination node for joining the second channel. Using multicast transmission, a system can send a packet of data (e.g., content data) once for receipt by multiple destination nodes. Multicast addressing may utilize a variety of different transport layer protocols, such as Pragmatic General Multicast (PGM) or is User Datagram Protocol (UDP).

Optionally, the content scheduling system operator (or other entity) may run advertisements on third party content sites. For example, the content scheduling system operator may purchase keywords corresponding to content, such as a video (e.g., a music video of a popular performer). Then, when a user of a third party content site performs a search using search terms that correspond to the keywords, an advertisement (which may comprise a link, text, an image/frame) for the video may be identified and displayed to the user on the user's terminal. When the user clicks on the advertisement/link for the video, the video may be played to the user. Optionally, the video is played via the site hosted by the content scheduling system. Optionally, the video is played via a third party content site. The content scheduling system may identify a channel that it determines the user may like based at least in part on the user selection of the video (e.g., by identifying a similar theme, subject matter, etc. using/comparing metadata associated with the channels and the video). For example, prior to the user selecting the video, an association of the video with a channel may optionally be performed, so that once a user selects the video, the system already "knows" which channel to select. The content scheduling system may detect or determine when the video has finished playing to the user and then cause the user to be provided with videos from the selected channel (e.g., in accordance with the channel schedule). For example, the currently playing program for the selected channel may be streamed to the user terminal for display to the user. The channel may be identified to the user by name, channel number, and/or otherwise.

Optionally, advertisement insertion points may be assigned by a programmer to different points within a playlist, such as before or after a given clip in a playlist. Thus, rather than specifying an advertisement insertion time, the insertion points are associated with the beginning and/or endings of clips within a playlist, such as a playlist of clips that forms a program. The advertisements may comprise linear advertisements (advertisements that appear before, after, or during a break in the video content (sometimes referred to as pre-roll, post-roll, or mid-roll)) and/or nonlinear advertisements (advertisements that appear along with the video content (e.g., overlays that cover part of the video as it plays)). The advertisements may be served by an advertisement server.

Optionally, an operator may specify a maximum number of minutes and/or quantity of advertisements that may be added to a playlist. For example, if the program is scheduled to be 30 minutes long (including advertisements), and the corresponding playlist includes 22 minutes of content, then only 8 minutes of the program time is allocated to advertisements. When the programmer adds an advertisement insertion point, the programmer may specify the length (in time) of the advertisement to be inserted. The programming tool may calculate the current program length (including the base program and the current advertisement insertions) and optionally continuously display the total time to the programmer. The system may compare the current total time against the scheduled program time. Optionally, if the programmer attempts to add an advertisement insertion point with an associated time length that would cause the total length of the program to exceed the scheduled length, an error notice may be generated and presented to the programmer, and optionally the programming tool will prevent the addition of the advertisement insertion point.

Example processes will now be described with reference to the figures. The processes may be performed by or using the systems disclosed herein or by or with other systems. It is understood that not all the following processes need to be performed, nor do all the process states need to be performed.

Figure 7:
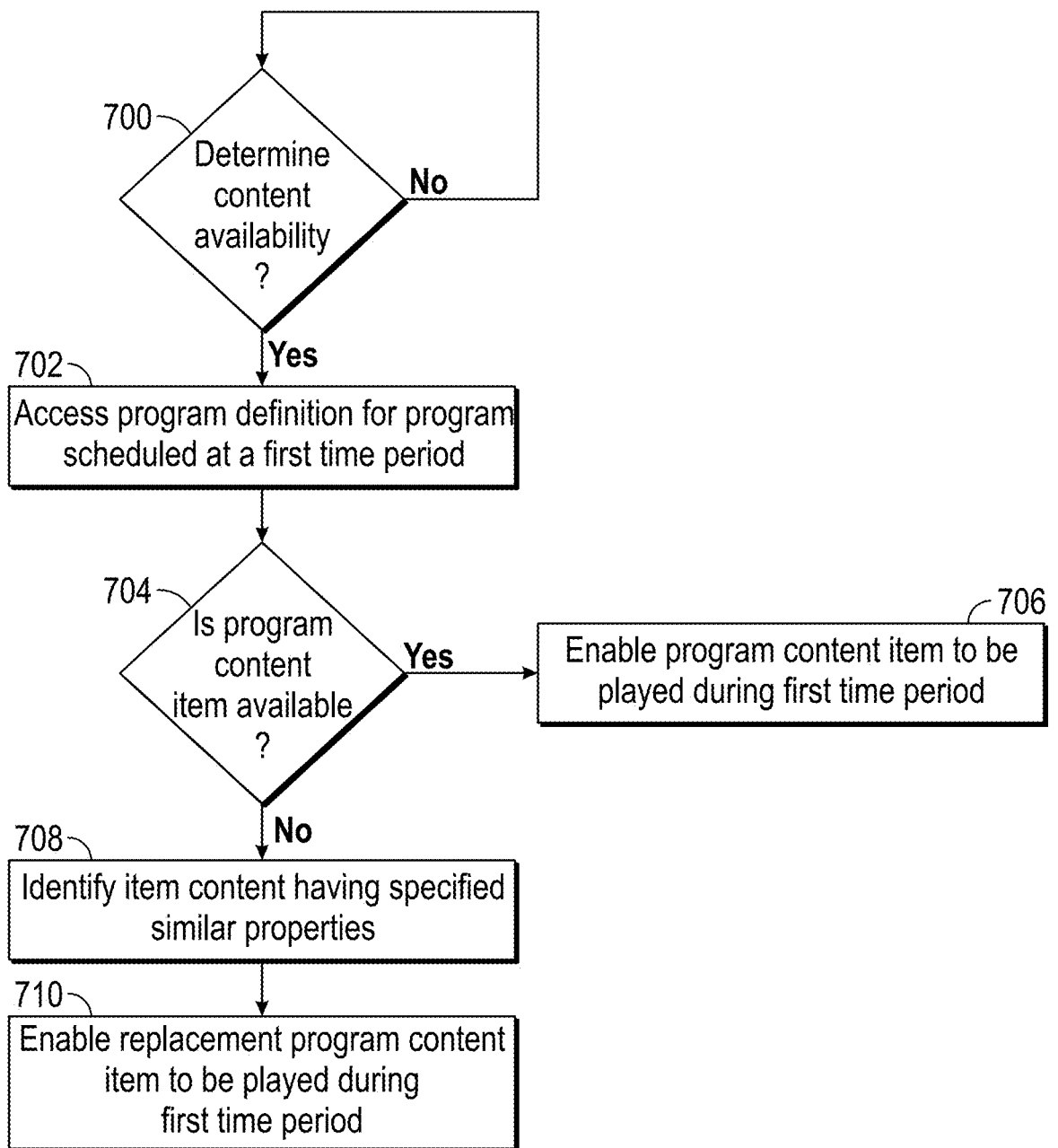

FIG. 7 illustrates an example process that identifies whether a previously scheduled content item, such as a clip scheduled as part of a program composed of multiple clips, is currently available. The process may optionally be performed using the content substitution module discussed above. At block 700, a determination is made as to whether the process should evaluate the availability of one or more content items (e.g., video clips, etc.) that had previously been scheduled to be included in the program. For example, a rule may be defined that states that the availability evaluation is to be performed a specified period of time before the program is scheduled to be presented, or a specified period of time before the content item is scheduled to be presented. Optionally in addition or instead, the rule may specify a specific day and/or time at which the availability evaluation is to be performed.

At block 702, a program definition for the program scheduled at a first time period is accessed from a data store of program definitions. For example, the program definition may indicate which content items are included in the program and the display ordering of the content items, the content items' lengths, the start time of a given content item relative to the beginning of the program (e.g., content item 3 begins 5 minutes into the program), and may include locators (e.g., URLs) for the content items. The program definition may have been established days, weeks, months, or other time period before the next showing of the program. At block 704, at least partly in response to the determination that the availability evaluation is to be performed, a determination is made for a given content item as to whether the content item is still available. For example, as similarly discussed elsewhere herein, a query may be issued to the hosting site via an API regarding the availability of the content item, and the response, if any, will be received from the hosting system, the response indicating whether or not the clip is still available (or the host system may provide no response, which may indicate that the content item is no longer available).

If the process determines that the content item is available, at block 706 the process enables the content to be streamed as scheduled during the first time period.

If the process determines that the content item is no longer available, at block 708 the process may identify a substitute content item from a pool of content items or from one or more other sources (optionally including a pool of content items stored and maintained by the content scheduling process) having one or more specified similar properties (e.g., subject, length, source, creator, posting date, popularity, etc.). By way of example, a pool of substitute content items (or other content) may have previously been manually or automatically identified for the specific program (e.g., a dedicated program pool). The process may then select the substitute content item (or other content) from the program pool based at least in part on the similarly to the length (in time) of the no longer available content item. Optionally, in addition to or instead of using a dedicated program pool of substitute backup content items, the process may search for and select substitute content items from a broader pool (e.g., a pool specific to a given channel) or from third party content hosting sites.

As similarly, discussed elsewhere herein, optionally, the process may select substitute content that is longer than the time period of the unavailable content, and may truncate or edit out the excess content corresponding to the time that exceeds that of the unavailable content. Optionally, if the process selects substitute content that is longer than that of the unavailable content, the process may delete other content from the program to compensate (e.g., the process may delete previously included promotional/advertising content for other programs). Optionally instead, the process may select substitute content that is no longer than the time period of the unavailable content. Optionally, the currently unavailable content item may be substituted using two or more content items that combined have about the same length as the currently unavailable content item. Optionally, rather than using a substitute content item to replace a recorded content item, live content (or other content type) may be specified, such as a microblog or social network stream.

At block 710, the process enables the recorded and/or live substitute content item(s) to be streamed to a user terminal in place of the original content item during the first time period.

Referring now to FIG. 8, an example process for determining whether supplemental content is needed for a program will be discussed. The process may optionally be performed using the supplemental content identification module discussed above. At block 802, a program definition for a program scheduled at a first time period is accessed. For example, the program definition may indicate the content items that are included in the program and the ordering of the content items for display, the content items' lengths, the start time of a given content item relative to the beginning of the program, and may include locators for the content items. Some or all of the content items may be hosted by third party hosting sites. For example, the content items may include a first content item (e.g., a video clip or other content) hosted by a third party site server, where the first content item has a first time length, where the first time length may include time allocated for an advertisement (e.g., a 30 second video advertisement) as well as for the primary, non-advertising content. The program definition and the content item time lengths may have been established days, weeks, months, or other time period before the next showing of the program. At block 804, a first span of time is allocated for the first content item hosted by the third party site server, where the first span of time is longer than the first time length of the first item.

At block 806, the current length of the first content item is determined. The current length may be the current total content item length (e.g., including an advertisement that will be or is currently being served from an advertisement server, where the current advertisement may be a different advertisement and have a different time length the previously allocated first time length). For example, a rule may be defined that states that the length evaluation is to be performed a specified period of time before the program is scheduled to be presented, or a specified period of time before the first content item is next scheduled to be presented (e.g., within 1 second, within 15 seconds, within 30 seconds, 1 day or other period of time prior to the next presentation of the first content item). Optionally in addition or instead, the rule may specify a specific day and/or time at which the length evaluation is to be performed.

The process may examine the first content item (e.g., the content item metadata that indicates the advertisement length and/or the content item length) to determine the current total content item length (including the advertisement from the advertisement server). For example, the process may optionally use an API to access the content item length without the advertisement from the content hosting system.

At block 806, a determination is made as to whether the current total content item length is shorter than the allocated first span of time for the first content item. If the total content item length is shorter than allocated first span of time for the first content item (or for multiple content items in a given program), at block 808, the process may identify and select other content to fill out the time (e.g., the time=the first span of time–current total content item length). The fill-in, supplemental content may be selected based on its length and optionally based on its relevancy to the program and/or on other criteria (e.g., subject, source, creator, posting date, popularity, etc.). If the process determines that the content item is shorter than the allocated first span of time, the process may identify fill-in content, which may be in the form of one or more video content items or other content items (e.g., still images, blogs streams, etc.).

Optionally, the process may select fill-in, supplemental content that is longer than the time period that needs to be filled in, and will truncate or edit out the excess content corresponding to the time that exceeds the period that needs to be filled in. Optionally, if the process selects fill-in content that is longer than the time period that needs to be filled in, the process may delete other content from the program to compensate (e.g., the process may delete previously included promotional/advertising content for other programs). The fill-in content may correspond to the subject matter of the program, may be promotional content for other programs, or may be advertisement content for one or more products or services. Optionally, the fill-in content may be retrieved from a pool of content items maintained by the process or from one or more other sources. By way of example, a pool of fill-in content items may have been manually or automatically identified for the specific program (e.g., a dedicated program pool). The process may then select the fill-in content item from the program pool based at least in part on the similarity to the length (in time) of the content item underrun.

At block 812, the fill-in, supplemental content is streamed during the program.

As noted above, the length of a given content item (e.g., a video clip) in a program may vary for a variety of reasons, such as a change in the time length of an advertisement (e.g., a video advertisement). In the previous example, the total content time length for an item of content (e.g., including an item of primary content and an advertisement) decreased from when the item of content was originally scheduled as part of a program. However, it is also possible that total content time length for an item of content (e.g., including an item of primary content and an advertisement) may increase from when the item of content was originally scheduled as part of a program. This increase in time may also be caused by content buffering delays on a user's terminal or elsewhere. Buffering delays may be reported to the system by the content player (which may be a third party content player utilized by the unified content player executing on the user terminal) and/or the system may infer a delay from playback status information from the content player. For example, the content player may report the current position in time and/or by frame of the playback of content, and the system may compare the report current position to the scheduled position to determine if there is a playback delay on the user terminal.

Thus, for example, if a program was scheduled to run for 30 minutes, but at the scheduled viewing time the total content time length of an item of content included in the program is 30 seconds longer than originally scheduled (of if there was a 30 second buffering delay), the total time for the program will now be 30 minutes and 30 seconds. In order to deal with this technical challenge, an example technique is to truncate the end of the program (e.g., the last 30 seconds) to ensure the next program begins as scheduled. However, this may provide an unpleasant user viewing experience, as a key portion of the program may be cut off.

Another technique, sometimes referred to herein as a time shift adjustment process, that may optionally be used is to enable a first program to be shown to the user without truncation, even if the first program overruns its scheduled time (as scheduled in the electronic program guide), and to delay the playback of the next, adjacent program so that the next, adjacent program does not start until 30 seconds (or other delay period) after its scheduled start time. For example, the delay may be determined by calculating the time difference between an amount of time originally allocated for a given item of content and the actual play time. Optionally, the electronic program guide may be dynamically adjusted to reflect the extended time of the first program and/or the delayed start and/or end of the next program (and optionally of still additional subsequent programs). Optionally, the electronic program guide is not adjusted to reflect the extended time of the first program and/or the delayed start and/or end of the next program. As discussed herein, the various items of content included in a program may optionally be streamed to the user terminal from various content sources for playback via a content player.

Optionally, in the situation where the user may experience a time shift (e.g., as a result of an advertisement that ran longer than its allocated time or as a result of buffering delays), the time shift adjustment process may choose to not play or inhibit playing of one or more upcoming advertisements in order to allow the program or channel being viewed by the user to 'catch up' to the originally scheduled "live," non-time shifted timeline.

The foregoing technique may be dynamically performed on a viewer-by-viewer basis. Thus, if a first user is viewing the first program (with the extended time), then the next, adjacent program start time may be delayed, as discussed above. However, if a second user is not viewing the first program (or had been viewing the first program but without delays, such as might be caused by buffering on the first user terminal), but then begins viewing the next, adjacent program (e.g., by selecting the next, adjacent program via the electronic program guide), the next adjacent program will begin playing to the second user via a content player at the originally scheduled time.

Thus, two different users watching the same time-scheduled program may actually view them with a time shift comprising a relative time skew (e.g., 30 seconds apart in this example), where the relative time skew may be based on changes in program length of one or more programs being viewed by one user that are not being viewed by another user or an a playback delay (e.g., a buffering delay) that might affect one user but not another user. Further, optionally the electronic program guide of the first user is dynamically adjusted to take into account the extended length of the first program, while the electronic program guide of the second user is not dynamically adjusted.

As similarly discussed above, changes in time length of a given item of content may be determined from metadata accessed via an API from the content source. Optionally, content buffering or other data may be accessed from a user terminal to determine if a display of a given item of content is being delayed as a result of buffering or other delays.

Figures 9, 10:
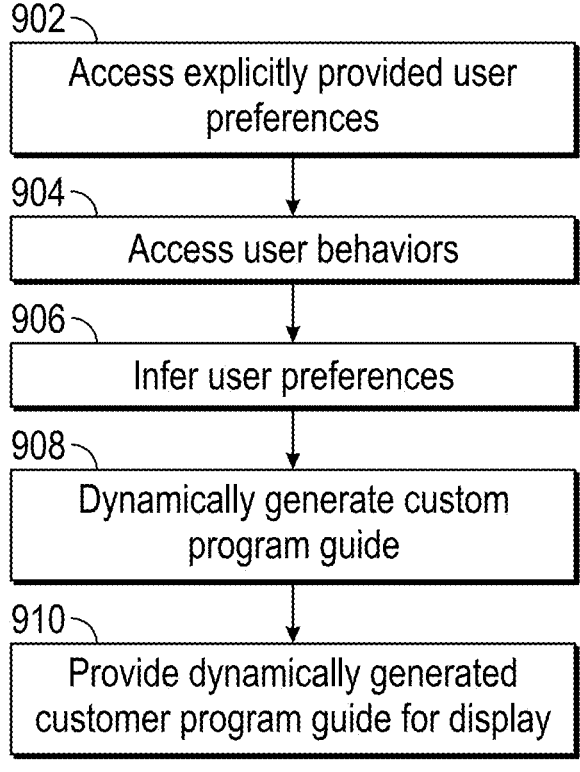

Referring now to FIG. 9, an example process for dynamically generating a customized program guide is discussed. The process may optionally be performed using the program guide generation module discussed above. At block 902, explicitly provided user preferences are accessed. For example, explicitly provided user preferences may be accessed from user account information which stores genre, program, subject matter, content and/or channel likes and/or dislikes, user specifications of channels to be blocked, user reminder instructions, user bookmarks, etc., previously provided by the user.

At block 904, user viewing behavior (e.g., how long a user watches content per day or week, how many times in a specified time period the user changes channels, how often per specified time period the user tries a new channel or show (a channel or show the user has not previously viewed), etc.) and viewing history may be accessed. At block 906, inferred user preferences may be determined or accessed. For example, a user's likes and/or dislikes may be inferred from the user's viewing history, user navigation, and viewing behavior, etc. By way of illustration it may be inferred that the user's most viewed channels in a specified past time period (e.g., the last 30 days) are the user's most preferred channels. On the other hand, if a user frequently switches to a specific channel for short periods of time (e.g., a sports news channel), the process may infer that, even though the user does not spend long period of time viewing the channel, the channel is still a strongly preferred channel.

At block 910, a personalized, dynamically generated program guide is generated based at least in part on the explicitly provided user preferences and/or the inferred user preferences. For example, the explicitly provided user preferences and/or the inferred user preferences may be used in determining the ordering of channels in the electronic program guide (e.g., which channels are presented first, second, third, etc.); which, if any channels are to be excluded from the program guide (e.g., channels that the system determines are of low interest to the user); which channels are to be highlighted (e.g., via color, animation, pop-up interfaces or otherwise, etc.), what types of information are to be included in the program guide, etc. The personalized, dynamically generated program guide may then be provided for display to a user terminal.

Referring now to FIG. 10, an example process for automatically assembling a program from multiple content items will be discussed. The process may optionally be performed using the automatic program generation module discussed above. At block 1002, a user interface is provided via which a programmer (where the programmer programs shows and may be unfamiliar with software programming languages) can specify criteria and rules for selecting content items for a program. For example, the user interface may enable a programmer to specify a name for the program, keywords associated with the subject matter of the program, a program length, a maximum content item length, a minimum content item length, the desired content-type (e.g., recorded video clips, still images, social media postings, blog streams, etc.), content sources (e.g., content hosting sites), content item popularity thresholds, content item author popularity thresholds, social influence ratings (e.g., scores or rankings), etc.

At block 1004, the process identifies content that satisfies the specified criteria, and ensures that the total length of the assembled of the content items, optionally including advertising, does not exceed the specified program length by keeping a running total of the item content being added to the program. For example, the process may access, via various content hosting APIs, associated metadata to determine if the criteria are met before selecting a given content item to be included in the program. For example, as part of the process of determining if a given item of content matches keywords included in the criteria, the process may compare keywords specified by the programmer to tags associated with the item content to determine if there is a match.

At block 1006, the process assembles the program, including the selected content items, and programs the content items to appear in a specified order. The program may then optionally be included in a program guide, and users may access and view the program via their user terminals.

Referring now to FIG. 11, an example process for dynamically generating a program or channel is described. The process may optionally be performed using the automatic program generation module discussed above. The process may be performed in substantially real time. The generated content may include non-scheduled content and/or content not specifically selected by the user (e.g., where the program or channel is not simply a playlist defined by the user). At block 1102, the process detects a user activation of a dynamic program generation control (sometimes referred to herein as a randomizer control) presented via a user interface of a user terminal.

At block 1104, the process accesses from memory dynamic program generation (randomizer) rules. For example, the randomizer rules may include one or more of the following: do not include more than a specified number of content items from the same author, do not include more than a specified number of content items from the same source, do not include content items longer than a first specified length, do not include content items shorter than a second specified length, the dynamically generated program shall be a first specified length, only include content meeting a specified popularity threshold, only include content from authors meeting a specified popularity threshold, only include content from authors meeting a specified social influence rating threshold, etc.

At block 1106, the process accesses user account information (e.g., explicitly provided user preferences (e.g., including likes and/or dislikes)), inferred user preferences (e.g., including likes and/or dislikes), user specifications of channels to be blocked, user reminder instructions, user bookmarks, user viewing history, user navigation and viewing behavior, etc.). The process selects one or more content items based at least in part on the user account information and/or the dynamic program generation rules. At block 1108, the process dynamically generates a program using the selected content and causes the content to be streamed to the user terminal.

Referring now to FIG. 12, an example process for fast forwarding or rewinding through a programmed composed of content items from multiple content sources (e.g., video hosting sites, etc.) is described. The process may optionally be performed using the unified player module discussed above.

At block 1202, a program comprised of multiple items of content from multiple sources (e.g., from a plurality of content hosting servers operated by different entities) is being streamed to a user terminal. For example, the program may include a first content item from a first source and a second content item from a second source. The user issues a content navigation instruction by activating a content navigation control, such as a fast forward control or a rewind control. At block 1204, a determination is made as to whether execution of the navigation instruction will cause a content boundary will be traversed. For example, the process may determine whether a fast forward operation, began while the first content item is being streamed from a first source, will exceed the length of the first content item. If the fast forward operation, began while the first content item is being streamed from a first source, will exceed the length of the first content item, then at block 1206, the fast forward process proceeds through the first content item from the first source (e.g., with selected frames from the first content item being presented during the fast forward process), and at block 1208, the fast forward process proceeds through at least a portion of the second content item from the second source (e.g., with selected frames from the second content item being presented during the fast forward process).

Optionally, timing of placement of ancillary content, such as interstitials (e.g., advertisements, games, quiz, informational content, etc.), during a program may be dynamically determined to enhance or maintain user engagement with the program and/or the ancillary content. Optionally, such a determination may be made individually for a given user, or for a set of users that share specified common characteristics (e.g., have similar preferences for watching interstitial and/or program content, live in the same or similar region, have similar demographics, and/or the like). The programs and/or interstitials may be streamed to or downloaded from a server to a user device for viewing. Advantageously, network bandwidth may be more efficiently utilized by avoiding streaming or downloading content that the user is likely to navigate away from.

Such enhanced user engagement with ancillary content makes it less likely that a user will navigate away from a current program to a new program (or other content), which would result in new resource (e.g., content) requests. Frequent user navigation puts increased demand on content servers and on the networks used to communicate requests for new content to content servers. Thus, by scheduling ancillary content so as to reduce user navigation events and resource requests reduces server and network loading, addressing the technical problem of managing server and network loading.

For example, the system may determine a user's tolerance for viewing a certain type of ancillary content, such as an interstitial (e.g., advertisements), when displayed during or between programs. Certain users may enjoy watching advertisements, other users may be relatively indifferent to advertisements, while still other users may so dislike advertisements that they will often or typically navigate away from a program in response to an advertisement being played. The system may monitor a user's response to advertisements (and/or other ancillary content) during programs and detect, measure, and score the user's response to such advertisements.

Optionally, an algorithm may be used to generate an advertisement tolerance score (e.g., where the higher the user's tolerance for advertisements, the higher the score). The score may be used to decide the placement in time in a program, relative to the start of the program, of one or more items of interstitial content, as played to a user via a user device. In addition or instead, the score may be used to decide the length of one or more items of interstitial content to be served to the user device for playback. In addition or instead, the score may be used to decide how many items of interstitial content are to be served to the user device during the program. In addition or instead, the score may be used to decide the subject matter and/or type of one or more items of interstitial content to be served to the user device.

For different users watching the system program at the same time on their respective terminals, the system may cause different time placement of items of interstitial content (relative to the beginning of the program) to be played, different interstitial content lengths to be played, and/or different items of interstitial content to be played. Optionally, users having the same or similar scores (e.g., with less than a 20% or less than a 10% variance) may be assigned to the same class of users, where users of the same class may be treated the same or similarly with respect to distribution of interstitials for a given program or category of programs.

For example, user interactions with and/or responses to advertisements may be monitored. By way of illustration, a system, such as system 102, can detect when (with respect to time of day and/or relative to the beginning of a program) and how often a user has fast forwarded through advertisements and/or how often a user has navigated away from a channel during an advertisement. If the ad is an interactive ad (e.g., configured to navigate the user to a website or present information in response to the user click on the advertisement), the system may further track how often the user has interacted with interactive advertisements. The system may be configured to detect/determine more detailed information such as some or all of the following examples:

how many seconds (or other time unit) into an advertisement the user navigated away from or fast forwarded through the advertisement;

how many seconds (or other time unit) into a sequential series of advertisements (where program content is not presented between advertisements in the sequential series of advertisements) the user navigated away from or fast forwarded through the advertisements;

the number of advertisements in a sequence of advertisements the user viewed before navigating away from or fast forwarded through the advertisements;

the number of advertisements in a non-sequential series of advertisements (where program content is presented between advertisements in the sequential series of advertisements) the user viewed before navigating away from or fast forwarded through the advertisements;

how many seconds (or other time unit) into a non-sequential series of advertisements (where program content is presented between advertisements in the sequential series of advertisements) the user navigated away from or fast forwarded through a given advertisement;

how the user responded to an advertisement (e.g., viewed the advertisement, fast forwarded through the advertisement, rewound through the advertisement to watch it again, changed channels, clicked on the advertisements) based on its placements in a program stream (e.g., placed at the beginning of a program, midway through a program (or other time position within a program), at the end of the program, between programs, or the like);

how the user responded to an advertisement at a given time of day (e.g., viewed the advertisement, fast forwarded through the advertisement, rewound through the advertisement to watch it again, changed channels, clicked on the advertisements), and/or other user behavior information discussed herein (e.g., other user behavior information stored in user behavior data store 164).

Similar user behavior information may be detected, stored, and used to determine placement for other types of interstitials (e.g., games, program information, etc.).

Optionally, the system will cause a predetermined amount of interstitials to be displayed during a program regardless of a user's historical response to interstitials, but may vary the placement of interstitials based on the user's historical response to interstitials. For example, the interstitial placement may be based on some or all of a user's historical responses to interstitials and/or other user behavior information, so as to increase the likelihood that the user will view and/or interact with interstitials.

Figure 22:
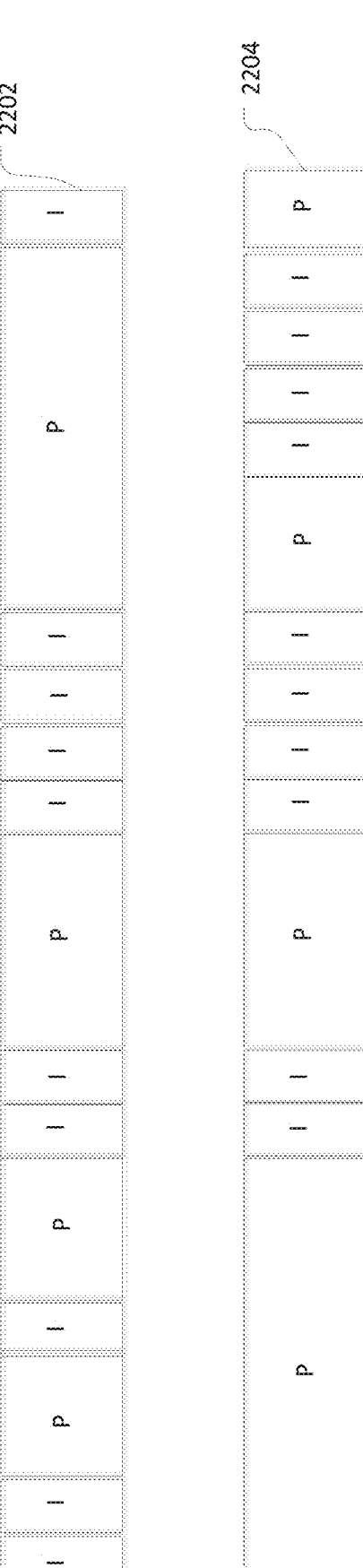
FIG. 22 illustrates examples of different positioning of interstitial content for different users.

By way of illustration and with reference to the example illustrated in FIG. 22, 10 interstitials may be displayed during a program to two different users. For the first user 2202, whose history indicated a high tolerance or preference for interstitials (e.g., advertisements), 2 interstitials may be scheduled to be immediately played before the beginning of the program and the other 8 interstitials may be distributed throughout the program (including during the first quarter of the program) and immediately after the program. For the second user 2204, whose history indicated a low tolerance for interstitials (e.g., advertisements), no interstitials may be displayed immediately before the program begins or during the first third of the program, and the 10 interstitials may be distributed through the last two thirds of the program. Thus, for the second user 2204, the display of interstitials may be delayed to enable the second user to have sufficient time to be fully engaged in the program, and hence less likely to navigate away from the interstitials (e.g., to another program on a different channel). The detected first and second user reactions to the interstitials may be further used in determining when to display interstitials for future programs.

A prediction/scheduler system may include an artificial intelligence engine employing machine learning or other process that may be utilized to determine an optimum placement of interstitials for a given user or class of users. For example, the artificial intelligence engine may make vary interstitial placement for a given user and learn which placement tends to result in the highest likelihood that the user will view all the interstitials (or the greatest number of interstitials) with respect to a given program.

As will be described, the prediction/scheduler system may utilize one or more of a deep neural network, a generative adversarial network, a genetic algorithm, a rules engine, a knowledge graph, a generalized Fibonacci sequence, a clustering algorithm, a recommender algorithm, and/or other technique for predicting user reactions to interstitial placements and for using the predictions to determine and schedule placement of such interstitials (e.g., to maximize the amount of interstitials viewed and/or interacted with).

The prediction and/or scheduler technique used may be selected based on one or more criteria. For example, certain techniques may be faster, more accurate, require less training data, and/or require less computer resources (e.g., less memory or processor bandwidth) than other techniques, and such factors may be utilized to selecting the optimum technique for a given situation.

By way of illustration, genetic algorithms may require less training data than neural networks (which need a sufficient number of representative examples in order to be configured to capture the underlying structure that enables the neural network to generalize to new cases). Further, genetic algorithms may, in certain scenarios, generate relatively higher-quality solutions to optimization problems. However, a genetic algorithm may take a longer time to find an acceptable solution. By contrast, a neural network may take longer to train, but then can almost instantly classify new inputs using relatively less processing bandwidth.

As similarly discussed above, there may be several algorithms/techniques that may be used to predict a given user's (or class of users') response to different placements of interstitials and to determine an optimum placement of interstitials for a given user or class of users. Such algorithms/techniques may be stored in respective pools of algorithms/techniques.

The best performing algorithm/technique may be identified from the pool, and selected for use for a given user or class of users (e.g., based on the average performance of the algorithm/technique). The algorithm/technique selection algorithm may take into account the speed with respect to finding a solution, the accuracy in identifying the optimum interstitial placement (e.g., as determined by the amount of interstitials a user is predicted to watch), the amount of training data needed, the processor bandwidth needed, and/or the amount of memory needed. The selection may be dynamic or static. The selection may be performed periodically or in response to certain events (e.g., detection of a new video program or other item of video content about to be streamed).

The inputs to a given prediction and/or scheduler model/engine may include some or all of the historical user viewing and/or behavioral information discussed herein. For example, an artificial intelligence engine may be configured to identify correlations between the input information and the user's historical responses to interstitials at various placements. The correlations may then be used in performing predictive analytics to determine how a user will respond to various placements of interstitials in a future program.

As discussed above, the prediction/scheduler system may optionally include a learning engine comprising a neural network. The neural network may include one or more layers (e.g., hidden layers) of one or more nodes. A given node may input one or more items of information, such as a user's historical responses to interstitials (e.g., change programs, fast forward, rewind, etc.) during one or more programs. The node may differently weight various inputs.

The weighted inputs may be summed and a function may be applied to the summed weighted inputs to generate a prediction as to a user's response to an interstitial for a given placement in a given program. The prediction may be compared to the user's actual historical response. If there is a difference, the difference constitutes a prediction error. The weights may be adjusted and the prediction may be performed again to determine if the error has decreased or increased. The weights may be repeatedly adjusted until the error cannot be reduced any further or until a certain number of iterations have been performed. A gradient descent process may be utilized to reduce the error.

The weights for such minimized error may then be used to predict a future user response to a given interstitial placement, and hence in determining where to place such interstitials.

Optional techniques for determining a user's response to interstitials (or other ancillary content) will now be described. As discussed above, a user's behavior with respect to interstitials and program content may be determined. For example, a user's interaction with content, such as a program and interstitial content, may be determined using a video player that reports such interactions via a video playback application programming interface (API) or plug-in. A program (e.g., a JavaScript program) executed by an application, such as a browser, may be utilized to obtain and set the current playing position. By way of further example, video player requests for content decryption keys may be used to determine a user's behavior with respect to interstitials and program content (e.g., did the user view the interstitial, fast forward through the interstitial, skip the interstitial, rewatch the interstitial, etc.).

By way of illustration, a request may be received over a network from a user device, for an item of content, such as video content. Interstitial content may be accessed and segmented, and the segments may be encrypted. A given decryption key for a given interstitial content segment may be associated with a respective locator, such as a URL. A manifest file may be generated that includes locators corresponding to decryption keys for respective encrypted interstitial segments. The manifest file may optionally further include locators corresponding to segments of the requested item of video content and segments of the interstitial content. The generated manifest file is transmitted to the user device. A request for a first decryption key for an encrypted first interstitial segment may be received from the video player on the user device, and based at least in part on the request, a playback position of the video player may be determined.

Example techniques for determining a playback position and whether a user has played or fast forwarded through content, such as interstitial content, are also described in U.S. patent application Ser. No. 15/714,931, filed Sep. 25, 2017, and titled "METHODS AND SYSTEMS FOR DETERMINING A VIDEO PLAYER PLAYBACK POSITION", the content of which is incorporated herein by reference in its entirety.

Figure 23A:
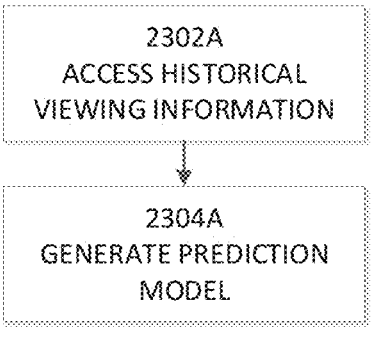
FIGS. 23A-23B illustrate an example process for generating a prediction model and updating the prediction model.
Figure 23B:
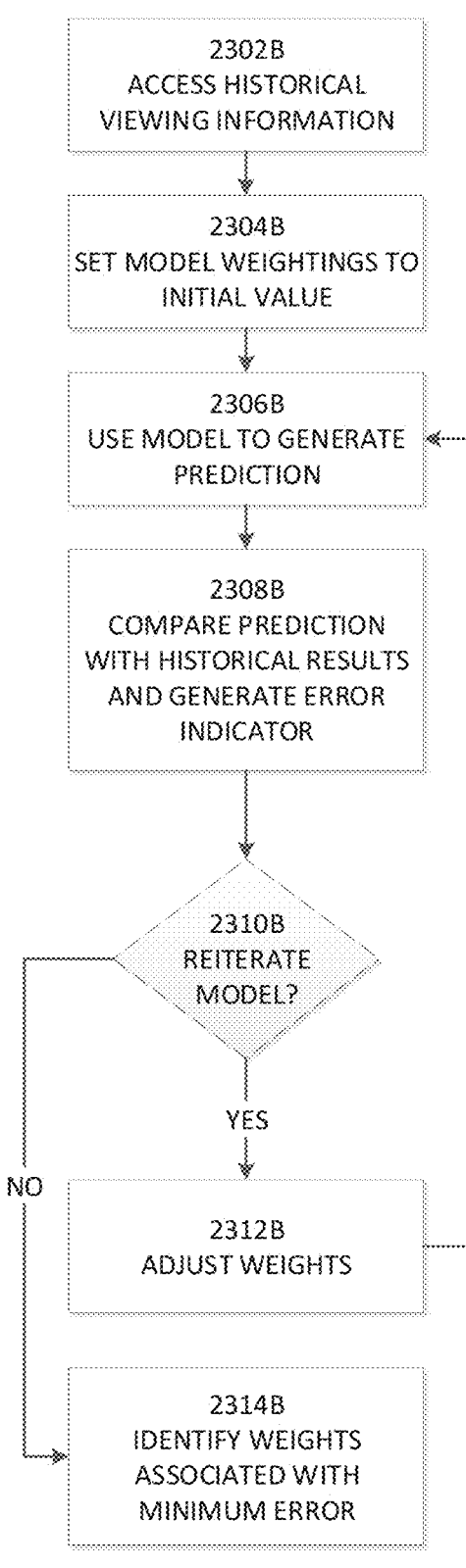

FIGS. 23A-23B illustrate an example process for generating a prediction model that may be used to predict how a given user or class of users will respond to a given placement of interstitials. Referring to FIG. 23A, at block 2302A, historical viewing and interaction information is accessed from a data store. Optionally, expressly provided user preference information may be accessed as well. The historical viewing and interaction information may include some or all of the viewing and interaction information discussed elsewhere herein with respect to interstitials and/or program content. Similarly, the preference information may include some or all of the user preference information discussed herein. Other information, such as the location of the user device when a given item of content associated with navigation information was played by the user device, the date/time when a given item of content associated with navigation information was played by the user device, metadata associated with the given item of content, and/or behavior information for social connections of the user, may optionally be accessed from a data store.

At block 2304A, some or all of the information accessed at block 2302A may be used to generate a prediction model that predicts how the user will respond to potential interstitial presentations with respect to a program.

FIG. 23B illustrates an example process of generating a predictive model in greater detail. At block 2302B, historical viewing, interaction, and/or preference information is accessed from a data store as similarly discussed above with respect to block 2302A. At block 2304B, input weights for the model may be set to an initial value. For example, all weights may be set to the same value (e.g., 1) or to different values. At block 2306B, a first prediction is made using the inputs and associated weights. The prediction predicts a user response for a historical placement of interstitials for which the user's actual response is known. At block 2308B, the prediction is compared the user's actual response and an error indication is generated reflective of the divergence of the prediction from the user's actual response. At block 2310B, a determination is made as to whether the error indication should be fed back into the predictive model in an attempt to improve the model's accuracy. For example, a fixed value may be used to determine how many times the model is to be trained. By way of further example, if the error indication is below a specified threshold, the training loop may be stop.

If a determination is made that the error indication should be fed back into the predictive model in an attempt to improve the model's accuracy, the process proceeds to block 2312B and the model weights are adjusted. The process then proceeds back to block 2306B, and the predictive model is executed again using the adjusted weights.

If a determination is made that the training loop should be halted, the process proceeds to block 2314B, and the error indications produced are analyzed and the weights associated with the lowest error indication are identified and selected for use.

Figure 24:
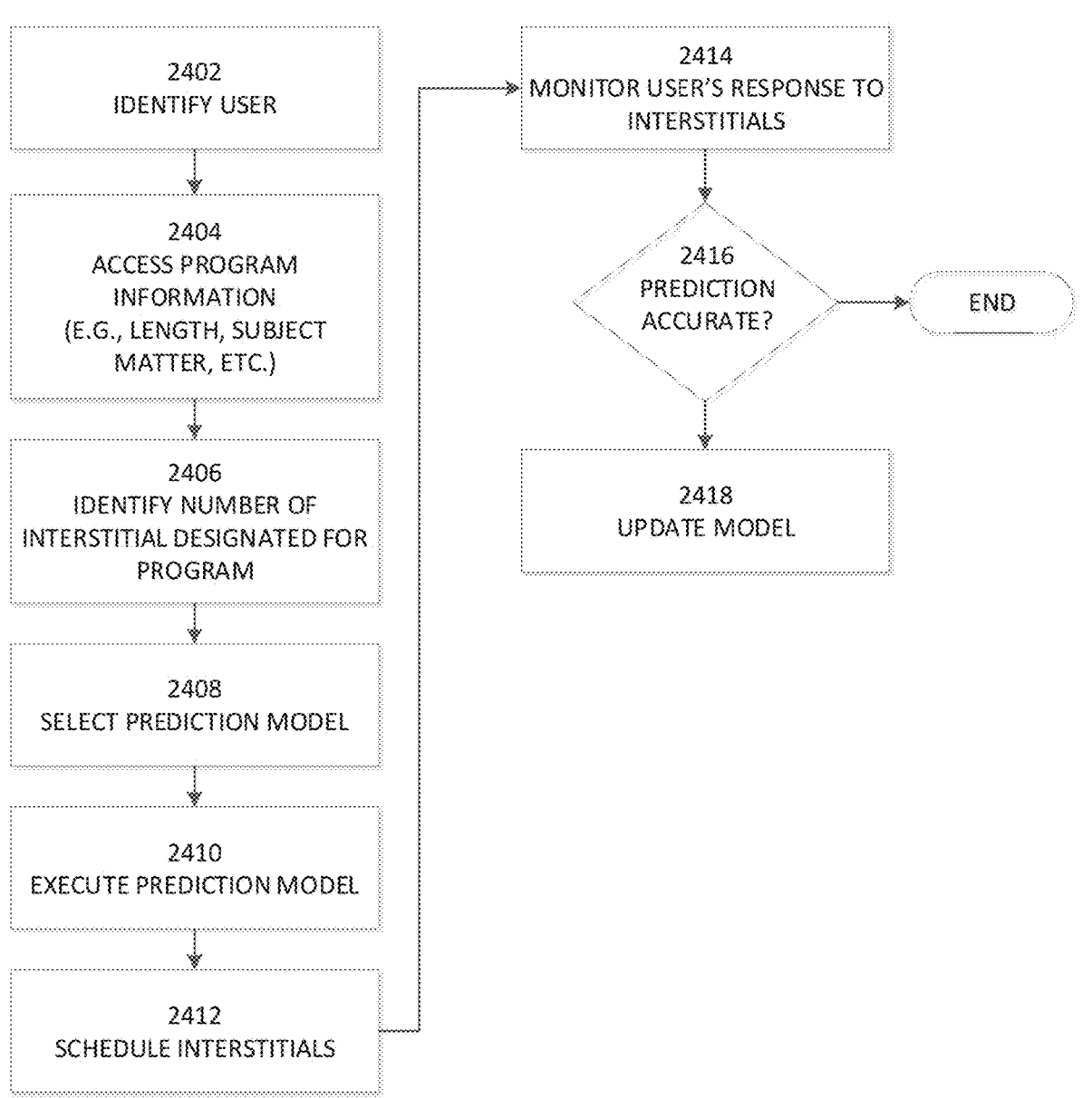
FIG. 24 illustrates an example process for determining interstitial placement.

FIG. 24 illustrates an example process for determining ancillary content (e.g., interstitial) placement. At block 2402, the user is identified. The user may be identified via user log-in information, a unique user device identifier, or otherwise. Optionally, the class (indicating interstitial tolerance) to which the user has been assigned may be identified as well. At block 2404, information (e.g., metadata/tags) is accessed regarding the program into which interstitials is to be inserted. For example, the program information may include program length, subject matter, actors/performers, writer, director, and/or other program information discussed herein.

At block 2406, the number of interstitials designated for the program is identified. For example, the number of interstitials designated for the program may have been included in metadata associated with the program, may be based on the length of the program, may be based on the subject matter of the program, may be based on the day/time the program is being streamed to the user, or a combination of two or more of the foregoing criteria. Optionally, different criteria may be associated with different weightings so that the relatively more important criteria may be more heavily weighted than less important criteria.

At block 2408, a prediction model may be selected that predicts how the user will respond to potential interstitial presentations with respect to a program. The selected prediction model may have been generated using the process illustrated in FIG. 23B or FIG. 26 (described elsewhere herein). The prediction model may have been optimized for the user, and may be selected based on the user identifier. The prediction model may have been optimized for a class of users (e.g., users having similar or within a specified range of tolerance scores or other similarities described herein) to which the user belongs. The prediction model may optionally also utilize some or all of the program information in generating prediction.

At block 2410, the prediction model is executed. A prediction model may be executed multiple times in serial fashion (to reduce the amount of memory and processor utilized at a given time) or in parallel (to reduce the amount of time needed for execution) with different proposed placements of interstitials to predict how the user will react to the given interstitial placements. A score may be generated that reflects the likelihood that the user will view all interstitials for a given interstitial placement.

At block 2412, based on the output of the prediction model, the determined number of interstitials are scheduled to enhance the probability that the user will watch the interstitials. For example, a determination may be made (e.g., using the score generated at block 2410) as to which interstitial placement will likely result in the user watching the largest amount of interstitials (as measured by time and/or the number of interstitials). Other factors may be used in addition to or instead of the prediction in determining interstitial placements. For example, there may be a requirement that a certain interstitial or set of interstitials be displayed at a certain time or within a certain portion of a video program, and those particular interstitials may be accordingly scheduled for display, while other interstitials may be scheduled in accordance with the predictions of user reaction.

At block 2414, the user's response to the interstitials is monitored. For example, some or all of the following may be monitored:

which interstitials the user viewed (e.g., without fast forwarding or skipping);

how many seconds (or other time unit) into an interstitial the user navigated away from or fast forwarded through/skipped the interstitial;

how many seconds (or other time unit) into a sequential series of interstitials (where program content is not presented between interstitials in the sequential series of interstitials) the user navigated away from or fast forwarded through/skipped the interstitials;

the number of interstitials in a sequence of interstitials the user viewed before navigating away from or fast forwarded through/skipped the interstitials;

the number of interstitials in a non-sequential series of interstitials (where program content is presented between interstitials in the sequential series of interstitials) the user viewed before navigating away from or fast forwarded through/skipped the interstitials;

how many seconds (or other time unit) into a non-sequential series of interstitials (where program content is presented between interstitials in the sequential series of interstitials) the user navigated away from or fast forwarded through/skipped a given interstitial;

how the user responded to an interstitial (e.g., viewed the interstitial, fast forwarded through/skipped the interstitial, rewound through the interstitial to watch it again, changed channels, clicked on the interstitials) based on its placements in a program stream (e.g., placed at the beginning of a program, midway through a program (or other time position within a program), at the end of the program, between programs, or the like); and/or other user behavior information discussed herein At block 2416, the user's response to the interstitials is compared to the predicted response, and if the actual response is sufficiently close to the predicted response, the process ends. Otherwise, at block 2418, the prediction model is updated based on the actual user response. For example, the prediction model weights (such as those discussed elsewhere herein with respect to the optional neural network utilization) may be iteratively updated and the updated prediction compared to the actual user response until the prediction and actual user response are within a matching threshold.

As noted above, more than one technique/algorithm may be used in select in predicting a user response to various interstitial placements and more than one technique/algorithm may be used in selecting which prediction technique/algorithm to utilize. Optionally, multiple techniques/algorithms may be used in combination to perform predictions and/or to select a prediction algorithm. For example, genetic algorithms may be used in conjunction with a neural network.

By way of illustration, one or more genetic algorithms may be used to generate hyperparameters for a neural network. Hyperparameters are variables which determine the neural network structure (e.g., the number of hidden layers) and the variables which determine how the network is trained (e.g., the learning rate).

For example, a population of several neural networks may be created, with initial or random hyperparameters assigned thereto. The neural networks weights may be iteratively trained (with the different neural networks trained sequentially or in parallel), and the resulting training cost may be calculated. In addition, a fitness score/cost of each neural network may be calculated (which indicates how well a given iteration performed).

The fitness score may reflect how accurately the algorithm predicts how a user will react to a given placement of interstitials in a video program. The fitness score may be used to increase the chances of a given neural network "reproducing," where the higher the fitness score, the higher the chance the neural network will reproduce. For example, the top N number (e.g., top 2) of performing neural networks (e.g., as determined by their fitness scores) may be selected. In addition, one or more random neural networks may be selected. The "genes" of the selected neural networks may be crossed over to create/breed one or more children neural networks. The children neural networks may be iteratively trained as discussed above, their fitness scores may be calculated, the top performing children may be selected, and the process may be repeated again. Finally, the process may be halted and the final selected child neural network may be used.

Figure 25:
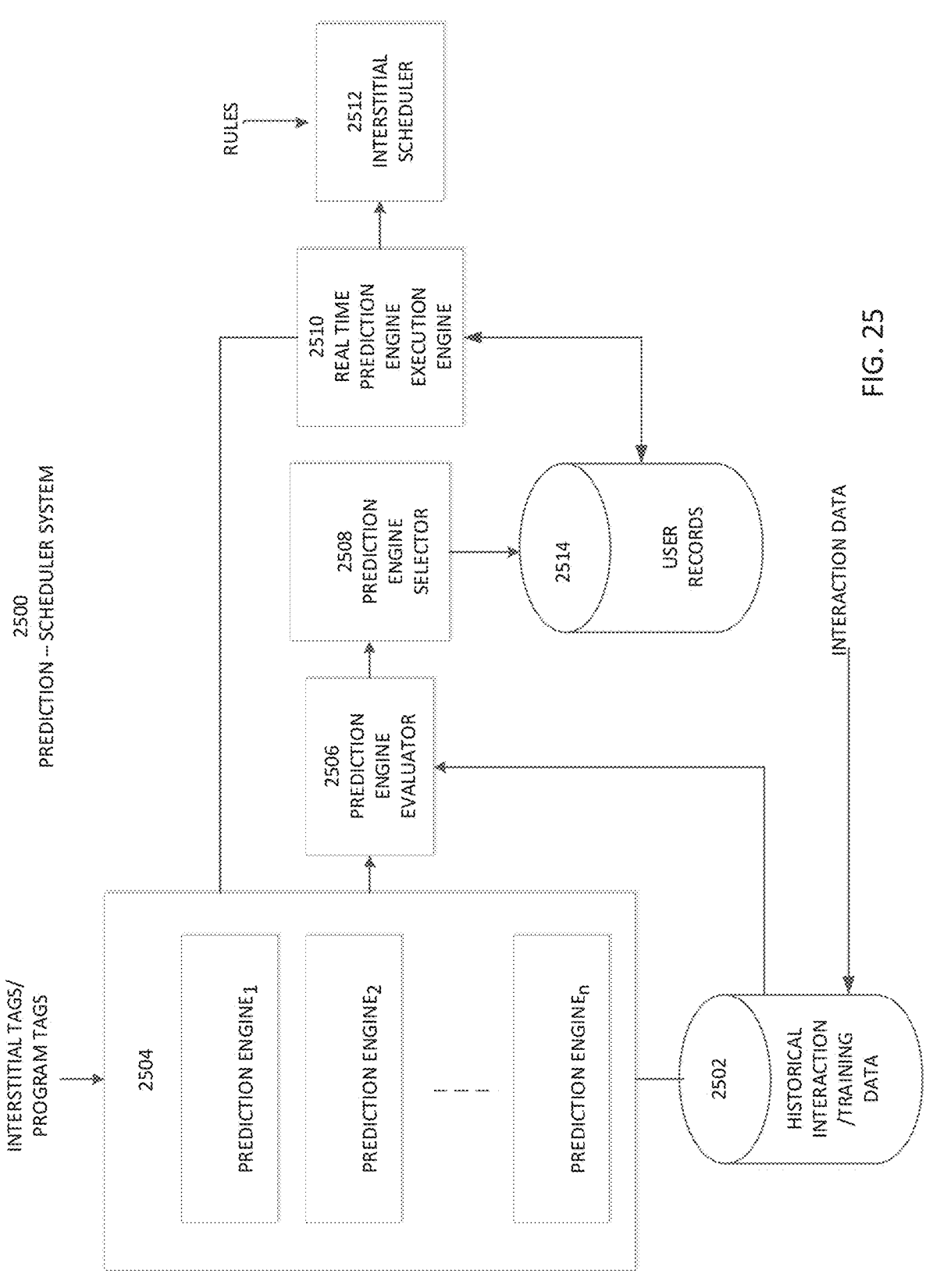
FIG. 25 illustrates an example prediction and scheduler system architecture.

FIG. 25 illustrates an example prediction and scheduler system 2500. In this example, a pool 2504 of prediction engines (e.g., prediction models) are provided. The pool 2504 may be homogeneous (where all the prediction engines are of the same type) or the pool 2504 may be heterogeneous (including different types of prediction engines). For example, the prediction engines may include engines that utilize deep neural networks, generative adversarial networks, genetic algorithms, rules, knowledge graphs, generalized Fibonacci sequences, clustering algorithms, and/or other techniques.

The prediction engines may access historical user interaction data and/or training data stored in a data store 2502, such as the monitored interaction data discussed above, in generating predictions of user responses to different placements of interstitials. In addition, user preference information (such as that discussed elsewhere herein) may optionally be utilized by the prediction engines in generating predictions. In addition, interstitial tags and/or video program tags (e.g., title, descriptive, subject matter, categorization, length, subject, or other tags) may be accessed and utilized by the prediction engines. For example, if a program tag indicates a subject matter that matches a user subject matter preference, a prediction engine may predict that the user is more likely to watch interstitials even if placed early on in the program. By contrast, if a program tag indicates a subject matter that does not match any user subject matter preference, a prediction engine may predict that the user is not likely to watch interstitials if placed early on in the program (but may be more willing to watch interstitials if placed later in the program).

Prediction engine evaluator 2506 may evaluate predictions made by predictions engines in the pool 2504. For example, as similarly discussed elsewhere, a fitness score may be generated for each engine which reflects how accurately a given engine predicted a user's response to interstitials when compared to actual user responses (e.g., accessed from the data store 2502 or using real time user responses).

A prediction selection engine 2508 selects, for a given user or class of user, a prediction engine from the prediction engine pool 2504. The prediction selection engine 2508 may perform the selection using the corresponding evaluations performed by the prediction engine evaluator 2506. In addition, the prediction selection engine 2508 may utilize other factors in performing the selection. The prediction selection engine 2508 may take into account the speed with respect to finding a solution, the accuracy in identifying the optimum interstitial placement, the amount of training data needed, the processor bandwidth needed, and/or the amount of memory needed. The selection may be dynamic or static. The prediction selection engine 2508 may perform the selection periodically or in response to certain events (e.g., detection of a new video program or other item of video content about to be streamed).

For example, the prediction selection engine 2508 may use a formula such as that provided below, in determining whether a given prediction engine is to be selected:

$$\text{Performance value}=w_1 n_1 \text{Fitness\_score}+$$
$$w_2 n_2 \text{Processor\_utilization}+$$
$$w_3 n_3 \text{Memory\_utilization}+$$
$$w_4 n_4 \text{Speed\_performance}+w_5 n_5(1/$$
$$\text{Amount\_of\_training\_data})$$

Where:
  w=weight
  n=normalization factor
  Fitness score=average accuracy in predicting user reaction to interstitial placement
  Processor_utilization=percentage of processor time utilized when executed
  Memory_utilization=amount of memory utilized
  Speed_performance=the amount of time to generate a prediction Amount_of_training_data=the amount of data needed to train the algorithm The evaluation process performed by predication engine evaluator 2506 and the prediction engine selection process performed by the prediction engine selector 2508 may be performed in batch mode for multiple users or class of users, optionally at a time selected based at least in part on system loading data. For example, the processes may be performed when processing systems and memory are generally less utilized (e.g., between 12 AM-4 AM, on weekends, etc.). The prediction engine selection may be stored (e.g., in the form of a prediction engine identifier) in associated user (or user class) records. This technique reduces peak loading on system resources thereby address the technical problem of managing system loading to ensure there is adequate processor and memory bandwidth to support resource demands.icall A prediction engine execution module 2510 may be configured to access and execute a selected prediction engine, optionally in real time. For example, when a user is watching a channel of video programs, immediately before the beginning of a given program (e.g., within 30 or 60 seconds of the beginning of the program), a service request may be made to the prediction engine execution module 2510 to execute a prediction engine. The service request may include a user identifier. The prediction engine execution module 2510 may utilize the user identifier to access the associated prediction engine identifier from the user records data store 2514, and then execute the accessed prediction engine. The prediction engine may generate predictions for multiple different potential scheduling of interstitials. The interstitial scheduler 2512 may evaluate the predictions and select the schedule that is predicted to result in the most amount of view interstitials. Optionally, one or more rules may be taken into account when performing the scheduling. For example, a rule may indicate that a given interstitial must be streamed/played within a first time period (e.g., the first 5 minutes) or last time period (the last 10 minutes). Certain interstitials may be scheduled in according to the rules, while other interstitials may be scheduled to maximized the likelihood that the user will view the interstitials.

FIG. 26 illustrates an example optional process for generating a prediction engine or an interstitial scheduler using a genetic algorithm. At block 2602, a fitness function may be accessed. Optionally, different fitness functions may be selected and used for different categories of video programs or interstitials. At block 2604, two or more existing models (e.g., prediction models or scheduling models) may be selected and executed. At block 2606, a threshold number of top performing models may be identified (e.g., using a fitness core generated using the select fitness function). For example, the models may be selected from a pool of models. At block 2610, the threshold number of top performing models may be used to generate one or more children models. For example, "genes" of at least two top performing models may be crossed over to create/breed one or more children models. The children models performance may be evaluated and compared to that of a parent model. If the performance (e.g., the survival rate) of a child is better than that of a parent, optionally the child model will replace the lower performing parent model in the pool.

As discussed above, systems and processes are described configured to enable ancillary content pods, ancillary content placement, and/or ancillary content pod durations to be adjusted on a user-by-user basis and/or a user cohort-by-user cohort basis (where a cohort may contain multiple users) to thereby provide tailored, targeted ancillary content loads, placement, and durations even when providing a linear, scheduled viewing experience of programs/episodes. Further, the disclosed systems and processes enable different ancillary content loads to be assigned to different channels of linear scheduled content and to different geographical areas of users.

The disclosed systems and processes improve computer system functionality, enabling real time modification of ancillary content pod lengths on a user-by-user or cohort-by-cohort basis, while reducing memory, processor, and network utilization. Optionally, the ancillary content pod lengths may be configured by channels, device types, regions, cohorts, and/or the like. Thus, the ancillary content pod length may be adjusted based on a number of factors. This contrasts with conventional systems that are unable to dynamically modify the length of ancillary content pods and the playback of ancillary content pods, and instead can only use pre-specified pod lengths and can only playback ancillary content pods at scheduled times. Further, systems and processes are described that manage the effects of communication interruptions between various systems to enable a channel of streaming content to continue being streamed without interruption.

For example, as described elsewhere herein, a given ancillary content segment (e.g., ad pod) may be assigned a predetermined time duration. However, different items of ancillary content (e.g., advertisements, previews of an upcoming program, a quiz, etc.) may have different lengths, as similarly discussed elsewhere herein. Further, there may not be sufficient ancillary content of a desired type (e.g., paid advertisements) available when requested for a given pod.

One option to address an underrun of content in a pod would be to simply use placeholder content (e.g., a video to fill or help fill an otherwise not fully-filled pod). However, such use of placeholder videos may provide an inadequate user experience. Further, when such placeholder content is used, providers of other ancillary content may not obtain a desired number of views for a given item of ancillary content. Still further, the access and streaming of such placeholder content may introduce undesirable latencies. Therefore, an enhanced solution is desired.

Further, unfilled pods may disadvantageously cause programs for a given channel of linear streaming content to drift from their published scheduled times so that the channel no longer matches the program guide schedule. Such de-synchronization may conventionally require a large amount of computer resources to manage.

Further greatly adding to the difficulty in addressing such drift is that, in many instances, different users or cohorts of users may be presented with different combinations of ancillary content for a given pod (e.g., ads targeted for a particular user type), even while watching the same primary content on the same linear, programmed channel with scheduled episodes. Because pods for a given user may be populated differently than for other users viewing a given item of primary content on a given channel, the under-fill of a given ancillary content pod may be different for different users. Thus, different users viewing the same streaming channel associated with a content schedule may experience different amounts of drift, and indeed, some users may not experience any drift. Yet further adding to the challenge of managing drift where there are multiple channels of linear programmed streaming content, is addressing the scenario where a user is switching back and forth between two or more channels, where it may be important not to lose track of drift associated with the user for each of the channels.

As discussed above, in order to address such technical difficulties in synchronizing streaming content playback across multiple users and user devices (where users may view the same primary content but different ancillary content (e.g., different ads)), a given ancillary content (e.g., interstitial) pod duration may be adjusted on a user-by-user or cohort-by-cohort basis so that the starting time of a program (or program segment) subsequent to the ancillary content pod may be adjusted accordingly on a user-by-user (or cohort-by-cohort) basis. In the following discussion regarding various scenarios, ancillary content pods will be presented in program breaks or between programs (as opposed to as overlays while a program is being viewed).

Figure 27:
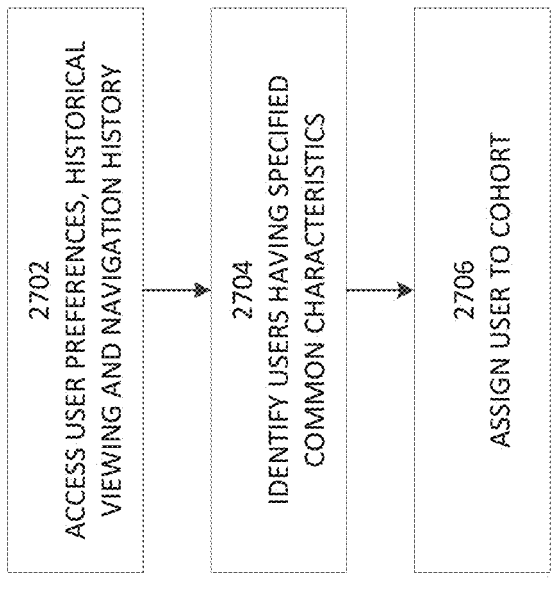
FIG. 27 illustrates an example process configured dynamically to modify and populate ancillary content pods.

FIG. 27 illustrates an example process configured to assign a user to a cohort, where a cohort may contain a set of users randomly or having one or more common characteristics. For example, as user may be assigned to a cohort based on how new a given user is as a user of the streaming service, optionally a given user's demographics (e.g., gender identification, age, marital status, geolocation, education level, income level, etc.), a given user's historical viewing history (e.g., which channels and programs the user has watched, how often the user watches a given channel or program, how long a user watches a given program or channel, etc.), expressly specified or inferred user preferences (e.g., genre, program, subject matter, content and/or channel likes and/or dislikes; user specifications of channels to be blocked; user reminder instructions regarding a given program; user bookmarks of a given program; other user preferences discussed herein; and/or the like), user navigation history (e.g., whether the user navigated away from an item of primary or ancillary content directed to a given subject matter (e.g., a given genre, or if the ancillary content is an ad, a given brand), fast forwarded through an item of primary or ancillary content directed to a given subject matter, skipped an item of primary or ancillary content directed to a given subject matter, replayed an item of primary or ancillary content directed to a given subject matter, interacted with an item of primary or ancillary content directed to a given subject matter (e.g., clicked on a link in an item of content, responded to a question or quiz posed by item of content, played a game provided by an item of content, and/or the like), and/or other criteria. Optionally, certain personally identifying data or other personal data may not be used in assigning a person to a cohort to enhance privacy.

At block 2704, a set of user characteristics (e.g., some or all of the foregoing data) may be accessed from a corresponding user account record from a corresponding database, such as a database described elsewhere herein. Users having specified user characteristics (e.g., a specified set of user characteristics, a threshold number of the user characteristics, or a minimum specified combination of certain characteristics) may be identified.

At block 2706, users that satisfy criteria for qualifying for a given cohort (e.g., having specified user characteristics needed in order to be a member) may be assigned to the cohort. For example, the criteria may be configured to group users together in a cohort that have certain similar content genre preferences, channel preferences, brand preferences, viewing behavior (e.g., time spent watching one or more channels, navigation patterns, etc.), and/or one or more specified demographic characteristics (e.g., age, gender, income, education level, marital status, number of children, geographical location, etc.).

As discussed above, an ancillary content load may be separately determined for a given user or cohort of users. In addition, each viewer or cohort may optionally be associated with a different duration for a given ancillary content pad (e.g., ad pod).

Optionally, a pod duration (e.g., an ad pod duration) may be set based at least in part on one or more specified rules. Different rules may be applied to different individual users and/or different cohorts. For example, a pod duration may have a fixed time length or a specified maximum time length, or the duration may be set as a percentage of total content (primary content and associated ancillary content), as a percentage of the primary content (which may be referred to as the ancillary or ad load), and/or the like.

Optionally, a pod duration determination process may determine which pods displayed during an item of primary content or between items of primary content are to have their lengths modified (e.g., shortened). Further a determination may made as to which ancillary content pods are to have their duration lengthened so as to compensate for the shorting of the duration of other ancillary content pods (where the change in time length may be distributed over multiple pods) in order to resynchronize a user's viewing experience to a channel schedule.

For example, if a user accesses a channel and begins watching a program after it has already begun playing (so that the user has missed some or all of the program, and the time remaining in the program is therefore less than the entire program time length), in order to maintain an acceptable ancillary content load, if the load was specified as a percentage, rather than determining the pod length based on the total length of the primary content, an updated pod length may be calculated based on the time length of the primary content remaining relative to at what point the user began viewing the primary content.

Pod length duration may also be modified as a result of a pod underfill condition. As discussed above, in certain instances a pod may not be fully populated. The not-fully populated pod may have its duration correspondingly reduced. The unfilled time may then be distributed to future pods, thereby correspondingly extending the time length of one or more future pods. The future pods may be populated using one or more types of ancillary content (e.g., unpaid-for ancillary content or paid for ads). The distribution of unfilled time may be based on one or more specified rules, and those rules may be different for different users/different cohorts, different programs, and/or different channels. For example, for certain users or cohorts it may be preferable (from the perspective of a user's experience) to display more ancillary content towards the end of a program, while for other users or cohorts it may be preferable to display more ancillary content towards the middle of the program, and the rules may reflect such preferences.

When the ancillary content load is adjusted for a given user or cohort, the user will no longer be viewing the primary content as originally scheduled. For example, if a 90 second pod (scheduled to be presented between a first segment and a second segment of a program) is adjusted so that it is 60 seconds, those users being presented with the shortened ancillary content pod will then view the second segment of the program earlier than those whose pod is not shortened. Thus, the viewers viewing the shortened pod will be viewing content that has "drifted" forward from the channel schedule so that the second segment is streamed and played ahead of schedule. Optionally, when streaming and showing content ahead of schedule, future channel timelines may be preprocessed and cached for fast and reliable accessibility thereby advantageously making the system and streaming process more resilient to database faults, as a significant amount of content to be streamed is already cached.

However, as discussed elsewhere herein, for certain types of programs, such as live programs having a set starting time, the system may determine that it is not possible to begin streaming the program earlier than the set starting time, and that the set starting time is a hard "anchor." In such a situation, the system may determine that a given pod length is not to be shortened and may also perform a resynchronize the user's viewing experience to the anchor to compensate for any drift.

Thus, for example, a process configured to dynamically modify the duration and population of ancillary content pods may be applied on a user-by-user basis or a user cohort—by user cohort basis. Such pod duration modification may result in drift, which may correspond to a time difference between the timing of content provided to the user and the content's scheduled time in an original timeline/schedule. Using the disclosed processes, drift may be tracked for a given user or cohort on a per-channel basis relative to a timing schedule for that channel, resulting from the adaptive placement and playing of ancillary content. Further, when a user switches between a first channel and a second channel, there may be drift across multiple channels that needs to be tracked. Disclosed herein are processes for tracking drift for multiple channels during a user session. In addition, the disclosed systems and processes enable a rule to be implemented specifying a maximum permitted drift for a given channel or channel time period. For example, optionally, a maximum permitted drift may be specified for a time period (e.g., 8 hours, 12 hours, 24 hours, or other time period) and/or for a number of sequential programs on a channel.

Drift may optionally be calculated based on the last "stitchable" in a content stream to a user device, from the start of each call processing. A stitchable may be defined as a unit of time corresponding to an item of content. For example, a stitchable may be defined to be the entire time length of a program or as a segment of a program. The process will map the adjusted timeline for a user or cohort resulting from drift to determine when the next stitchable (e.g., program or program segment) will begin. When tracking drift, the process may store an associated channel identifier, a timeline identifier, a stitchable type (e.g., clip, advertisement, advertisement pods, etc.), stitchable identifier (e.g., clip identifier, ad pod identifier identifier), and/or user stream ending time (e.g., in UTC (Coordinated Universal Time) time). Because the drift information may include a channel identifier, drift may be tracked for multiple channels accessed by a user during a user session.

Optionally, to reduce computer processor and memory utilization, drift is only calculated when needed (e.g., to backfill content into a pod). For example, the drift value may be updated upon adding a stitchable to the content stream being streamed to the user device. Optionally, the calculated drift will only be stored if the process determines that the drift value is greater than a specified threshold (e.g., zero seconds, one second, or other threshold), thereby reducing memory utilization. If the drift value does not satisfy the threshold, the drift value may be deleted or overwritten with other data, conserving memory.

In certain instances, it is possible that in response to a request for ancillary content of a certain length to populate an ancillary content pod having the corresponding length, the returned ancillary content will be longer than requested. For example, as described elsewhere herein, a video stitcher service may transmit a request to an ancillary content load tuning microservice, which in turn may request and receives one or more clip identifiers (clipID(s)) from a database. In response to determining that the returned ancillary content is longer than the length of the corresponding pod, the pod length (time duration) may be correspondingly lengthened so that is long enough to contain the returned ancillary content. The returned ancillary content may be streamed to a user device during the lengthened ancillary content pod. The next item (e.g., segment) of primary of content, associated with a corresponding scheduled start time, may be streamed immediately after the items of ancillary content associated with the lengthened ancillary content pod are streamed to the user device, and later than a corresponding previously scheduled start time of the item of primary content. One or more subsequent ancillary content pods may have their time lengths shortened so as to cause a future item of content to be streamed in accordance with its scheduled start time, thus synchronizing content streaming back to a previously specified content streaming schedule. The shortened ancillary contents may be populated via requests for ancillary content having corresponding lengths. Such ancillary content may then be streamed to the user device at times corresponding to their respective ancillary pods.

Examples of drift and drift-types will now be discussed with reference to the figures.

Figure 28:
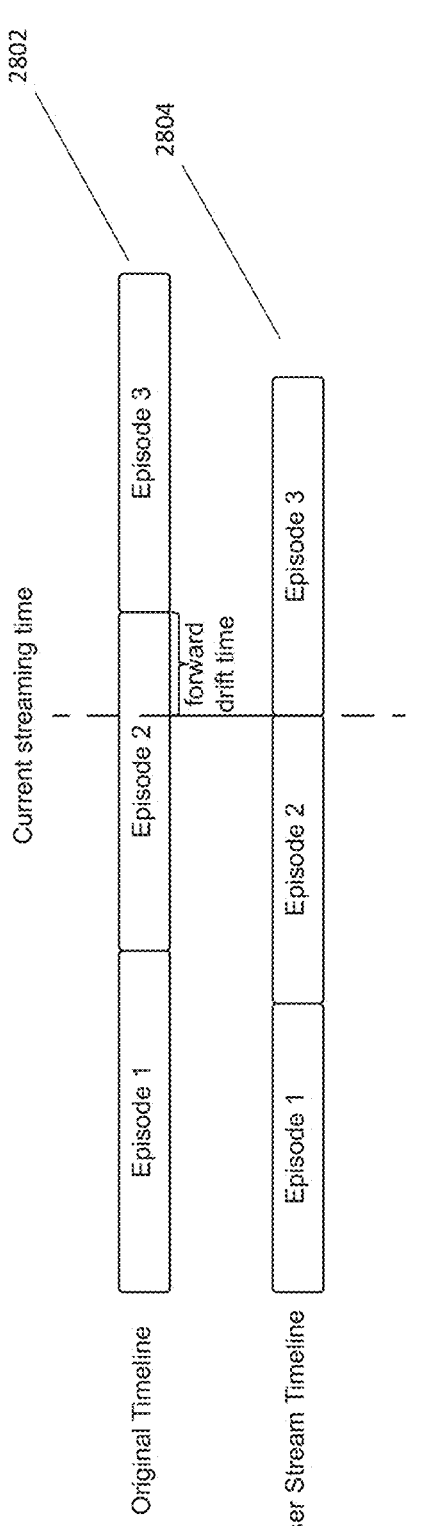
FIGS. 28 and 29 illustrate example content timelines with drift.

Drift may be in a forward direction (which may be referred to as forward drift) or in a backward direction (which may be referred to as backward drift). FIG. 28 illustrates an example of forward drift. The original content timeline 2802 including Episodes 1, 2, and 3 is illustrated. The original timeline 2802 may correspond to a linear channel in a published electronic program guide listing multiple channels of streaming programs and associated scheduled program (e.g., episode) start and end times as similarly discussed elsewhere herein. A given episode as positioned in the timeline may include (between the episode start time and end time) one or more ancillary content pods.

In the illustrated example of FIG. 28, a user timeline 2804 has Episode 3 beginning before its scheduled time (and hence diverging from the original timeline 2802) by an amount referred to as the forward drift time. As similarly discussed above, such forward drift may be the result of an underfilled pod, where the pod time length is correspondingly shortened from the pod's originally scheduled length. Other viewers (such as viewers in different cohorts) may not experience such drift (because their pods were fully populated) and hence such viewers may view episode 3 beginning at the original scheduled time as indicated on original timeline 2802. In order to synchronize the drifted user timeline with the original timeline 2802, the system may increase the length of one or more subsequent pods, scheduled to be presented during (or after) Episode 2, for an aggregate amount corresponding to the forward drift time.

A maximum allowed forward drift may be specified. The maximum allowed forward drift may be a configurable value (e.g., a time value). Once the maximum allowed forward drift time threshold is met, the viewer's viewing experience may be resynchronized with the original timeline corresponding to the program guide (e.g., by extending a pod duration and populating the extended pod duration). The maximum allowed forward drift time and the actual determined forward drift time may be stored for each channel the user has viewed in the current user session (e.g., prior to the user turning off the user's device being used to view the channel content, or logging out or closing the application used to view the channel content). This enables the drift to be kept track of even when the user switches back and forth between channels (e.g., by selecting among channels via the program guide), thereby enabling an accurate determination to be made as to whether the maximum allowed forward drift threshold has been satisfied.

Figure 29:
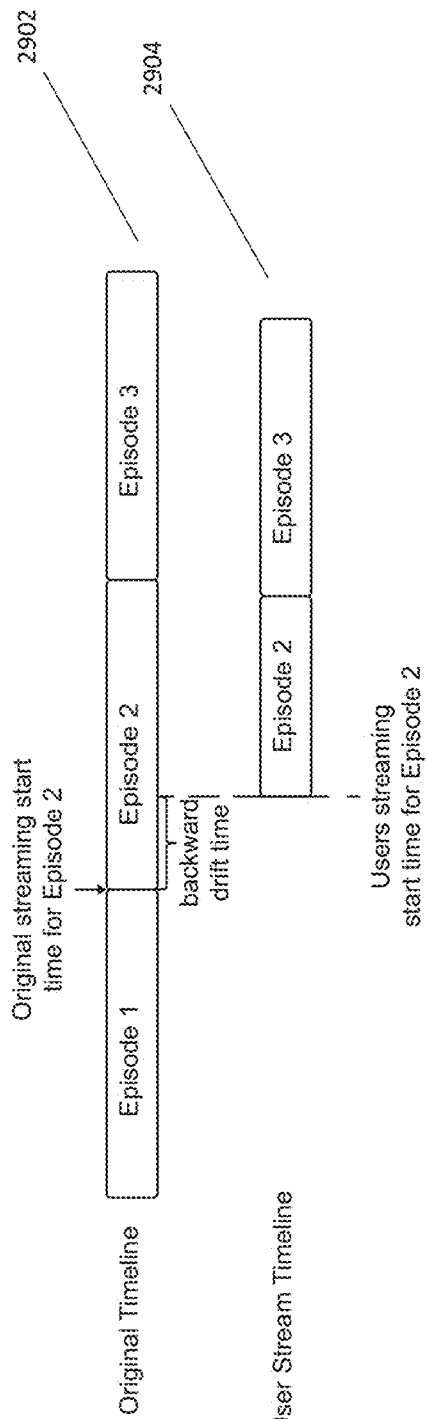

FIG. 29 illustrates an example of backward drift (where primary content is presented later than scheduled in the program guide). The original content timeline 2902 (including Episodes 1, 2, and 3) is illustrated. As similarly discussed above, the original timeline 2902 may correspond to a published electronic program guide listing multiple linear channels of streaming programs and associated program start and end times. In this example, a user timeline 2904 has Episode 2 beginning after the scheduled time (and hence diverging from the original timeline 2902) by an amount referred to as the backward drift time.

The backward drift may be the result of a user switching from one channel to the channel corresponding to timeline 2902 in what would be the middle of Episode 2 according to the published schedule. Rather than have the user miss the beginning of Episode 2, the system may begin streaming Episode 2 to the user device from the episode beginning even though it has an earlier scheduled start time. Thus, the user will view the beginning of Episode 2 later than the originally scheduled time (and later than viewers that are not subject to backward drift). By way of further example, if the user changes channels or begins watching the channel corresponding to timeline 2902, and an advertisement included in an ad pod is scheduled to be playing, the system may instead begin streaming the primary content of Episode 2.

In order to synchronize the user with the original timeline 2902, the system may reduce the length of a pod scheduled to be presented during (or after) Episode 2. A maximum allowed backward drift may be specified. The maximum allowed backward drift may be a configurable value (e.g., a time value), which may correspond to the calculated approximate drift acquired during the corresponding timeline. The maximum allowed backward drift time and the actual determined backward drift time may be stored for each channel the user has viewed in the current user session.

Once the system determines that the maximum allowed backward drift time threshold is met, the user's viewing experience may be resynchronized with the original timeline corresponding to the program guide (e.g., by shortening the duration of one or more pods by a commensurate amount). The maximum allowed backward drift time and the actual determined backward drift time may be stored, in associated with a channel identifier, for each channel the user has viewed in the current user session (e.g., prior to the user turning off the user's device being used to view the channel content, or prior to logging out or closing the application used to view the channel content). This enables the drift to be kept track of even when the user switches back and forth between channels (e.g., by selecting channels via the program guide), thereby enabling an accurate determination to be made as to whether the maximum allowed backward drift threshold has been satisfied for a given channel.

Certain additional aspects of dynamically configuring ancillary content pods will now be described. Various variables may be utilized in configuring an ancillary content pod, including a maximum allowed drift variable, a permitted pod load variation variable, one or more variables specifying the maximum percentage of a pod duration that may be populated for corresponding content types (e.g., house advertisements (a self-promotional advertisement for the streaming service), public service announcements, quizzes, paid advertisements, etc.), a drift strategy variable, an ad load variable, a backfill strategy variable, and/or a backfill transitions variable. Different variable values may be specified for different cohorts of users, for users or user devices in different geographical areas, and/or for different channels. For example, the foregoing variables may be selected so as to control drift in a manner configured to enhance a user's viewing experience so as to encourage a user to remain on a given channel and to encourage a user to continue using the streaming services provided by the system operator.

The foregoing ancillary content pod configuration variables are described below. Variable values may be specified by a user via a user interface or via a learning engine (e.g., an artificial intelligence engine) using a data interface (e.g., an API). For each variable type a default value may be specified (e.g., as appropriate: a default integer value, such as "0", "1", or "2"; a default Boolean value, such as "true" or "false", or an alphanumeric value, such as "a" "b" "c").

As discussed above, a maximum forward drift time may be specified. For example, the maximum forward drift time may be specified with sufficient precision so as to permit flexibility in backfilling content while being able to closely resynchronize a user's viewing experience to an original timeline. By way of illustration, the maximum forward drift time may be specified in units of milliseconds or centiseconds. Once the threshold is exceeded, a synchronization process may be performed to bring the user's viewing experience back to the original scheduled timeline. For example, one or more items of backfill content may be selected and inserted into the user's timeline until synchronization is achieved. Optionally, to ensure that desynchronization does not inadvertently become practically difficult to deal with (e.g., with respect to the amount of memory and processor resources needed to keep track of such drift), a default maximum permitted forward drift time may be set (e.g., in the range of 600000 milliseconds-12000000 milliseconds, or other desired value) which can then be modified as needed.

Backfill content may include, by way of example, filler, targeted, indirect, and/or repurposed content. By way of example, filler content may be a graphic. Targeted content may be manually tagged as such. By way of further example, indirect content may be dynamically chosen based at least in part on attributes such as duration, category, subcategory, genre, and/or subgenre.

Repurposed content may comprise content programmed to be streamed and played earlier on the same channel. Advantageously, such repurposed content may likely be appropriate for the channel as backfill content (e.g., with respect to genre or theme) as it had already been previously programmed to be streamed on the channel.

Some or all of the backfill content may optionally be stored in a clip cache which may utilize high-speed memory (e.g., solid state memory, such as RAM, rather than rotating magnetic or optical disc memory that has inherent mechanical delays) to reduce latency. Preferably, backfill content inserted into a stream is selected so as it is not repetitive and is not truncated arbitrarily.

A permitted ancillary content pod load variable may specify the percentage of a given episode (including primary content and ancillary content) that may be populated during ancillary content (e.g., an advertisement, public service announcement, etc.). A permitted ancillary content pod load variation variable may specify how much, in terms of a percentage, the actual ancillary content pod (e.g., advertisement pod) load may vary from a scheduled, programmed ancillary content pod load. Optionally, a default permitted pod load variation variable may be specified (e.g., 100%, meaning that the permitted ancillary content pod load will not be more than 100% of the programmed ancillary content pod load). Optionally, a given ancillary content pod length is predefined as a percentage of the maximum programmed time. Optionally, a given ancillary content pod length is predefined as a maximum ancillary content length for a given episode, and then ancillary content load tunning services may adjust the length as described herein.

Variables, specifying the maximum percentage of a pod duration that may be populated for corresponding content types, may include a variable for house ads (a HouseAdMax variable). The HouseAdMax variable value may limit the percentage of requested pod durations populated using house ads. For example, if the HouseAdMax is set to 0%, then the requested pod duration will not be populated with any house ads (which may provide an enhanced user viewing experience). If the HouseAdMax is set to 50%, then up to 50% of the requested pod duration may be populated with house ads (although the actual percentage may be lower, such as where there is preferred other ancillary content available, such as paid advertisements). By way of further example, if the HouseAdMax is set to 100%, then there may be no limits placed on the population of the requested pod duration with house ads.

In order to maintain the ancillary content load, paid advertisements may be used to populate the pods to partly or entirely make up for the lack of house ads (e.g., when the HouseAdMax variable is set to 0%). Thus, where the HouseAdMax is set to 0%, the video services stitcher may issue a pod content request (e.g., an ad break request with the requested break duration and the ad load configuration) to an advertising ad proxy/ad pod service for the paid advertisements. The ad proxy/ad pod service may in turn request, over a network, advertisements from one or more remote advertising platforms.

Similarly, a PaidAdMax variable may be provide a similar function as the HouseAdMax variable to thereby provide the capability to limit the amount of paid ads used to satisfy a programmed ad load (e.g., by specifying a maximum percentage of a pod that may be populated using paid advertisements).

Figure 35:
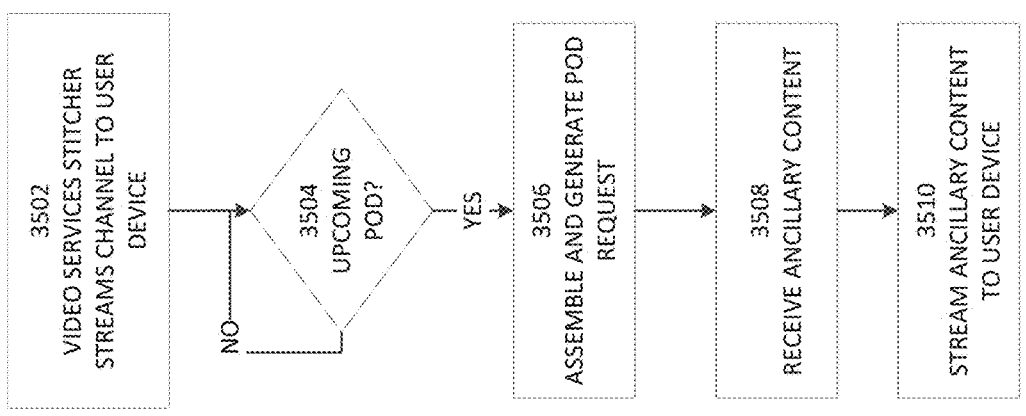
FIG. 35 illustrates an example ancillary content request servicing process.

Referring now to FIG. 35, an example process for requesting, assembling and streaming content for a pod (e.g., an ad break pod) is illustrated. At block 3502, a video services stitcher streams primary content for a linear channel of programmed content to a user device. At block 3504, a determination is made by the video services stitcher as to whether there is a scheduled upcoming pod (e.g., an ad pod) within a specified period of time (e.g., in the range of the next 5 seconds to 10 minutes).

If a determination is made that there is an upcoming pod, at block 3506, the video services stitcher may assemble and generate a request for ancillary content with which to populate the pod. The request may include, by way of example, the duration, metadata from the current primary content episode/clip, a JSON Web Token (JWT) token with some or all of the user session information discussed herein, and the ancillary content load configuration (which may include a cohort identifier and the HouseAdMax and/or the PaidAdMax values discussed above). The load configuration may be cached and readily accessed from the local high-speed memory (where it may be stored in order reduce system latency). Optionally, to better manage storage of a large number of load configurations, the configurations may be stored in the database, in high-speed memory, divided by channel, into multiple keys (where data is stored as a key/value pair).

The ancillary content pod (e.g., ad break pod) duration may, by way of example, be determined by the video services stitcher using information regarding the programmed timeline/episode, information regarding ad break locations in the episode, and the maximum ad break time specified for the episode. The JWT token may be compatible with an open standard (e.g., RFC 7519) that defines a compact and self-contained, digitally signed way for securely transmitting information between parties as a JSON object, that can be verified via the signature. The request may be transmitted to the pod service. At block 3508, the pod service may access or request ancillary content and may cause the ancillary content to be streamed to the video services stitcher. At block 3510, the video services stitcher may stream the ancillary content at the appropriate time to the user device for display.

Figure 30:
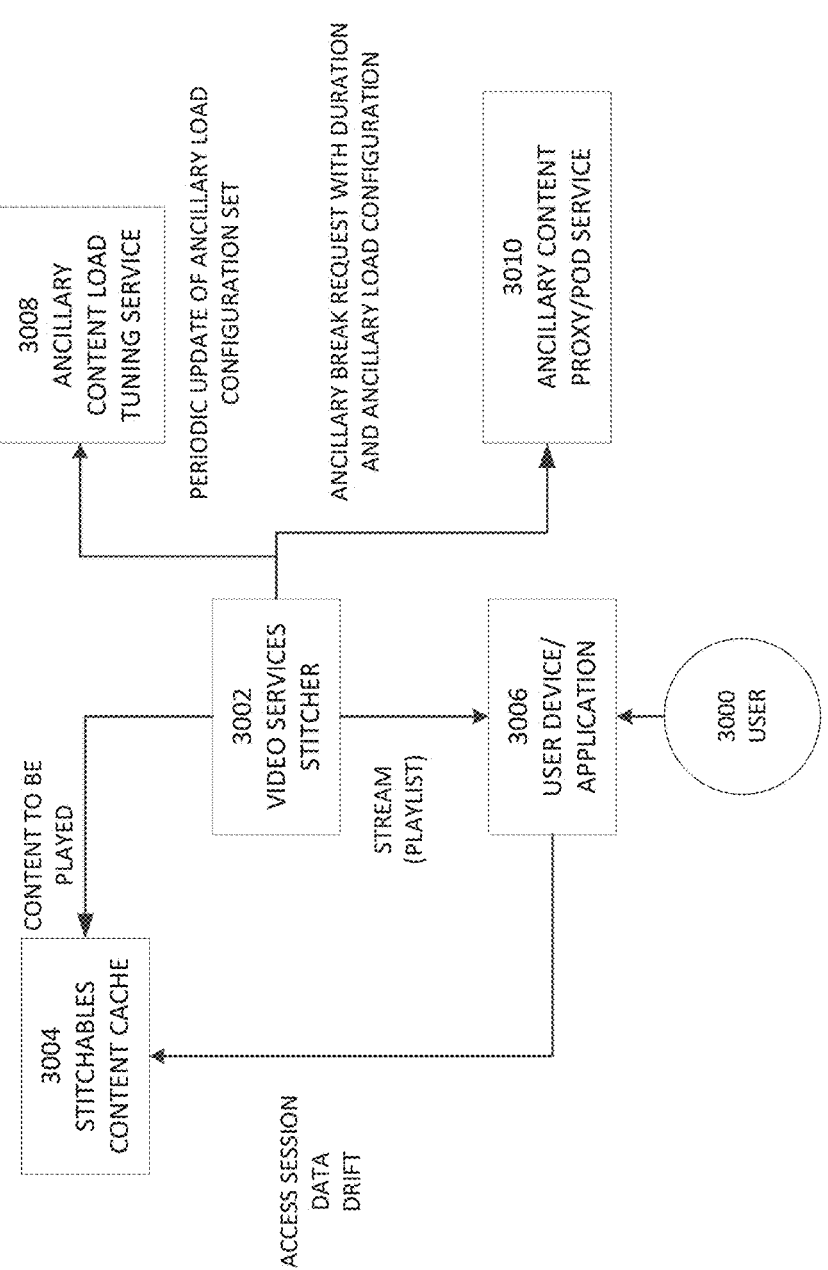
FIG. 30 illustrates an example architecture configured to dynamically modify and populate ancillary content pods.

Referring now to FIG. 30, an example architecture configured to perform a timeline management process is illustrated. A user device 3006 may include a streaming Internet media player, a smart television, a mobile device, a desktop computer, a smart wearable device, an augmented reality device, a virtual reality device, or other user device configured to transmit requests for streaming content and to receive and display streaming content. The user device 3006 may (e.g., via a browser or dedicated application hosted by the user device 3006) initiate streaming of a channel of linear content and/or video on demand content. For example, a user 3000 accessing the user device 3006 may open a dedicated application configured to request and receive streaming content from video services stitcher 3002. The application may enable the user 3000 to select a channel of linear programmed content as similarly described elsewhere herein (e.g., by touching, pointing, and/or clicking on a channel presented via an electronic program guide).

The video services stitcher 3002 may have already accessed one or more ancillary content load configurations (e.g., ad load configurations), which may optionally be stored in a primary database in relatively slower memory (e.g., a rotating memory device, such as a magnetic or optical disk drive). A given ad load configuration may utilize some or all of the foregoing configuration variables. The configuration structure may optionally include some or all of the following data (and optionally still additional data, such as a video on demand identifier):

channelID(s)—the channel identifier(s) of the channel(s) the configuration is to be applied to;

VoD(s)—the video on demand identifier(s) of the video on demand content the configuration is to be applied to cohortID—the cohort identifier(s) of the cohort(s) to which the configuration will be applied;

deviceTypes—an array of devices to which the configuration will be applied;

HouseAdMax;

Region(s)—regions (e.g., geographical regions) to which the configuration will be applied.

If, for example, a channel identifier is determined not to be included in the ancillary content load configuration, the configuration may be applied to several or all channels. By way of further example, if a cohort identifier is determined not to be included in the ancillary content load configuration, the configuration may be applied to several or all cohorts and users.

Thus, the configuration data (e.g., the channel identifier, cohort identifier, and/or device types), data associated with the user 3000 and/or the user device 3006 may be used by the video services stitcher 3002 to select the appropriate ancillary content load configuration from memory to apply to the channel (or video on demand content) requested by the user device 1006. Such data may include an identifier associated with the channel (or video on demand content) being requested by the user device 3006, an identifier associated with the user and/or the user's cohort, an identifier associated with video on demand content being requested, and/or a device type associated with the user device 3006s.

The selected ancillary content load configuration may be accessed from the relatively slower memory and may then be stored in high-speed cache memory with user session data (e.g., that captures the current status of user interaction with dedicated application or website, user identity, login credentials, personalization information, recent actions, and/or the like) to provide quick access to the selected ancillary content load configuration. Optionally, a shared-nothing, symmetric database architecture may be utilized configured to enable dataset sizes to grow linearly without requiring recoding. The video services stitcher 3002 may initiate an ad load variation process each time the user 1000 selects, via the user device 1006, a new channel.

Updates to the ancillary content load configuration may be fetched periodically by the video services stitcher 3002 and cached in local, high-speed memory to ensure the configuration will be readily available when needed, thereby reducing latencies, optionally so that any delays are not perceptible to a given viewer. Further, the ancillary content load configuration updates may be performed in the background to avoid introducing additional latency from the viewer perspective. An ancillary content load tuning microservice 3008 may receive the ancillary content load configuration updates. The ancillary content load tuning microservice 3008 may be configured to identify units of content (e.g., clips) to communicate to the video services stitcher 3002 to be used as backfill content (e.g., to compensate for drift). Optionally, periodic updates may be substituted with the event bus (which enables different software components to communicate with each other) and the configuration changes would be propagated to stitcher instances and there will be no need to reread all the configuration items periodically and only on the start-up of the service The video services stitcher 3002 may request ancillary content to populate a pod of a specified duration. The video services stitcher 3002 may identify the appropriate duration of the requested pod content using information accessed from memory, such as information regarding the programmed timeline, information regarding an episode, information regarding pod locations in the episode and/or the maximum specified ancillary content time for the episode. The video services stitcher 3002 may also specify the applicable, selected ancillary load configuration. For example, where the ancillary content comprises advertisements and the pod corresponds to an ad break, the video services stitcher 3002 may request ad break content from an ad proxy/ad pod service (e.g., ancillary content proxy/pod service 3010). The ancillary content proxy/pod service 3010 may communicate over a network with one or more ad platforms that may provide targeted advertisements, such as a demand side platform.

The video services stitcher 3002 may assemble and transmit a playlist to the user device 1006 (including content accessed from a stitchables content cache 3004). If the HLS protocol is being used, the video services stitcher 3002 may make the content stream available to clients, such as the application hosted on user device 1006, through a URL that returns an HLS .m3u8 file. The application may access and/or play each item of content in the defined order.

Optionally, the MPEG-DASH protocol or other protocol may be utilized rather than or in addition to the HLS protocol.

User session may be communicated from the user device 3006 application to, and stored by, the stitchables content cache 3004. Drift data may be communicated from the stitcher 3002 to the user device 3006.

The foregoing architecture may be utilized to implement the following drift, load, and/or backfill strategies.

As discussed above, backward or forward drift may occur as a result of a pod being underfilled (which may cause forward drift) or as a result of a viewer switching to a channel, where the viewer has missed the beginning of a streaming program (which may result in backward drift). With respect to managing drift, different drift strategies may be selected and used for different users, cohorts, channels, and/or programs. A DriftStrategy variable may be set to identify the drift strategy that is to be used. For example, a DriftStrategy variable value of "0" may indicate that a fixed viewing experience is to be used, where each timeline may have a hard anchor, where a given timeline has set start and stop times, and a reference to a given episode (where an episode may be a container for a movie or a set of video clips) so that resynchronization is performed by the end of a given episode. By way of further example, a DriftStrategy variable value of "1" may indicate that a hybrid viewing experience is to be used, where drift is permitted to accumulate over multiple timelines (e.g., multiple episodes).

In addition, different algorithms may be selected and used to determine how to distribute a given type of ancillary content (e.g., ads) over multiple pods to compensate for forward drift and resynchronize the user timeline with the original timeline. A LoadStrategy variable may be set to identify the load algorithm that is to be used. For example, a LoadStrategy variable value of "0" may indicate that if ad time is not distributed equally amongst pods (e.g., in order to compensate for drift), ads will be placed in respective pods, in descending order by time so that earlier scheduled pods will be allocated ad time before later scheduled pods. A LoadStrategy variable value of "1" may indicate that if ad time is not distributed equally amongst pods (e.g., in order to compensate for drift), ads will be placed in respective pods, in ascending order by time so that earlier scheduled pods will be allocated additional ad time before later pods.

Similarly, different backfill strategies for populating pods to compensate for forward drift and to resynchronize a user's timeline to the original timeline may be selected and used for different users, cohorts, channels, and/or programs. A BackfillStrategy variable may be set to identify the backfill strategy that is to be used.

For example, a BackfillStrategy variable value of "0" may indicate that only "filler" content is to be used in performing a backfill operation. By way of example, filler content may be ancillary content that is not sponsored by an advertiser, such as a house ad, a house cartoon character, a news item, a quiz, or the like.

A BackfillStrategy variable value of "1" may indicate that ancillary targeted content is to be used in performing the backfill operation if and to the extent such ancillary targeted content is available, and "filler" content is to be used in performing the backfill operation to satisfy any time to be backfilled to the extent it was not backfilled using targeted content. Targeted ancillary content may include content manually identified (e.g., tagged) by an authorized user to be used as backfill content.

A BackfillStrategy variable value of "2" may indicate that the user corresponding to the user timeline is permitted to select the filler content or filler content type/subject matter that is to be presented to the user when filler is used to populate a pod or episode. For example, a user interface may be provided for display on the user device via which the user can specify filler content types, such as quizzes, news, information on actors or directors, and so on. Such user specification may be stored in the user's account data and may be used in the future to select backfill content.

Optionally, backfill content may only be added after the currently streaming episode associated with the drift.

Optionally, the requested backfill content time duration to compensate for drift may be based on a number of factors. For example, the requested backfill content time duration may be based on the maximum configured drift for the channel, the current amount of drift for the user's stream, and an increment value. By way of illustrative example, if the maximum configured drift for the channel is 60 minutes, and the current amount of drift is 58 minutes 59 seconds, and the increment value is 1 minute 46 seconds, the video services stitcher will request the ancillary content load tuning microservice to provide 60 minutes and 45 seconds of backfill content into the stream to the user's device.

Figure 31:
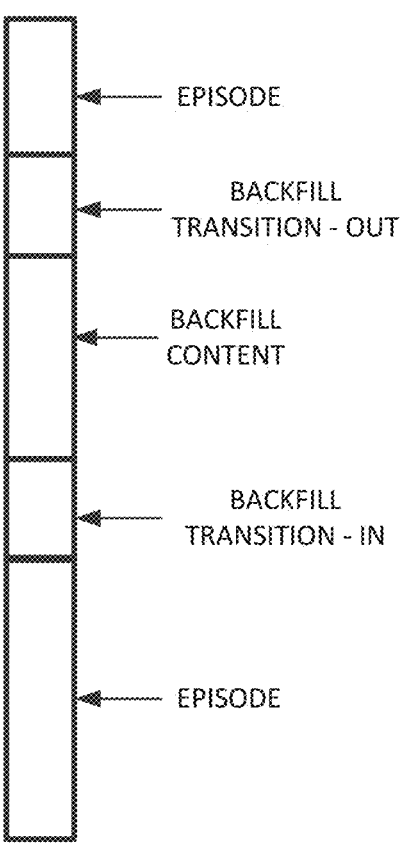
FIG. 31 illustrates an example content backfill timeline.

Optionally, a transitional notification may be presented prior to the playing of the backfill content on the user's device, the notification informing the user that backfill content will be presented. In addition, optionally a transitional notification may be presented immediately after the playing of the backfill content, the notification informing the user that the playing of the backfill content has completed. FIG. 31 illustrates an example of the placement of transition clips and backfill content in an episode.

As illustrated, transition video clips may be streamed for display to a user device between programmed content and backfill content. For example, video clips may be identified within a content database as transition clips. In addition, one or more video clips may be identified as default clips that are to be used if transition clips are needed but not available or found. A BackfillTransitions variable value of "false" may indicate that transition clips are not to be inserted between programmed content and backfill content. A BackfillTransitions variable value of "true" may indicate that transition clips are to be inserted between programmed content and backfill content.

Disadvantageously, there may often be occurrences where the returned backfill content duration will be less than the requested duration. Depending on the scenario such an occurrence may be handled in different ways.

For example, as discussed above, there may be instances where a hard time/event anchor may be present in a timeline, where the user's viewing experience needs to be aligned with the published schedule at such anchor. For example, if a live program is being streamed, it is not possible to watch the live program in advance, and so the user's viewing experience cannot be modified so as to begin streaming the live program before its start time. Therefore, the user's viewing experience with respect to such live program may be anchored to the beginning of the live program.

By way of further example, there may be certain content items that must be aired at a specific time and no earlier (e.g., based on one or more rules). In this example, as with the live content example, there may be a hard anchor requiring strict alignment with the program schedule with respect to such anchors for a given episode. However, in other instances, such strict alignment with respect to a specific episode may not be required or utilized, and drift may be permitted to accumulate over multiple episodes.

The presence of an anchor may be considered in the backfill process, as discussed below:

If there an upcoming item of anchored content, and if the drift is not fully filled with backfill content prior to the anchored content, the following options may be utilized:

a. If the unfilled time is <Unfilled Threshold (e.g., 5, 10, or 15 seconds) then filler content may be inserted to enable continuity of the stream;

b. If the unfilled time is ≥Unfilled Threshold then another ancillary content pod (e.g., an ad pod) may be inserted immediately after the backfill content and the content (e.g., ad content) may be requested from the ancillary content (e.g., ad) proxy/pod service. If unfilled time still remains before the anchor, then additional filler content may be inserted to enable continuity of the stream.

To the extent that there is still a difference between the requested duration of backfill content and the actual duration of the backfill content, such difference may optionally be maintained as drift on the user's stream.

Figure 32:
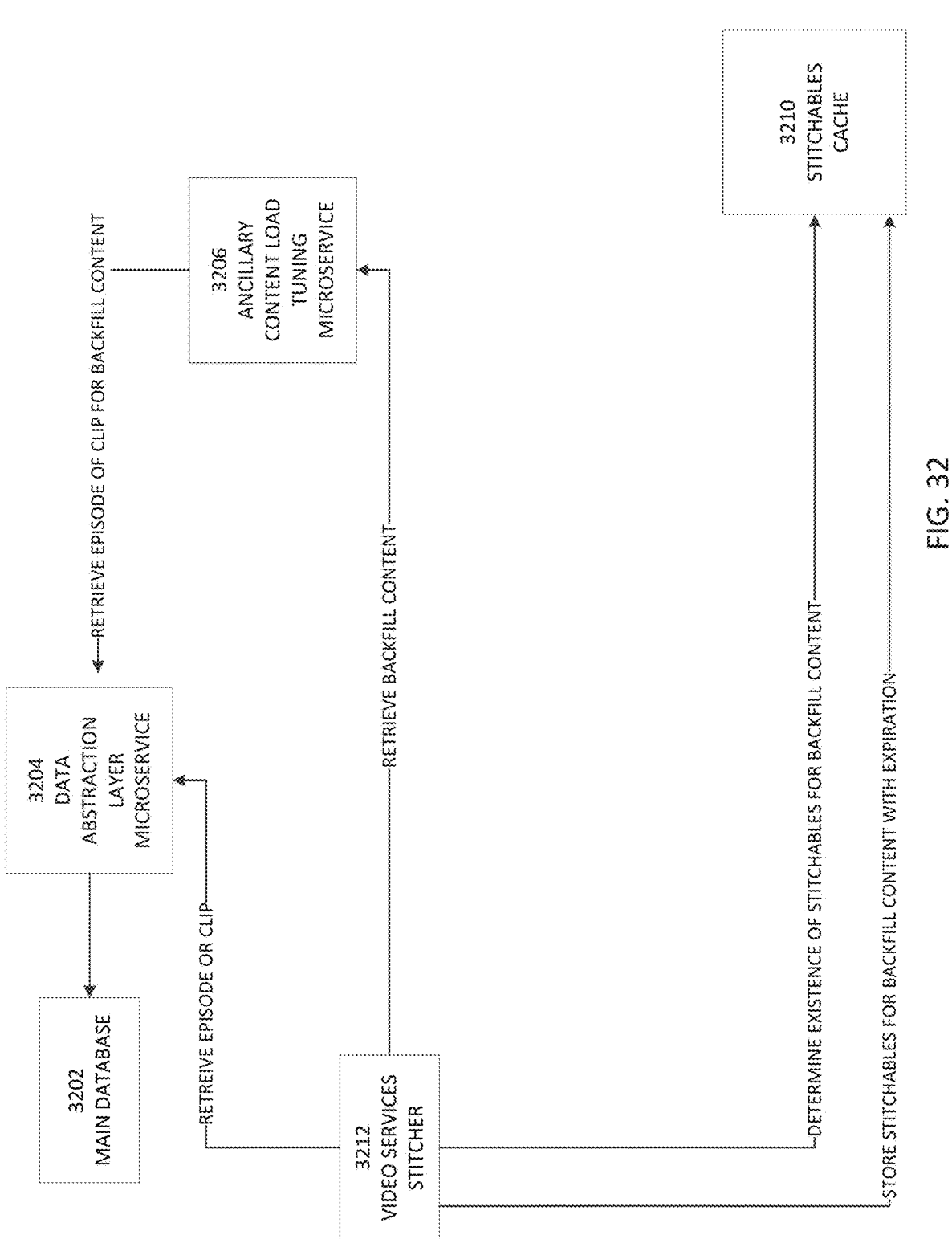
FIG. 32 illustrates an example architecture configured to dynamically manage a content backfill process.

Referring now to FIG. 32, an example architecture and process is illustrated for managing a backfill process.

As discussed with respect to FIG. 31, optionally a transition clip (e.g., 5-10 seconds long) may be accessed and presented prior to backfill content informing the viewer regarding the playing of the upcoming backfill content, thereby providing an enhanced viewer playback experience.

A video stitcher service 3212 transmits a request to the ancillary content load tuning microservice 3206 for backfill content. The content request may specify the accumulated drift time, the associated channel being streamed to the user/viewer device, and device information (e.g., the device ID). Using the requested data, the ancillary content load tuning microservice 3206 requests and receives one or more clip identifiers (clipID(s)) from a database (e.g., optionally via data abstraction layer microservice 3204). The data abstraction layer microservice 3204 is configured to abstract the connection to a database 3202 (that stores backfill content and data related to a content catalog) on behalf of applications and services needing access to the database 3202. The data abstraction layer microservice 3204 may also contain a business layer logic configured to determine how to process or share information retrieved from the database 3202.

The video services stitcher 3212 uses the clipID(s) from the data abstraction layer microservice 3204 to determine if the clipID(s) (and hence the corresponding stitchable video clips for the backfill content) already exist in the cache database 3210 stored in the high-speed memory. If the corresponding clipID(s) exist in the cache database 3210, the backfill content, generated from the stitchable video clips stored in the cache database, is inserted into the user content stream.

If the clipID(s) (and hence the corresponding stitchable video clips for the backfill content) are not available in the cache database 3210, the video stitcher service 3212 may transmit a request for the needed stitchable clips data from the data abstraction layer microservice 3204, may form backfill stitchables from the received clip data, and may store the backfill stitchables in the stitchables database cache 3210, optionally in an association with a configurable expiration date/time. The backfill content may then be included in the content stream to the user device.

With respect to inserting the backfill content, even before backfill data is inserted into the user stream, the video stitcher service 3212 may already be providing metadata (e.g., metadata described elsewhere herein) regarding the clip currently being streamed to the user device. When the video stitcher service 3212 inserts backfill content into the user stream, the corresponding metadata may be automatically passed to the client application playing the content on the user device. The video stitcher service 3212 may explicitly tag the clip metadata streamed to the client application on the user device as a backfill content so that client application will be able to represent it accordingly to the user (e.g., with text, graphic, or video notifications).

Figure 36:
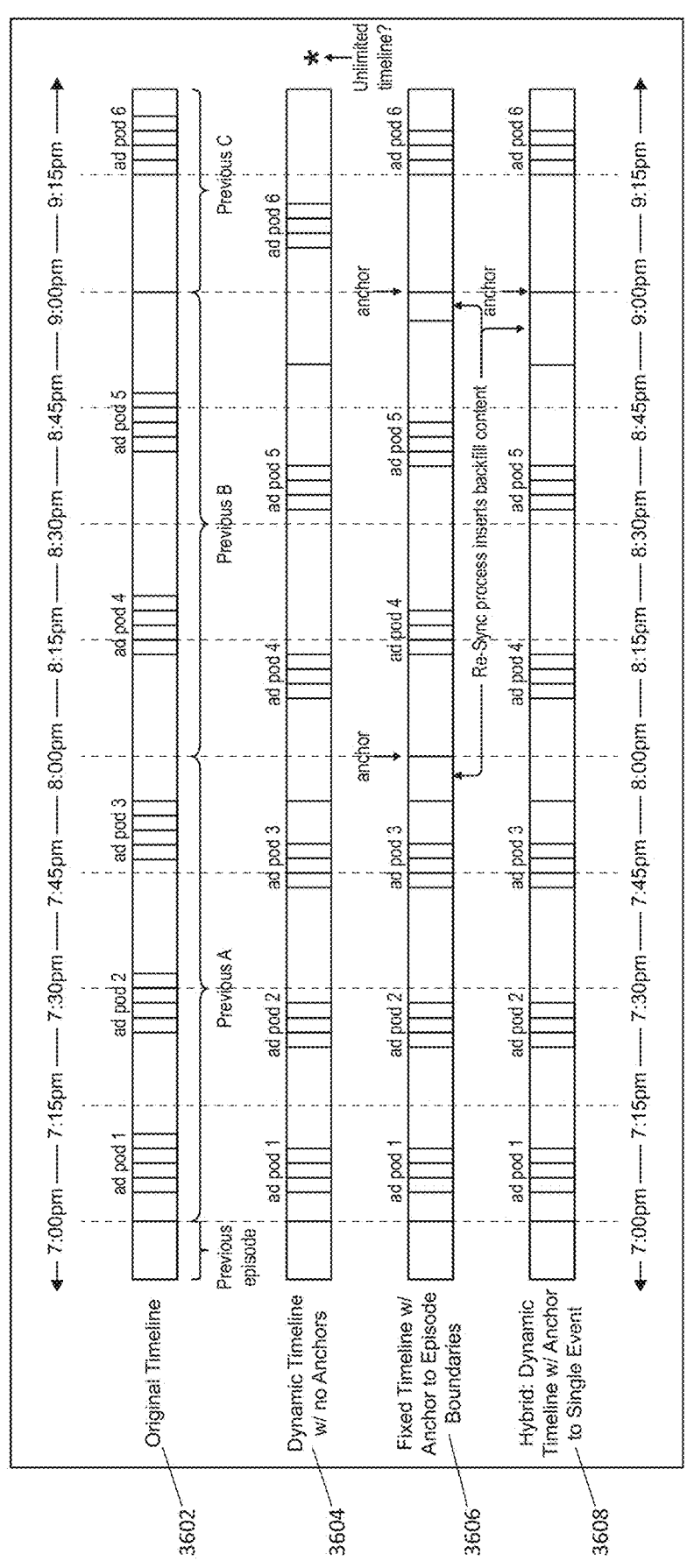
FIG. 36 illustrates example timelines related to anchor management.

Referring now to FIG. 36, example timelines are illustrated, depicting the application of backfill content to compensate for forward drift in the scenarios where there is a dynamic timeline no anchors, a fixed timeline with anchors placed at episode boundaries (at the beginning and end of the episode), and a dynamic timeline with an anchor to a single event (e.g., a beginning or end of an episode). It is understood that other numbers of slots may be provided for ancillary content than those provided in the example timelines. Optionally, the number of ancillary content slots may be specified based on the scheduled duration of the ancillary content pods and the duration of each individual item of ancillary content.

The original, scheduled timeline 3602 depicts the start and stop boundaries of Episodes A, B, C, and the placement of ancillary content ad pods 1-6. The dynamic timeline 3604 with no anchors depicts the forward drift of the beginning of Episode B resulting from the under-population of pods 1-3. The dynamic timeline 3604 with no anchors also depicts the forward drift of the beginning of Episode C resulting from the under-population of pods 1-5.

Fixed timeline 3606 depicts anchors placed at the beginning and end of Episode B (between the end of Episode B and the beginning of Episode C). The foregoing backfill process inserts backfill content immediately before each of the anchors so as to compensate for drift caused by the underfill of ad pods 1-5. The inserted backfill content causes Episode B to start at the scheduled time and, with the backfill content inserted immediately after Episode B, causes Episode C to start at the scheduled time (and so to correspond with the start Episode B and the start Episode C of original timeline 3602).

Hybrid timeline 3608 depicts a single event anchor placed at the beginning of Episode C. The foregoing backfill process inserts backfill content immediately before the single anchor so as to compensate for drift caused by the underfill of ad pods 1-5. The inserted backfill content causes Episode C to start at the scheduled time (and so to correspond with the start Episode C of original timeline 3602).

Figure 33:
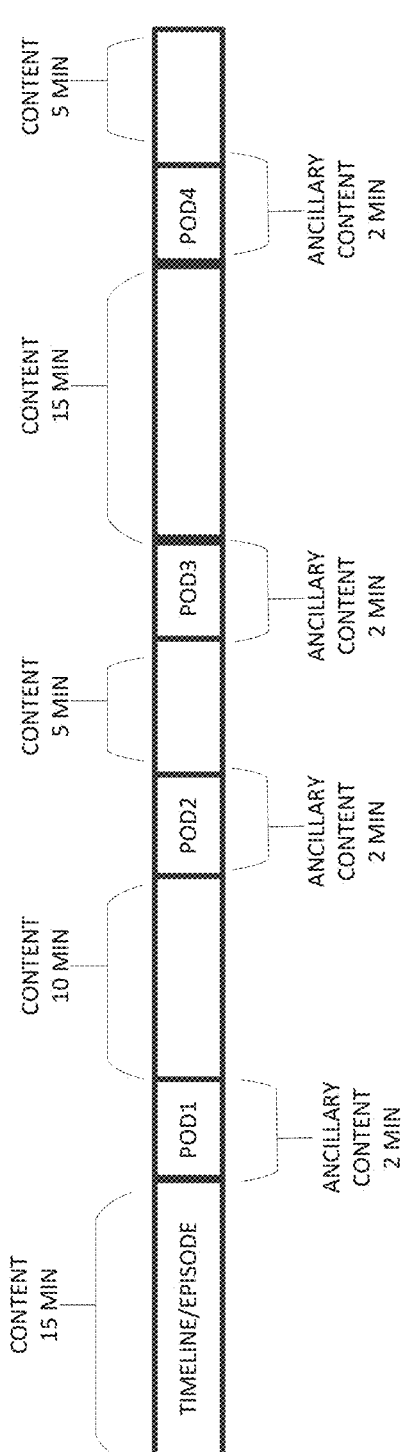
FIGS. 33 and 34 illustrate additional example timelines related to drift management.

Certain examples of pod duration and drift management will now be discussed to further illustrate the foregoing teachings. Referring now to FIG. 33, an example timeline is depicted to illustrate a process of determining the amount of ancillary time (e.g., ad time) per episode with a given ancillary content (e.g., ad) load variation configuration. For example, the determination may be performed by the video services stitcher discussed above using a load variation configuration provided by the ancillary load tuning microservice discussed above. In this example, the process begins with a viewer viewing the timeline episode from the start.

When streaming a channel of linear content, the video services stitcher has information regarding the current timeline/episode, information regarding the entire content duration and the maximum ancillary content (e.g., advertisement) time programmed for regarding the current timeline/episode.

Referring again to FIG. 33, in the illustrated example the total programmed time for primary content is calculated as follows:

> Total programmed time for primary content in the example episode=15 minutes of primary content+10 minutes of primary content+5 minutes of primary content+15 minutes of primary content+5 minutes of primary content=50 minutes of primary content In the illustrated example, the total programmed time for ancillary content is calculated as follows:

> Total programmed time for ancillary content=2 minutes of ancillary content+2 minutes of ancillary content+2 minutes of ancillary content+2 minutes of ancillary content=8 minutes of ancillary content Therefore, the programmed ancillary content (e.g., ad) load, expressed as a percentage may be calculated as follows:

> Programmed ancillary content load for episode=100*total ancillary content time/(total ancillary content time+total primary content time)=(8 min/(50 min+8 min)=13.8%.

In this example, the ancillary load variation value is set to 10% (e.g., by the ancillary content load tuning microservice).

Therefore, using the ancillary load variation value, the adjusted total ancillary content time may be calculated by video services stitcher as follows:

> (total primary content time*ancillary load variation value)/(100−ancillary load variation value)=(50 min*10%)/(100%−10%)=5.55 min=333.33 sec.

Optionally, the calculated adjusted total ancillary content time may be set to a nearest multiple of a specified time increment value. For example, if the specified time increment value is set to 15, then in the foregoing example, where the adjusted total ancillary content time is 333.33 sec, the closest multiple of 15 is 330 sec (which may be referred to as the rounded total ancillary content time). Such a rounding process reduces computer resource utilization with respect to satisfying such calculated time.

In this example, 330 seconds of budgeted ancillary content time is distributed among the four pods scheduled for the episode (Pod1, Pod2, Pod3, Pod4). A pod increment time period may be specified, where the pod is to be a multiple of the increment time period. In this example, the pod increment time period is set to 15 seconds.

If the rounded total ancillary content time is not evenly divisible over the episode pods, different strategies may be used to determine how to allocate the time over the pods. For example, the rounded total ancillary content time allocation may be front loaded (where more time is allocated to the first pods and less time is allocated to the later pods) or backloaded (where less time is allocated to the first pods and more time is allocated to the later pods). In this example, a frontloaded strategy will be used, where the additional, front loaded time is allocated in increments of 15 seconds or multiples thereof. Therefore, in the example above, the 330 seconds of rounded total ancillary content time may be distributed in the following cadence (and content may be requested to populate the pods):

Pod1=90 sec
Pod2=90 sec
Pod3=75 sec
Pod4=75 sec

Optionally, the video services stitcher performs a failsafe check to determine if the configured ancillary content load value is greater than the programmed ancillary content load value. If the video services stitcher determines that the configured ancillary content load value is greater than the programmed ancillary content load value, the video services stitcher may utilize the programmed ancillary content load value instead of the configured ancillary content load value.

As discussed above, the ancillary content may comprise one or more advertisements. An ancillary (e.g., ad) content proxy/pod service may request ads to populate the pods. However, as previously discussed, advertising services may return ads whose total time may be less than the requested duration needed to populate the pods (e.g., the ad pods). In order to ensure that drift is kept to a correctable amount and to ensure that the actual ad load is as close as possible to the configured ad load, it is desirable to keep as close as possible to the configured ancillary content/ad load. Therefore, as similarly discussed above, if there is an underrun for a given pod, that pod may be shortened by an amount corresponding to the underrun in ad time, and that amount may then be added to a subsequent pod (or divided up amongst a plurality of subsequent pods).

Referring back the example above, with Pod1=90 seconds, Pod2=90 seconds, Pod3=75 seconds, Pod4=75 seconds, the following example scenario will be discussed.

Where 90 seconds of ads were requested for Pod1, but only 60 seconds of ad time content is received, there is a 30 second underrun from the configured ad load. The 30 seconds may be allocated over the subsequent ad pods to compensate for the underrun. The system may attempt to evenly distribute pod extension time to compensate for the underrun over the subsequent ad pods, However, where the underrun compensation extension time cannot be evenly distributed over the remaining episode pods, the time may be distributed in a frontloaded or backloaded manner, with a set increment value (e.g., 15 seconds) so that certain pods are extended more than other pods, while still attempting to distribute the underrun so that the pods lengths will be as equal as possible.

In the foregoing example, the unpopulated 30 seconds from Pod1 are distributed, using the frontloaded algorithm described above, as follows:

Pod2=90 seconds (with no additional time added)
Pod3=75 seconds+15 seconds (to compensate for the underrun)=90 sec
Pod4=75 seconds+15 seconds (to compensate for the underrun)=90 sec To continue the example, 90 seconds of ads are requested to populate the now extended Pod2, but only 75 seconds of ads are received, resulting in a 15 second underrun for Pod2. Therefore, the 15 seconds will be allocated in a frontloaded manner to the subsequent pods as follows:

Pod3=90 seconds+15 seconds (to compensate for the underrun)=105 seconds
Pod4=90 seconds To continue the example, 105 seconds of ads are requested to populate extended Pod3, but only 80 seconds of ads are received, resulting in a 25 second underrun for Pod3. Therefore, the 25 seconds will be allocated to remaining Pod4 as follows:

Pod4=90 seconds+25 seconds (to compensate for the underrun)=115 seconds.

Figure 34:
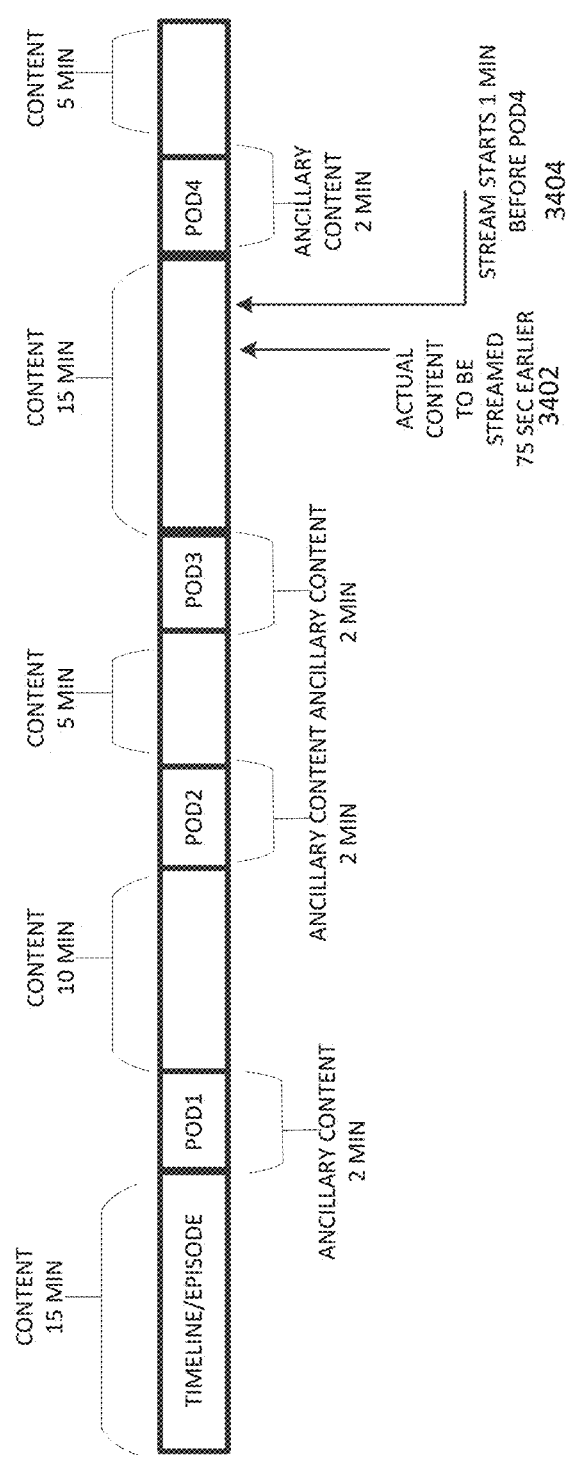

Referring now to FIG. 34, another example of reallocation of pod time for an episode will be discussed. In this example, a user device starts requesting the episode stream one minute before Pod4 is scheduled to be streamed (e.g., as a result of switching from one channel to another). In order to maintain the ancillary content load, the system will cause the length of Pod4 for to be reduced, drift will be introduced.

Following is a description the analysis and calculation (which may be performed by the video services stitcher) of time reallocation for a given amount of ancillary content (e.g., ad) time per episode with a given load variation configuration from the ancillary content load tuning microservice, where the user device requests the episode stream one minute before Pod4 is scheduled to be streamed at 3404.

Given the example above:

maximum content time from 3404 until the end of the episode=1 minute of primary content+5 minutes of primary content=6 minutes of remaining primary content time.

total remaining ancillary content (e.g., ad) time=2 minutes.

As in the above example, the load variation configured by ancillary content load tuning microservice is 10%.

Programmed ancillary content (e.g., ad content) load for the remainder of the episode (beginning at 3404)=remaining ancillary content time/(remaining primary content time+remaining ancillary content time)=2 minutes/(6 minutes+2 minutes)=25%.

However, the desired ancillary content load (the configured ad load) is 10%, and so the adjusted remaining ad content time=(remaining ancillary content time*ancillary load variation)/(100%–ancillary load variation)=(6 minutes*10%)/(100%–10%)=0.67 minutes=40 seconds.

As before, the calculated adjusted total ancillary content time may be set to a nearest multiple of a specified time increment value. For example, if is the specified time increment value set to 15, then in the foregoing example, where the adjusted total ancillary content time is 40 sec, the closest multiple of 15 is 45 seconds (which may be referred to as the rounded total ancillary content time).

Accordingly, to satisfy the rounded total ancillary time of 45 seconds, Pod4 will now be reduced from 120 seconds to 45 seconds, which will cause a forward drift of 120–45=75 seconds. Rather than streaming the content to the user device beginning 1 minute before Pod4, because of the adjustment, the content will be streamed to the user device 75 seconds earlier (135 seconds prior than the beginning of scheduled Pod4). Thus, the user will be viewing the content 75 seconds in the past as compared to other users and the scheduled time.

Because the time length of Pod4 is reduced, more time is available to present primary content. Further, advantageously, the video services stitcher is provided with an additional 75 seconds to request ancillary content (e.g., advertisements) in the background for subsequent pods.

In a scenario where there is another pod within the 75 seconds (such as when there is a short primary content clip between Pod4 and the earlier pod), than rather starting streaming to the user device 75 seconds in past, the 75 seconds will be reduced to a time which aligns with the start of the relatively short clip right after the previous pod.

Optionally, the video services stitcher performs a failsafe check to determine if the configured ancillary content (e.g., ad) load will be more than programmed ancillary content load. If a determination is made that the configured ancillary content load will be more than programmed ancillary content load, then the video services stitcher will use the programmed ancillary content load rather than the configured ancillary content load.

Another technical challenge is presented when certain functions, such as the ancillary load tuning microservice, becomes unavailable (e.g., for a limited period of time, such as due to a temporary component failure or network outage). For example, the video services stitcher may request a configured ancillary content (e.g., ad) load configuration set from an ancillary load tuning microservice. The video services stitcher may determine that the ancillary load tuning microservice is not reachable or that the ancillary load tuning microservice has not responded within a threshold period of time and that a timeout condition has occurred. In such an occurrence, the video services stitcher may, as a fallback, use an earlier accessed version of the ancillary content (e.g., ad) load configuration. As a further fallback, if the earlier accessed version of the ancillary content (e.g., ad) load configuration is unavailable, a preset default configuration variable values may be accessed (e.g., from a local memory).

In addition, the disclosed system may be configured to enhance a user's viewing experience when the user is accessing a given channel of streaming content while an ad pod is scheduled to be playing. Rather than streaming the scheduled ad pod to the user's device at the scheduled time, the system may cause the ad pod to be skipped. Thus, the user will not view the ad pod at the scheduled time (although other users who had been viewing the channel prior to the start of the ad pod may still have the ad pod streamed to and played back by the respective user devices).

Figure 37:
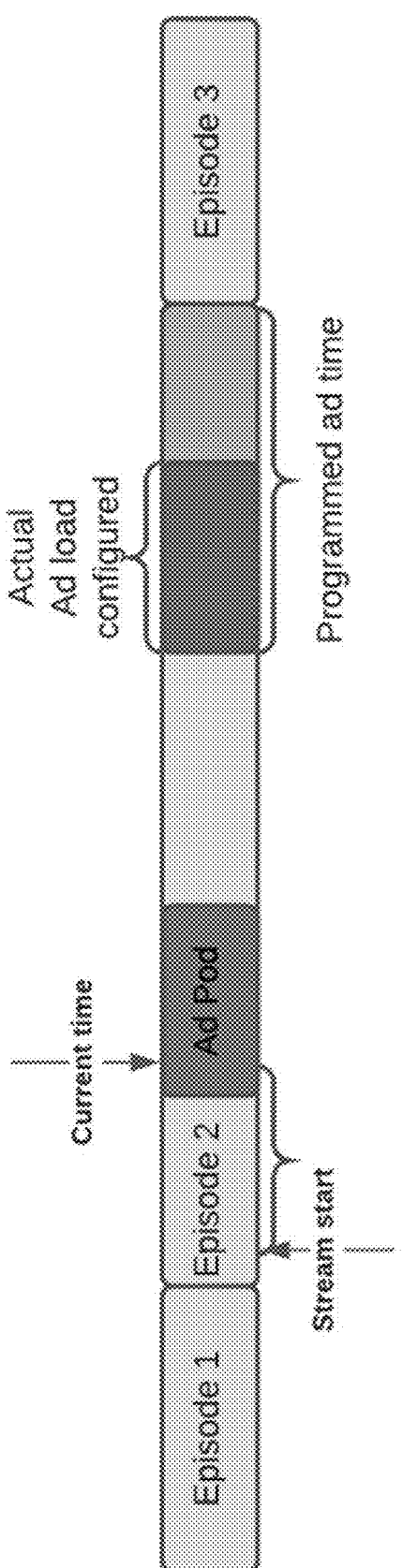
FIGS. 37 and 38 illustrate additional example timelines related to management of content streaming and user navigation to a channel of streaming programmed content.

For example, with reference to the example timeline illustrated in FIG. 37, a user device may access a channel when an ad pod is scheduled to be streamed and played at the current time. Conventionally a request would be issued by a video services stitcher to an ad proxy service for ads to populate the ad pod. The video services stitcher would provide a content stream to the user device only after the ad proxy service obtained and returned ads to populate the ad pod. During the delay caused by the need to request and receive ads, the user may not be provided with any content to view, providing a poor user experience.

The foregoing technical problem may be exacerbated when a user is surfing channels looking for content of interest to view. When channel surfing, the user may land on a given channel for just a few seconds before moving on to the next channel. Conventionally, each time a user accesses a channel, ad content will be requested from the ad proxy. However, because the user is quickly changing to another channel, some or all of the ad content may not be utilized or streamed to the user device, and may be logically discarded. Thus, the ad proxy will be disadvantageously excessively loaded by such requests without the processing results being utilized.

To address the foregoing technical problem, rather than requesting ad content when a user lands on a channel in the middle of a scheduled pod, backward drift may be introduced allowing the user to view primary content, such as the beginning of Episode 2 (which may have already been streamed according to schedule to other user devices). Advantageously, this approach enables streaming to the user device to begin substantially immediately as ads do not need to be requested and provided in real time. However, the ads may still be requested in the background while Episode 2 is being streamed to the user device and shown in a later pod if the user returns to the channel, thereby avoiding streaming latency and deadtime with respect to the user device and user experience.

Further, when the user changes from one channel to another channel, the request for ads may be delayed for a threshold period of time, where if the user does not stay on the new channel for more than the threshold period of time (e.g., in the range of 5-15 seconds), the ad request for a pod in the new channel is not issued thereby reducing unnecessary loading of the ad proxy service.

Advantageously, because the user will immediately view primary content at each streaming channel while channel surfing (rather than waiting for ad content to be accessed and then displayed), the user is advantageously enabled to quickly inspect the primary content and decide whether to remain on the channel to continue viewing the primary content. The ancillary pod content may then be displayed at a later time.

Still further challenges are posed when a user is switching among two or more channels. An additional challenge is keeping track of the drift associated with the multiple channels. As discussed above, while a user is streaming a given first channel, pods may shrink as a result of underfills, and forward drift may accumulate relative to the published schedule (which assumes full pods with no pod reduction in length). As a result of the forward drift, the user is watching content on the first channel earlier than it was originally scheduled to be played. For example, as illustrated in FIG. 38, portions of Episode 2 and the beginning of Episode 3 are streamed to and played by the user device earlier than scheduled in the original timeline, as illustrated in the user stream timeline.

Figure 38:
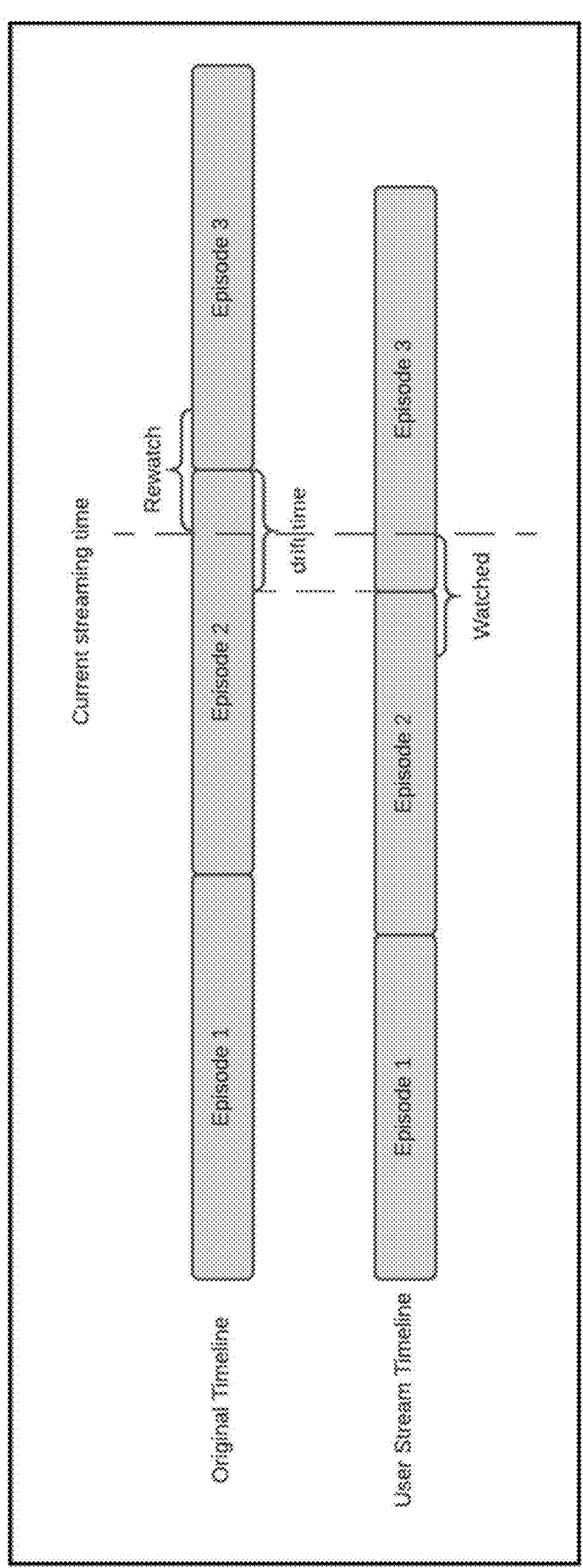

However, if the drift on the first channel is not tracked once the user's switches to a second channel, disadvantageously, when the user switches back to the first channel, the content will be played according to the original published schedule as illustrated in FIG. 38. Hence, because the user had earlier viewed content played ahead of schedule, once the user switches back to the first channel, the user may be presented with the same content for a second time, corresponding to the amount of accumulated drift. Such repeat playing and re-watching of content provides a poor user experience and unnecessarily uses computer resources and network bandwidth in streaming the same content to the same user device twice in rapid succession (e.g., less than 1 minute).

In order to ensure that the same content is not streamed and played twice as a result of drift and the user switching channels, the video services stitcher is configured to store the amount of drift per channel in the user session data. A Time to Live (TTL) limit is set for the user session that limits the lifespan of the session (e.g., using a timestamp attached to or embedded in the session). Once the prescribed timespan has elapsed, the session data may be discarded or revalidated. The TTL setting logic is updated to be set to a value not less than the largest drift time. When the user switches from the first channel (having associated forward drift) to the second channel, the drift on the first channel will be decreasing in an amount corresponding to the time the user is viewing other channels during the user session.

The drift value may be managed using the following drift rules:
1. If the user does not return to the first channel (having associated drift) for a duration equal to or greater than the drift accumulated for the first channel, then the drift indicator is cancelled and the channel drift value may be set to zero or overwritten in the user session, and the first channel drift does not to be further tracked.
2. If the user returns to the first channel after a time period less than the drift time, then the user will be presented with the content of the first channel resuming from the point where the user had navigated away from the first channel. This enables the user to avoid missing viewing any content and reduces the drift for the first channel by the elapsed amount of programming time when the user was viewing other channels streamed to the user device.

Figure 39:
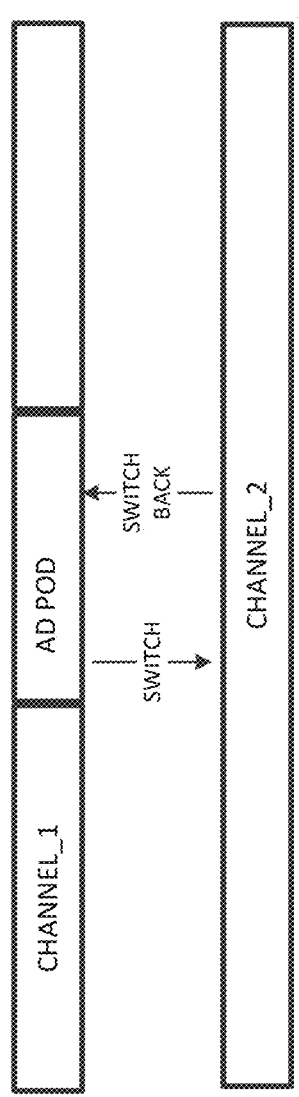
FIGS. 39-41 illustrate additional example timelines related to management of content streaming and user navigation between multiple channels of streaming programmed content.

Another challenge posed when a user is switching among two or more channels relates to the management of ancillary content pods, such as ad pods. With reference to FIG. 39, conventionally, when a user is streaming a first channel (channel_1) and switches to a second channel (channel_2) in the middle of an ad pod (which may include one or more video ads), the TTL expiration set for the ad pod on the first channel, the information regarding the ad pod may be deleted or overwritten, and the first channel (channel_1) stream is removed in favor of creating the stream for the second channel (channel_2).

When the user returns to the first channel (channel_1) while the ad pod is still scheduled to be playing, the video services stitcher requests new content for the ad pod from the ancillary content proxy (e.g., the ad proxy) and streams the new ads to populate the ad pod to the user device only after the video stitcher service received a response from the ancillary content proxy (e.g., ad proxy). Disadvantageously, because of the delay introduced by having to request and stream new content to the user device, the user will experience latency (e.g., deadtime) when the user switches back to and resumes streaming the first channel (channel_1). Further, because multiple requests are issued to the ad proxy for content for the same ad pod, the ad proxy must process a higher request servicing load and must use additional computer resources to handle such load. Yet further, the beacons associated with the content of the original ad pod content are not fired, and so credit/value is not ascribed to playing of the original ad pod content.

The foregoing technical issue is solved by storing pod information on a per channel basis as a separate key (where data is stored as a key/value pair) in a database stored in high-speed memory that acts as a cache. The pod information may be stored with an expiration time set to cause the pod information to be deleted, overwritten, or marked as expired once the information is no longer needed. This further avoids counting ads that are only partly shown as being fully shown (e.g., for monetization impression purposes).

Further, preferably, to enhance the user experience, when a user navigates away from a video ad presented on a first channel and then returns to the first channel during a session, it may be preferred that the same video ad is not played (either from the beginning or resuming from where the user left off). For example, it may be preferable to start streaming the next ad in the ad pod to the user device.

Figure 40:
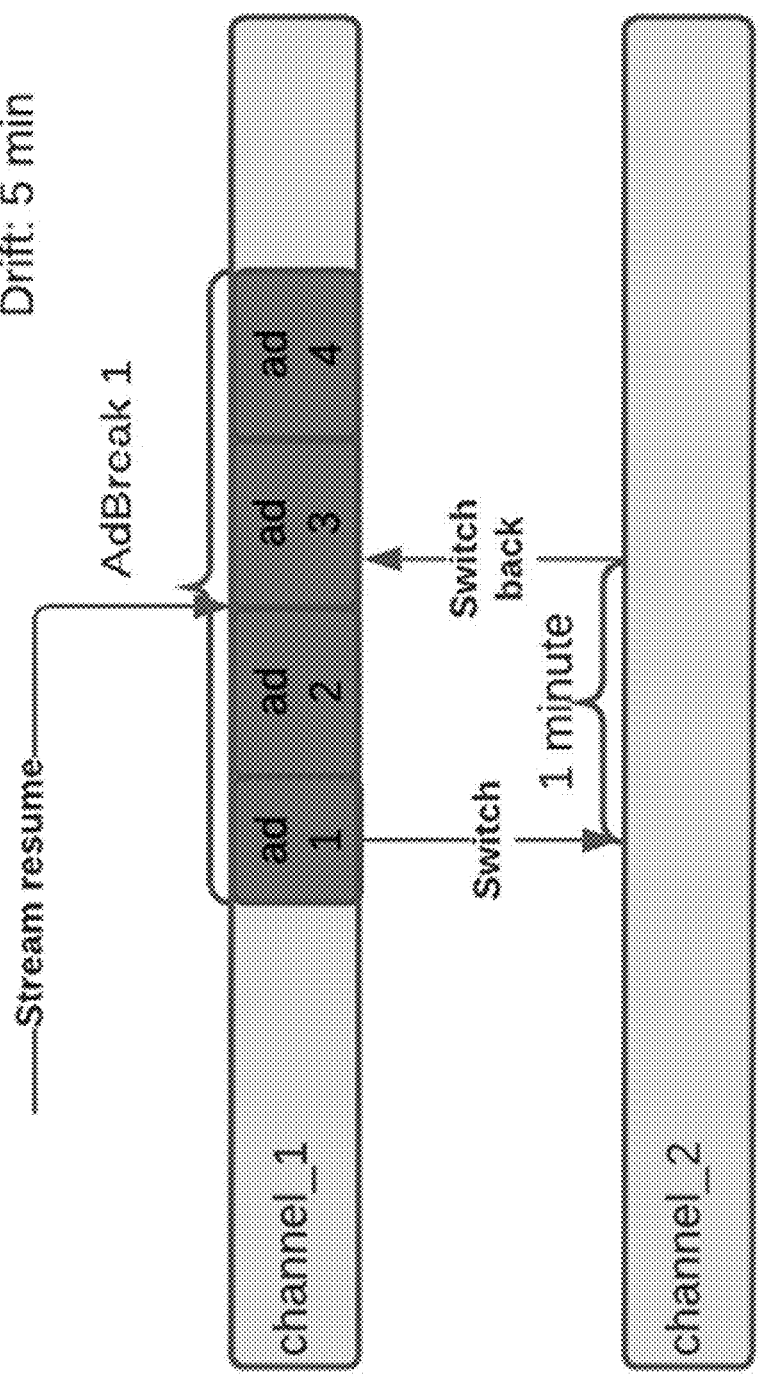

Referring to FIG. 40, an example application of the technical solution is illustrated. In this example, the existing drift time is sufficient so that rather than having to present the program, ads may be presented to the user in the ad pod. In other words, in the illustrated example, the user changes from channel_1 to channel_2 and then returns to channel_1 during the same ad pod (sometimes also referred to as an ad break), and the drift time is equal to or greater than the amount of drift time the user would lose by starting the video from the beginning. In the illustrated example, the drift time is 5 minutes.

In the illustrated example:
The user is viewing channel_1 and streaming ad_1 from AdBreak_1;
The user switches to the channel_2 while ad_1 is playing and then switches back to channel_1 one minute later while ad_3 is playing.

Using the drift time, the system is able to resume the stream from the point user left channel_1. However, a rule is implemented in this example that prevents the same ad that was being streamed to the user device when the user switched from channel_1 to channel_2 from being streamed and presented to the user when the user returns to the channel_1 stream. Instead, the system will stream, from the beginning, ad_3 from AdBreak_1. Thus, rather than requesting new ad content from the ad proxy to populate the adBreak (which would require system and network resources and further load the ad proxy), the video services stitcher will reuse the already fetched ad_3 (and then ad_4). Further, advantageously, the user will not experience latency when switching channels. In addition, the drift value may be adjusted by the amount of the streamed reused adBreak time. Although ad_1 and ad_2 may not be counted as monetized impressions because the user did not view all of ad_1 or any of ad_2, advantageously, ad_3 and ad_4 may be counted as monetized impressions as they will be fully played.

Optionally, if the user changes from a first channel, while a first ad is playing, to a second channel, but then returns to the first channel while the first ad is still scheduled to be playing, the system may resume streaming the first ad from the point the user left the ad. In certain scenarios the playing of the ad to the user may be excluded from being counted as a monetizable impression, however, this technique inhibits the user from skipping ads. Optionally, as in the illustrated example, if the user changes from a first channel, while a first ad is playing, to a second channel, but then returns to the first channel while a different ad is scheduled to be playing, that different ad may be streamed to the user device from the beginning, and the playback may be counted as a monetizable impression.

Figure 41:
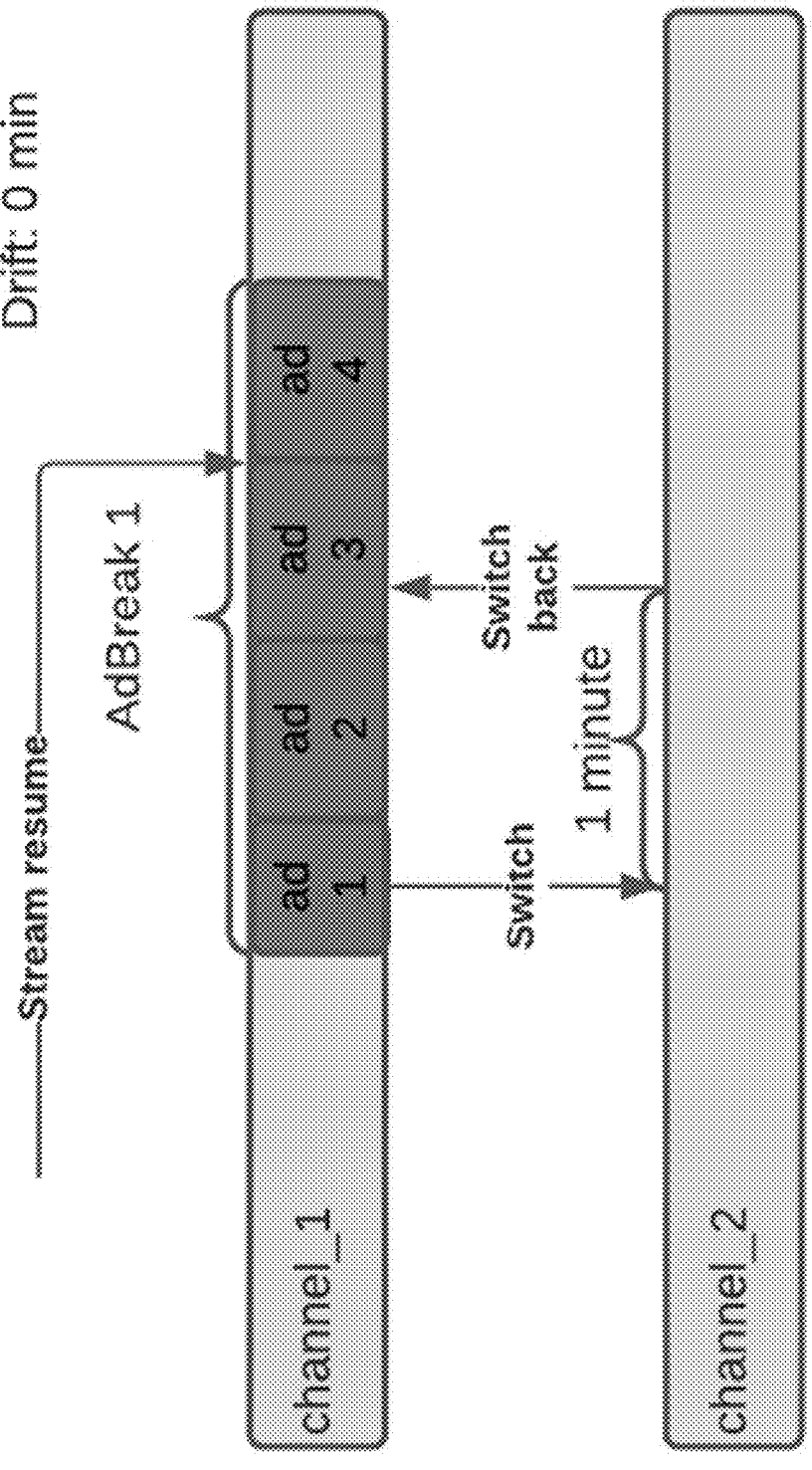

Referring now to the example illustrated in FIG. 41, in the illustrated example the drift time is zero, and therefore there is less drift time available than the amount of drift time the user would lose by starting the ad that would otherwise be streamed and played from the beginning.

As in the example discussed above with respect to FIG. 40, in the example illustrated in FIG. 41:

The user is viewing channel_1 and streaming ad_1 from AdBreak_1;

The user switches to channel_2 while ad_1 is playing and then switches back to channel_1 one minute later while ad_3 is playing.

However, in this example, there is no drift time available. Further, in this example, there is a rule inhibiting the firing of an ad beacon unless a video ad is fully streamed to a user device. Hence, if ad_3 were streamed to the user device from midpoint, an ad beacon would not fire, and the playing of the portion of ad_3 will not be treated as a monetizable impression. Therefore, in this example, the video service stitcher will skip the streaming of ad_3 to the user device, and will instead immediately stream ad_4 to the user device. This will contribute a drift time equal to the difference from where the user returned to channel_1 during the scheduled playback of ad_3 until the end of the ad_3 (approximately 20 seconds in this example).

Figure 42:
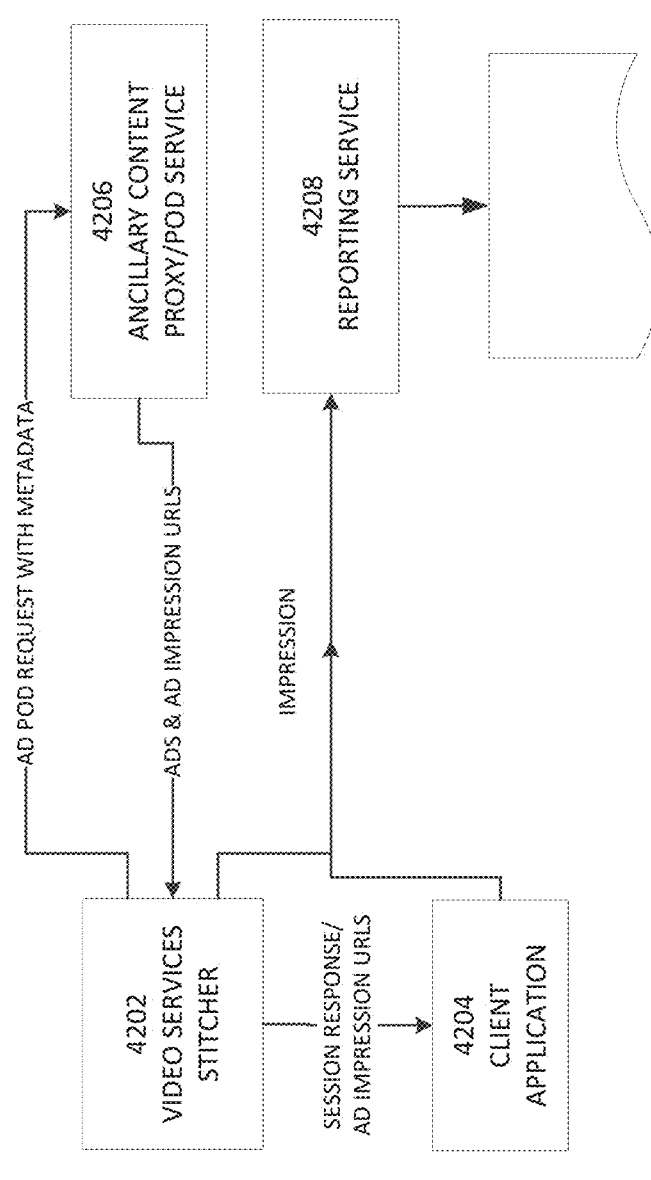
FIG. 42 illustrates an example architecture configured to generate analytics related to streaming content.

Referring now to FIG. 42, an example architecture and process is illustrated configured to collect, process and report key benefit indicators with respect to the distribution, viewing, interaction, and reporting of ancillary content, such as advertisements. The foregoing data may be provided to a business intelligence system.

The illustrated system is configured to differentiate between different types of ancillary content distributed, viewed, and interacted with (e.g., paid advertisements, house advertisements, public service announcements, backfill content, transition content, etc.). The illustrated system may further be configured to determine and analyze the foregoing data on a user session-by-user session basis. Further, the illustrated system is configured to determine an ancillary content load for a given user for a given channel for a given session and to determine the user responses and differences in user responses to different ancillary content loads and report the same.

The video services stitcher 4202 may issue a request for ads to populate an ad pod to an ancillary content proxy/pod service 4206, as similarly discussed elsewhere herein. The ancillary content proxy/pod service 4206 may respond with corresponding ancillary content and URLs (e.g., ads and ad impression URLs). For example, some of the foregoing data may be generated based on the impression URLs, associated with respective items of ancillary content, fired by the video services stitcher 4202 (e.g., server side ancillary content (e.g., ad) beacons) or the client application 4204 when a corresponding item of ancillary content is viewed by the user. In order to have an appropriate view per the user session, the user session identifier is included in the impression URLs. The user session identifier may be inserted into a given impression URL by the ancillary content proxy/pod service 4206.

The reporting service 4208 may use the impression data to generate reports providing the foregoing data.

Thus, systems and methods are described that enhance the placement of content, such as interstitial content, to increase the viewing of such content. Techniques described herein may optionally be used to reduce overall system loading, reduce peak system loading, and enhance system performance with respect to generating predictions of content interactions.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multithreaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc. While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system configured to dynamically control streaming of content for linear, scheduled content, the system comprising:

a network interface;

at least one processing device;

non-transitory memory storing programmatic code that when executed by the at least one processing device, cause the system to perform operations comprising:

select for a first user a first customized prediction model, from a plurality customized prediction models, to generate customized response predictions for the first user of responses to different presentations of interstitial content with respect to a digital program, wherein the first customized prediction model is generated based at least upon:

a number of interstitials in a sequence of interstitials the first user viewed before navigating away from or fast forwarding through the sequence of interstitials;

execute the first customized prediction model to generate predictions of responses for the first user to a plurality of different presentations of interstitial content:

based at least in part on the generated predictions of responses for the first user to the plurality of different presentations of interstitial content, determine a first presentation of items of interstitial content comprising a first number of items of interstitial content; and enable the first number of items of interstitial content to be streamed to and displayed by a user device of the first user using the determined first presentation.

2. The system as defined in claim 1, the operations further comprising:

at least partly in response to detecting that the user device has begun streaming a first item of primary content after a scheduled start time of the first item of primary content, reduce a time length of a first ancillary content pod.

3. The system as defined in claim 1, the operations further comprising:

access a specification of a first time length of a first ancillary content pod;

transmit a first request for ancillary content of a duration corresponding to the first time length;

determine whether a response to the first request for ancillary content of a duration corresponding to the first time length of the first ancillary content pod includes ancillary content of insufficient duration to populate the first time length;

at least partly in response to determining that the response to the first request is insufficient to populate the first time length of the first ancillary content pod:

reduce the first time length of the first ancillary content pod by a first time period;

cause items of ancillary content associated with the response to the first request for ancillary content to be streamed to a first user device;

cause an item of primary content, associated with a corresponding scheduled start time, to be streamed immediately after the items of ancillary content associated with the response to the first request are streamed to the first user device, and earlier than the corresponding scheduled start time of the item of primary content;

determine a respective extension time length for an ancillary content pod scheduled to be played after the first ancillary content pod;

extend the time length of the ancillary content pod scheduled to be played after the first ancillary content pod by a respective extension time length;

enable the ancillary content pod extended by the extension time length to be populated with one or more items of ancillary content;

enable the one or more items of ancillary content used to populate the ancillary content pod extended by the extension time length, to be streamed to the first user device;

transmit a second request for ancillary content of the duration corresponding to the first time length of the first ancillary content pod, wherein the second request includes one or more variables different than variables included in the first request, wherein the variables included in the second request are associated with one or more characteristics of a second user;

determine whether a response to the second request for ancillary content includes ancillary content of sufficient duration to populate the first time length of the first ancillary content pod;

at least partly in response to determining that the response to the second request for ancillary content is sufficient to populate the first time length of the first ancillary content pod:

cause the one or more items of ancillary content associated with the response to the second request for ancillary content to be streamed to a second user device; and cause the item of primary content, associated with the corresponding scheduled start time, to be streamed after the items of ancillary content associated with the response to the second request for ancillary content are streamed to the second user device, and at the corresponding scheduled start time of the item of primary content.

4. The system as defined in claim 1, the operations further comprising:

access a specification of a first time length of a first ancillary content pod, wherein items of primary content are associated with corresponding scheduled start play times;

transmit a first request for ancillary content of a duration corresponding to the first time length;

determine whether a response to the first request for ancillary content of a duration corresponding to the first time length of the first ancillary content pod includes ancillary content of insufficient duration to populate the first time length;

at least partly in response to determining that the response to the first request is insufficient to populate the first time length of the first ancillary content pod:

reduce the first time length of the first ancillary content pod by a first time period;

cause items of ancillary content associated with the response to the first request for ancillary content to be streamed to a first user device;

cause an item of primary content, associated with a corresponding scheduled start time, to be streamed immediately after the items of ancillary content associated with the response to the first request are streamed to the first user device, and earlier than the corresponding scheduled start time of the item of primary content;

determine an extension time length for an ancillary content pod scheduled to be played after the first ancillary content pod;

extend the time length of the ancillary content pod scheduled to be played after the first ancillary content pod by the extension time length;

enable the ancillary content pod extended by the extension time length to be populated with one or more items of ancillary content; and enable the one or more items of ancillary content used to populate the ancillary content pod extended by the extension time length, to be streamed to the first user device.

5. The system as defined in claim 1, the operations further comprising:

detect that a second user device is accessing a first channel comprising a first plurality of items of primary content associated with respective scheduled start times;

detect that the second user device has accessed a second channel comprising a second plurality of items of primary content associated with respective scheduled start times;

detect that the second user device has returned to accessing the first channel at a first time;

determine that a second item of content is scheduled to be played in the first channel beginning prior to and ending after when the second user device has returned to accessing the first channel at the first time; and at least partly in response to determining that the second item of content is scheduled to be played in the first channel beginning prior to and ending after when the second user device has returned to accessing the first channel at the first time, cause the second item of content to be played by the second user device from the beginning of the second item of content.

6. The system as defined in claim 1, the operations further comprising:

detect that a second user device is accessing, during a first session, a first channel comprising a first plurality of items of primary content associated with respective scheduled start times;

determine that a second item of primary content is to be streamed to the second user device earlier by a first amount than a scheduled start time for the second item of primary content;

cause a drift value corresponding to the first amount to be stored;

detect that the second user device has accessed, during the first session at a first time, a given channel comprising a second plurality of items of primary content associated with respective scheduled start times;

detect that the second user device has returned to accessing, during the first session at a second time, the given channel;

determine a difference between the first time and the second time;

access the stored drift value;

based at least in part:

on the accessed drift value, and the determined difference between the first time and the second time, determine what content is to be streamed to the second user device.

7. The system as defined in claim 1, the operations further comprising:

detect that a second user device is accessing, during a first session, a first channel comprising a first plurality of items of primary content associated with respective scheduled start times;

detect that the second user device has accessed, during the first session, a second channel comprising a second plurality of items of primary content associated with respective scheduled start times;

detect that the second user device has returned to accessing, during the first session, the first channel at a first time;

determine that a second item of primary content is scheduled to be played beginning prior to and ending after when the second user device has returned to accessing, during the first session, the first channel at the first time; and at least partly in response to determining that the second item of primary content is scheduled to be played in the first channel beginning prior to and ending after when the second user device has returned to accessing, during the first session, the first channel at the first time, cause a different item of content to be played by the second user device instead of the second item of primary content.

8. The system as defined in claim 1, the operations further comprising:

detect that a second user device is accessing, during a first session, a first channel comprising a first plurality of items of primary content associated with respective previously scheduled start times;

determine that a second item of primary content is to be streamed to the second user device earlier by a drift period than a scheduled start time for the second item of primary content;

cause a drift value corresponding to the drift period to be stored;

detect an upcoming anchor event in the first channel; and at least partly in response to detecting the upcoming anchor event in the first channel, cause backfill content to be streamed to the second user device prior to the upcoming anchor event, to thereby reduce the drift period and to cause a viewing experience of the second user device with respect to at least one item of content to be synchronized to a previously scheduled start time of the at least one item of content.

9. The system as defined in claim 1, the operations further comprising:

determine that a second item of primary content is to be streamed to a second user device earlier by a drift period than a scheduled start time for the second item of primary content;

cause a drift value corresponding to the drift period to be generated;

access a maximum drift specification; and at least partly in response to a comparison of the drift value and the maximum drift specification, cause a viewing experience of the second user device with respect to at least one item of content to be synchronized to a previously scheduled start time of the at least one item of content.

10. The system as defined in claim 1, the operations further comprising:

identify a first plurality of users that share at least a first characteristic;

assign the first plurality of users that share at least the first characteristic to first cohort;

identify a second plurality of users that share at least a second characteristic;

assign the second plurality of users that share at least the second characteristic to second cohort;

stream content of a first channel to at least one device of a user assigned to the first cohort, the first channel including a second ancillary content pod having a first designated length;

stream content of the first channel to at least one device of a user assigned to the second cohort, the first channel including the second ancillary content pod having the first designated length;

cause the second ancillary content pod to be populated with a first set of ancillary content having a first length for at least one user assigned to the first cohort, the first length less than the first designated length;

cause the second ancillary content pod to be populated with a second set of ancillary content having a second length for at least one user assigned to the second cohort, the second length less than the first designated length;

store a first drift value corresponding to a difference between the first designated length and the first length;

store a second drift value corresponding to a difference between the first designated length and the second length;

cause a second item of primary content to be streamed in the first channel at a first adjusted time to at least one device of a user assigned to the first cohort, the first adjusted time earlier than a scheduled start time for the second item of primary content, the first adjusted time determined using at least the first drift value; and cause the second item of primary content to be streamed in the first channel at a second adjusted time to at least one device of a user assigned to the second cohort, the second adjusted time earlier than the scheduled start time for the second item of primary content, the second adjusted time determined using at least the second drift value.

11. A computer-implemented method, the method comprising:

selecting, using a computer system comprising a processing device, for a first user a first customized prediction model, from a plurality customized prediction models, to generate customized response predictions for the first user of responses to different presentations of interstitial content with respect to a program, wherein the first customized prediction model is generated based at least upon:

a number of interstitials in a sequence of interstitials the first user viewed before navigating away from or fast forwarding through the sequence of interstitials;

executing the first customized prediction model to generate predictions of responses for the first user to a plurality of different presentations of interstitial content:

based at least in part on the generated predictions of responses for the first user to the plurality of different presentations of interstitial content, determining a first presentation of items of interstitial content comprising a first number of items of interstitial content; and enabling the first number of items of interstitial content to be streamed to and displayed by a user device of the first user using the determined first presentation.

12. The computer-implemented method as defined in claim 11, the method further comprising:

at least partly in response to detecting that the user device has begun streaming a first item of primary content after a scheduled start time of the first item of primary content, reduce a time length of a first ancillary content pod.

13. The computer-implemented method as defined in claim 11, the method further comprising:

accessing a specification of a first time length of a first ancillary content pod, wherein items of primary content are associated with corresponding scheduled start play times;

transmitting a first request for ancillary content of a duration corresponding to the first time length;

determining whether a response to the first request for ancillary content of a duration corresponding to the first time length of the first ancillary content pod includes ancillary content of insufficient duration to populate the first time length;

at least partly in response to determining that the response to the first request is insufficient to populate the first time length of the first ancillary content pod:

reducing the first time length of the first ancillary content pod by a first time period;

causing items of ancillary content associated with the response to the first request for ancillary content to be streamed to a first user device;

causing an item of primary content, associated with a corresponding scheduled start time, to be streamed immediately after the items of ancillary content associated with the response to the first request are streamed to the first user device, and earlier than the corresponding scheduled start time of the item of primary content;

determining a respective extension time length for an ancillary content pod scheduled to be played after the first ancillary content pod;

extending the time length of the ancillary content pod scheduled to be played after the first ancillary content pod by a respective extension time length;

enabling the ancillary content pod extended by the extension time length to be populated with ancillary content; and enabling the ancillary content used to populate the ancillary content pod extended by the extension time length, to be streamed to the first user device;

transmit a second request for ancillary content of the duration corresponding to the first time length of the first ancillary content pod, wherein the second request includes one or more variables different than variables included in the first request, wherein the variables included in the second request are associated with one or more characteristics of a second user;

determining whether a response to the second request for ancillary content includes ancillary content of sufficient duration to populate the first time length of the first ancillary content pod;

at least partly in response to determining that the response to the second request for ancillary content is sufficient to populate the first time length of the first ancillary content pod:

causing items of ancillary content associated with the response to the second request for ancillary content to be streamed to a second user device; and causing the item of primary content, associated with the corresponding scheduled start time, to be streamed after the items of ancillary content associated with the response to the second request for ancillary content are streamed to the second user device, and at the corresponding scheduled start time of the item of primary content.

14. The computer-implemented method as defined in claim 11, the method further comprising:

accessing a specification of a first time length of a first ancillary content pod, wherein items of primary content are associated with corresponding scheduled start play times;

transmitting a first request for ancillary content of a duration corresponding to the first time length;

determining whether a response to the first request for ancillary content of a duration corresponding to the first time length of the first ancillary content pod includes ancillary content of insufficient duration to populate the first time length;

at least partly in response to determining that the response to the first request is insufficient to populate the first time length of the first ancillary content pod:

reducing the first time length of the first ancillary content pod by a first time period;

causing items of ancillary content associated with the response to the first request for ancillary content to be streamed to a first user device;

causing an item of primary content, associated with a corresponding scheduled start time, to be streamed immediately after the items of ancillary content associated with the response to the first request are streamed to the first user device, and earlier than the corresponding scheduled start time of the item of primary content;

determining an extension time length for an ancillary content pod scheduled to be played after the first ancillary content pod;

extending the time length of the ancillary content pod scheduled to be played after the first ancillary content pod by the extension time length;

enabling the ancillary content pod extended by the extension time length to be populated with ancillary content; and enabling the ancillary content used to populate the ancillary content pod extended by the extension time length, to be streamed to the first user device.

15. The computer-implemented method as defined in claim 11, the method further comprising:

detecting that a second user device is accessing, during a first session, a first channel comprising a first plurality of items of primary content associated with respective scheduled start times;

determining that a second item of primary content is to be streamed to the second user device earlier by a first amount than a scheduled start time for the second item of primary content;

causing a drift value corresponding to the first amount to be stored;

detect that the second user device has accessed, during the first session at a first time, a given channel comprising a second plurality of items of primary content associated with respective scheduled start times;

detecting that the second user device has returned to accessing, during the first session at a second time, the given channel;

determining a difference between the first time and the second time;

accessing the stored drift value; and based at least in part:

on the accessed drift value, and the determined difference between the first time and the second time, determining what content is to be streamed to the second user device.

16. The computer-implemented method as defined in claim 11, the method further comprising:

detecting that a second user device is accessing a first channel comprising a first plurality of items of primary content associated with respective scheduled start times;

detecting that the second user device has accessed a second channel comprising a second plurality of items of primary content associated with respective scheduled start times;

detecting that the second user device has returned to accessing the first channel at a first time;

determining that a second item of content is scheduled to be played in the first channel beginning prior to and ending after when the second user device has returned to accessing the first channel at the first time; and at least partly in response to determining that the second item of content is scheduled to be played in the first channel beginning prior to and ending after when the second user device has returned to accessing the first channel at the first time, causing the second item of content to be played by the second user device from the beginning of the second item of content.

17. The computer-implemented method as defined in claim 11, the method further comprising:

detecting that a second user device is accessing, during a first session, a first channel comprising a first plurality of items of primary content associated with respective scheduled start times;

detecting that the second user device has accessed, during the first session, a second channel comprising a second plurality of items of primary content associated with respective scheduled start times;

detecting that the second user device has returned to accessing, during the first session, the first channel at a first time;

determining that a second item of primary content is scheduled to be played beginning prior to and ending after when the second user device has returned to accessing, during the first session, the first channel at the first time; and at least partly in response to determining that the second item of primary content is scheduled to be played in the first channel beginning prior to and ending after when the second user device has returned to accessing, during the first session, the first channel at the first time, causing a second item of content to be played by the second user device instead of the second item of primary content.

18. The computer-implemented method as defined in claim 11, the method further comprising:

detecting that a second user device is accessing, during a first session, a first channel comprising a first plurality of items of primary content associated with respective previously scheduled start times;

determining that a second item of primary content is to be streamed to the second user device earlier by a drift period than a scheduled start time for the second item of primary content;

causing a drift value corresponding to the drift period to be stored;

detecting an upcoming anchor event in the first channel; and at least partly in response to detecting the upcoming anchor event in the first channel, causing backfill content to be streamed to the second user device prior to the upcoming anchor event, to thereby reduce the drift period and to cause a viewing experience of the second user device with respect to at least one item of content to be synchronized to a previously scheduled start time of the at least one item of content.

19. The computer-implemented method as defined in claim 11, the method further comprising:

determining that a second item of primary content is to be streamed to a second user device earlier by a drift period than a scheduled start time for the second item of primary content;

causing a drift value corresponding to the drift period to be generated;

accessing a maximum drift specification; and at least partly in response to a comparison of the drift value and the maximum drift specification, causing a viewing experience of the second user device with respect to at least one item of content to be synchronized to a previously scheduled start time of the at least one item of content.

20. The computer-implemented method as defined in claim 11, the method further comprising:

identifying a first plurality of users that share at least a first characteristic;

assigning the first plurality of users that share at least the first characteristic to first cohort;

identifying a second plurality of users that share at least a second characteristic;

assign the second plurality of users that share at least the second characteristic to second cohort;

streaming content of a first channel to at least one device of a user assigned to the first cohort, the first channel including a second ancillary content pod having a first designated length;

streaming content of the first channel to at least one device of a user assigned to the second cohort, the first channel including the second ancillary content pod having the first designated length;

causing the second ancillary content pod to be populated with a first set of ancillary content having a first length for at least one user assigned to the first cohort, the first length less than the first designated length;

causing the second ancillary content pod to be populated with a second set of ancillary content having a second length for at least one user assigned to the second cohort, the second length less than the first designated length;

storing a first drift value corresponding to a difference between the first designated length and the first length;

storing a second drift value corresponding to a difference between the first designated length and the second length;

causing a second item of primary content to be streamed in the first channel at a first adjusted time to at least one device of a user assigned to the first cohort, the first adjusted time earlier than a scheduled start time for the second item of primary content, the first adjusted time determined using at least the first drift value; and causing the second item of primary content to be streamed in the first channel at a second adjusted time to at least one device of a user assigned to the second cohort, the second adjusted time earlier than the scheduled start time for the second item of primary content, the second adjusted time determined using at least the second drift value.

\* \* \* \* \*